(12) United States Patent
Meier et al.

(10) Patent No.: US 7,350,077 B2
(45) Date of Patent: Mar. 25, 2008

(54) 802.11 USING A COMPRESSED REASSOCIATION EXCHANGE TO FACILITATE FAST HANDOFF

(75) Inventors: Robert Meier, Cuyahoga Falls, OH (US); Richard D. Rebo, Fairlawn, OH (US); Victor J. Griswold, North Canton, OH (US); Douglas Smith, Stouffvile (CA); Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 829 days.

(21) Appl. No.: 10/417,653

(22) Filed: Apr. 17, 2003

(65) Prior Publication Data

US 2004/0103282 A1 May 27, 2004

Related U.S. Application Data

(60) Provisional application No. 60/439,419, filed on Jan. 10, 2003, provisional application No. 60/429,714, filed on Nov. 26, 2002.

(51) Int. Cl.
*H04L 9/00* (2006.01)

(52) U.S. Cl. ................ 713/171; 713/168; 380/47; 705/67

(58) Field of Classification Search ........... 713/171, 713/168; 370/338
See application file for complete search history.

(56) References Cited

U.S. PATENT DOCUMENTS

| | | | |
|---|---|---|---|
| 5,295,154 A | 3/1994 | Meier et al. | |
| 5,394,436 A | 2/1995 | Meier et al. | |
| 5,428,636 A | 6/1995 | Meier | |
| 5,504,746 A | 4/1996 | Meier | |
| 5,673,031 A | 9/1997 | Meier | |
| 5,740,366 A | 4/1998 | Mahany et al. | |
| 5,790,536 A | 8/1998 | Mahany et al. | |
| 5,940,771 A | 8/1999 | Gollnick et al. | |
| 6,046,992 A | 4/2000 | Meier et al. | |
| 6,084,867 A | 7/2000 | Meier | |
| 6,374,311 B1 | 4/2002 | Mahany et al. | |
| 6,965,674 B2 * | 11/2005 | Whelan et al. | 380/270 |
| 2002/0012433 A1 * | 1/2002 | Haverinen et al. | 380/247 |
| 2002/0061748 A1 | 5/2002 | Nakakita et al. | |
| 2002/0120844 A1 * | 8/2002 | Faccin et al. | 713/168 |

(Continued)

OTHER PUBLICATIONS

International Search Report mailed Aug. 19, 2004 related to PCT/US04/011880 filed Apr. 16, 2004.

(Continued)

*Primary Examiner*—Kambiz Zand
*Assistant Examiner*—Roderick Tolentino
(74) *Attorney, Agent, or Firm*—Tucker Ellis & West LLP

(57) ABSTRACT

A method and system for handling roaming mobile nodes in a wireless network. The system uses a Subnet Context Manager to store current Network session keys, security policy and duration of the session (e.g. session timeout) for mobile nodes, which is established when the mobile node is initially authenticated. Pairwise transit keys are derived from the network session key. The Subnet Context Manager handles subsequent reassociation requests. When a mobile node roams to a new access point, the access point obtains the network session key from the Subnet Context Manager and validates the mobile node by computing a new pairwise transient key from the network session key.

42 Claims, 29 Drawing Sheets

U.S. PATENT DOCUMENTS

| | | | |
|---|---|---|---|
| 2002/0191572 A1* | 12/2002 | Weinstein et al. | 370/338 |
| 2003/0039234 A1* | 2/2003 | Sharma et al. | 370/338 |
| 2003/0112977 A1* | 6/2003 | Ray et al. | 380/270 |
| 2003/0126466 A1* | 7/2003 | Park et al. | 713/201 |
| 2004/0088545 A1* | 5/2004 | Foster et al. | 713/167 |

OTHER PUBLICATIONS

IEEE Standard for Local and Metropolitan Area Networks-Port-Based Network Access Control; American National Standard; Jul. 13, 2001; pp. 1-134; I-VIII, XP002966199.

Decleene, et al.; Secure Group Communications for Wireless Networks; vol. 1 of 2; Oct. 28, 2001; pp. 113-117; XP010578990; ISBN: 0-7803-7225-5; Abstract; Figs. 1-2.

J. Arkko, et al.; EAP AKA Authentication; Internet Draft of the Internet Engineering Task Force IETF, Feb. 2002; pp. 1-28; XP002273977.

Waldvogel, et al.; The Versakey Framework: Versatile Group Key Management; IEEE Journal on Selected Areas in Communications; IEEE Inc.; New York, US; vol. 17, No. 9, Sep. 1999; pp. 1614-1631.

\* cited by examiner

| 802.1X Authentication Type | NSK computation | NSK length (in bytes) | SCM Acquitisiton |
|---|---|---|---|
| LEAP | Mutually derived by MN and AS | 16 | Radius attribute: MS-MPPE single key |
| PEAP | Mutually derived by MN and AS | 32 | Radius attribute: MS-MPPE Recv-key (ignore Send-key) |
| EAP-TLS | Mutually derived by MN and AS | 32 | Radius attribute: MS-MPPE Recv-key (ignore Send-key) |
| EAP-MD5 | None | 5, 13 or 16 | Static configuration |

FIGURE 2

| OUI | Type | Meaning |
|---|---|---|
| 00:50:F2 | 0 | No Authenticated Key Management |
| 00:50:F2 | 1 | Authenticated Key Management using unspecified authentication over 802.1X: default for SSN |
| 00:50:F2 | 2 | Authenticated Key Management using pre-shared Key over 802.1X |
| 00:50:F2 | 3-255 | Reserved |
| 00:40:96 | Agreed value | CCKM** |
| Other | Any | Vendor Specific |

FIGURE 3

SCM cache of MN credentials

| Field | Length(bytes) | Description |
|---|---|---|
| State | 2 | Indicates whether this node is Active or not |
| STA Addr | 8 | WLCCP Node identifier : MN's MAC address |
| Authentication Type | 1 | EAP Type used to authenticate |
| Key Management Type | 1 | Type of (or no) key management negotiated. Valid values are:<br>0 – none<br>1 – CCKM<br>2 – SSN/TGi |
| Session Timeout | 4 | Session expiration time provided by the Radius Access Accept |
| KRK | 16 | Key Request Key used to authenticate MNs request for context transfers |
| BTK | 32 | Base Transient Key used to derive PTKs |
| RN | 8 | Rekey number used to track how many PTKs have been derived from BTK |
| SSID | 32 | MN's associated SSID |
| VLAN ID | 2 | MN's associated VLAN assignment |
| BSSID | 6 | Defines the current associated AP |
| Cipher | 2 | Negotiated cipher, values are:<br>0x0000 – none<br>0x0001 – WEP<br>0x0002 – TKIP<br>0x0003 – AES-OCB<br>0x0004 – AES-CCMP<br>0xff<value> - Vendor specific |
| NSK Key length | 2 | Rx key length as specified by MS-MPPE |
| NSK | N | The Rx key resulting from a successful 802.1X EAP authentication (Rx Key in MS-MPPE) |
| Tx Key length | 2 | Rx key length as specified by MS-MPPE |
| Tx Key | P | The Tx key resulting from a successful 802.1X EAP authentication (Tx key in MS-MPPE) |

FIGURE 4

AP's cached credentials

| Field | Length (bytes) | Description |
|---|---|---|
| State | 1 | Indicates whether this node is Active or not. |
| Node-ID | 8 | WLCCP Node Identifier: AP's MAC Address (e.g. BSSID) |
| NSK | 16 | The key resulting from a successful LEAP authentication. |
| Session Timeout | 4 | Session expiration time provided by the Radius Access Accept |
| CTK | 32 | The current context transfer key used to protect communications between the SCM Authenticator and the Node-ID |
| Key Sequence Counter | 4 | A sequence counter used to track how many CTK key refreshes have occured |

FIGURE 5

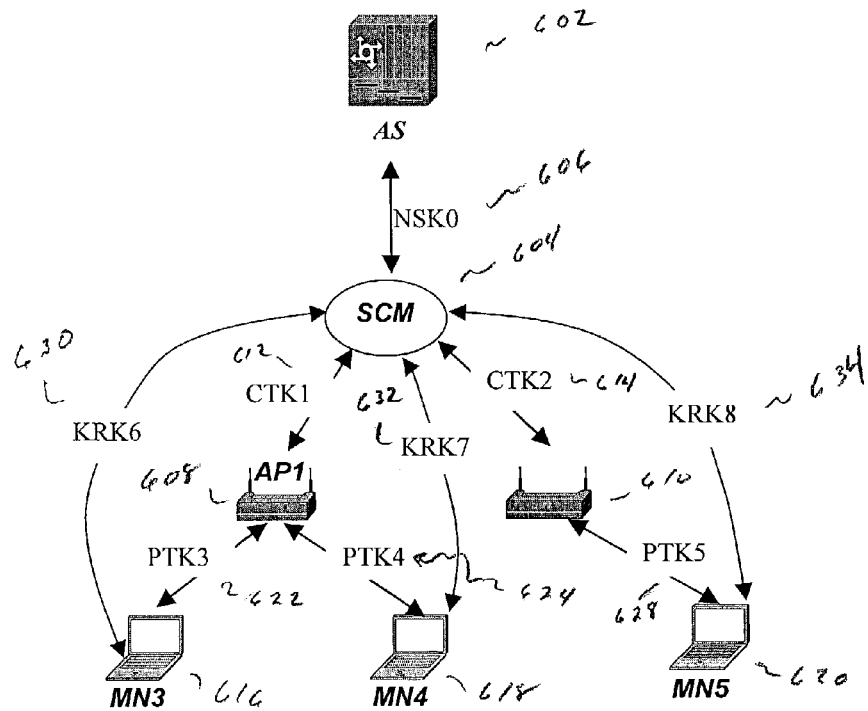

FIGURE 6

AP registration to SCM

| AP (702) | SCM (704) | Authentication Server (AS) (706) |
|---|---|---|
| | SCM discards all requests from unauthenticated and unregistered APs | |
| AP receives SCM advertisement. AP must 1st authenticate to SCM. | SCM sending advertisements over wired line, allowing AP and MN authentications. SCM is the Authenticator | |
| WLCCP encapsulated EAP Identity Response → | | |
| | RADIUS access request with EAP attribute → | |
| | | ←RADIUS challenge with EAP attribute containing LEAP Server Challenge |
| | ← EAPOL packet with LEAP Server Challenge | |
| WLCCP encapsulated EAPOL packet with LEAP challenge response→ | | |
| | RADIUS access request with EAP attribute → | |
| | | ← If invalid send a RADIUS deny with an EAP fail attribute |
| | | ← If valid send a RADIUS Access-Challenge message with an EAP success attribute |
| | ← EAPOL packet with EAP Success | |
| WLCCP encapsulated EAPOL packet with LEAP client challenge→ | | |
| | RADIUS access request with EAP attribute→ | |
| | | ← RADIUS Access-Accept message with EAP attribute containing LEAP client challenge response and Cisco attributes containing the session and session timeout |
| | SCM caches NSK and session timeout | |

FIGURE 7

|  | ← EAPOL packet with LEAP client challenge response |  |
|---|---|---|
| AP installs keys |  |  |
| WLCCP(Path Init, provide Nonce$_{AP}$) → |  |  |
|  | ← If Path Init fails, respond with a non-zero status |  |
|  | ← If Path Init succeeds, generate Nonce$_{SCM}$ and derive CTK, set KSC=1 send WLCCP( Path Init Reply, Nonce$_{SCM}$, MIC$_{CTK}$) |  |
| Obtain Nonce$_{SCM}$ and derive CTK. |  |  |
| If MIC$_{CTK}$ fails, confirm with a non-zero status → |  |  |
| If MIC$_{CTK}$ succeeds, set KSC=1, send WLCCP(Path Init Confirm, MIC$_{CTK}$) |  |  |
| AP can now protect communications with SCM using delivered CTK, request MN context transfers and register MNs |  |  |
| WLCCP(Registration Request) → |  |  |
|  | ← If Registration fails, respond with a non-zero status |  |
|  | ← If Registration succeeds send WLCCP( Pre-Registration Response, status=0) |  |

FIGURE 7 continued

| MN | AP | SCM |
|---|---|---|
| MN successfully associates and authenticates to the SCM. Both MN and SCM have NSK. | | |
| MN generates Nonce$_{MN}$ | | MN 802.1X authentication is complete, generate Nonce$_{SCM}$<br>Initiate KRK, BTK initialization |
| | | ← WLCCP_AUTHENTICATE encapsulated EAPOL packet with Nonce$_{SCM}$ |
| | ←EAPOL Key with Nonce$_{SCM}$ | |
| Compute KRK and BTK from PRF(NSK, Nonce$_{MN}$, Nonce$_{SCM}$) RN=1, PTK$_1$ = PRF"(BTK,BSSID\|\| RN)<br>Generate MIC$_{MN}$(KRK, BSSID, MN-ID, Nonce$_{MN}$, Nonce$_{AP}$, RSNIE$_{AP}$) | | |
| EAPOL Key with Nonce$_{MN}$,→ RSNIE$_{AP}$, MIC$_{KRK}$ | | |
| | WLCCP Pre-Reg Req packet → WTLV_SESSION_INIT request with WTLV_SECURE_CONTEX(AP-ID, MN-ID, Nonce$_{MN}$, SSID, MIC$_{KRK}$) | |
| | | ← If SSID, VLAN, MIC$_{MN}$ is invalid, do not update registry, do not generate keys. Send appropriate status value |
| | | ← If SSID, VLAN, MIC$_{MN}$ is valid, generate KRK, BTK from PRF(NSK, Nonce$_{MN}$, Nonce$_{AP}$), RN=1<br>Send WLCCP Pre-Reg Reply packet with WTLV_SESSION_INIT ( WTLV_SECURE_CONTEXT ( WTLV_TRANSIENT_KEY(BTK, RN), session timeout)) |
| | ← Cache BTK, RN and session timeout for this MN. Compose response EAPOL Key Nonce$_{MN}$, | |

FIGURE 10

|  | RSNIE$_{MN}$, MIC$_{AP}$ |  |
|---|---|---|
| MN can receive and transmit protected 802.1X and 802.11 unicast frames to AP | AP can receive and transmit protected 802.1X and 802.11 unicast frames to AP |  |
| MIC$_{MN}$ = MIC(PTK, BSSID, MN-ID, Nonce$_{MN}$, Nonce$_{AP}$, RSNIE$_{AP}$) EAPOL Key MIC$_{MN}$ → |  |  |
|  | ← EAPOL Key GTK, Nonce$_{GTK}$, MIC$_{GTK}$ |  |
| EAPOL Key Nonce$_{GTK}$, MIC→ |  |  |
| Port is fully open; all packets are protected | Port is fully open; all packets are protected |  |

FIGURE 10 continued

| Descriptor Type | Key Info |  | EAPOL Replay Ctr | rsvd | Key-ID | MN-ID | BSSID | RN | MIC |
|---|---|---|---|---|---|---|---|---|---|
| 1byte | 1byte | 2bytes | 4bytes | 1byte | 1byte | 6bytes | 6bytes | 4bytes | 8bytes |

FIGURE 11

| Initiator | Responder |
|---|---|
| State transition calls for a new PTK:<br>RN = RN + 1<br>New PTK = $PTK_{RN+1}$, compute $MIC_{request}$<br>Transmission to responder is halted until a valid response or timeout is reached.<br>Reception with $PTK_{RN}$ must be allowed<br>Request use of $PTK_{RN+1}$ in Key ID → | |
| | ← If the $MIC_{request}$ new RN is not greater than cached RN, or any attribute in EAPOL Key request is invalid, do no update PTK send response with non zero status |
| | ← If the $MIC_{request}$ RN and EAPOL Key attributes are valid.<br>Update RN and compute $PTK_{RN+1}$<br>flush MN transmit queue<br>Install $PTK_{RN+1}$<br>Respond ready to xmit and rcv with $PTK_{RN+1}$<br>(once response is sent, rcvd packets from MN using $PTK_{RN}$ will not decrypt properly) |
| If the $MIC_{response}$ or any EAPOL Key attribute is invalid, abort this rekey and try again → | |
| If $MIC_{response}$ and EAPOL Key attributes are valid: install $PTK_{RN+1}$<br>Ready to xmit and rcv with $PTK_{RN+1}$<br>Send EAPOL Key confirm message → | |
| | ← If the $MIC_{confirm}$ or any attribute in EAPOL Key confirm is invalid, either trigger another rekey, determine it's a spoof and disassoc or deauth |
| | If EAPOL confirm is valid link is now protected using $PTK_{RN+1}$ |

FIGURE 12

| Element ID | Length | OUI | OUI Type | Timestamp | RN | $MIC_{MN}$ |
|---|---|---|---|---|---|---|
| 1byte | 1byte | 3bytes | 1byte | 8bytes | 4bytes | 8bytes |

FIGURE 13

| Element ID | Len | OUI | OUI Type | RN | KeyID (unicast) | KeyID (multicast) | multicast key length | MIC$_{AP}$ | EGTK |
|---|---|---|---|---|---|---|---|---|---|
| 1 byte | 1byte | 3bytes | 1byte | 4bytes | 1byte | 1byte | 2bytes | 8bytes | multicast key len |

| Field Name | Offset | Size (bytes) | Description |
|---|---|---|---|
| Node Type 1902 | 0 | 2 | (none) = 0<br>AP = 1<br>SCM = 2<br>LCM = 4<br>CCM = 8<br>ICN = 0x10 /* infrastructure client */<br>Client = 0x40<br><br>Multicast Flag – 0x8000 |
| Node Address 1804 | 2 | 6 | IEEE 48-bit global or locally administered address in canonical (i.e. Ethernet) format. |
FIGURE 18
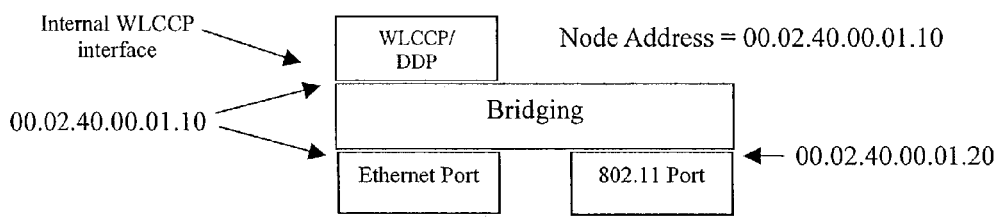
FIGURE 19
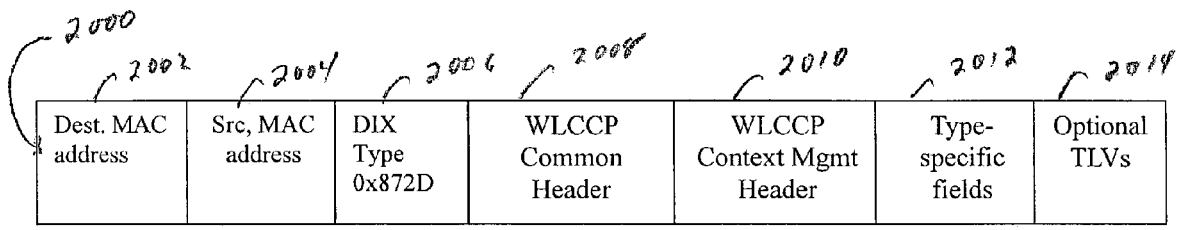
FIGURE 20

20/33

| Field Name | Offset | Size (bytes) | Description |
|---|---|---|---|
| Protocol ID/Version | 0 | 1 | Hex. C1-selected for compatibility with DDP. |
| WLCCP SAP | 1 | 1 | 8-bit protocol service access point ID<br>0 = WLCCP Context Mgmt SAP<br>2 = Radio Resource Mgmt SAP |
| Dest. Node Type | 2 | 2 | Node type of the hop destination |
| Length | 4 | 2 | Length of the message in bytes, including the WLCCP header |
| Type | 6 | 1 | Message Type<br>Bits 0-1 — Subtype (0 = Request, 1 = Reply, 2 = Confirm, 3 = Ack)<br>Bits 2-7 — Base Message Type |
| Hop Count | 7 | 1 | Number of WLCCP hops |
| Message ID | 8 | 2 | Message sequence number used to match request/reply pairs. |
| Flags | 10 | 2 | Bit 0 — Retry flag (set ON in retransmissions)<br>Bit 1 — Response-Req flag (set ON to request a reply)<br>Bit 2 — TLV flag (set ON to indicate that optional TLVs follow the fixed fields)<br>Bit 3 — Inbound Flag<br>Bit 4 — Outbound Flag<br>Bit 5 — Hopwise-Routing Flag<br>Bit 6 — Root CM Flag<br>Bit 7 — Relay Flag<br>Bit 8 — MIC Flag<br>Bits 9-15 — (reserved-must be 0) |
| Originator Node ID | 12 | 8 | Originator Node Type and Node Address |
| Responder Node ID | 20 | 8 | Responder Node Type and Node Address |
| Data | 28 | N | Type-specific fields and TLVs |

Fig. 21

| Field Name | Offset | Size (bytes) | Description |
|---|---|---|---|
| Type | 0 | 2 | TLV identifier<br><br>Bit 0 – Container Flag<br>Bit 1 – Encrypted Flag<br>Bits 2-3 – (reserved – must be zero)<br>Bits 4-7 – Group ID<br>Bit 8 – Request Flag<br>Bits 9-15 – Type ID |
| Length | 2 | 2 | Length of the TLV, including the Type and Length fields. |
| Value | 4 | N | Type-specific data, if the Request Flag is OFF |

Repeater AP Roaming:

802.11 USING A COMPRESSED REASSOCIATION EXCHANGE TO FACILITATE FAST HANDOFF

CROSS-REFERENCE TO RELATED APPLICATIONS

This application claims the benefit of U.S. Provisional Application No. 60/429,714, filed Nov. 26, 2002. This application claims the benefit of U.S. Provisional Application No. 60/439,419, filed Jan. 10, 2003.

COPYRIGHT OR MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention is generally related to wireless networking, more specifically to methods and systems for authenticating and provisioning wireless devices as the devices roam among access points.

Most current 802.11 network-level authentication protocols require a substantial amount of time to re-establish a wireless station's connectivity to the network after that station roams from one access point (AP) to another access point. Typically, when a station associates with a first access point, it has to be authenticated through a central authentication server. When the station roams to a new access point, the station loses the session to the network and must again authenticate itself with the authentication server which typically involves a full challenge request and response. A new accounting session is then established. This method introduces a new key hierarchy that commences on the initial authentication and allows for the authentication key to persist across the duration of a session to the network versus an 802.11 link. Further, this new key hierarchy is based on counter mode key generation to allow the precomputation of the 802.11 key obviating the need for unnecessary session teardown and restart.

This delay in re-establishing connectivity greatly impacts 802.11 service to the point that some upper-level protocols, such as Voice-over-IP (VoIP), actually fail. Furthermore, each roam commonly necessitates interaction with a site's Authentication, Accounting, and Authorization (AAA) servers, resulting in a significant increase in server load, to the point at which some servers fail to provide the necessary rate of authentications requests for the 802.11 lo stations. More importantly, after the authentication has succeeded, the 802.11 station must then use the key provisioned at authentication to establish a fresh key used to secure the 802.11 link with the access point.

Thus, the need exists for a fast, secure and reliable method for authenticating and provisioning a station when the station roams from one access point to another that decreases is traffic to the authentication server and optimizes the generation of a fresh 802.11 key. In designing a fast secure and reliable method for seamlessly roaming a station between access points, the following underlying assumptions and requirements are desirable:

1) Fast handoff must minimize the message transactions and computations between MN and AP
2) Fast handoff is affected only in intra-subnet mobility, though an infrastructure is built to allow for future support for inter-subnet mobility
3) The handoff must be secure
4) The overall design must leverage existing standards to the extent possible
5) The overall design must not interfere with existing protocols.
6) The handoff mechanism is based on key management and thus is independent of the authentication mechanism. Note however that any key management mechanism must be aware of chosen authentication type as it must know how to properly retrieve and interpret the NSK.
7) The handoff mechanism relies on a centralized service to provide secure key distribution services Current authentication protocols such as PEAP or TLS require interaction with the authentication state. PEAP touts the ability to shorten roam time by allowing a MN to bypass a full challenge-response authentication exchange by affecting a resume operation. IEEE 802.11 security task group 'i' e.g. TGi have accommodated for the means of pre-authenticating. These two mechanisms presume a need for re-establishment of the network session key (NSK) before the link between the AP and MN can establish a pairwise transient key (PTK) for protecting 802.11 and 802.1X traffic. However, with a defined key hierarchy, TGi also alludes to the ability of transferring the NSK from one AP to another. This design also uses the notion of retaining the NSK and relies only on the key management mechanisms to affect a fast handoff during a roam. However, to provide freshness and uniqueness of a session key for each access point, CCKM defines an initial authenticated key exchange by which the MN and first associated AP contribute material for deriving fresh keys for authenticating key requests, KRK, and a base transient key, BTK for deriving PTKs.

The following is a list of acronyms and their corresponding definition as used throughout this specification:
AKM—Authenticated Key Management
AP—Access Point
AS—Authentication server
BSSID—Basic Service Set Indetifier
BTK—Base Transient Key
CCKM—Central Key Management
CCM—Campus Context Manager
CCX—Client Enablement
CTK—Context Transfer Key
GTK—Group Transient Key
KRK—Key Request Key
MN—Mobile Node
MN-ID—Mobile Node Identifier
NSK—network session key
PRF—PseudoRandom Function
PMK—Pairwise Master Key
PTK—pairwise transient key
RN—rekey request sequence number
SCM—Subnet Context Manager
SSID—Service Set Identifier
SSN—Simple Security Network
VLAN—Virtual Local Area Network
WLCCP—Wireless Local Context Control Protocol.

Along with the aforementioned acronyms, defined below is a definition of terms appearing throughout this application:

IEEE—Institute of Electrical and Electronics Engineers, Inc.

IEEE 802.11—The 802.11 protocol and 802.11 terms are defined in IEEE Std 802.11, 1999 Edition IEEE 802.11 TGi—a task group in IEEE 802.11 currently focused in addressing 802.11 security.

802 address. A canonical IEEE 48 bit "Ethernet" address. 802.11 and Ethernet addresses are 802 addresses.

802.11 bridge—An 802.11 bridge is a transparent bridge with an Ethernet bridge port and one or more 802.11 bridge ports. A parent 802.11 bridge has a secondary 802.11 port which links to a primary 802.11 port in a child 802.11 bridge.

802.11 station—A MN or AP.

802.1X—The IEEE 802.1X protocol and 802.1X terms are defined in [ ]. 802.1X defines a protocol where an 802.1X Supplicant mutually authenticates with an 802.1X Authenticator via an Authentication Server.

AAA—Authentication Authorization Accounting. A node will request network access by executing a protocol to a (typically) Authentication Server that provides protocols and services for providing authentication, authorization and session accounting.

AKM—Authenticated Key Management. New selector in both the SSN and TGi negotiated element present in beacons, probe response and reassociation request/response messages. This selector allows for definition of authentication type and key management.

AP—Access Point. In this document, "AP" is used as a general term to refer to any 802.11-to-Ethernet or 802.11-to-802.11 relay devices.

Association Message—An 802.11 station sends an Association Request message to initially associate with a parent AP. The parent AP replies with an Association Response message.

AS—Authentication Server. A node that provides AAA (specifically authentication) service.

BDPU—an 802.1D Bridge Protocol Data Unit.

BSS—An 802.11 Basic Service Set. A BSS is the set of 802.11 stations associated with a single 802.11 AP. A logical "BSS port" in an AP is used to access stations in the BSS.

Base Transient Key (BTK)—the base transient key that is mutually derived between MN and SCM to serve as the key for generating PTKs.

Campus Network—an aggregate "seamless roaming domain" which implies a geographic locality which may include one or more 802.11 Extended Service Sets. A physical campus network may contain multiple "campus networks."

Central Key Management (CCKM)—the key management scheme of the present invention. It utilizes a central node, an AP, as the key distributor to enable protected communications between a link (e.g. an AP and MN).

Context Transfer Key (CTK)—A key shared between two nodes to establish protection of its data packets. The CTK may consist of a pair of keys if the protection mechanism requires a unique key for each encryption and packet authentication (e.g. a MIC).

Correspondent Host (CH)—A mobile or non-mobile node that is actively communicating with a MN.

Descendant—A node that is in the sub tree of a Topology Tree that is roonated in an ancestor node.

DRR—Descendant Registration Record. A DRR contains state information for descendant nodes. An MN-DRR is a DRR for a mobile node. An AP-DRR is a DRR for an AP.

DPR—Descendant Path Record (DPR). A DPR contains path state information for descendant nodes.

Downlink—The logical radio path from an 802.11 AP radio to a child 802.11 station.

ESS—An 802.11 Extended Service Set. An ESS includes one or more BSSes and may span one or more subnets. MNs can roam between APs in the ESS. A SWAN Campus Network may include multiple ESSes.

FA—A Mobile Ipv4 foreign agent.

Group Transient Key (GTK)—A key owned and managed by an AP. It is used to protect multicast and broadcast traffic.

HA—A Mobile Ipv4 home agent.

Hopwise Routing—"Hopwise routing" is used when an inbound or outbound WLCCP message must be forwarded to intermediate APs on the path from the Originator to the Responder.

IA—Infrastructure Node Authenticator. In standalone mode, the SCM is the IA; in a full SWAN configuration, the CCM is the IA.

IGMP—Internet Group Management Protocol. IGMP is used to determine IP multicast group membership.

IGMP Snooping—Switches and APs "snoop" IGMP messages, received on a port, to determine which IP multicast addresses must be transmitted on the port.

Inbound—An "inbound frame" is forwarded toward the CCM, in the SWAN Topology Tree. An "inbound node" is accessed via the "primary port". (An "inbound node" is not necessarily an "ancestor node".)

IN—Infrastructure Node. An IN is an AP, SCM, LCM, or CCM.

IRR—Inbound Registration Record.

KDC—Key Distribution Center. This is a service provided by the IN Authenticator to distribute CTKs to be consumed by registered infrastructure nodes.

Key Request Key (KRK)—the portion of the expanded NSK used to authenticate key refresh request/response handshakes Layer 2—The data link layer, as defined in the ISO 7-layer model.

L-CTK—Lateral Context Transfer Key.

Link—the logical link between two immediate neighbors in the SWAN Topology tree.

Link State—Each SWAN node is responsible for monitoring the link to each of its lo immediate neighbors. The Link State can be "Connected" or "Disconnected".

MIP—Mobile IPv4 as defined in RFC 2002.

MN—802.11 Mobile Node.

MN-ID—802.11 Mobile Node identifier represented as the node's MAC address

Network Session Key (NSK)—the key established by a successful authentication between a node an its authenticator. With the CCM being the authenticator for all infrastructure nodes and the LCM being the authenticator for all MNs. In the case where an SCM is acting in standalone mode, the SCM is the authenticator for all nodes.

MNR—Mobile Node Record. A Mobile Node Record contains state information for MNs.

Mobility bindings—The "mobility bindings" for a station are used to determine the current path to the station. APs, context managers, and MIP agents maintain mobility bindings for 802.11 stations.

MSC—Message Sequence Counter. This is effectively the RC4 IV and replay protector.

Native VLAN ID—A switch port and/or AP can be configured with a "native VLAN ID". Untagged or priority-tagged frames are implicitly associated with the native VLAN ID.

Network Access Identifier (NAI)—An NAI is used to identify a user within a network domain. For example, "joe@cisco.com" is a typical NAI.

NSK—Network Session Key. An NSK is the key established by a successful authentication between a node and its "authenticator". (The CCM is the authenticator for all infrastructure nodes and the LCM is the authenticator for all MNs, in a campus network. In a standalone subnet domain, the SCM is the authenticator for all nodes in the subnet.)

Originator—The node that "originates" a WLCCP "request" message.

Outbound—An "outbound frame" is forwarded away from the CCM, in the SWAN Topology Tree. An "outbound node" is a "descendant" node that is relatively further from the CCM in the SWAN Topology Tree.

OMNR—Outbound Mobile Node Record

Pairwise Master Key (PMK)—the key established by a successful authentication. This is the term used in both the TGi and SSN draft specification and is a key used to derive PTKs.

Pairwise Transient Key (PTK)—the key mutually derived by AP and MN and is a function of BTK and RN Path Authentication—Path authentication refers to the process where an AP or child CM mutually authenticates and establishes a path CTK with each of its ancestors. Path-Init and (optionally) intial Registration messages are used for path authentication.

Port—The logical entity that provides access to a SWAN Topology Tree "link". Multiple logical ports may exist on a single hardware interface.

PNR—Parent Node Record

Primary LAN—The wired Ethernet LAN directly attached to the SCM. Each subnet has one Primary Ethernet LAN. The primary LAN may include multiple Ethernet segments and wired transparent bridges/switches.

Primary Port—The port that is used to attach to the SWAN topology tree. In an SCM, it is the port that is used to access the parent LCM or CCM. In an AP, it is the port that is used to transmit frames toward the primary LAN. An AP primary port can be an Ethernet or 802.11 port. The AP primary port is the "default port" for unicast flooding purposes. [If an AP is co-located with an SCM, then a logical internal link exists between the AP and SCM. A logical AP "internal primary port" provides access to the SCM; however, the Ethernet port is still the "primary port" for frame forwarding purposes.]

PTK—Pairwise Transient Key. This key is used to protect 802.1X and 802.11 data packets between a MN and AP. PTKs are mutually derived by each node in the link based on a predefined strong pseudorandom function, BSSID, RN and BTK.

Reassociation Message—An 802.11 station sends an 802.11 Reassociation Request message to associate with a new parent AP after it roams. The parent AP replies with a Reassociation Response message.

Rekey Request Number (RN)—the counter used to protect PTK key refreshes from replay attacks. The counter is also used as part of the PTK key generator.

Repeater—A repeater is a "wireless AP" that is attached to a parent AP on an 802.11 primary port.

RN—Request Number. A sequence value used to rotate PTKs used between an authenticated MN and Root AP.

Root AP—A "root AP" is directly attached to the primary LAN on its primary Ethernet port.

Root CM—The CM that is at the root of the active SWAN Topology Tree. The CCM is the root CM in a campus network. The SCM is the root CM in a "stand-alone" subnet control domain.

Responder—The destination of a WLCCP Request message or the node that originates a WLCCP Reply message.

SARpM—SCM-Advertisement Reply Message

SCM—Subnet Context Manager. An SCM provides a central control point for each subnet. The SCM establishes the "primary LAN" for each subnet. From the perspective of a MN, a home SCM is the SCM of the home subnet for the MN and a foreign SCM is an SCM on any other "foreign subnet".

Seamless roaming. A MN is said to roam "seamlessly" if it roams between APs in different subnets without changing its "home IP address".

Secondary LAN—Any wired Ethernet LAN that is attached to the Primary Ethernet LAN by a wireless link. A secondary LAN may include multiple Ethernet segments and wired transparent bridges/switches.

Secondary Port—A secondary port is any active AP or CM port other than the primary port.

SSID—802.11 Service Set Identifier. Authentication parameters are defined globally per SSID. An SSID can be locally bound to a "home subnet" or VLAN, in each AP.

Simple Security Network (SSN)—Microsoft's specification for a framework used to provide 802.11 security. It mandates use of 802.1X EAP authentication, TKIP and Microsoft's 802.1X 4-way handshake for managing unicast keys and 802.1X 2-way handshake for managing broadcast and multicast keys.

STP—IEEE 802.1D Spanning Tree Protocol. An "STP AP" executes the 802.1D STP and the 802.1D STP is operated on an "STP link". A "non-STP AP" does not execute the 802.1D STP.

Subnet—An IP subnet. A MN is associated with a single "home subnet" at any given time. Any other subnet is a "foreign subnet", from the perspective of the MN.

Supplicant—The IEEE 802.1X standard defines the term "supplicant". A supplicant is a node that is mutually authenticating with an "802.1X authenticator" via an authentication server.

SWAN—Smart Wireless Architecture for Networking, an architecture for radio, network and mobility management within a secure environment.

SWAN Topology Tree—The logical structure of a SWAN network as determined by the SWAN parent/child relationships. The SWAN CCM is at the root of the topology tree.

VLAN—A "Virtual LAN", as defined in the IEEE 802.1Q standard.

TLV—Type, Length, Value "TLV's" contain optional parameters in WLCCP messages.

Uplink—The logical radio path from an 802.11 child station to its parent AP radio.

URR—Unbound Registration Record.

VLAN—A "Virtual LAN" as defined in the IEEE 802.1Q standard. VLAN tagged frames are transmitted on a VLAN Trunk link.

Wireless station—A MN, repeater, WGB, or child 802.11 bridge.

WGB—A work-group bridge is a non-STP AP with an 802.11 primary port and a secondary Ethernet port that provides access to a non-STP secondary Ethenet LAN segment.

WLAN-Wireless LAN.

WLCCP—Wireless LAN Context Control Protocol.

In addition to the aforementioned acronyms, unless otherwise defined acronyms from the 802.11 specification should be given their usual and customary meaning as defined by the 802.11 specification. The 802.11 specification is hereby incorporated by reference.

BRIEF SUMMARY OF THE INVENTION

In view of the aforementioned needs, the invention contemplates a design that reduces both message and computational burdens by employing a key hierarchy that decouples authentication session time from key management. Current 802.11 implementations tightly bind authentication and key management and enforce full backend (re)authentications because they are bound to the cipher suite selection. For Wired Equivalent Privacy (WEP), this can result in very frequent (re)authentications due to WEPs rekey requirements. For roaming, current implementations also enforce a full (re)authentication.

The key hierarchy defines keys established on a successful authentication as network session keys (NSKs), which are independent of the 802.11 cipher suite selection. The NSK is used to generate a key refresh key (KRK) to authenticate key refresh requests and a base transient key (BTK) which serves as the base key from which pairwise transient keys (PTK) are derived.

Only PTKs are bound to the selected 802.11 cipher suite and thus must be managed based on the cipher suite security policies. The longevity of the NSK is defined by the Authentication Server (AS) as a session timeout which can now be defined as a function of the NSK entropy versus the 802.11 negotiated cipher suite. It is desired is to strongly encourage the use of authentication types that result in generation of dynamic NSK with more good entropy.

Keys are managed by a centralized node that provides subnet context management (SCM). Preferably, the SCM is the 802.1X authenticator for all MNs and APs enforcing all MN nodes to implicitly register. The registration process ensures that all nodes in the registry have successfully associated, authenticated and have security credentials cached. The mechanisms described in this proposal are defined as Central Key Management (CCKM) and negotiated as a proprietary value in the Authenticated Key Management (AKM) information element as defined in SSN/TGi's drafts.

While the authentication mechanism remains unchanged, e.g. 802.1X Extensible Authentication Protocol (EAP) authentication, this design introduces a new key management scheme: Central Key Management (CCKM). This new capability is advertised and negotiated using SSN's IE or RSN's IE as described herein infra.

One aspect of the present invention is a method for authenticating a mobile node with a network, the steps comprising associating with an access point, authenticating the mobile node using an extensible authentication protocol by the access point, and establishing a network session key and registering the mobile node into the network infrastructure. The network session key is used to establish a key request key and a base transient key.

After the initial authentication, the network session key is sent to a Subnet Context Manager. The present invention further contemplates authenticating key refreshes using the network session key. It is further contemplated that pairwise transient keys are derived using the network session key.

Another aspect of the present invention is a method of re-association by a mobile node, the steps comprising sending a re-association request from a mobile node to an access point, the re-association request comprising a mobile node identification, a rekey request number, and an authentication element, validating the re-association request, the validating step comprising computing a new pairwise transient key, sending a response, the response comprising an authentication element, to the mobile node, the authentication element comprising the new pairwise transit key and an extensible authentication protocol over local area network key; and confirming the response by verifying the new pairwise transit key to a second computed pairwise transit key.

Typically the response is validated by verifying the new pairwise transient key. The response may also be verified by verifying a timestamp included in the response. The authentication element preferably uses a current pairwise transient key. The validating step is performed by either a subnet context manager (SCM), an authentication server (AS), or the access server (AAA server). Other methods for validating the request include but are not limited to verifying that the timestamp of the re-association request is within a configurable value, verifying the sequence number is greater than a previous value, sending to a query to a subnet context manager to validate the re-association request, wherein the access point (AP) receives a rekey request number and a base transient key from the subnet context manager and generates a pairwise transient key (PTK).

Another aspect of the present invention is a rekey sequence, the steps comprising: computing an authentication element, the authentication element comprising a rekey request number and a new pair transient key, transmitting to a responder a call for a new pair transient key, receiving an response authentication element from the responder; and verifying the response authentication element, the response authentication element comprising the new pair transient key. The rekey sequence may further comprise sending an extensible authentication protocol over local area network key confirm message. Prior to computing the authentication element, the rekey request number is incremented.

Another aspect of the present invention is a rekey sequence, the steps comprising: receiving a rekey request, the rekey request comprising a rekey request number and an authentication element, computing a new pair transient key; and sending a ready to transmit and receive with the new pair transient key message. The rekey sequence may further comprise receiving an extensible authentication protocol over local area network key confirm message, verifying the rekey request number is greater than a cached rekey request number, verifying all attributes of an extensible authentication protocol over local area network key request, updating a cached rekey request number, or a combination thereof. Furthermore, the authentication element may comprise a new initiator pair transient key and the steps may further comprise comparing the new pair transient key with the new initiator pair transient key.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings:

FIG. 2 is a table of Subnet Context Manager acquisition of network session keys;

FIG. 3 is a table illustrating authenticated key management selector values;

FIG. 4 is a table illustrating a Subnet Context Manager's cached credentials;

FIG. 5 is a table illustrating the credentials cached by an Access Point;

FIG. 6 is a block diagram illustrating the keys used to secure messages between links;

FIG. 7 is a flow diagram showing the steps for AP registration to an SCM;

FIG. 10 is a flow diagram illustrating the sequence triggered to complete a key establishment after a successful authentication;

FIG. 11 is an example key descriptor for a rekey sequence;

FIG. 12 is a block diagram showing a rekey sequence;

FIG. 13 is an example of the authenticating element included in a re-association request sent by a mobile node;

FIG. 18 is a table illustrating the format of a WLCCP Node ID.

FIG. 19 is block diagram showing the internal bridging structure in an access point;

FIG. 20 is an example of an Ethernet-encapsulated WLCCP Context Management frame;

FIG. 21 is an example of a WLCCP Message Header;

DETAILED DESCRIPTION OF INVENTION

Throughout this description, the preferred embodiment and examples shown should be considered as exemplars, rather than limitations, of the present invention.

The present invention reduces both message and computational burdens by employing a key hierarchy that decouples authentication session time from key management. Current 802.11 implementations tightly bound authentication and key management and enforce full backend (re)authentications because they are bound to the cipher suite selection. For WEP, this can result in very frequent (re)authentications due to WEPs rekey requirements. For roaming, current implementations also enforce a full (re) authentication.

The key hierarchy defines keys established on a successful authentication as network session keys (NSKs), which are independent of the 802.11 cipher suite selection. The NSK is used to generate a key refresh key (KRK) to authenticate key refresh requests and a base transient key (BTK) which serves as the base key from which pairwise transient keys (PTK) are derived.

Only PTKs are bound to the selected 802.11 cipher suite and thus must be managed based on the cipher suite security policies. The longevity of the NSK is defined by the Authentication Server (AS) as a session timeout which can now be defined as a function of the NSK entropy versus the 802.11 negotiated cipher suite. The goal is to strongly encourage the use of authentication types that result in generation of dynamic NSK with more good entropy.

Figure 1:
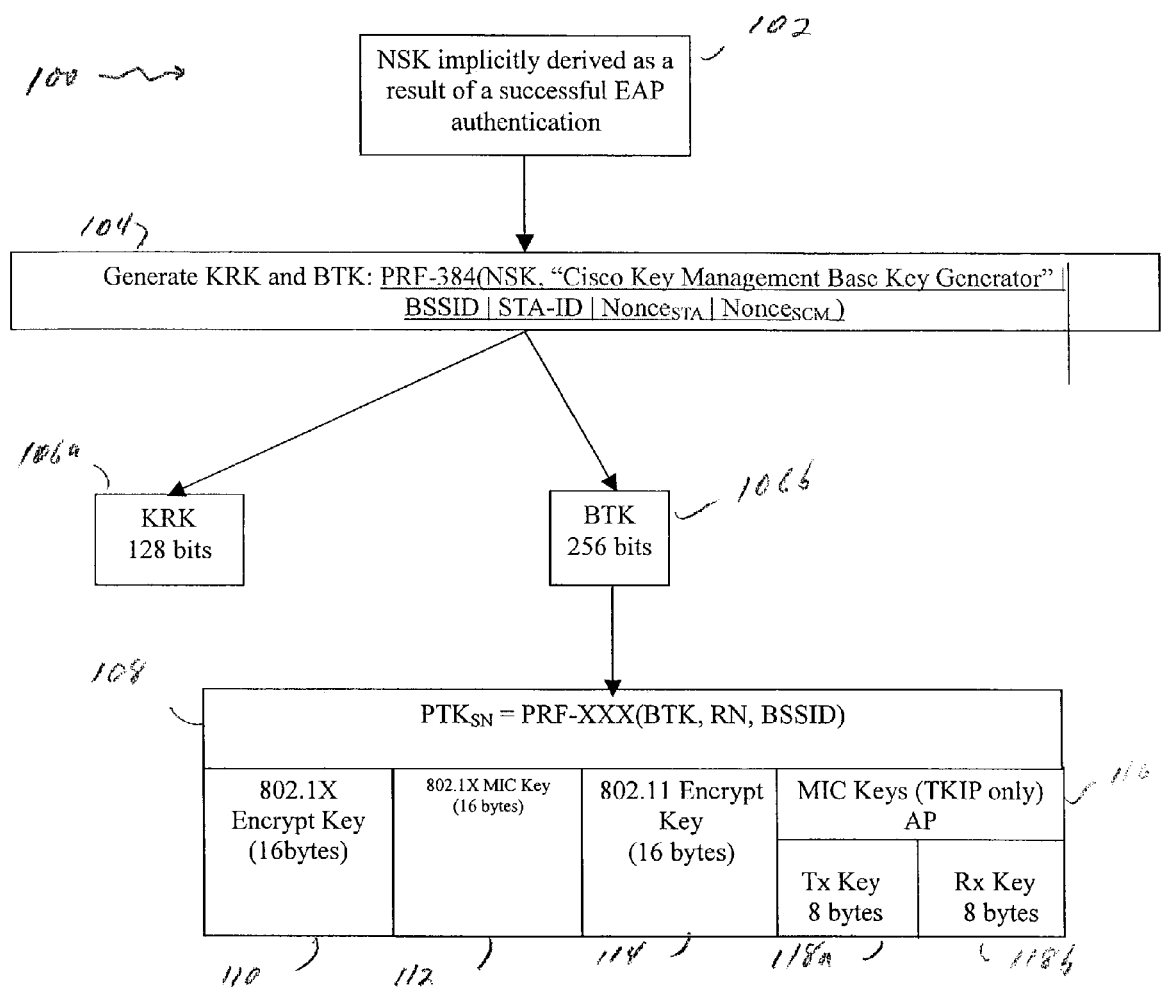
FIG. 1 is a block diagram illustrating a key hierarchy as contemplated by the present invention.

The new key hierarchy 100 is depicted in FIG. 1. Keys (as defined in FIG. 1) are managed by a centralized node that provides subnet context management (SCM). The SCM is the 802.1X authenticator for all MNs and APs enforcing all MN nodes to implicitly register. The registration process ensures that all nodes in the registry have successfully associated, authenticated and have security credentials cached. The mechanisms described in this proposal are defined as Central Key Management (CCKM) and negotiated as a proprietary value in the Authenticated Key Management (AKM) information element as defined in current SSN and TGi's drafts.

Referring to FIG. 1, the top of the hierarchy 100 is the NSK 102. The NSK 102 is implicitly derived as a result of a successful EAP authentication. From the NSK 102 is generated the KRK and BTK as shown in block 104. The KRK and BTK are generated using a PRF with the NSK, BSSID, STA-ID, Nonce$_{STA}$ and Nonce$_{SCM}$ as parameters. The 128 bit KRK 106a and 256 bit BTK 106b are derived from the NSK. From the BTK 106b is generated the PTK$_{SN}$ using a PRF with the BTK, RN and BSSID as parameters. From the PTK are derived the 802.1X Encrypt Key 110 (16 bytes), the 802.1X MIC key 112 (16 bytes), the 802.11 Encrypt Key 114 (16 byes) and the AP MIC Keys 116 (TKIP only). The AP MIC Keys 116 further comprise a Tx Key 118a, 8 bytes, and a Rx Key 118b, also 8 bytes.

While the authentication mechanism remains unchanged, e.g. 802.1X EAP authentication, the present invention introduces a new key management scheme: CCKM. This new capability is advertised and negotiated using SSN's IE or RSN's IE, described herein infra.

An implementation consideration of the present invention is ensuring autonomy from authentication mechanisms. Like TGi and SSN, the present invention also presumes the presence of a (NSK) key upon successful authentication. For security reasons, this key should in general be dynamically configured and managed. The present invention provisions for short NSK's and provides a means to stretch them to the required 384 bit length. Though heavily discouraged, this design can also allow for the use of pre-shared keys to be defined as the NSKs.

The CCKM must be aware of the authentication type used to interpret and retrieve the NSK. FIG. 2 is a table 200 that describes how the NSK is derived and retrieved by the SCM. Column 202 describes the 802.1X Authentication type. Column 204 describes the NSK computation. Column 206 shows the length of the NSK in bytes, and column 208 describes how the SCM acquires the NSK.

Authentication types that do not mutually derive dynamic keys, such as EAP-MD5 rely on having a static key to be configured similar to how legacy systems support pre-shared key authentication. These static configurations are traditionally managed at the AP. To allow for backward compatibility, these configurations must persist. Thus, CCKM will request these NSK types from the first associated AP as the session NSK.

The present invention contemplates a fast handoff system and method (herein referred to as CCKM) that is based on a centralized service, a Subnet Context Manager (SCM) to enable a seamless secure context transfer required to transition a MN from one AP to a new one. To secure such transfers, the SCM relies on each node both APs and MNs to mutually authenticate with the SCM. Upon successful authentication, a shared secret must be established: a network session key (NSK).

The use of the NSK deviates from IEEE 802.11 TGi's (as well as SSN) use of the key established at authentication. TGi/SSN refers to this key as a PMK which in turn is used as key material to derive both the 802.1X and 802.11 pairwise transient keys (PTKs). While CCKM also derives further key material from the NSK, the derived keys are used to authenticate transient key requests and to derive the PTKs. The key hierarchy is depicted in FIG. 1.

By defining a key rotation scheme, CCKM allows the MN to derive the new PTK before reassociation. The MN may derive the PTK for the new AP once it determines the new BSSID it is roaming to and before the reassociation request is transmitted. Thus, upon a reassociation request, the MN can be ready to protect unicast communications to the new AP but must await the AP's reassociation response as acknowledgement that both parties can now secure unicast communications. The AP's reassociation response also includes delivery of the broadcast keys (GTK) to enable full protected communications.

For general PTK rekeying, CCKM introduces EAPOL key descriptor enhancements similar to those defined in SSN/TGi to affect a CCKM rekey.

Using either SSN or TGi's information elements, SSN EE and RSN IE respectively, CCKM capabilities can be negotiated. Currently both specifications allow the negotiation for an authenticated key management suite. The suite selector encapsulates both an authentication and a key management mechanism, the assigned values are described in table 300 in FIG. 3. Column 302 is the Organization Unique Identifier (OUI), column 304 is the type corresponding to the OUI in column 302, and column 306 is the description for the OUI in column 302.

Both AP and MN must support CCKM for interoperability. The AP must advertise CCKM capability by using a new value in the Authenticated Key Management Suite Selector as defined in SSN v 0.21 and TGi draft 2.3.

CCKM capability must be advertised in beacons and negotiated during probe response and association request. Successful negotiation of CCKM enables the centralized key management defined in this specification. Enabling CCKM also implies activation of the SCM.

The SCM is designed to provide context control for a subnet and affect client context transfers upon a roam. The SCM is a module that can coexist in an AP, be a standalone server, or coexist in an AS. While the SCM is designed to affect full inter-subnet mobility, this design only employs the components required to affect intra-subnet mobility. These elements include:

a repository holding authenticated node's security credentials including the node's NSK, session timeout and security policy
   an MN's security credentials include an NSK, SSID, VLAN, session timeout, associated BSSID and possibly also authentication mechanism, key management mechanism and cipher suite negotiated at association. The credentials are used to validate the session before a context transfer and PTK can be delivered.
   an AP's security credentials include an NSK, session timeout and list of associated MNs
   a context repository including security credentials for all registered nodes
   services required to manage the context repository for registered MNs and APs
   services to identify and enable the SCM as the Authenticator for all APs and MNs
   SCM provides services to automatically provide the new AP with the MNs security credentials without client interaction
   services to generate and secure delivery of PTKs based on security policy.

The SCM maintains a cache of all registered MN contexts within a given subnet including the MNs' NSKs (shown in FIG. 4). The cached credentials for an AP are slightly different and are described in FIG. 5. Referring to FIG. 4, column 402 lists the SCAM cache of MN credentials, comprising the fields State 408, STA Addr 410, Authentication type 412, Key Management Type 414, Session Timeout 416, KRK 418, BTK 420, RN 422, SSID 424, VLAN ID 426, BSSID 428, Cipher 430, NSK Key length 432, NSK 434, Tx Key Length 436 and Tx Key 438. The length in bytes and a description of these fields are provided in columns 404 and 406 respectively. Referring to FIG. 5, the AP's cached credentials comprise the state 508, Node-ID 510, NSK 512, Session Timeout 514, CTK 516 and key sequence counter 518 as shown in column 502. The length and description of these fields are provided in columns 504 and 506 respectively.

The SCM establishes shared secrets with both the MN and APs. It uses the Key Request Key (KRK) as the shared secret with MNs to authenticate key requests. The Context Transfer Key (CTK) is the shared secret with APs to protect communications between the SCM and AP. The trust relationship is depicted in FIG. 6.

CTKs are distributed by the SCM to the AP for protecting link communications. Note that while it has been suggested that NSKs be used to protect AP to SCM communications, this would enforce a shorter session timeout and full reauthentications to the AS when link keys need updating.

FIG. 6 shows the keys used to protect communication between assigned links. Note that BTKs are not used to protect messages directly, rather, it is used to derive PTKs used to protect communications between AP and MN. As shown in FIG. 6, the AS 602 uses NSK0 606 to communicate with the SCM 604. The SCM 604 communicates with AP1 608 and AP2 610 using keys CTK1 612 and CTK2 614 respectively. AP1 608 communicates with MN3 616 and MN4 618 using PTK3 622 and PTK4 624 respectively, while AP2 610 communicates with MN5 with PTK5 628. The SCM 604 may also directly communicate with the mobile nodes, MN3 616, MN4 618 and MN5 620 using KRK6 630, KRK7 632 and KRK8 634 respectively.

PTKs are derived and refreshed based on a Rekey sequence counter and BTKs as defined or refreshed based on the NSK as decribed herein infra.

By employing Bering's SCM capabilities, the fast handoff design provides a scalable infrastructure that is required to provide inter-subnet roaming in a subsequent release.

The SCM services coexist in any AP and thus an election mechanism may be defined to allow for the selection of an AP as the SCM provider.

While there will be no initial support for SCM to SCM (e.g. lateral) communication to enable warm restarts, the election mechanism still enables cold standby. To secure communications with MNs, the AP must first authenticate and register with its SCM. Authentication is required to establish an NSK and registration allows secure communications between the SCM and the AP. The AP's NSK is derived by the AP as a result of a successful 802.1X LEAP authentication with the SCM; the authentication server delivers the NSK to the SCM via the Radius MS-MPPE attribute also as a result of a successful authentication. The AP identifies its SCM by listening to the SCM advertisement messages.

Upon successful authentication with the SCM, the AP must then register itself with the SCM as a valid AP. Upon pre-registration, the SCM delivers a set of CTKs to the AP that is used to both encrypt and authenticate WLCCP messages between the SCM and the AP.

A message depiction of how an AP establishes the required NSK and CTKs is shown in FIG. 7. The AP must also establish the CTK to ensure that no rogue AP is introduced and compromise either NSK or CTK. The authentication mechanism is similar to that used for bridges, where the configure LEAP username and password are used to authenticate with the AS. Tasks performed by the AP are in column 702, tasks performed by the SCM are listed in column 704, and tasks performed by the AS are in column 706.

For some embodiments, the SCM is the 802.1X Authenticator for all nodes. Thus, CTK establishment between the AP and SCM must be mutually derived.

To secure communications, a MN must first authenticate with the network via 802.1X EAP authentication. The result of a successful authentication establishes a NSK that is used to establish the KRK and BTK used to respectively authenticate key refreshes and derive PTKs.

Figure 8:
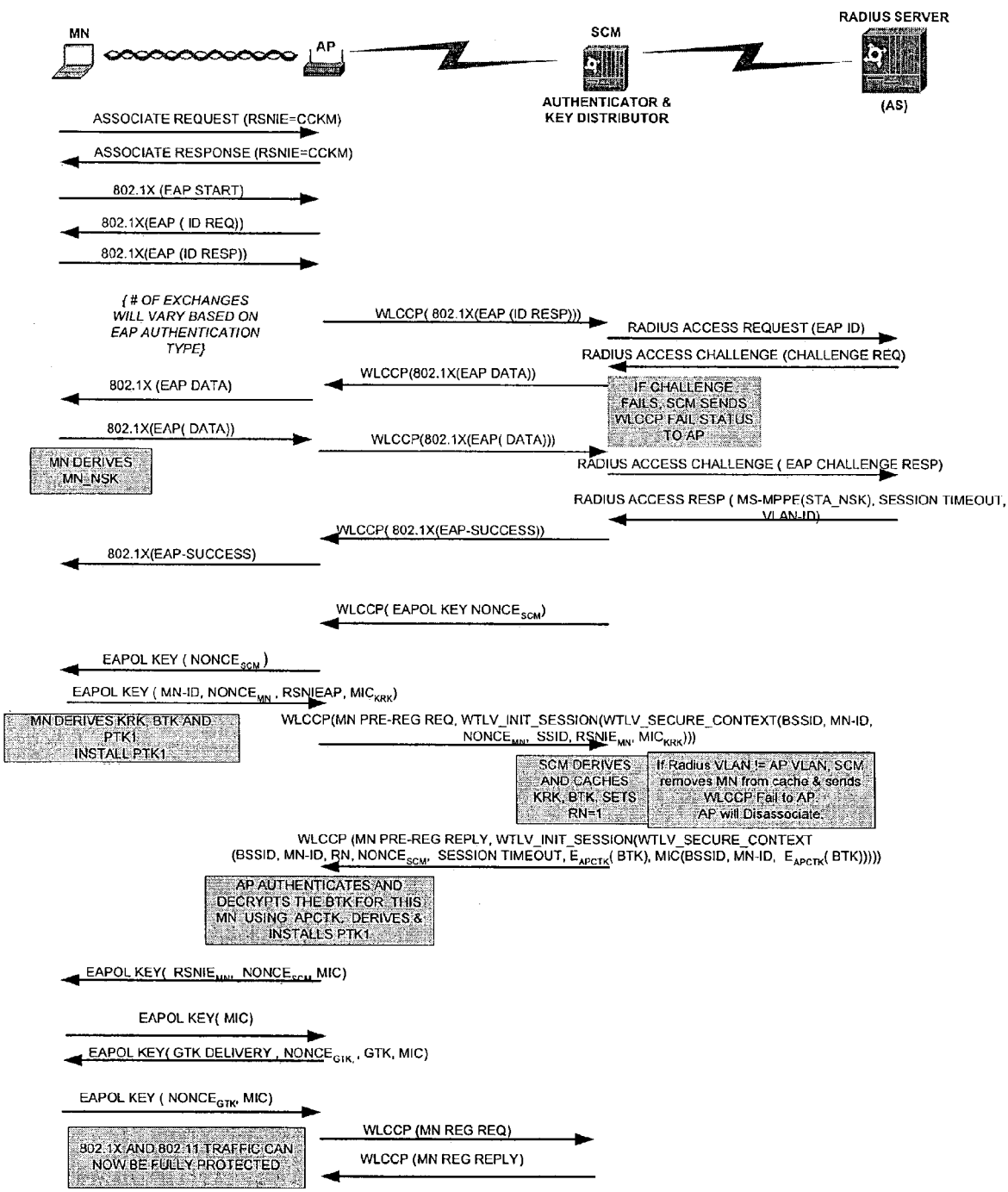
FIG. 8 shows an example of a successful mobile node Lightweight Extensible Authentication Protocol Authentication and Registration.
Figure 9:
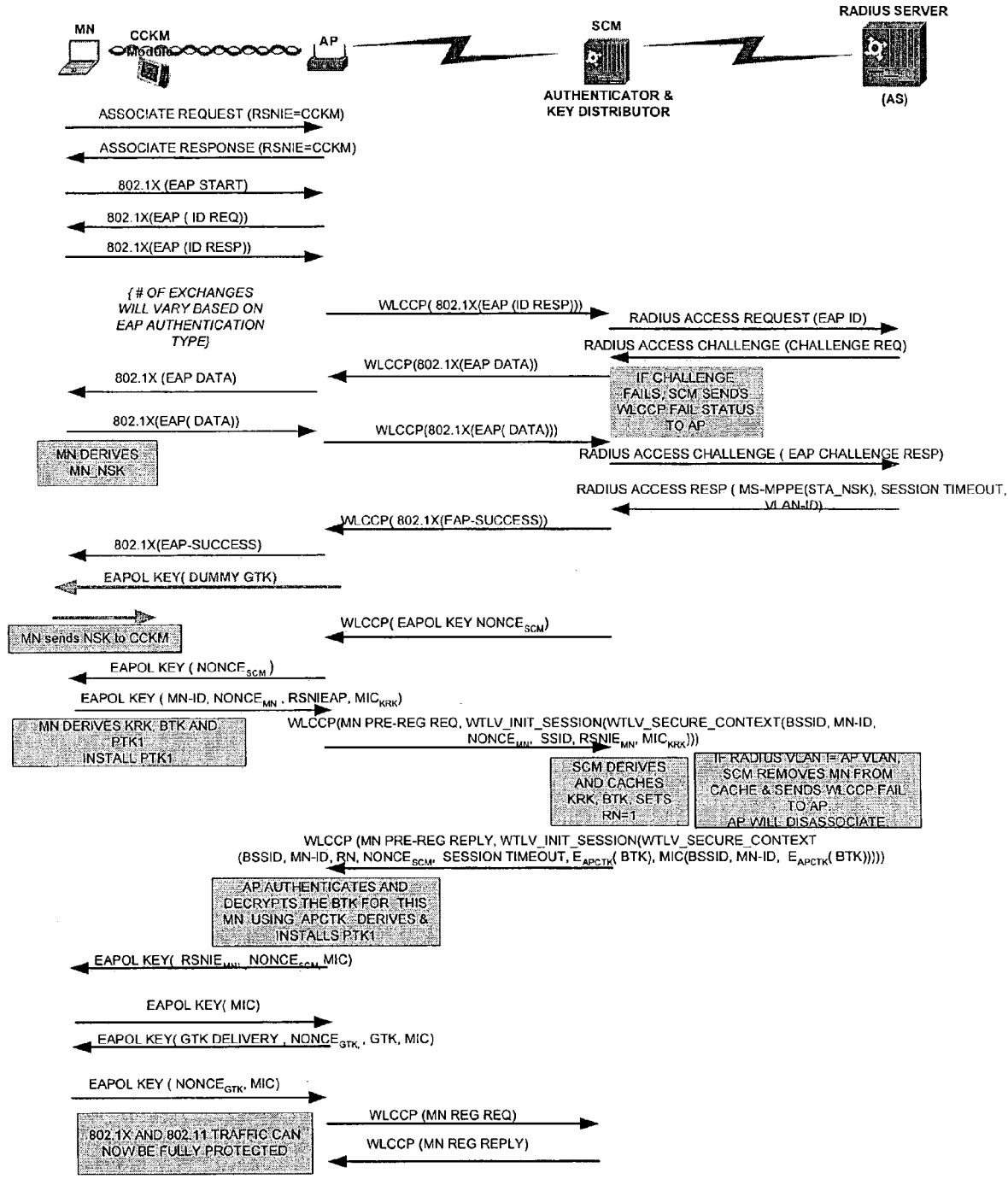
FIG. 9 shows an example of a successful mobile node non-Lightweight Extensible Authentication Protocol authentication and registration.

Like SSN, CCKM also initiates a session with a 4-way handshake to establish the KRK and BTK, for enabling protection of unicast traffic These handshakes are only required after successful authentication. Rekey requests either upon re-association or due to general key management rekeying (like cipher suite countermeasures) only require an authenticated 3-way handshake. FIG. 8, depicts a successful MN LEAP Authentication and registration with the SCM.

A mechanism is needed to pass the NSK from EAP supplicants which are independent of the CCKM module. For instance, for non-LEAP EAP authentication on Windows platforms, the MN's NSK is usually generated in the EAP supplicant and passed to the EAP framework. The EAP framework will then pass the NSK to the CCKM module. Since the current SSN-capable EAP framework treats CCKM as non-SSN compliant, it will just process the 802.1X EAP authentication and send down the NSK after an EAP authentication success. Similarly, non-SSN EAP supplicants will simply process the 802.1X EAP authentication and send down the NSK after an EAP authentication success.

However, it is likely that the NSK will not be delivered until after the group key delivery EAPOL Key message from the AP is received. Thus, as shown in FIG. 8, for non-LEAP EAP authentication, the AP needs to send an additional 802.1X EAPOL key message with a dummy group key right after sending an EAP-Success message to the station.

It is up to the implementation in the CCKM module to indicate to the AP that it needs to send an additional EAPOL key message. This information could be negotiated during the association request RSNIE. An alternate solution is to always send the dummy EAPOL key message after EAP Success message. The CCKM module can ignore the dummy key if it already has the NSK and establish the real keys post the four-way handshake.

However, for legacy systems, association exchanges will always trigger a full authentication and 4-way handshake. Receipt of the CCKM rekey elements will be ignored.

An additional 2-way handshake is used to rekey the multicast/broadcast keys (GTK). The rekey protocol for GTK management is the same as specified in TGi and SSN. The 2-message handshake is initiated by the AP to deliver the GTK over and encrypted EAPOL Key message. The current PTK is used to protect these EAPOL Key messages.

In a CCKM capable system, an AP will always request the SCM for security credentials during a pre-registration request/reply. Associations imply session initiation and thus, upon an association if security credentials are valid in an SCM and CCKM is negotiated then 802.1X authentication can be bypassed. However fresh KRK and BTKs must be established. If no security credentials exist, then the AP must expect full authentication between MN and AS.

After a successful authentication, the sequence shown in FIG. 10 is triggered to complete the key establishment and result in the necessary PTKs used to protect packets between AP and MN.

Since the AP is also provided with the MN's session timeout, policy for managing (re)authentications is assigned to the AP. Similar to current implementations, APs can trigger (re)authentications before the session timeout expires and can also manage the update of the KRK and BTK refreshment as defined herein.

Either MN or AP can trigger a PTK rekey. Conditions in which either node may request a rekey include: TKIP failures, particularly in Michael countermeasures; Exhaustion of IV (mainly for WEP) and Countermeasures if the node feels the PTK has been compromised.

The rekey exchange is a 3-message EAPOL Key handshake. A new key descriptor is defined to allow for a secure rekey exchange, which is shown in FIG. 11. The fields are defined as follows:

Key Information 1102: designates whether it is a request (0), response (1) or confirm (3);

Status 1104: is used by the responder and confirmer. A zero value means success; non-zero means the rekey failed and either a full KRK, BTK or deauthentication must be invoked;

EAPOL Replay Counter 1106: is the EAPOL Key message counter also used to protect from message replays;

Reserved field 1108: an extra byte is added to better align the element;

Key-ID 1110: 1 byte field that stored the key identifier (0, 1, 2 or 3) assignment, it must match the currently assigned key ID;

MN-ID 1112: the client's MAC address;

BSSID 1114: the AP's MAC address;

RN 1116: the rekey request number;

MIC 1118: authentication element using the current PTK. The MIC is defined as:

$$MIC_{request} = HMAC\text{-}MD5( PTK,$$
$$\text{Key Info} \| \text{EAPOL Replay Ctr} \| \text{Key ID} \| \text{MN-ID} \|$$
$$\text{BSSID} \| \text{RN} ),$$
$$MIC_{response} = HMAC\text{-}MD5( PTK,$$
$$\text{Key Info} \| \text{EAPOL Replay Ctr} \| \text{Key ID} \| \text{MN-ID} \|$$
$$\text{BSSID} \| \text{RN}$$
$$\| \text{Status}),$$
$$MIC_{confirm} = HMAC\text{-}MD5( PTK,$$
$$\text{Key Info} \| \text{EAPOL Replay Ctr} \| \text{Key ID} \| \text{MN-ID} \|$$
$$\text{BSSID} \| \text{RN}$$
$$\| \text{Status}).$$

The rekey sequence 1200 is shown in FIG. 12. The left column 1202 shows tasks performed by the initiator while the right column 1204 shows tasks performed by the responder.

At block 1206 the State transition calls for a new PTK. The initiator sets RN=RN+1, the new PTK=$PTK_{RN+1}$, and the compute $MIC_{request}$. Transmission to responder is halted until a valid response or timeout is reached. Reception with $PTK_{RN}$ must be allowed. Request is use of $PTK_{RN+1}$ in Key ID is sent.

The responder receives the request. If as shown at block 1208 the $MIC_{request}$ new RN is not greater than cached RN, or any attribute in EAPOL Key request is invalid, the responder does not update PTK or send a response with non zero status. However, if as shown at block 1210 the $MIC_{request}$ RN and EAPOL Key attributes are valid, the responder will update RN and compute $PTK_{RN+1}$, flush MN transmit queue, install $PTK_{RN+1}$, and Respond ready to xmit and rcv with $PTK_{RN+1}$ (once response is sent, rcvd packets from MN using $PTK_{RN}$ will not decrypt properly).

The initiator then receives the responder's response. As shown in block 1212, if the $MIC_{response}$ or any EAPOL Key attribute is invalid, the rekey is aborted and the initiator will try again. However, if as shown at block 1204 the $MIC_{response}$ and EAPOL Key attributes are valid, then the initiator installs $PTK_{RN+1}$ and is ready to xmit and rcv with $PTK_{RN+1}$. The initiator then sends an EAPOL Key confirm message.

The responder then receives the EAPOL confirm message. As shown in block 1216, if the $MIC_{confirm}$ or any attribute in EAPOL Key confirm is invalid, the responder will either trigger another rekey, determine it's a spoof and disassociate or deauthenticate. As shown in block 1218, if EAPOL confirm is valid, the link is now protected using $PTK_{RN+1}$ On a successful rekey, the AP must synchronize the SCM's RN value for the MN. It is recommended that the synchronization be made at every rekey. To update the SCM, a WLCCP_CONTEXT message with a WTLV_UPDATE_RN is sent to the SCM.

The description above assumes that neither request nor responder is capable of using multiple Key IDs to buffer PTKs. However, the protocol of the present invention allows for this function and thus facilitate a smoother transition during a rekey operation. That is, the requester can install $PTK_{RN+1}$ into a new KeyID and thus enable reception of packets under either $PTK_{RN}$ or $PTK_{RN+1}$. Similarly, the responder could plumb the key in the alternate specified Key ID and also allow transmission and reception under either key. The final confirmation is to halt transmission and reception under the current (old) $PTK_{RN}$.

CCKM uses the SSN and TGi style of rekeying for updating multicast (GTK) keys and is thus not defined in this specification. For details on group/broadcast key updates refer to the latest TGi draft.

To shorten the re-association handshake, this design minimizes the number of packets exchanged between the client station and the AP to two packets—re-association request and re-association response. Referring to FIG. 13, a new proprietary element 1300 is introduced to facilitate the handoff in the re-association messages. The element in the re-association request includes the rekey request number (RN) and an authenticated element. Where:

$$MIC_{MN}1314=HMAC\text{-}MD5(KRK,$$
$$MN\text{-}ID\|BSSID\|RSNIE_{MN}\|\text{Timestamp}\|RN), \text{ and}$$

Element ID 1302 is a Cisco defined element whose value is 0x9c

Length 1304 should be the length of the CCKM element request (e.g. 24 bytes)

OUI 1306 should be 00:40:96

OUI 1308 Type should be 0

MN-ID (not shown) is the MN's MAC address,

BSSID (not shown) is the AP's MAC address,

Timestamp 1310 is the current TSF timer value,

RN 1312 is the rekey request number, $RSNIE_{MN}$ (not shown) is the MN's requesting security policy (e.g. AKM and cipher suite negotiation);

CCKM (now shown) must be specified in the AKM selector of $RSNIE_{MN}$

Figures 14, 15:
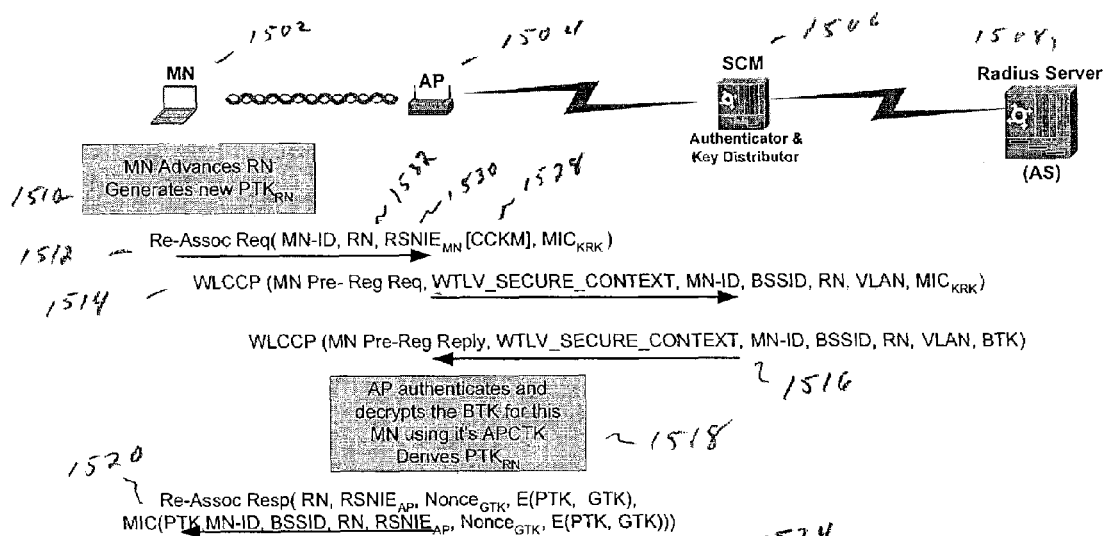
FIG. 14 is an example of the format of the response to the re-association request by the access point.
FIG. 15 is a block diagram illustrating the communications that take place between the various network components for a successful mobile node reassocation to a new access point.

The re-association response includes a new element authenticating 1400 the request, confirming use of $PTK_{RN}$ and delivering the multicast key as shown in FIG. 14. Where:

$$EGTK=RC4(RN\|PTK_{RN}, GTK)$$

$$MIC_{AP} \mathbf{1402}=HMAC\text{-}MD5(PTK_{RN},$$
$$MN\text{-}ID\|RSNIE_{AP}\|RN\|KeyID_{unicast}\|KeyID_{multicast}\|\text{Key}$$
$$\text{length}\|EGTK)$$

Referring now to FIG. 15, there is shown an example of a successful MN reassocation to a new AP. The handoff occurs in the re-associate request/response exchange. The MN 1502 must include CCKM 1528 in the RSNIE 1530 to employ the fast handoff. More importantly, the security policy negotiated by the MN 1502 at reassociation must match to the one specified at initial association. The SCM 1506 must validate that the requesting RN 1532 value is greater than the previous one. The timestamp provided in the request must also be within a configurable value of the AP's TSF timer (not shown); the timestamp is included to ensure that this request is fresh. On a response, the AP 1504 must also provide it's TSF timer value in the CCKM response element to assure the MN 1502 that the response is also fresh.

When the AP 1504 receives a re-association request and CCKM is negotiated, it must query the SCM 1506 for validation of security credentials and acquire the RN and BTK before it can generate $PTK_{RN}$. The request is made using a WTLV_SECURE_CONTEXT request to the SCM 1506. If the SCM 1506 cannot validate credentials, then it will not deliver anything and provide a non-zero status indicating failure. On a successful transfer, the SCM 1506 will deliver the RN and BTK in an encrypted and authenticated WTLV_SECURE_CONTEXT reply. The validation of security credentials prevents an insider from fast reassociation with a different SSID.

On a successful context transfer, the AP 1504 proceeds to generate the PTK as described herein infa. It will then use the PTK to encrypt and authenticate the new information element to affirm PTK and securely deliver the multicast key, GTK.

If CCKM is negotiated but no proprietary element is provided, the AP 1504 can still request for security credentials. If credentials are valid then a full WTLV_INIT_SESSION establishment of fresh KRK and BTK is triggered and upon a successful 4-way exchange, KRK and BTK are mutually derived by SCM 1506 and MN 1502 and RN is reset to 1. If there are no credentials or the request to the SCM fails, the AP may choose to enforce a full (re) authentication.

By utilizing a sequence of PTK the client station is ready to decrypt unicast packets before the client initiates the re-association request. The client confirms its identity in the re-association request by using an incrementing authenticator (request number) and corresponding authentication (MIC). The AP 1504 uses the re-association response to confirm its identity and to piggyback the multicast key information (GTK) to the client STA.

For each fast re-association attempt, a unique request number (RN) will be used. On each fast re-association attempt, the client will increment the RN. The SCM prevents replay of a fast re-association request by caching the last RN used by the client, and rejecting any request for which the RN is less than or equal to the cached last RN.

Note that the derivation of the credentials and keying information includes the BSSID to prevent replay attempts across different APs. For example, without the BSSID, a hacker could attempt to reuse a fast-reassociation request for one AP to associate to a second AP. Which attempt will reach the SCM first—the hacker or the true client—depends on the delays through the network.

In another embodiment, there may be included the ability to forward security credentials to registered APs. For networks with large latency between the AP 1504 and the SCM 1506, the SCM 1506 information can also be cached at the AP 1504. In this case, the AP 1504 could perform all of the calculations that would normally be done at the SCM 1506. The AP 1504 can verify the authentication of a client, without having to query the SCM 1506 to obtain the latest RN, as the last RN used for a particular BSSID is sufficient to prevent replay. The AP 1504 should send an update to the SCM 1506 to ensure that the SCM 1506 has the latest RN information—this is particularly important if the AP should stale the information and request the information from the SCM later.

The process for the reassociation starts at 1510 wherein a MN 1502 advances RN and generates a new $PTK_{RN}$. As shown at 1512, the MN 1502 sends the Re-Assoc Request to the AP 1512 which includes RN 1532, $RSNIE_{MN}$ 1530 with CCKM 1528 as the negotiated key management value. The AP 1504 then sends a WLCCP(MN, Pre-Reg Req, WTLV_SECURE_CONTEXT, MN-ID, BSSID, RN, VLAN, $MIC_{KRK}$) to the SCM 1506 as shown by 1514. The SCM 1506 responds with WLCCP(MN Pre-Req Reply, WTLV_SECURE_CONTEXT, MN-ID, BSSID, RN, VLAN, BTK) as shown by 1516. As shown in block 1518, the AP 1504 authenticates and decrypts the BTK for the MN 1502 using it's AP's CTK and derives $PTK_{RN}$. At 1520, the AP 1504 sends Re-Assoc Resp(RN, $RSNIE_{AP}$ $Nonce_{GTK}$ E(PTK, GTK), MIC(PTK, MN-ID, BSSID, RN, RSNIEAP, $Nonce_{GTK}$, E(PTK,GTK)) which completes the liveness of $PTK_{RN}$ and delivery of the GTK. Then as shown in block 1522 the MN 1502 authenticates and decrypts the GTK for this STA using PTK. Once the AP 1504 has completed the establishment of a secure communication link with the MN 1502, it registers the MN 1502 as being active with the AP 1504. This is accomplished by steps 1524 and 1526. At step 1524 a WLCCP(MN, REg Req) is sent from AP 1504 to SCM 1506 and the reply is sent at step 1526 as WLCCP(MN Reg Reply).

Figure 16:
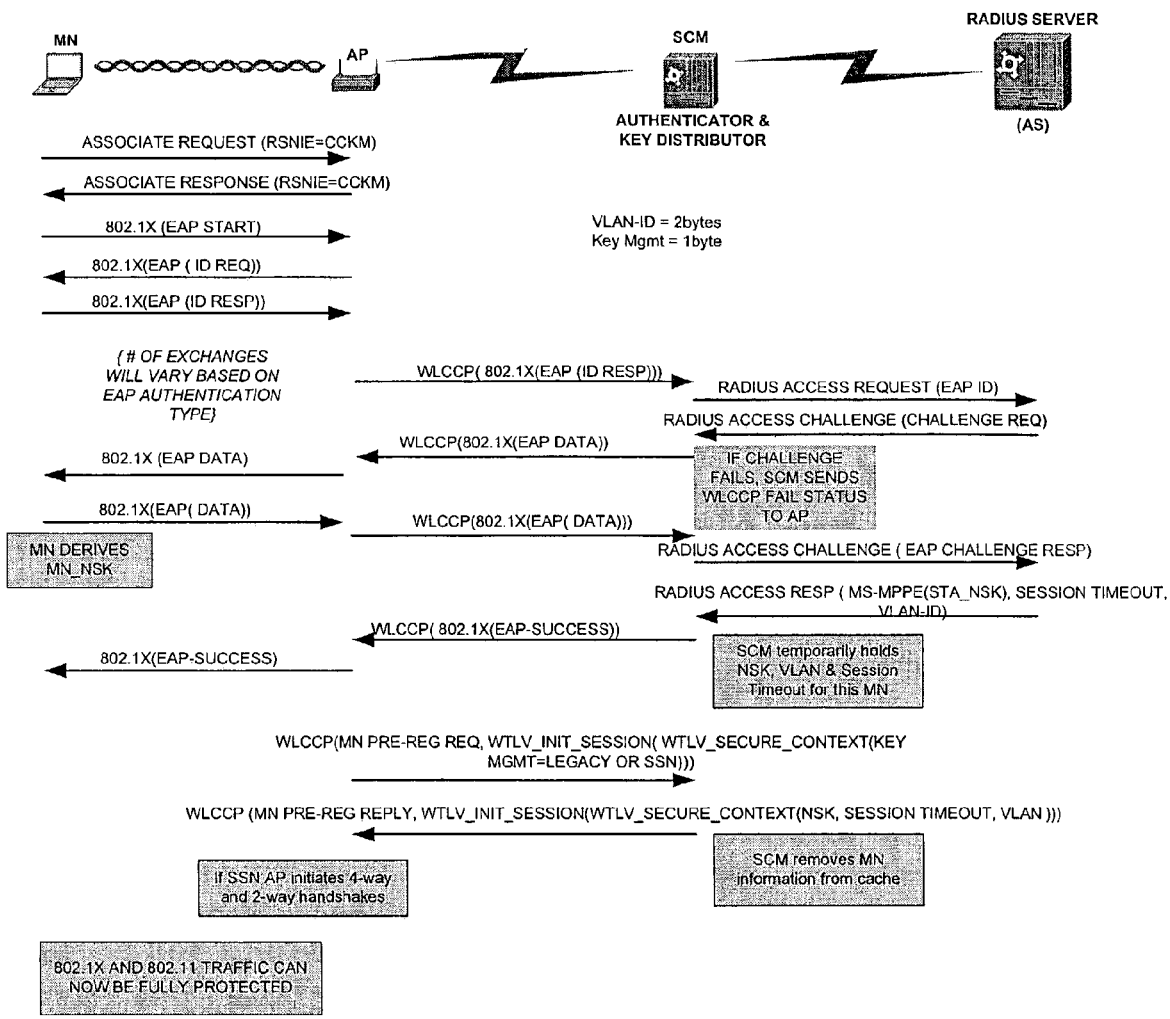
FIG. 16 is a block diagram showing a method for propagating keys for legacy or SSN mobile nodes.

While this design promotes the use of CCKM, other Authenticated Key Management (AKM) types can be supported. Since CCKM-capable MNs are the only MN types that have their credentials cached at the SCM and thus require registration. However, in order to properly propagate credentials to the AP, all MNs require pre-registration. Whether supporting a legacy or SSN-capable client the credential propagation and pre-registration is the same, as shown in FIG. 16.

A key hierarchy is defined to allow for stretching keys as well as derivation of fresh keys. This section describes the functions used to derive the keys. A comment must be made though, to address the issue of key entropy.

CCKM ensures key freshness but relies on the provisioning of strong keys; e.g. having good entropy. If implementations like LEAP which are password based are believed to have low entropy then further crypto tools can be used to improve the key's entropy. TGi has already adopted a variation of PKCS#5 as a means of improving key entropy which this design can easily adopt. Note however, that this requires far more computation that some NICs can provide.

KRK and BTK Derivation:

To ensure fresh KRK and BTK keys, the AP and MN engage in a 4-way handshake to provide key material required for deriving KRK and BTK. Each node must provide 16 byte nonces that are subsequently used with the NSK to derive the required keys. The function is defined as follows:

---

GK = PRF-384(NSK, "Cisco Key Management Base Key Generator" | BSSID | STA-ID | $Nonce_{STA}$ | $Nonce_{SCM}$ )
  KRK = GK[0:127]
  BTK = GK[128:383]
  PRF-384 is defined in Section 0.

---

Since the same PRF-XXX function is used to generate multiple key types, the string "Cisco's Key Management Base Key Generator" is introduced to this key derivation function to ensure that these keys are uniquely constructed from other key types.

Securing WLCCP Messages:

To protect WLCCP messages from eavesdropping and man-in-the-middle attacks, most WLCCP messages are encrypted using RC4 and authenticated using HMAC-MD5. An AP establishes a CTK with the SCM during pre-registration so that it can commence protection of WLCCP messages.

The CTK is a 256 bit key that is used to protect WLCCP messages as follows:

The low order 128 bits of CTK is used as the RC4 key.
The high order 128 bits of CTK is used as the HMAC-MD5 key CTK Key Derivation:

Context transfer keys used between the AP and SCM are generated and distributed by the SCM. Each node in the link must provide an 16 byte nonce to assure a fresh key:

$CTK=PRF\text{-}256(NSK,$ "SWAN IN-IA link Context Transfer Key Derivation"$|AP\text{-}ID|SCM\text{-}ID|Nonce_{AP}|Nonce_{SCM}|KSC)$ The CTK is computed by the SCM and delivered to the AP for protecting subsequent WLCCP messages. Delivery of the CTK is done by encrypting and authenticating the key using the NSK.

PTK Key Derivation

PTKs are a maximum of 512 bytes as they are used to protect both 802.1X and 802.11 communications. Its length is dependent on the 802.11 cipher suite negotiation established at association.

PTKs are derived by use of a one way hash function: SHA-1 and is based on the BTK, RN and BSSID:

$PTK=PRF\text{-}Len(BTK, RN|BSSID)$ where Len=384 for WRAP or CCMP, 512 for TKIP or CKIP While the present invention uses PTK liberally, the PTK generated is partitioned into several keys used to protect the following (also shown in FIG. 1):

EAPOL Key encryption between the AP and MN
EAPOL Key authentication between the AP and MN
802.11 encryption
For 802.11 TKIP and CKIP: data packet authentication between the AP and MN The key assignment for PTK is as follows:

EAPOL-Key MIC Key=PTK[0:127]
EAPOL-Key ENC Key=PTK[128:255]
802.11 Encrypt Key=PTK[256:383]
TKIP Michael Authenticator Tx Key=PTK[384:447]
TKIP Michael Authenticator Rx Key=PTK[448:511]

The definition and pseudocode for generating arbitrary length keys based on given key material is as follows (extracted from TGi draft 2.3):

```
H-SHA-1(K, A, B, X) = HMAC-SHA-1(K, A | Y | B | X) where Y is
  a single octet
containing 0x00 (zero)
  PRF-384(K, A, B) = PRF(K, A, B, 384)
  PRF-512(K, A, B) = PRF(K, A, B, 512)
  PRF(K, A, B, Len)
  {
  octet i;
  for (i = 0; i < (Len+159)/160; i++) {
  R = R | H-SHA-1(K, A, B, i)
  }
  L(R, 0, Len)
  }
```

The key used in SHA-1 is one generated independently by the SCM and need not be shared by any other party.

HMAC-SHA1 Reference code

```
#include "stdafx.h"
#define ULONG unsigned long
#include <sha.h>
void hmac_sha1(
unsigned char *text, int text_len,
unsigned char *key, int key_len,
unsigned char *digest)
{
A_SHA_CTX context;
unsigned char k_ipad[65]; /* inner padding - key XORd with ipad */
unsigned char k_opad[65]; /* outer padding - key XORd with opad */
int i;
/* if key is longer than 64 bytes reset it to key=SHA1(key) */
if (key_len > 64) {
A_SHA_CTX tctx;
A_SHAInit(&tctx);
A_SHAUpdate(&tctx, key, key_len);
A_SHAFinal(&tctx, key);
key_len = 20;
}
/*
* the HMAC_SHA1 transform looks like:
*
* SHA1(K XOR opad, SHA1(K XOR ipad, text))
*
* where K is an n byte key
* ipad is the byte 0x36 repeated 64 times
* opad is the byte 0x5c repeated 64 times
* and text is the data being protected
*/
/* start out by storing key in pads */
memset(k_ipad, 0, sizeofk_ipad);
memset(k_opad, 0, sizeofk_opad);
memcpy(k_ipad, key, key_len);
memcpy(k_opad, key, key_len);
/* XOR key with ipad and opad values */
for (i = 0; i < 64; i++) {
k_ipad[i] ^= 0x36;
k_opad[i] ^= 0x5c;
}
/* perform inner SHA1*/
A_SHAInit(&context); /* init context for 1st pass */
A_SHAUpdate(&context, k_ipad, 64); /* start with inner pad */
A_SHAUpdate(&context, text, text_len); /* then text of datagram */
A_SHAFinal(&context, digest); /* finish up 1st pass */
/* perform outer SHA1 */
A_SHAInit(&context); /* init context for 2nd pass */
A_SHAUpdate(&context, k_opad, 64); /* start with outer pad */
A_SHAUpdate(&context, digest, 20); /* then results of 1st hash */
A_SHAFinal(&context, digest); /* finish up 2nd pass */
}
```

HMAC-SHA1 Test vectors (extracted from the SSN draft):

The test vectors for HMAC_SHA1 are from rfc2202 and have been checked against the reference code above. The PRF test vectors have been checked against two other implementations.

```
test_case =   1
key =         0x0b0b0b0b0b0b0b0b0b0b0b0b0b0b0b0b0b0b0b0b
key_len =     20
data =        "Hi There"
data_len =    8
digest =      0xb617318655057264e28bc0b6fb378c8ef146be00
PRF =
   0xbcd4c650b30b9684951829e0d75f9d54b862175ed9f00606e
   17d8da35402ffee75df78c3d31e0f889f012120c0862beb6775
   3e7439ae242edb8373698356cf5a
testcase =    2
key =         "Jefe"
key_len =     4
data =        "what do ya want for nothing?"
data_len =    28
digest=       0xeffcdf6ae5eb2fa2d27416d5f184df9c259a7c79
PRF =
   0x51f4de5b33f249adf81aeb713a3c20f4fe631446fabdfa58
   244759ae58ef9009a99abf4eac2ca5fa87e692c440eb40023e
   7babb206d61de7b92f41529092b8fc
```

-continued

```
test_case =   3
key =         0xaaaaaaaaaaaaaaaaaaaaaaaaaaaaaaaaaaaaaaaa
key_len =     20
data =        0xdd repeated 50 times
data_len =    50
digest =      0x125d7342b9ac11cd91a39af48aa17b4f63f175d3
PRF =
    0xe1ac546ec4cb636f9976487be5c86be17a0252ca5d8d8df12c
    fb0473525249ce9dd8d177ead710bc9b590547239107aef7b4ab
    d43d87f0a68f1cbd9e2b6f7607
```

In addition to the aforementioned method, another aspect of the present invention is a Wireless LAN Context Control Protocol (WLCCP) that is used to establish and manage a network topology, referred to herein as the Smart Wireless Architecture for Networking (SWAN), and it is used to securely manage the "operational context" for mobile stations in a SWAN "campus network".

A WLCCP registration protocol a) automatically creates and deletes links in the SWAN topology, b) securely distributes operational context, and c) (optionally) reliably establishes Layer 2 forwarding paths on wireless links.

A WLCCP SCM advertisement/election protocol automatically establishes a single SCM as the central control point for each subnet, and enables APs and MNs to select the parent node that provides the "least-cost path" to a backbone LAN.

WLCCP "Context" messages provide a general-purpose transport for context and management information. WLCCP "Trace" messages facilitate network diagnostic tools.

WLCCP is a transaction-oriented "request/reply" protocol. All WLCCP request and reply messages have a fixed-length header that contains message-type-dependent fields. Optional Type-Length-Value pairs follow the fixed length header; therefore, WLCCP is extensible.

Ethernet or UDP/IP encapsulation can be used for WLCCP messages. Ethernet encapsulation is restricted to intra-subnet (e.g. AP-to-AP or AP-to-SCM) WLCCP messages. IP encapsulation must be used for inter-subnet WLCCP messages and may also be used for intra-subnet WLCCP messages.

As those skilled in the art can readily appreciate, a specific WLCCP implementation may not include all of the components described herein.

A "distributed" context transfer protocol can be used to directly transfer context from an "old AP" to a "new AP", when a MN roams. The IEEE 802.11f draft protocol, for example, defines a distributed context transfer protocol. There are a number of inherent problems with such a distributed approach. The most notable problems are: 1) Secure context transfer requires a many-to-many trust relationship between APs (or requires some additional hierarchy). 2) A protocol is needed to enable the "new AP" to determine the "old AP" when a MN roams. (The "old AP" 802.11 Reassociation field is not sufficient.) Context is passed around from AP to AP as a station roams; therefore, critical context may be lost (e.g. if the link to an old AP is lost). 4) A distributed protocol is susceptible to an inherent race condition where "handoff messages" for rapidly roaming stations may arrive out-of-order.

The SWAN network disclosed herein is organized as a hierarchical "Topology Tree". When a station roams from an "old AP" to a "new AP", context is generally transferred via the "nearest common ancestor", in the Topology Tree, of both the old and new APs. WLCCP registration includes the necessary routing logic to automatically find the nearest common ancestor. Cached configuration and context information is stored in the network infrastructure. The common ancestor securely forwards the cached information on the new Topology Tree branch for a station that has roamed. Therefore, context transfer is automatically "localized" and context information is not lost if the link to an old AP is lost. The common ancestor also forwards the "old AP bindings" to the new AP.

A many-to-many security relationship between 802.11 APs is not needed for secure context transfer in a SWAN network. Instead, a trust hierarchy is established that corresponds to the SWAN Topology Tree. Operational context is generally forwarded on Topology Tree branches; therefore, WLCCP context transfer keys are pre-established between all SWAN nodes on the same topology tree branch. If it necessary to transfer context "laterally" between 2 nodes on different topology tree branches, then the nearest common ancestor of the 2 nodes can function as a trusted third party to quickly establish mutual authentication and a transient context transfer key.

The hierarchical Topology Tree facilitates central management and control points. For example, network-wide parameters can be centrally configured and distributed. A central WLCCP control point establishes and deletes topology links; therefore, it is possible to maintain a consistent network topology even if hand-off messages for rapidly roaming stations arrive out-of-order.

A locally or globally administered 48-bit IEEE 802 address is used as an internal WLCCP network Node Address. An IP address is not used as a Node Address because: a) A node may change its IP address. b) WLCCP is used to manage Layer 2 mobility; it should generally be independent of any network layer protocol.

A WLCCP Node Address is an internal WLCCP node identifier and should NOT be used to identify APs and CMs to users in network management applications. Instead, a Network Access Identifier (NAI) or domain name can be used as a user WLCCP node identifier.

The design of WLCCP of the present invention considers the following underlying assumptions and requirements:
1) The target environment is an enterprise "campus network".
2) 802.11 is an Ethernet access technology, which is used to extend wired Ethernet backbone LANs to Mobile Nodes and select "secondary LANs".
3) An 802.11 AP is, effectively, a Layer 2 "Ethernet" bridge.
4) An 802.11 Mobile Node (MN) is, effectively, a mobile "Ethernet" node.
5) WLCCP is generally independent of the underlying radio technology.
6) A MN should be able to roam seamlessly within a single subnet or between subnets within a "campus network" and operate as if attached to an Ethernet switch port; therefore, is necessary to transfer location-specific operational context when a MN roams.
7) The path between a MN and each Correspondent Host (CH) must be reliably re-established when the MN roams. [Simple backward-learning is not sufficient and is susceptible to a "race conditions".]
8) Non-WLCCP Ethernet bridges and switches must support backward-learning, as defined in the 802.1D standard.
9) WLCCP must provide context management services for an integrated Proxy-MIP/VLAN seamless inter-subnet mobility solution. The seamless mobility solution must support both IP and non-IP applications; it must not require client support; and it must not require users to significantly change their existing wired topologies.

10) WLCCP does NOT facilitate (or preclude) seamless roaming between subnets in different geographic locales.

11) A campus network may include a large population of stations that roam frequently; therefore, the overhead for roaming must be minimal.

12) WLCCP must support very fast roaming for QoS applications.

13) WLCCP must support existing WLAN features, include wireless (i.e. repeater) APs, wireless bridges, and mobile APs and bridges.

14) Unicast and multicast frame flooding must be minimized on wireless links.

15) WLCCP must support fast, secure context transfer, without introducing a need for many-to-many security relationships between APs.

16) WLCCP must operate independently of any underlying Spanning Tree Protocol.

17) WLCCP must not significantly increase user configuration requirements; therefore, the underlying topology must be largely self-configuring.

18) WLCCP must not introduce single points of failure. The network must continue to operate, possibly with reduced features, if a SWAN node or link fails.

19) WLCCP must leverage existing standards, as much as possible.

20) WLCCP must not interfere with existing protocols. In particular, WLCCP must not preclude standard Mobile IP clients.

21) Client MNs must NOT be required to directly support WLCCP. Instead, MNs can indirectly support WLCCP via 802.11 elements.

22) WLCCP must provide building blocks for WLAN management and diagnostic tools.

23) The radio coverage of APs on different subnets may overlap.

24) WLCCP secure context transfer and message authentication is independent of the underlying security infrastructure, except that it must be possible to mutually authenticate SWAN nodes and establish secret session keys.

25) WLCCP does NOT provide MN authentication; however, it must facilitate fast re-authentication by securely transferring dynamic MN security credentials.

Figure 17:
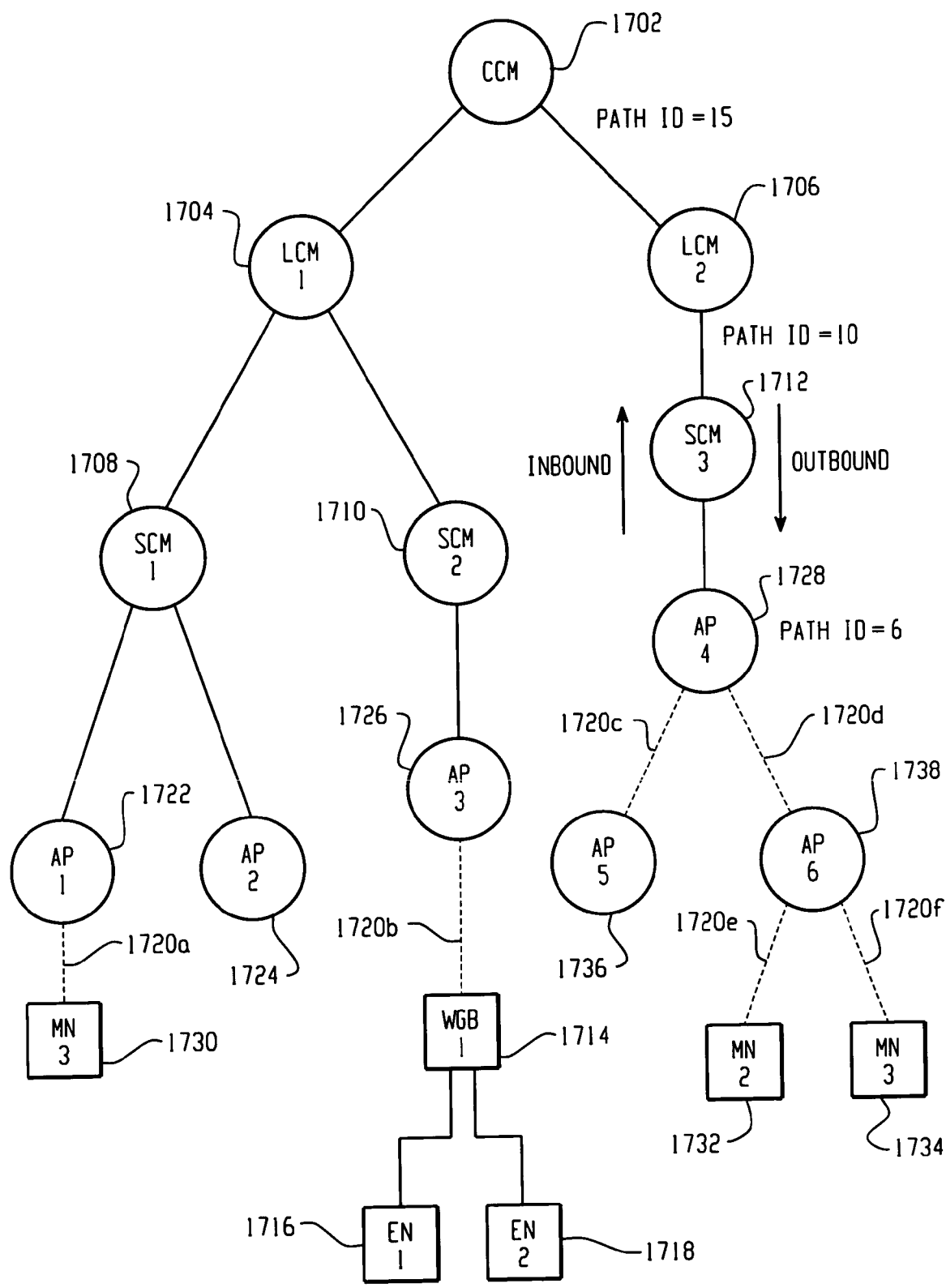
FIG. 17 is a block diagram exemplifying a topology tree for a full implementation of one aspect of the present invention.

As used herein, a SWAN network is a "tree topology" rooted at a SWAN CM. WLCCP is used to establish and maintain the Topology Tree. An example Topology Tree for a full WLCCP implementation is shown in FIG. 17. FIG. 17 shows a "campus topology" with two local control domains (LCM) 1706 and 1706 and three subnet control domains (SCM) 1708, 1710 and 1712. The example network includes a Work-group Bridge (WGB-1) 1714 and its attached Ethernet Nodes (EN-1 and EN-2, 1716 and 1718 respectively). Topology branches that exist over 802.11 links are shown as dashed lines 1720a-f.

Possible subnet topology components are specific to the WLCCP implementation. An example subnet topology for an implementation that supports Layer 2 path updates and wireless bridges will be illustrated herein infra.

SWAN CMs and APs are interior nodes (INs) and MNs and secondary Ethernet Nodes (ENs) are leaves in the SWAN Topology Tree. The SWAN CCM 1702 is at the root of the campus Topology Tree. The CCM 1702 is the root CM, in a campus network. An LCM 1704, 1706 is at the root of the sub tree contained in a Local Control Domain. An SCM 1708, 1710, 1712 is at the root of the sub tree contained in each network subnet. A "parent AP" 1722, 1724, 1726 and 1728 is at the root of a sub tree that contains child MNs 1730, 1732 and 1734 and any child Aps 1736 and 1738.

The format of a WLCCP Node ID is shown in table 1800 of FIG. 18. A 64-bit WLCCP Node ID identifies each node in a SWAN network. A Node ID is a concatenated 16-bit WLCCP Node Type 1802 and a 48-bit WLCCP Node Address 1804. The Node Address 1804 for a MN, EN, AP, or SCM is a global 48-bit IEEE 802 address. The Node Address 1804 for an LCM or CCM can be a global or locally-administered 48-bit IEEE 802 address. It is contemplated in one embodiment, the CCM can automatically assign "local" 48-bit addresses to itself and other LCMs. A Node Address of 'all zeros' is used to identify the "local WLCCP node" in a WLCCP CM or AP. The Node Type is CCM, LCM, SCM, AP, MN, or EN.

Each physical AP (e.g. Ethernet and 802.11) communications interface is identified by a 48-bit IEEE 802 port address. An SCM's LAN communications interface is also identified by a 48-bit IEEE 802 port address. An 802 port address can be re-used as the WLCCP Node Address. Each WLCCP CM must have an IP communications interface, which is identified by an IP port address. An IP port address is not used as a CM node address because a CM's IP address may change.

AP communications interfaces generally operate in "promiscuous mode"; therefore, an AP can receive WLCCP frames destined to its Node Address on any physical interface. In a simple implementation, the AP Node Address can be used to identify an "internal WLCCP interface" in an AP.

FIG. 19 shows the internal bridging structure in an AP. The Ethernet 802 port address is also the WLCCP Node Address. A frame, which is destined to the Node Address and received on either the Ethernet or 802.11 interface, is "bridged" internally to the WLCCP protocol interface; therefore, the Node Address can also be used as the WLCCP "Hop Address" on any AP port. [WLCCP and DDP are shown together because they share the same Ethernet DIX type.]

Each WLCCP AP and CM should be configured with a permanent "node name" [e.g. Network Access Identifier (NAI) or a DNS domain name]. An LCM must be configured with a node name to request a locally administered Node Address from the CCM.

A Node ID is NOT a permanent node identifier and should not be used as such. An NAI can be used to represent network nodes to users.

An Instance Identifier and its Node ID identify each "instance" of an "Attached" AP or CM. In WLCCP, an Instance Age is used as the instance identifier, as described below.

Each WLCCP CM must maintain cross-referenced tables that are used to map a WLCCP Node ID to a node name or IP address, or vice-versa.

Referring again to FIG. 17, in a campus network, each SWAN AP 1722, 1724, 1726, and 1728 CM 1704, 1706, 1708, 1710, 1712 other than the SWAN CCM 1702, is bound to a single "parent node" and to a single "parent CM". The parent CM for an LCM is the CCM. The parent CM for an SCM is an LCM. [Note that a single device may include multiple logical CMs. The device that contains the CCM always contains a logical LCM.] In FIG. 17, the parent node and parent CM, for AP 1720, are AP 1728 and SCM 1712, respectively.

The SCM for each subnet is the parent CM for all APs on its subnet and for all MNs that are associated with those APs. Note that a MN is a child of the SCM for the parent AP's "native" subnet even if the MN is bound to a different "home subnet" via VLAN trunking or Proxy MIP tunneling. For example, in FIG. 17, SCM 1708, AP 1722 and AP 1724 all belong to the same subnet. MN 1730 is a child of AP 1722; therefore, it is a child of SCM 1708. However, MN 1730 may belong to a different subnet if AP-1 is attached on a VLAN trunk link.

The "parent node" for an LCM or SCM is the parent CM. The parent node for a MN is the 802.11 parent AP. The parent node for a "root AP" is an SCM. The parent node for a non-root AP is the 802.11 parent AP. A node is considered a "child" of its parent. A "neighbor" is a parent or child node.

A logical "link" exists between a node and each of its neighbors. A "port" is the logical entity that provides access to a link. Each CM and AP has a single primary port and one or more secondary ports. A node attaches to the network on its primary port. Multiple logical ports may exist on top of a single physical communications interface. For example, in FIG. 17, AP 1728 may use the same physical 802.11 interface to access the link to AP 1736 and AP 1738; however, AP 1728 has a separate logical port for each link.

A "branch" of the Topology Tree is comprised of a set of nodes and links that provide the shortest path between an "ancestor" node and a "descendant" node. An inbound node is an ancestor and an outbound node is a descendant. All nodes are descendants of the root CM 1702. An outbound path originates from an ancestor node and terminates at a descendant node. An inbound path originates at a descendant node.

SWAN CMs are NOT in the forwarding path for non-WLCCP messages; therefore, a node's SWAN "path instance" is NOT the same as the node's data forwarding path.

A Topology Tree "link" exists between each SWAN node and each of its neighbors. A link is established when a "child node" selects a "parent node" and registers with the SWAN infrastructure via its parent node. An SCM-to-AP link is always an Ethernet link. An AP-to-AP link can be an Ethernet or 802.11 link. An AP-to-MN link is (currently) always an 802.11 link. A CM-to-CM link can, conceptually, be any link that supports IP.

A node is responsible for maintaining the "link state" for each of its neighbors. An active link is in a "connected" state. A link transitions to a "disconnected" state if the underlying physical communications link is lost or if a child roams to a different parent node. A node must be able to detect link state changes in its neighbors; otherwise, links may exist in a "half-connected" state. [AP-to-AP 802.11 link state is transparent to WLCCP implemations where WLCCP is not used for Layer 2 path updates.]

The CCM's IP address or domain name must be statically configured in each LCM and in each SCM candidate. It is contemplated that in one embodiment an LCM or SCM can automatically discover the CCM, via a CCM Advertisement Protocol.

The list of subnets that are bound to each LCM is configured in the CCM. An SCM sends a request message to the CCM, initially and whenever any parent LCM is lost, to obtain its parent LCM assignment.

An SCM is automatically elected for each subnet. An AP automatically discovers its parent SCM, via an SCM Advertisement Protocol. A non-root "child AP" is also bound to a "parent AP", as described below. A MN is bound to a parent AP via the 802.11 association protocol.

A node is either in an "Attached" or "Unattached" state. A node is initially in the Unattached state. A CCM candidate transitions to the Attached state when it becomes the active CCM. A CCM transitions to the Unattached state when it relinquishes the CCM role. A non-CCM node transitions to the Attached state when it initially registers with the SWAN infrastructure. An Attached non-CCM node transitions to the Unattached state if a) it detects that is parent node is unattached, or b) it is unable to communicate with its parent node.

Each CM must maintain an internal Instance Age that contains the elapsed time, in seconds, since the node last transitioned to the Attached state. The Instance Age is initialized to 0 and is reset to 0 each time the node initially registers with a new parent CM. The Instance Age of an SCM is copied into the Instance Age field in SCM-Advertisement Reply messages, so that a child AP can detect a new instance of its parent SCM. A child AP becomes Unattached if it receives an advertisement message with a lower Instance Age. In one embodiment, an AP does not need to maintain an Instance Age if WLCCP is not used for Layer 2 path updates.

A SWAN network generally operates in "campus infrastructure mode" with a single CCM and corresponding Campus Control Domain. An LCM and its corresponding Local Control Domain must operate in "local stand-alone mode" if the LCM cannot communicate with the CCM. An LCM must also operate in stand-alone mode if it is not assigned to a CCM. Likewise, each SCM and corresponding subnet must operate in "subnet stand-alone mode", if the SCM is not assigned to a parent LCM.

In stand-alone mode, a Local Control Domain or Subnet Control Domain operates much like a SWAN campus network. An LCM operating in local stand-alone mode assumes CCM functions. The LCM or SCM at the root of a stand-alone domain functions as the 802.1X authenticator for both infrastructure nodes and MNs. A Local or Subnet Control Domain must be able to transition smoothly between infrastructure mode and stand-alone mode.

An LCM is configured with the IP address of the CCM, to operate in infrastructure mode. If an LCM is operating in stand-alone mode because it lost the link to its assigned CCM, then it must periodically attempt to re-establish communications with the CCM.

An SCM is configured with the IP address or domain name of the CCM, to operate in infrastructure mode. The CCM is responsible for assigning each SCM to an LCM, as described below in the section entitled "W2—Parent LCM Assignment".

An AP must operate in a fallback "distributed mode" if it cannot discover an SCM for its subnet. An AP must be able to transition smoothly between infrastructure mode and distributed mode. For example, an AP can use the existing Cisco Datagram Delivery Protocol in distributed mode. Note that a user can force APs to operate in distributed mode by simply not configuring any SCM candidates.

In general, an LCM or SCM can transition smoothly from infrastructure mode to stand-alone (i.e. when the link to its parent is lost) mode without disconnecting nodes in its sub tree. Nodes in a "new" stand-alone domain can continue to use existing registration information and security credentials, which were previously established in infrastructure mode.

The sub tree rooted at an LCM or SCM must be rebuilt when the LCM or SCM transitions from stand-alone mode to infrastructure mode. An SCM or LCM establishes a new Instance ID when it transitions from stand-alone to infrastructure mode. An SCM also establishes a new Instance ID if its parent LCM changes. The sub tree rooted at the SCM or LCM is automatically deleted as nodes in the sub tree detect the new SCM or LCM instance.

WLCCP "Context Management" message types are listed below. A "request" and "reply" subtype is defined for each message type. An optional "confirm" and "ack" subtype is defined for select message types that require additional handshaking.

SCM-Advertisement
CCM-Advertisement
Registration
Preregistration
Deregistration
Detach
Context
Path-Update
Path-Check
Trace
AAA
Path-Init WLCCP message formats are defined in the section entitled "WLCCP Protocol Definitions".

A "Response-Req" Flag is set ON in a Request message to solicit a Reply message. In general, a reply message is used to acknowledge a request message and to return status and/or context information to the Originator. A request "message identifier" is copied into the corresponding reply message to "match" request/reply pairs. The same message identifier is used in retransmitted request messages, to identify all request/reply messages that belong to a single transaction.

An optional "Confirm" message can be used to acknowledge a Reply message and return status and/or context information to the Responder. The Response-Req Flag is set ON in a Reply message to solicit a Confirm message.

An optional "Ack" message can be used to acknowledge a Confirm message and return status and/or context information to the Originator. The Response-Req Flag is set ON in a Confirm message to solicit an Ack message.

WLCCP messages contained a fixed-length header, followed by optional, variable-length TLVs.

An SCM sends periodic SCM-Advertisement-Reply messages to advertise network parameters and availability and to facilitate the SCM election protocol, on each AP "native" subnet. APs automatically discover the active SCM for the local subnet by monitoring SCM advertisements. APs receive SCM advertisements on a "primary port" and forward SCM advertisements on "secondary ports" to propagate SCM and subnet information to descendent nodes in the SWAN topology.

A node can send an SCM-Advertisement-Request message to solicit an SCM-Advertisement-Reply message (e.g. to shorten the discovery period).

A CCM can, optionally, send periodic CCM-Advertisement-Reply messages to advertise network parameters and availability and to facilitate a CCM election protocol. LCMs and SCMs can automatically discover the active CCM by monitoring CCM advertisements. CCM-Advertisement Request and Reply messages are sent to an IP multicast address.

A node can send a CCM-Advertisement-Request message to solicit a CCM-Advertisement-Reply message.

A Registration-Request message is used to request registration for a MN, AP, or CM with the SWAN infrastructure. A SWAN node is always registered with the CCM and each LCM, SCM, and AP on the path to the CCM. A Registration-Request is always forwarded inbound on a single branch in the SWAN topology. There are two Registration Request types: An "initial" Registration Request is generated to establish a new Path Instance. An "update" Registration Request is used to refresh a Path Instance and to update cached dynamic context information.

A CM returns a Registration-Reply to acknowledge receipt of a registration request, establish a "path instance", and to return context information, including any "old mobility bindings". Registration-Reply messages establish the Layer 2 forwarding path on wireless links. A Registration-Reply is always forwarded outbound on the reverse path of the corresponding request.

Preregistration Request and Preregistration Reply messages are used to obtain security credentials and establish the authentication state for an 802.11 MN or child AP prior to registration.

A CM sends a Deregistration-Request message to request deletion an old path instance when a station roams. A Deregistration-Request is always generated by a CM (SCM, LCM, or CCM) and is always forwarded outbound on a single branch in the SWAN topology.

An AP or CM returns a Deregistration-Reply to acknowledge receipt of a Deregistration Request, delete the respective path instance, and (optionally) to return context and status information. Transient accounting statistics and an activity timestamp are (optionally) returned in the Deregistration Reply.

An AP or CM sends a Detach-Request message to its parent CM to indicate that a "detached" child station should be "deregistered". A Detach-Request message is forwarded inbound until it reaches either a CM with a "newer" registration record or the CCM.

A CM can send a Detach-Reply message to acknowledge a Detach-Request.

A Context-Request message is used to get or set context, configuration, or management information. Context messages provide a general-purpose transport for exchanging information. A Context-Request can be used, for example, to initiate a lateral handoff when a station roams from an old LCM to a new LCM. The new LCM or the old LCM may send the Context-Request. A Context-Request that is generated by the old LCM may contain context and configuration information. A Context-Request message can also be used to predictively forward mobility context for a MN to SCMs or APs. [A Context-Request that is used to "get" information contains one or more "request" TLVs.]

A Context-Reply message is used to acknowledge a Context-Request message. It is also used to return status information (e.g. for a "set" request) or context, configuration, or management information (e.g. for a "get" request) for a corresponding Context-Request message.

A Path-Update-Request message is used to re-establish the backward-learned path between a wireless station and each correspondent host, when the wireless station roams from an old AP to a new AP within a single subnet. The Path-Update-Request is sent from the new AP to the old AP, with the source 802 address of the station that roamed.

A Path-Update-Reply message is, optionally, used to acknowledge a Path-Update-Request message and it is used to transfer transient context information directly from an "old AP" to a "new AP".

A Path-Check message is used to implement a Reliable Path Update mechanism (i.e. to recover from lost Path-Update-Request messages).

A Trace-Request message is used for SWAN path testing, response time analysis, and station tracking.

A Trace-Reply is used to acknowledge a Trace Request.

AAA messages are encapsulated 802.1X EAPOL messages typically used for authentication. Alternately, AAA messages could also be typed to designate the beginning (START) or end (SUCCESS) of an AAA message exchange. Finally, AAA messages are also encapsulated Cisco accounting messages typically used by the AP to update the session accounting maintained by the AS. When the MN is employing Cisco's Central Key Management (CCKM), initial key establishment between the MN and MN Authenticator, is triggered by the MN Authenticator initiating a 4-way handshake by sending the MN an EAPOL Key message with a 16 byte nonce. To achieve this, a nonce is passed from the MN Authenticator to the AP using an AAA Success message. Details of the key establishment is described in the Fast Handoff Protocol Specification [8]. This is the only EAPOL Key message generated by the SWAN Topology, all others are results of 802.1X EAP Authentication.

AAA messages are WLCCP encapsulations of 802.1X EAPOL or Cisco session accounting messages and thus do not follow the Request-Reply norm. However, since Authenticators can detect authentication failures, the Status field provided in the outbound messages can provide more information to reflect authentication status.

Path-Init Request, Reply, Confirm, Ack. Path-Init messages are used for IN path authentication, where an IN mutually authenticates and establishes a path CTK with each of its ancestors. The necessary path authentication 4-way handshake may consist of 1) a Path-Init Request/Reply exchange followed by an initial Registration Request/Reply exchange, or 2) a Path-Init Request/Reply/Confirm/Ack exchange. (The second sequence is used to refresh path CTKs for a registered IN.)

WLCCP fields are defined in network byte and bit order (i.e. big endian). The bits in each field are numbered from left to right starting with '0' (i.e. the high-order bit is bit '0').

WLCCP messages can be encapsulated in Ethernet frames or UDP/TCP/IP packets. Ethernet encapsulation can be used for intra-subnet messages sent between two APs or an AP and SCM, which are on the same subnet. IP encapsulation must be used for inter-subnet messages. The WLCCP Ethernet DIX type is 0x872d. The WLCCP UDP/TCP protocol port is decimal 2887. It is a "well-known" protocol port that is registered with the Internet Assigned Number Authority.

A single WLCCP message format is used for both Ethernet and IP encapsulation. All WLCCP messages share a common header format, which is defined below. The header format is defined so that it is unambiguous with existing Ethernet and IP DDP message formats. The WLCCP message body, which follows the common header, contains SAP-specific message types. This document defines message formats for the WLCCP "Context Management" SAP, which is '0'.

An example Ethernet-encapsulated WLCCP Context Management frame 2000 is shown in FIG. 20. The frame 2000 comprises the destination MAC address 2002, the source MAC address 2004, the DIX Type (0x872D for this example) 2006, WLCCP Common Header 2008, WLCCP Context management header 2010, Type-specific fields 2012, and Optional TLVs 2014.

In general, Ethernet encapsulation can be used for WLCCP messages that are limited to a single subnet. IP encapsulation is required for all inter-subnet messages. Ethernet encapsulation is used for SCM-Advertisement messages and intra-subnet Registration, Deregistration, Detach, Path-Update, and Path Check messages. UDP/IP encapsulation is used for CCM Advertisement messages and inter-subnet Registration, Deregistration, and Detach messages. Either Ethernet or UDP/IP encapsulation can be used for Trace messages. Ethernet, UDP/IP, or TCP/IP encapsulation can be used for Context messages.

Sample definitions for the Ethernet-encapsulated WLCCP Context Management frame 2000 are shown below:

```
#define WLCCP_DIX_ETHER_TYPE 0x872d
#define WLCCP_DEF_UDP_PROTO_PORT 2887
#define WLCCP_IP_MCAST_ADDRESS 0xE0000128 /* 224.0.1.40 */
#define WLCCP_MCAST_ADDRESS_IN {0x01, 0x40, 0x96,
0xff, 0xff, 0xC0}
Sample WLCCP Node Type Definitions
#define WLCCP_NODE_TYPE_ANY        0
#define WLCCP_NODE_TYPE_AP         1
#define WLCCP_NODE_TYPE_SCM        2
#define WLCCP_NODE_TYPE_LCM        4
#define WLCCP_NODE_TYPE_CCM        8
#define WLCCP_NODE_TYPE_ICN        0x10 /* infrastructure
                                           client node */
#define WLCCP_NODE_TYPE_CLIENT     0x40
#define WLCCP_NODE_TYPE_MULTI_MASK    0x8000
Sample WLCCP Port Type Definitions
#define WLCCP_PORT_TYPE_ETHER      1
#define WLCCP_PORT_TYPE_INTERNAL   2
#define WLCCP_PORT_TYPE_DOT11      0x80
#define WLCCP_PORT_TYPE_DOT11A     0x81
#define WLCCP_PORT_TYPE_DOT11B     0x82
#define WLCCP_PORT_TYPE_DOT11G     0x83
```

An "internal port" is a logical port that exists between an AP and SCM that are co-located in the same device.

```
#define WLCCP_PORT_COST_ETHER     10
#define WLCCP_PORT_COST_INTERNAL  10
#define WLCCP_PORT_COST_DOT11     50
#define WLCCP_PORT_COST_DOT11A    30
#define WLCCP_PORT_COST_DOT11B    50
#define WLCCP_PORT_COST_DOT11G    40
1.1.1 Sample Miscellaneous Constants
#define DEF_SCM_ADVERTISE_PERIOD  FIVE_SECONDS
#define DEF_SCM_LISTEN_TIME       4 * DEF_SCM_ADVERTISE_PERIOD
#define MAX_SCM_ELECT_TIME        6 * DEF_SCM_ADVERTISE_PERIOD
#define MAX_SCM_AGE               8 * DEF_SCM_ADVERTISE_PERIOD
```

Referring now to FIG. 21 there is a table illustrating the fields for a WLCCP Message Header 2100. The columns comprise the Field Name 2102, Offset 2104, Size 2106 and a Description 2108 of each field of the message header 2100.

The length of the fixed WLCCP header 2100 is 28 bytes. The fields Protocol ID/Version 2110, WLCCP SAP 2112 and Destination Node type 2114 are common to all WLCCP SAPs. The remaining fixed fields are common to all Context Management frames (i.e. all frames defined in this document). If the Relay Flag is set ON, then the header is immediately followed by an 8-byte Relay Node ID field.

```
#define WLCCP_PROTO_ID 0xC0
```

The WLCCP Protocol ID 2110, 0xC0, is defined so that WLCCP and DDP messages can share the same DIX Ethernet type and UDP protocol port. The DDP message header is defined in Appendix B.

The Destination Node Type 2114 and WLCCP SAP 2112 fields are used to select the internal destination within the device identified by the Ethernet or IP destination address. The sender must set the Destination Node Type 2114 to the node type of the immediate receiver, before sending a WLCCP message. The Destination Node Type 2114 can be '0' if the SAP uniquely identifies the internal destination.

The Hop Count 2116 field contains the number of WLCCP hops (minus one) between the Originator and Responder. The Originator or Responder must initialize the Hop Count to '0'. The Hop Count is incremented by each intermediate node on the path to the Originator or Responder. A message is discarded if the Hop Count exceeds WLCCP_MAX_HOP_COUNT.

The Response-Req Flag is set ON in a request message to solicit a reply.

The TLV flag is set ON to indicate that optional TLVs follow the fixed fields.

The Inbound Flag, Outbound Flag, and Hopwise-Routing Flag determine how a WLCCP message is forwarded (as described below).

If the Root CM Flag is set ON in an inbound message, then the message is always forwarded to the CM at the root of the entire Topology Tree—the "root CM". If the Root CM Flag is set ON in an outbound message, then the message originated at the root CM.

If the Relay Flag is set ON, then the WLCCP header is immediately followed by a 64-bit Relay Node ID field (a 16-bit Node Type followed by a 48-bit Node Address).

The MIC flag is set ON to in a message that must be authenticated and contains a WTLV_MIC TLV.

The Responder Node Type bits contain the Node Type of the WLCCP node that generated the original reply message.

The Originator Node ID 2122, generally, identifies the node that originated a request message. The Responder Node ID 2124 generally identifies the target of a request message and the source of the corresponding reply message. In a WLCCP Registration message for a MN, the Originator Node ID is the 802 address of the MN. The Responder Node ID may be '0' in Registration Request, Advertisement Request, or Detach Request messages. The Responder Node

```
#define WLCCP_MAX_HOP_COUNT      25
#define WLCCP_PROTO_VERSION      1
#define WLCCP_CONTEXT_MGMT_SAP   0x00 /* WLCCP (mobility/context control) */
#define WLCCP_SECURITY_SAP       0x01
#define WLCCP_RRM_SAP            0x02 /* radio resource management */
#define WLCCP_QOS_SAP            0x03
#define WLCCP_NM_SAP             0x04 /* network management */
#define WLCCP_MIP_SAP            0x05
WLCCP message Type 2118 definitions:
#define WLCCP_TYPE_SCM_ADVERTISE 1
#define WLCCP_TYPE_CCM_ADVERTISE 2
#define WLCCP_TYPE_REG           3
#define WLCCP_TYPE_DEREG         4
#define WLCCP_TYPE_DETACH        5
#define WLCCP_TYPE_CONTEXT       6
#define WLCCP_TYPE_PATH_UPDATE   7
#define WLCCP_TYPE_PATH_CHECK    8
#define WLCCP_TYPE_PREREG        9
#define WLCCP_TYPE_TRACE         10
#define WLCCP_TYPE_EAP_AUTHEN    11
#define WLCCP_TYPE_PATH_AUTHEN   12
```

WLCCP "Reply" message types are equal to the corresponding request type ORed with WLCCP_TYPE_REPLY_MASK.

```
#define WLCCP_TYPE_CONFIRM_MASK 0x80
#define WLCCP_TYPE_REPLY_MASK   0x40
```

The Flags field 2120 is used as follows:

The Retry flag is set ON in retransmitted Request or Confirm messages. The Message ID in a retransmitted message is the same as in the original message. The Retry flag is set ON in a Reply or Ack message if it is set ON in the corresponding request message.

ID may be '0' in any IP-encapsulated Request message. The Responder Node ID identifies the source of a solicited or unsolicited Advertisement Reply message.

The Hop Source Node ID contains the WLCCP Node ID of the hop source of a request or reply message.

Figures 22, 23:
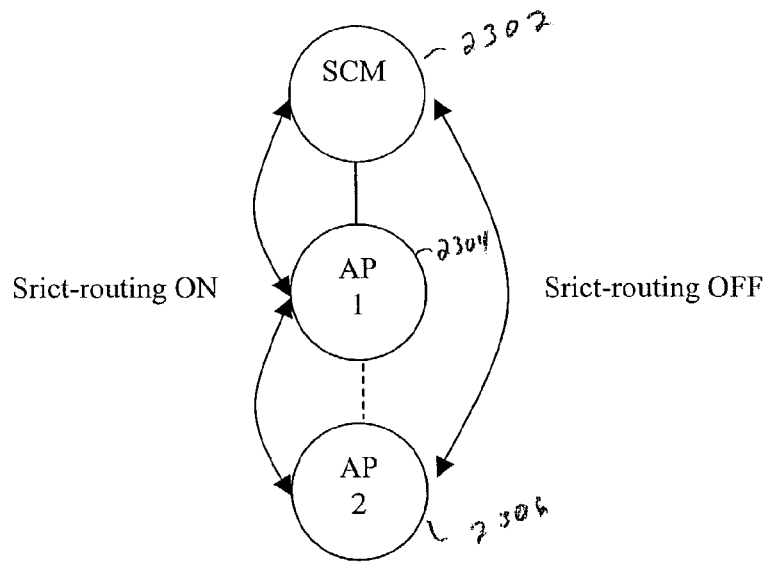
FIG. 22 is an example of a TLV format.
FIG. 23 is a block diagram showing how hopwise routing is used.

Optional parameters may follow the fixed fields in any WLCCP message. Optional parameters are in the "TLV" format as shown in FIG. 22.

The TLV "Type" 2210 field contains a Container Flag, an Encrypted Flag, a Request Flag, a Group ID and a Type ID. A "request TLV" has the Request Flag set ON in the Type ID field.

```
#define WLCCP_TLV_CONTAINER_MASK    0x8000
#define WLCCP_TLV_ENCRYPTED_MASK    0x4000
#define WLCCP_TLV_GROUP_MASK        0x0300
#define WLCCP_TLV_REQUEST_MASK      0x0080
#define WLCCP_TLV_TYPE_MASK         0x007f
```

TLV Group IDs are used to group TLVs hierarchically. A Group ID can be used to identify the software module in the target node that must process the respective TLV type.

The Request Flag is set on in a TLV in a WLCCP request message to "request" information from the target WLCCP node. A "request TLV" has the Request Flag set ON.

The TLV Container Flag can be used to group fixed attributes and other optional TLVs into a single "container TLV". The Container Flag should only be set ON in a TLV if any required TLV fields are followed by other optional TLVs. Container TLVs can be nested.

TLV Group IDs:

```
#define WTLV_WLCCP_GROUP_ID      0x00
#define WTLV_SECURITY_GROUP_ID   0x01
#define WTLV_RRM_GROUP_ID        0x02 /* radio resource management */
#define WTLV_QOS_GROUP_ID        0x03
#define WTLV_NM_GROUP_ID         0x04 /* network management */
#define WTLV_MIP_GROUP_ID        0x05
```

WLCCP TLV formats are defined in the tables below. The first row in each table contains the TLV name, TLV ID, and TLV description. The description includes a list of message types that may contain the respective TLV. The Type and Length fields are not included in the field definitions.

| TLV Name | ID | Description |
|---|---|---|
| WTLV_NULL | 0x0000 | A NULL TLV can be used to pad a message for even alignment. The length must be at least '4'. |
| WTLV_CONTAINER | 0x0001 | The generic "Container" TLV is used to logically group arbitrary TLVs. |

| WTLV_AP_PORT_INFO | 0x0002 | The type, mode, and address of an AP port. Msgs: Contained in an AP_PORT_LIST TLV in an AP Registration Request |
|---|---|---|

| Field Name | Offset | Size | Field Description |
|---|---|---|---|
| Type | 4 | 1 | 1 = Ethernet, 2 = Internal, 0x80 = 802.11, 0x81 = 802.11a, 0x82 = 802.11b, 0x83 = 802.11g |
| Mode | 5 | 1 | 1 = Parent, 2 = Child, 3 = Parent/Child 0x80 = Primary Port mask |
| Address | 6 | 6 | 802 hardware address |

| WTLV_AP_PORT_INFO | 0x0002 | The type, mode, and address of an AP port. Msgs: Contained in an AP_PORT_LIST TLV in an AP Registration Request |
|---|---|---|

| Field Name | Offset | Size | Field Description |
|---|---|---|---|
| NIC ID | 12 | 2 | An integer that is used internally to identify the NIC type (e.g. Venus radio). |
| Version String TLV (optional) | 14 | N | |

| WTLV_IPV4_SUBNET_ID | 0x0003 | IP Subnet Address. Msgs: Contained in an SCM Advertisement Reply to advertise the IP address and subnet of the SCM. Optionally contain in a PMIP_SSID_LIST TLV in a Registration Request to bind a PMIP SSID to a subnet. |
|---|---|---|

| Field Name | Offset | Size | Field Description |
|---|---|---|---|
| IPv4 Address | 4 | 4 | IPv4 address |
| Prefix Length | 8 | 1 | Number of bits in the subnet mask |
| Flags | 9 | 1 | (reserved - must be 0) |

| WTLV_SEC_LAN_ADDR_LIST | 0x0004 | A list of Ethernet addresses of stations on a secondary LAN. Msgs: WLCCP Designated Bridge Registration Req. |
|---|---|---|

| Field Name | Offset | Size | Field Description |
|---|---|---|---|
| Count | 4 | 2 | Number of addresses in the list |
| VLAN ID | 6 | 2 | VLAN ID of the secondary LAN. A value of '0' is used to indicate the "native VLAN". |
| Address List | 8 | N x 6 | A list of Ethernet addresses. |

| WTLV_MCAST_ADDR_LIST | 0x0005 | | A list of enabled multicast Ethernet addresses. Msgs: Child AP Registration Req. (implementation is optional) |
|---|---|---|---|
| Field Name | Offset | Size | Field Description |
| Count | 4 | 2 | Number of addresses in the list |
| Address List | 6 | N × 6 | A list of multicast Ethernet addresses. |

| WTLV_IPV4_MCAST_ADDR_LIST | 0x0006 | | A list of enabled multicast IPv4 addresses. Msgs: AP Registration Req. (implementation is optional) |
|---|---|---|---|
| Field Name | Offset | Size | Field Description |
| Count | 4 | 2 | Number of addresses in the list |
| Address List | 6 | N × 4 | A list of multicast IPv4 addresses. |

| WTLV_AP_PORT_LIST | 0x0007 | | A list of AP_PORT_INFO TLVs (see above). Msgs: AP Registration Requests. |
|---|---|---|---|
| Field Name | Offset | Size | Field Description |
| Count | 4 | 2 | Number of AP ports |
| Port List | 6 | N × 16 | A list of AP_PORT_INFO TLVs. |

| WTLV_SSID | 0x0008 | | The SSID of an 802.11 "Requester Node". If the "Broadcast Translation" flag is set ON, then the station used a broadcast SSID. Msgs: Preregistration and Registration Request/Reply |
|---|---|---|---|
| Field Name | Offset | Size | Field Description |
| Flags | 4 | 1 | Bit 0 - AAA Assigned (set ON in a Reply message to assign a MN to the SSID) Bit 1 - Broadcast Translation Bit 2 - IN WLCCP SSID Bits 3-7 - (reserved - must be zero) |
| Length | 5 | 1 | SSID Length (Max. length = 32) |
| SSID | 6 | N | 802.11 SSID |

| WTLV_IPV4_ADDRESS | 0x0009 | | The IPv4 address of a "Requester Node" - registered in a Request msg or returned in a Reply msg. Msgs: Preregistration, Registration, Context Request/Reply |
|---|---|---|---|
| Field Name | Offset | Size | Field Description |
| IP Address | 4 | 4 | IPv4 address |

| WTLV_PARENT_AP_BSSID | 0x000A | | The BSSID for the BSS of an 802.11 MN or AP "Requester Node". Msgs: Registration Request for an 802.11 station |
|---|---|---|---|
| Field Name | Offset | Size | Field Description |
| BSSID | 4 | 6 | 802.11 BSSID of the station's current BSS |

| WTLV_OLD_AP_BSSID | 0x000B | | The previous BSSID of an 802.11 MN or AP "Requester Node" from the "Current AP" element in an 802.11 Reassociation Request. Msgs: Preregistration or Registration Request for an 802.11 station. |
|---|---|---|---|
| Field Name | Offset | Size | Field Description |
| BSSID | 4 | 6 | 802.11 BSSID of the station's previous BSS |

| WTLV_PMIP_SSID_LIST | 0x000C | | A container TLV that contains SSID TLVs and for each SSID TLV, a list of 0 or more MIPV4_AGENT TLVs or a SUBNET_ID TLV. The optional SUBNET_ID is included only if an HA is not known, but the subnet address is known. Msgs: SCM or AP Registration Request. |
|---|---|---|---|
| Field Name | Offset | Size | Field Description |
| SSID TLV | 4 | N | SSID TLV which contains a PMIP SSID (repeated for each PMIP SSID) |
| MIPV4_AGENT TLV | 4 + N | 6 | MIPv4 HA for the default subnet bound to the SSID (repeated for each HA on the subnet). |

| | | | |
|---|---|---|---|
| WTLV_PARENT_CM (request) | 0x008E | | An SCM uses a request PARENT_CM TLV to request a parent CM (LCM or CCM) from the CCM. If the SCM was previously bound to a parent CM, then the Node ID field must contain the old parent CM's Node ID; otherwise, the Node ID field must be '0'. Msgs: Context Request sent by an SCM to the CCM. |
| Field Name | Offset | Size | Field Description |
| Node ID | 4 | 8 | Node ID of any old parent CM or '0'. |
| IPv4 Address | 12 | 4 | IPv4 address of any old parent CM or '0'. |

| | | | |
|---|---|---|---|
| WTLV_PARENT_CM | 0x000E | | The CCM uses a PARENT_CM TLV to assign an SCM to a parent CM (LCM or CCM). Msgs: Context Reply sent by the CCM to an SCM. |
| Field Name | Offset | Size | Field Description |
| Node ID | 4 | 8 | Node ID of the parent CM. A Node ID of '0' is used to indicate "no parent CM" (i.e. standalone mode). |
| IPv4 Address | 12 | 4 | IPv4 address of the parent CM. |

| | | | |
|---|---|---|---|
| WTLV_DELETED_NODE_LIST | 0x000F | | A list of Node IDs of deleted nodes. A parent SCM or AP uses the DELETED_NODE_LIST TLV to notify a child AP that it must reregister. Msgs: SCM Advertisement Reply |
| Field Name | Offset | Size | Field Description |
| Count | 4 | 2 | The number of deleted nodes. |
| Node Instance | 6 | 12 | An 8-byte Node ID followed by a 4-byte Path ID of a deleted node. The Node Instance field is repeated for each deleted node. |

| | | | |
|---|---|---|---|
| WTLV_MIPV4_AGENT | 0x0010 | | The IP address, subnet prefix length, and capabilities of a MIP HA. Msgs: Contained in a PMIP_SSID_LIST TLV in an SCM or AP Registration Request. |
| Field Name | Offset | Size | Field Description |
| IPv4 Address | 4 | 4 | MIP agent IPv4 address |
| Prefix Length | 8 | 1 | Number of bits in the agent's subnet mask. |
| Flags | 9 | 1 | Bit 0 - Statically Configured Bits 1-7 - (reserved - must be zero) |
| Capability Bits | 10 | 2 | The capability bits are the same as the last 16 bits in a MIPv4 Agent Advertisement Extension: Bits 0-8 - R, B, H, F, M, G, H, r, T Bits 9-15 - (reserved - must be zero) |
| Age | 12 | 2 | Elapsed time in seconds since an advertisement was received from the agent. |

| | | | |
|---|---|---|---|
| WTLV_OLD_AP_BINDINGS | 0x0011 | | The Node ID, IPv4 address, and BSSID of the old AP for an 802.11 "Requester Node". Msgs: Preregistration or Registration Reply for an 802.11 station. |
| Field Name | Offset | Size | Field Description |
| Node ID | 4 | 8 | Node ID of the old AP |
| IP Address | 12 | 4 | IPv4 address of the old AP |
| BSSID | 16 | 6 | 802.11 BSSID of the old BSS |

| | | | |
|---|---|---|---|
| WTLV_HOME_SUBNET | 0x0012 | | The IP address, MIP HA, and subnet prefix length of a Proxy MIP MN. Msgs: Registration Request/Reply |
| Field Name | Offset | Size | Field Description |
| IPv4 Address | 4 | 4 | IPv4 address of the MN |
| Prefix Length | 8 | 1 | Number of bits in the MN's home subnet mask. The field can be '0' if the mask is unknown. |
| Flags | 9 | 1 | Bit 0 - At Home Flag (set ON if the MN is at home) Bits 1-7 - (reserved - must be zero) |
| HA Address | 10 | 4 | IPv4 address of the MN's HA. It is the default HA for the MN's subnet |

| Field Name | Offset | Size | Field Description |
|---|---|---|---|
| WTLV_HOME_SUBNET | | 0x0012 | The IP address, MIP HA, and subnet prefix length of a Proxy MIP MN. Msgs: Registration Request/Reply |
| Field Name | Offset | Size | Field Description |
| | | | in a Request. It is the assigned HA in a Reply. |

| Field Name | Offset | Size | Field Description |
|---|---|---|---|
| WTLV_LOST_LINK | | 0x0013 | The LOST_LINK TLV is used to report a lost infrastructure link. Msgs: A lost secondary link is reported in a Registration Request. A lost SCM primary link is reported to the CCM in a Context Request. |
| Field Name | Offset | Size | Field Description |
| Node ID | 4 | 8 | Parent Node ID if the Primary flag is set ON; otherwise, the child Node ID |
| Reason | 12 | 1 | Reason code. 0 = General Error, 1 = Retry Error, 2 = Keepalive Timeout, 3 = Administrative Dereg., 4 = Beacon Timeout, 5 = Path Cost |
| Flags | 13 | 1 | Bit 0 - Primary (set ON for a primary link; set OFF for a secondary link) Bits 1-7 - (reserved - must be zero) |

| Field Name | Offset | Size | Field Description |
|---|---|---|---|
| WTLV_VERSION_STRING | | 0x0014 | The hardware and software version of an AP or CM "Requester Node". Msgs: Registration Request |
| Field Name | Offset | Size | Field Description |
| HW Version Length | 4 | 1 | HW version string length in bytes. The length may include 'null' padding bytes. |
| HW Version | 5 | M | HW Version String |
| SW Version Length | 5 + M | 1 | SW version string length in bytes. The length may include 'null' padding bytes. |
| SW Version | 6 + M | N | SW Version String |

| Field Name | Offset | Size | Field Description |
|---|---|---|---|
| WTLV_NAME | | 0x0015 | The Network Access Identifier (NAI) or Domain Name of a MN, AP, or CM "Requester Node". Msgs: Registration Request |
| Field Name | Offset | Size | Field Description |
| Name Type | 4 | 1 | 1 = NAI, 2 = Domain Name |
| Name Length | 5 | 1 | Name length in bytes |
| Name | 6 | N | A string that contains the NAI or domain name. |

| Field Name | Offset | Size | Field Description |
|---|---|---|---|
| WTLV_SYSTEM_ID | | 0x0016 | System ID values. Msgs: Registration Request |
| Field Name | Offset | Size | Field Description |
| Product ID | 4 | 2 | An integer that is used internally to identify the product type (e.g. Ivory AP). |
| Version String TLV (optional) | NA | M | Optional VERSION_STRING TLV - which can contain the HW and/or SW version. |
| System Name TLV (optional) | NA | N | Optional NAME TLV - which contains the system name. |

| Field Name | Offset | Size | Field Description |
|---|---|---|---|
| WTLV_NODE_ID_LIST | | 0x0018 | A list of Node IDs, with an entry for each node on the path to the root CM. Msgs: Path-Init Request/Reply |
| Field Name | Offset | Size | Field Description |
| Count | 4 | 2 | The number of Node IDs in the list. |
| Node ID List | 6 | 8 × N | A list of Node IDs |

| Field Name | Offset | Size | Field Description |
|---|---|---|---|
| WTLV_MIP4_REG_REQ | | 0x0019 | An SCM sends a MIP_REG_REQ container TLV to trigger a parent AP to send a MIP registration request for the Requester Node. A MIP "deregistration request" is sent if the MN is "at home". Msgs: MN Registration Reply |
| Field Name | Offset | Size | Field Description |
| Flags | 4 | 2 | Bit 0 - At Home Flag (set ON if the MN is at home) Bits 1-15 - (reserved - must be zero) |

-continued

| Field Name | Offset | Size | Field Description |
|---|---|---|---|
| WTLV_MIP4_REG_REQ | 0x0019 | | An SCM sends a MIP_REG_REQ container TLV to trigger a parent AP to send a MIP registration request for the Requester Node. A MIP "deregistration request" is sent if the MN is "at home". Msgs: MN Registration Reply |
| Home subnet bindings | 6 | N | HOME_SUBNET TLV (It may be possible to just use a flag in the HOME_SUBNET TLV) |

| Field Name | Offset | Size | Field Description |
|---|---|---|---|
| WTLV_AUTH_METHOD | 0x001A | | The authentication method(s) used for the "Requester Node". The Fast Reauthentication Flag is set ON if the node used fast reauthentication. Msgs: Preregistration and Registration Request |
| Base Type | 4 | 2 | None = 0, Open = 0x0001, Shared Key = 0x0002, LEAP = 0x0004, EAP = 0x0008, MAC Address = 0x0010, Alternate = 0x0020, Client = 0x0040, Unknown = 0x8000 |
| EAP Type | 5 | 1 | |
| Fast Reauthentication | 6 | 1 | Bit 0 - Fast Reauthen. Flag Bits 1-7 - Fast Reauthen. Type. CCKM = 1 |

| Field Name | Offset | Size | Field Description |
|---|---|---|---|
| WTLV_IPV4_HOP_ADDRESS | 0x001B | | The IPV4_HOP_ADDRESS TLV is used to advertise the IP address of an AP. Msgs: SCM Advertisement Reply generated by an AP. |
| IP Address | 4 | 4 | AP IPv4 address |

| Field Name | Offset | Size | Field Description |
|---|---|---|---|
| WTLV_EAP_IDENTITY | 0x001C | | The EAP Identity string of the "Requester Node". Msgs: Preregistration and Registration Request |
| EAP ID Length | 4 | 1 | Length of the EAP ID in bytes. |
| EAP ID | 5 | N | A string that contains the EAP ID from the node's EAP Identity Response message. |

| Field Name | Offset | Size | Field Description |
|---|---|---|---|
| WTLV_MN_1X_AUTHEN | 0x001E | | The Node ID and IPv4 address of the 802.1X MN authenticator. Msgs: IN Registration Reply and SCM Advertisement Reply. The TLV is included in SCM Advertisement messages to advertise a MN authenticator change. |
| Node ID | 4 | 8 | Node ID of the 802.1X MN Authenticator. |
| IPv4 Address | 12 | 4 | IPv4 address of the 802.1X MN Authenticator. |

| Field Name | Offset | Size | Field Description |
|---|---|---|---|
| WTLV_ROOT_CM_INFO | 0x001F | | The Node ID and IPv4 address of the WLCCP Root CM. Msgs: SCM Advertisement Reply. |
| Node ID | 4 | 8 | Node ID of the root CM. |
| IPv4 Address | 12 | 4 | IPv4 address of the root CM. |

| Field Name | Offset | Size | Field Description |
|---|---|---|---|
| WTLV_REPLY_STATE | 0x0020 | | Opaque transaction state information. REPLY_STATE TLVs contained in Request messages must be copied, in order, to Reply messages. |
| Node ID | 4 | 8 | Node ID of the node that entered the TLV. |
| State | 12 | N | Opaque transaction state information. |

| WTLV_MN_REG | 0x0021 | | A MN_REG TLV contains any information necessary to register a MN. It is contained in a MN_REG_LIST TLV. Any fields that are not described are defined the same as the corresponding field in the Registration header. |
|---|---|---|---|
| Field Name | Offset | Size | Field Description |
| Requestor Node ID | 4 | 8 | WLCCP Node ID of the MN. |
| Path ID | 12 | 4 | Contains the Path ID assigned to the MN in a Reply message. |
| Registration Flags | 16 | 2 | |
| VLAN ID | 18 | 2 | |
| Status | 20 | 1 | |
| Age | 21 | 1 | Seconds since the MN was last active. |
| Optional TLVs | 22 | N | Optional TLVs (e.g. IPV4_ADDRESS or SSID) can be included by setting the container flag ON. |

Any parameters that are not contained in the WTLV_MN_REG TLV are taken from the Registration message or the encapsulating WTLV_MN_REG_LIST TLV.

| WTLV_MN_REG_LIST | 0x0022 | | A list of MN_REG TLVs and o |
|---|---|---|---|
| Field Name | Offset | Size | Field Description |
| MN_REG TLVs an other optional TLVs. | 4 | N | Any TLVs, other that MN_REG TLVs, establish default parameter values for succeeding MN_REG TLVs. |

The table below shows the fields for an SCM Advertisement Reply Message.

| Field Name | Offset | Size (bytes) | Description |
|---|---|---|---|
| WLCCP Header | 0 | 28 | Common Context Mgmt SAP Header |
| Hop Address | 28 | 6 | Source 802 Port Address |
| SCM Flags | 34 | 2 | Bit 15 - Active Flag. Set ON in advertisements from the active SCM.<br>Bit 14 - Unscheduled Flag (set ON in unscheduled advertisement messages)<br>Bit 13 - Unattached Flag* (set ON in advertisements from an unattached node)<br>Bit 12 - Layer 2 Update Flag (set ON if WLCCP Layer 2 path updates are enabled. Set OFF by default)<br>Bits 0-11 - (reserved - must be zero) |
| SCM Election Group | 36 | 1 | (reserved for future use - must be zero) |
| Attach Count | 37 | 1 | Attach count of the hop source |
| SCM Priority | 38 | 1 | Bits 1-7 - SCM Priority value from 0 (lowest) to 127 (highest).<br>Bit 0 - Preferred Flag - Set OFF if the SCM is the "preferred SCM". |
| Bridge Priority | 39 | 1 | Bits 1-7 - Bridge Priority value from 0 (highest) to 127 (lowest).<br>Bit 0 - Bridge Disable Flag. Set ON to indicate that secondary bridging is disabled. The Bridge Priority is used to negotiate the WLCCP designated bridge on a non-STP secondary Ethernet LAN. |
| Instance Age | 40 | 4 | The "instance age" of the SCM, in seconds |
| SCM Node ID | 44 | 6 | WLCCP Node ID of the SCM |
| Path Cost | 50 | 2 | Sum of port costs on the path to the SCM |
| Hop Count | 52 | 1 | Number of wireless hops on the path to the SCM |

| Field Name | Offset | Size (bytes) | Description |
|---|---|---|---|
| Advertisement Period | 53 | 1 | The average number of seconds between SCM advertisements. |
| (Optional TLVs) | 54 | N | (required TLVs are defined below) |

*A parent node sends an SCM Advertisement Request with the Unattached Flag set ON to quickly notify child nodes that it has become "unattached". If it is unattached because the active SCM was lost, then it must also set the SCM Node ID to '0'. The Instance Age field contains the "age" of the instance of the node that transmits an SCM-Advertisement Reply message, in seconds. (See the section entitled "Topology StateInformation" for a description of an "Instance Number".) An SCM Advertisement Reply message must include a WTLV_SUBNET_ID TLV, which contains the IP address and subnet mask of the SCM. An SCM Advertisement Reply message must include a WTLV_ROOT_CM_INFO TLV which contains the IPv4 address of the root CM (which is also the 802.1X IN Authenticator). An SCM Advertisement Reply message sent by an AP can include a WTLV_IPV4_HOP_ADDRESS TLV, which contains the AP's IP address.
define SCM_ADVERTISE_INTERVAL 5 /* The default SCM advertisement interval is 5 seconds. */
define SCM_INFINITE_PATH_COST 0xFFFF
define SCM_INFINITE_HOP_COUNT 0xFF The below table shows the fields for an SCM-Advertisement Request Message.

| Field Name | Offset | Size (bytes) | Description |
|---|---|---|---|
| WLCCP Header | 0 | 28 | Common Context Mgmt SAP Header* |
| Hop Address | 28 | 6 | Source 802 Port Address |
| (optional TLVs) | 34 | N | |

The below table gives the fields for a Registration Request/Reply Message

| Field Name | Offset | Size (bytes) | Description |
|---|---|---|---|
| WLCCP Header | 0 | 28 | Common Context Mgmt SAP Header |
| Relay Node ID | 28 | 8 | Relay Node Type and Node Address |
| 802 Hop Address | 36 | 6 | 802 Source Port Interface Address. |
| Requester Node ID | 42 | 8 | WLCCP Node ID of the node that is "requesting" network registration. It is the 802 address of a MN, in a "proxy" request. |
| Registration Sub Type Flags | 50 | 1 | Bit 7 - Initial Registration Flag<br>Bit 6 - Proxy Registration Flag<br>Bit 5 - List Registration Flag<br>Bits 0-5 (reserved - must be zero) |
| Bridging Flags | 51 | 1 | Bit 7 - Secondary Bridge Flag<br>Bit 6 - Unicast Flooding Flag<br>Bit 5 - Multicast Flooding Flag<br>Bit 4 - IP Multicast Flooding Flag<br>Bits 0-3 - (reserved - must be zero) |
| Registration Flags | 52 | 2 | Bit 15 - Authenticated Flag<br>Bit 14 - (reserved - must be zero)<br>Bit 13 - Proxy MIP flag<br>Bit 12 - L2 Path Update (0 = disable, 1 = enable)<br>Bits 0-11 - (reserved - must be zero) |
| Delay | 54 | 2 | Time since the node was last active, in hundredths of seconds, in a request message. |
| Path ID | 56 | 4 | Path ID establish by a CM. A value of '0' is used to indicate "no Path ID". |
| Lifetime | 62 | 1 | Registration lifetime in minutes. A value of '0' is used to indicate an "infinite" lifetime. |
| Status | 63 | 1 | Registration status in a reply message.<br>0-126 - good status<br>127 - (reserved)<br>128-254 - error status<br>255 - extended error status (an extended error status is contained in a TLV) |

| Field Name | Offset | Size (bytes) | Description |
| --- | --- | --- | --- |
| VLAN ID | 64 | 2 | Bit 3 - Assigned Flag. Set ON in a Reply if the VLAN ID was assigned by the infrastructure.<br>Bits 4-15 - VLAN ID of the Requester node (may be 0). |
| (Optional TLVs) | 66 | N | |

```
#define WLCCP_DEF_AP_REG_LIFETIME 10/*10
    minutes */ define WLCCP_DEF_CM_REG_LIFETIME 10 define WLCCP_DEF_MN_REG_LIFETIME 0/*
    infinite */
```

The Status field contains the registration status in a Reply message. Values from 0 to 126 are used to indicate a "good" status. The high-order bit is set ON to indicate an error status. Values from 128 to 254 are used to return an error status. A value of 255 is used to indicate that an extended error status code is contained in a WTLV_STATUS TLV.

Registration Reply status codes:

0—General good status

0x80—General error status

0x81—Unauthenticated. The Requester node is not authenticated.

0x82—Path Error. A path error was detected. The error will occur, for example, if a parent or relay node is not registered.

0x83—Invalid Update. An update Registration Request did not match the current path instance or a path instance did not exist.

0x84—Out-of-order. The Registration Request was received out-of-order.

0x85—A MIC error occurred.

0x86—Admin. Disabled. The Requester node is administratively disabled.

0x87—Max. Nodes. The registration was rejected because the max. number of registered nodes was exceeded.

0x88—Memory. A registration error occurred due to a lack of internal resources.

The Authenticated Flag is set ON in a Request for a MN, to indicate that the MN has been authenticated by the parent AP. The flag is used to register authenticated MNs when an AP transitions from distributed to infrastructure mode. It is also set on for a MN where authentication is not required (i.e. open authentication).

The Proxy MIP Flag is set ON in a Registration message for a proxy MIP MN.

The L2 Path Update Flag is set ON if WLCCP layer 2 path updates are enabled.

The VLAN ID in an initial Registration Request for a MN is set to the default VLAN ID for the MN's SSID. The VLAN ID in an initial Reply message for a MN contains an assigned VLAN ID, if the Assigned VLAN ID Flag is set ON. The VLAN ID in a Request for a child AP is always '0'. The VLAN ID in an initial Reply for a child AP is the AP native VLAN ID. (A child AP inherits its native VLAN ID from its parent AP.) The VLAN ID in an update Request or Reply can be '0' or the current VLAN ID for the Requester node.

A WTLV_IPV4_ADDRESS TLV always contains the IP address of the Requester Node. The IP address is included in a Request to register it with the WLCCP infrastructure. The IP address is included in a Reply for a MN to transfer it to the new parent AP.

An initial Registration Request for a MN must include a WTLV_AUTH_METHOD TLV that contains the MN authentication type.

An initial Registration Request for an 802.11 station (MN or child AP) must include a WTLV_SSID TLV, which contains the SSID from the station's 802.11 (Re)Association Request message.

An initial Registration Request for an 802.11 station (MN or child AP) must include a WTLV_PARENT_AP_BSSID TLV, which contains the BSSID of the stations parent AP.

An initial Registration Request for an 802.11 station, which has "reassociated", must include a WTLV_OLD_AP_BSSID TLV, which contains the BSSID from the "Old AP" field in the respective 802.11 Reassociation Request message.

A Registration Request for an AP must include a WTLV_AP_PORT_LIST container TLV, which contains a list of one or more WTLV_AP_PORT_INFO TLVs.

A Registration Reply for an 802.11 station must include a WTLV_OLD_AP_BINDINGS TLV, if the station was previously associated with an "old AP".

The table below shows the format of the Preregistration Request/Reply Message.

| Field Name | Offset | Size (bytes) | Description |
| --- | --- | --- | --- |
| WLCCP Header | 0 | 28 | Common Context Mgmt SAP Header |
| Relay Node ID | 28 | 8 | Relay Node Type and Node Address |
| Requester Node ID | 36 | 8 | WLCCP Node ID of the child 802.11 station (MN or child AP). |
| Preregistration Flags | 42 | 2 | Bits 0-15 - (reserved - must be zero) |
| (reserved) | 44 | 1 | (must be zero) |
| Status | 45 | 1 | Preregistration status in a reply message. 0 - good status |
| VLAN ID | 46 | 2 | Bits 0-2 - (reserved - must be zero) Bit 3 - Assigned VLAN Flag Bits 4-15 - VLAN ID of the Requester node (may be 0). Default VLAN ID in the Request message. Optional, assigned VLAN ID in the Reply Message. |
| (Optional TLVs) | 48 | N | |

The VLAN ID in a Preregistration Request for a MN is set to the default VLAN ID for the MN's SSID. The VLAN ID in a Reply message for a MN contains an assigned VLAN ID, if the Assigned VLAN ID Flag is set ON. The VLAN ID in a Request for a child AP is always '0'. The VLAN ID in a Reply for a child AP is the AP native VLAN ID. (A child AP inherits its native VLAN ID from its parent AP.)

A Preregistration Request for an 802.11 station (MN or child AP) must include a WTLV_SSID TLV, which contains the SSID from the station's 802.11 (Re)Association Request message.

A Preregistration Request for an 802.11 station, which has "reassociated", must include a WTLV_OLD_AP_BSSID TLV, which contains the BSSID from the "Old AP" field in the respective 802.11 Reassociation Request message.

A Preregistration Reply for an 802.11 station must include a WTLV_OLD_AP_BINDINGS TLV, if the station was previously associated with an "old is AP".

Referring to the table below, there is shown a Deregistration Request/Reply Message.

| Field Name | Offset | Size (bytes) | Description |
|---|---|---|---|
| WLCCP Header | 0 | 28 | Common Context Mgmt SAP Header |
| Relay Node ID | 28 | 8 | Relay Node Type and Node Address |
| Path ID | 36 | 4 | Path identifier established by a CM. |
| Status | 40 | 1 | A "reason" code in a request; a "status" value in a reply. The high-order bit of the reason code is set ON in "administrative" Dereg. Requests. |
| Deregistration Flags | 41 | 1 | Bit 7 - L2 Path Update (0 = disable, 1 = enable) Bits 0-6 - (reserved - must be zero) |
| Registration Message ID | 42 | 2 | Message ID of the last Registration Request received for the node. |
| Target Node ID | 44 | 8 | WLCCP Node ID of the node whose path instance must be "deleted. |
| Activity Timestamp | 52 | 2 | Number of seconds since the target node was last active, in a Reply message. |
| (Optional TLVs) | 54 | N | |

The format of the Detach Request/Reply Message is shown below:

| Field Name | Offset | Size (bytes) | Description |
|---|---|---|---|
| WLCCP Header | 0 | 28 | Common Context Mgmt SAP Header |
| Relay Node ID | 28 | 8 | Relay Node Type and Node Address |
| Path ID | 36 | 4 | Path identifier established by a CM. |
| Status | 40 | 1 | A "reason" code in a request; a "status" value in a reply. |
| Detach Flags | 41 | 1 | Bit 7 - L2 Path Update (0 = disable, 1 = enable) Bits 0-6 - (reserved - must be zero) |
| Requester Node ID | 42 | 8 | WLCCP Node ID of the node whose path instance must be "deleted. |
| (optional TLVs) | 50 | N | |

The format of the Path Check Request/Reply message is shown in the table below:

| Field Name | Offset | Size (bytes) | Description |
|---|---|---|---|
| WLCCP Header | 0 | 28 | Common Context Mgmt SAP Header |
| Relay Node ID | 28 | 8 | Relay Node Type and Node Address |
| Path ID | 36 | 4 | Path identifier established by a CM. |
| Status | 40 | 1 | A "reason" code in a request; a "status" value in a reply. |
| Query Flags | 41 | 1 | (reserved - must be 0) |
| Parent Node ID | 42 | 8 | Node ID of the parent AP that initiated the "path check". |
| (optional TLVs) | 50 | N | |

Path check usage is defined infra.

The Path Update Request/Reply Message is shown below:

| Field Name | Offset | Size (bytes) | Description |
|---|---|---|---|
| WLCCP Header | 0 | 28 | Common Context Mgmt SAP Header |
| Path ID | 28 | 4 | Path identifier established by a CM. |
| Update Flags | 32 | 2 | (reserved - must be 0) |
| Parent Node ID | 34 | 8 | Node ID of the new parent AP |
| (optional TLVs) | 42 | N | |

It should be noted that Disassociation Notification messages may be used in lieu of Path Update messages, if it is not necessary to transfer context information directly from an old AP to a new AP.

The format of the Context Request/Reply Message is given in the table below:

| Field Name | Offset | Size (bytes) | Description |
|---|---|---|---|
| WLCCP Header | 0 | 28 | Common WLCCP Context Mgmt SAP Header |
| (optional TLVs) | 28 + N | P | |

WLCCP AAA messages are used to encapsulate EAPOL and proprietary, e.g. Cisco, accounting messages, so that messages can be forwarded to/from the WLCCP Security SAP in the WLCCP MN or IN Authenticator. For instance, a repeater AP's or MN's EAPOL message will be WLCCP encapsulated by it's parent AP. Additionally, an AP may update the AS with session accounting reports and must thus send the appropriate Cisco proprietary messages.

The AAA messages need not be encrypted as they are typically either already protected by the original protocol (e.g. EAPOL or Cisco accounting) nor do they need to be authenticated. However, it is good security practice to authenticate (MIC) authentication messages. Optionally, only the MN's EAPOL messages should include a WTLV_MIC. If a WTLV_MIC TLV is included, the contained MIC authenticates the entire WLCCP message using the link's CTK. For instance, if the message is transmitted by an AP to the SCM, the shared CTK between the AP and SCM shall be used. Each hop in the inbound (or outbound) path must authenticate and recompute the MIC, if it is enabled.

Finally, AAA messages must also indicate whether the state machine has entered into a AAA message as well as when it has completed. To provision these states, the AAA message is further typed accordingly.

The general format for encapsulated EAPOL and proprietary, e.g. Cisco, accounting messages is as follows:

| Field Name | Offset | Size (bytes) | Description |
|---|---|---|---|
| WLCCP Header | 0 | 28 | Common Context Mgmt SAP Header |
| Requester Node ID | 28 | 8 | WLCCP Node ID of the node that is "requesting" network authentication. |
| AAA Type | 36 | 1 | AAA protocol message type:<br>0 - Start<br>1 - Finish<br>2 - EAPOL<br>3 - Cisco Accounting |
| Authentication Type | 37 | 1 | If AAA Type = EAPOL authentication, then it could be one of the following types:<br>0 - EAP only<br>1 - MAC only<br>2 - do MAC first, if it fails then do EAP<br>3 - do MAC and EAP<br>4 - LEAP only<br>5 - do MAC first, if it fails then do LEAP<br>6 - do MAC then do LEAP |
| Key Management Type | 38 | 1 | Type of (or no) key management negotiated. Valid values are:<br>0 - none<br>1 - CCKM<br>2 - Legacy 802.1X<br>3 - SSN/TGi |
| Status | 39 | 1 | Status field |
| Message | 40 | N | AAA message |

The WLCCP AAA messages serve several purposes:

1. Distinguish entry and exit of the AAA state
2. Encapsulate Cisco accounting messages sent from an AP to the AS to report accounting information.
3. Encapsulate EAPOL authentication messages. The first WLCCP (request) message must define the Key Management Type to trigger session key action by the MN authenticator. If CCKM is defined, then the MN authenticator will trigger a EAPOL Key message after receipt of a Radius Access Accept with a securely delivered NSK. Otherwise, the MN authenticator will temporarily hold the NSK to forward to the AP (but will remove the MN's entry upon a pre-registration request).
4. Encapsulate EAPOL Key message from the MN authenticator to the MN to initiate CCKM's initial 4-message handshake between the MN Authenticator and MN to establish the KRK and BTK.

If the AAA message is of type Start, then the message format is only a request message (no reply is expected). The Start message not only initiates the start of the AAA message exchange but it also provides SSID information as well as the AAA authentication or accounting messages to follow. The subsequent AAA messages must match in both AAA Authentication and Key Mangement type defined in the Start request. It's format is as follows:

| Field Name | Offset | Size (bytes) | Description |
|---|---|---|---|
| WLCCP Header | 0 | 28 | Common Context Mgmt SAP Header |
| Requester Node ID | 28 | 8 | WLCCP Node ID of the node that is "requesting" to initiate AAA message exchanges |
| AAA Type | 36 | 1 | 0 - for Start |
| Authentication Type | 37 | 1 | If AAA Type = EAPOL authentication, then it could be one of the following types:<br>0 - EAP only<br>1 - MAC only<br>2 - do MAC first, if it fails then do EAP<br>3 - do MAC and EAP<br>4 - LEAP only<br>5 - do MAC first, if it fails then do LEAP<br>6 - do MAC then do LEAP |
| Key Management Type | 38 | 1 | Type of (or no) key management negotiated. Valid values are:<br>0 - none<br>1 - CCKM |

| Field Name | Offset | Size (bytes) | Description |
| --- | --- | --- | --- |
| | | | 2 - Legacy 802.1X |
| | | | 3 - SSN/TGi |
| Status | 39 | 1 | Field value is ignored |
| TLV | 40 | N | SSID TLV |

When the AAA authentication or accounting exchange is complete, a AAA Finish (reply) message must be issued to terminate the AAA state. The AAA Finish is also used to indicate an AAA success (e.g. EAP or accounting success). If AAA Finish is successful and CCKM is defined as the Key Management, then the Finish message also includes a nonce. The AAA Finish message format is as follows:

| Field Name | Offset | Size (bytes) | Description |
| --- | --- | --- | --- |
| WLCCP Header | 0 | 28 | Common Context Mgmt SAP Header |
| Requester Node ID | 28 | 8 | WLCCP Node ID of the node that is "requesting" to initiate AAA message exchanges |
| AAA Type | 36 | 1 | 1 - for Finish |
| Authentication Type | 37 | 1 | Type must match that defined at AAA Start |
| Key Management Type | 38 | 1 | Type must match that defined at AAA Start |
| Status | 39 | 1 | 0 - success |
| Nonce length | 40 | 2 | Should always be set to 16 bytes |
| Nonce | 42 | 16 | 16 byte pseudorandom value |

The below table shows the format of the Path-Init Request/Reply/Confirm/ACK Message:

| Field Name | Offset | Size (bytes) | Description |
| --- | --- | --- | --- |
| WLCCP Header | 0 | 28 | Common Context Mgmt SAP Header |
| Relay Node | 28 | 8 | Node ID of any intermediate relay AP |
| Requester Node ID | 36 | 8 | WLCCP Node ID of the "requesting" node to establish a CTK to share with the IN Authenticator. |
| Reserved | 44 | 1 | Reserved for byte alignment |
| Status | 45 | 1 | Status field |
| TLV(s) | 46 | N | Includes either Secure Context or Init Session TLVs to establish CTKs. |

The Requester Node must include a Secure Context TLV within the Init Session TLV to ensure that a CTK is mutually derived between the Requester Node and its IA. In the Secure Context TLV, the Requester Node must provide it's nonce and CTK Sequence counter to allow the IA to derive a CTK and be assured the request is not a reply. In initial releases, the rekeys can be discarded if a replay has been detected; the sequence counter is sufficiently large that rekeys should never be exhausted. However, in the case where the value is about to wrap, the IN must re-authenticate. For further details on establishing CTKs refer to the sections on Secure Context TLVs.

The following 802.11 elements are used to support the operation of WLCCP.

define WLCCP_PATH_COST define WLCCP_HOP_COUNT define IPv4_SUBNET_ID define MULTICAST_802_ADDRESS_LIST define DOT1D_PATH_COST define DOT1D_ROOT_ID/*802.1D priority and 802 address of the root bridge */

A WLCCP inter-AP SSID is contained in a standard 802.11 SSID element.

The general operation of the architecture will now be disclosed.

A Request message is always forwarded from the Originator to the Responder. A Reply message is always forwarded from the Responder to the Originator. The Inbound and Outbound flags determine how a message is forwarded. If both the Inbound and Outbound flags are set OFF, then a message is forwarded via IP routing and/or transparent bridging to the target destination (i.e. to the "Responder" in a Request message).

The Inbound Flag or Outbound Flag is set ON in a message to indicate that the message is being forwarded inbound or outbound, respectively, on a branch of the Topology Tree. It is an error if a node receives an "inbound" message from a node that is not a descendant. It is also an error if a node receives an "outbound" message from a node that is not an ancestor.

The Hopwise-Routing Flag is set ON in an inbound or outbound message to force intermediate APs to process the message, where an "intermediate AP" is any AP on the topology tree branch between the Originator and the Responder of the message. A "hopwise-routed" inbound message is forwarded to the hop address of the parent node; an outbound message is forwarded to the "Next Hop" on the path to the target node. A hopwise-routed message is processed by each node on the inbound or outbound path. It is an error if a node receives a hopwise-routed message from a Hop Source that is not a neighbor.

The Hopwise-Routing Flag can be used in a registration message, for example, to update Layer 2 path information in each AP on the path to a MN. The Responder is always the SCM in a Proxy Registration message generated by an AP. FIG. 23 illustrates how hopwise routing is used. If Layer 2 path updating is enabled (as in the W2 implementation), then Registration messages are forwarded with Hopwise-Routing set ON. If Layer 2 path updating is not enabled (as in the W1 implementation) then Registration messages are forwarded with the Hopwise-Routing Flag set OFF.

If the Relay Flag is set ON, in a WLCCP message, then the general WLCCP header is immediately followed by a Relay Node ID field. If the Relay Node ID field is non-zero, then it contains the Node ID of any intermediate node that "relayed" the respective message. The Relay Node ID is initialized to all zeroes by both the Originator and Responder. As shown in FIG. 23, AP 2304 is the relay node for a hopwise-routed message sent from AP 2306 to the SCM 2302; therefore, AP 2304 must set the Relay Flag ON and enter its Node ID in the Relay Node ID field before forwarding the message inbound to the SCM.

If the Root CM Flag is set ON in an inbound request message, then the message is always forwarded inbound to the CM at the root of the entire Topology Tree—the root CM. In a campus network, for example, the message is forwarded to the CCM. For example, an AP can use the Root CM Flag to forward a MN's IP address to the CCM. The AP can simply send a request message to its parent SCM that contains the MN's IP address and has the Root CM Flag set ON.

In many cases the original Responder of a request message must forward the message on the path to the final destination. For example, an SCM must forward an inbound Registration Request to its parent LCM if the SCM is not the "nearest common ancestor" or if the Root CM Flag is set ON. Likewise, an LCM must forward an outbound Deregistration Request to the parent SCM of the Target Node. An original or intermediate "relay Responder" forwards such a message as follows: a) The Responder field is updated with the Node ID of the next-hop CM, b) The relay Responder enters its Node ID in the Relay Node ID field, c) The Originator and Message ID fields are unchanged. The relay Responder does not update the Responder field in any corresponding Reply message; therefore, the Responder field in the Reply message will contain the Node ID of the "final Responder" when it is received by the Originator.

The Originator of a Request message sets the Response-Req Flag ON to solicit a corresponding Reply message. The Originator is always responsible for error recovery if an expected Reply message is not received. An Originator must start a "retry timer" for each outstanding Request message that requires a Reply. A Request message is retransmitted, with the Retry Flag set ON and the original Message ID, if an expected Reply message is not received before the respective timer expires. A retry timer is not needed in an intermediate "relay Responder", which forwards a Request message on the path to the final Responder.

An Originator or relay node can include a Reply_State TLV in a Request message, to reduce the amount of state information that must be kept in memory. A Reply_State TLV contains information that is necessary to process (e.g. forward) a Reply message.

AP message forwarding logic is generally independent of the network infrastructure. The parent SCM is the Responder in messages generated by an AP, with one exception. [If Layer 2 path updating is enabled, then the Responder in an initial Registration Request generated by a non-root AP is the parent AP.] In a local or campus infrastructure, the SCM forwards AP messages to the root CM as required. Likewise, SCM message forwarding logic is the same in a standalone local infrastructure or a campus infrastructure. The parent LCM is always the Responder in messages generated by the SCM. In a campus network, the LCM forwards SCM messages to the CCM, as required.

A WLCCP node only accepts "valid" WLCCP messages transmitted on its native VLAN. All other messages are discarded. A message is invalid if it fails a Message Integrity Check or if the message type is unknown.

The SCM Election and Advertisement Protocol is used to elect a single active SCM for each subnet and to advertise network availability and network parameters. A registered, active SCM sends periodic SCM Advertisement Reply messages, with the "SCM Active" flag set ON, to a WLCCP "all nodes" 802 group address. An AP selects its "primary port" and registers with the active SCM whenever the SCM instance changes.

The general operational steps for SCM election and advertisement are as follows:

1) One or more "SCM candidates" are configured with a non-zero SCM priority value, on each subnet.
2) As an option, each SCM candidate can authenticate with the root CM to establish a shared WLCCP multicast key. The multicast key is used to optionally authenticate multicast SCM Advertisement messages. [If SCM Advertisement messages are not authenticated, then authentication is deferred until an active SCM is elected.]
3) Each SCM candidate sends a Context Mgmt Request message to the CCM. The CCM assigns the SCM candidate to a parent LCM or directs it to operate in stand-alone mode in the Context Reply message.
4) In campus infrastructure mode, each SCM candidate initiates Path Authentication with its assigned LCM and the CCM.
5) In each subnet, SCM candidates participate in the SCM election protocol to determine the active SCM for the subnet.
6) In campus infrastructure mode, the elected "active SCM" registers with its assigned LCM and the CCM.
7) Steps 3-5 are repeated if an active SCM becomes unattached.
8) In infrastructure mode, the active SCM begins generating "active" SCM Advertisements (i.e. advertisements with the Active flag set ON) only after it has successfully registered with the root CM.

9) Root APs must register with the active SCM and propagate active SCM Advertisements.
10) Other APs must register with the active SCM and propagate active SCM Advertisements. A registered parent AP must send a unicast unscheduled SCM advertisement to a child AP, immediately after the child AP is authenticated.

The SCM election protocol is described in detail in the section entitled "Active SCM Election".

SCM Advertisement messages contain an IPv4_SUBNET_ID TLV, which uniquely identifies the local subnet, and "Path Cost" and "Hop Count" fields. The Path Cost is used to convey the path cost to the primary LAN for the respective subnet. The Hop Count field is used for backward-compatibility with existing APs and radio firmware and contains the number of wireless hops to the primary LAN. An active SCM sends SCM Advertisement Reply messages with the Path Cost and Hop Count fields set to '0'.

SCM advertisement messages must contain a Root CM IP Address TLV, which is used to advertise the IP address of the root CM in the SWAN Topology Tree. The SCM is the Root CM if the SCM is operating in stand-alone mode. If the SCM is operating in infrastructure mode, then the IP address of the LCM or CCM that is at the root of the entire Topology Tree. The Root CM is the default 802.1X authenticator for infrastructure nodes.

SCM advertisment messages contain a Root CM field, which contains the Node ID of the Root CM. An AP can determine if the Root CM changes by monitoring the Root CM field in SCM advertisements.

An AP or SCM candidate can send a multicast SCM-Advertisement Request to solicit an "unscheduled" SCM-Advertisement Reply message. The active SCM must send a unicast unscheduled Reply if it receives a Request on its Ethernet port. An "Attached" AP must send a unicast unscheduled Reply if it receives a Request on a secondary port from a child AP. The unicast MAC destination address in the unscheduled Reply is taken from the Hop Address in the corresponding Request and is the same as the MAC source address in the Request.

An AP must NOT forward an SCM-Advertisement Request. The SCM and each Attached AP must maintain the state information that is necessary to generate an unscheduled SCM-Advertisement Reply (i.e. the information used to generate the last scheduled advertisement message).

An SCM Candidate or AP can set the Responder Node ID to '0' in an SCM-Advertisement Request (i.e. if it does not know the Node ID of the active SCM or parent AP). The actual responder (i.e. the active SCM or a parent AP) must enter its Node ID in the Responder field in the Reply message.

A non-root AP should set the Responder Node ID, in an SCM-Advertisement Request, to the Node ID of its parent AP, if it is known.

"Initial Authentication" is used to fully authenticate a node when it first enters the network. A MN initially authenticates with the MN 802.1X Authenticator; an infrastructure node (AP or CM) initially authenticates with the IN 802.1X Authenticator in the root CM. Initial Authentication messages are encapsulated in 802.1X EAPOL messages on an 802.11 link between a child and parent 802.11 station. Initial Authentication messages are encapsulated in WLCCP AAA messages on all other links.

An AP or child CM uses "Path Authentication" messages to mutually authenticate and establish a CTK with each of its ancestors. An AP or child CM initiates Path Authentication after it initially authenticates and whenever it path changes.

"Fast Reauthentication" is used to quickly "reauthenticate an 802.11 station (MN or child AP) when it roams to a new parent AP. A parent AP uses "Preregistration" messages to fetch the necessary security context for Fast Reauthentication when an 802.11 station reassociates. Preregistration messages do NOT update the forwarding path.

Initial Authentication, Preregistration, Fast Re-authentication, and Path Authentication is discussed in detail in the section entitled "WLCCP Security Support".

The WLCCP Registration and Handoff Protocol is used to establish, maintain, and delete branches and path instances in the SWAN Topology Tree. Registration (and deregistration) messages are also use to transfer context information when a node roams. Each authenticated child CM, AP, and MN in a SWAN network is registered with the root of the SWAN Topology Tree—the root CM. In general, each CM, AP, and MN in a sub tree is reliably registered with the CM at the root of the sub tree. Example registration and handoff message sequences are shown in following sections.

The Registration and Handoff Protocol is implemented with three message types—Registration, Deregistration, and Detach.

Each MN, AP, and child CM must successfully authenticate (or reauthenticate) before it is registered with the SWAN infrastructure.

An inbound "initial" Registration Request is generated to initially register a node with the root CM after it has successfully (re)authenticated. A Registration Request is acknowledged by a Registration Reply that contains a matching Message ID. An outbound initial Registration Reply establishes a Path Instance, which is (optionally) identified by a Path ID. An "update Registration Request" is used to refresh the registration state of an Attached station. An update Registration Request is also used to update the context information cached in ancestor nodes.

"Proxy" Registration Request/Reply messages are used to register WLCCP-unaware MNs. A "registered" parent AP generates a proxy "initial" Registration Request for an associated MN after it successfully authenticates.

A Registration message contains an Initial Flag, which is set ON in an "initial" Registration message and OFF in an "update" Registration message. A Registration message has a Proxy Flag, which is set on in a "proxy" Registration message generated "in proxy" by a parent AP for a non-WLCCP MN. An "initial, proxy" Registration message, for example, has both the Initial Flag and the Proxy Flag set ON.

In general, a Registration Request for a node, which has roamed, is forwarded inbound until it reaches the "nearest common ancestor CM". The "nearest common ancestor CM" is the CM that is at the root of the smallest sub tree that includes the CM and both the old and new parent nodes. For example, the SCM is the nearest common ancestor when a MN roams within a single subnet. An LCM is the nearest common ancestor when a MN roams between subnets in the same Local Control Domain. The nearest common ancestor CM is referred to as the "common CM".

The common CM returns a Registration Reply outbound to acknowledge the Registration Request and to establish a new path instance for the "Requester Node". The common CM (optionally) "deregisters" any old path instance, when it establishes the new path instance for the node.

A non-parent CM or AP must forward an "initial" or "proxy" Registration Reply to the "parent" of the Requester Node, identified by the Requester Node ID field. Therefore, the parent node is the Originator of any "initial" or "proxy" Registration Request that it forwards inbound for a child Requestor Node.

The Root CM Flag is set ON in a Registration Request to force a "full path update". A Registration Request is always forwarded to the root CM if the Root CM Flag is set ON.

The Path ID field in an "initial" Registration Request is always set to '0'. The parent CM (optionally) establishes the path ID, for a path instance, by entering a path ID value into the Path ID field of an initial Registration Reply. The Path ID field in an "update" Registration Request is set to the path ID for the path instance.

A Registration Request is always transmitted with the Response-Req Flag set ON, to solicit a Reply. A Registration Request message is retransmitted if an expected matching Reply is not received, until a REGISTRATION_RETRY_MAX limit is exceeded. The same Message ID is used for the original Registration Request and all retransmissions.

In general, received Registration Requests are ordered by time-of-arrival. The Registration Delay field is, optionally, used to order received Proxy Registration Requests that are generated by a parent AP for a child node. The Delay field contains the elapsed time, in to hundredths of seconds, since the respective child node last transmitted an uplink frame. A Registration Record in a CM must contain a timestamp field that contains the "time-of-arrival" of the last Registration Request. The time-of-arrival is calculated by subtracting the Delay value from the current time.

A parent AP or SCM forwards a Registration Reply to a child AP by sending it to the port MAC address contained in the Hop Source field in the original Registration Request. A parent CCM or LCM forwards a message to a child CM by sending it to the hop IP address of the child CM.

If WLCCP is used to establish forwarding paths, then an "old" path instance must be deleted when a node roams. Inbound Deregistration Reply and Detach Request messages are optionally used to delete old path instances. A Deregistration Request is generated by a "common CM" to delete any old path instance when a new path instance is established. Also, an "administrative" Deregistration Request can be generated by the Root CM to administratively disconnect a node.

A parent AP generates a Detach Request, when a child node is disassociated. If the child node is an AP, then the sub tree rooted at the AP is deleted. Deregistration and Detach logic is described in more detail below.

Each AP in a subnet, and any MNs associated with the AP, are registered with the active SCM for the subnet. An AP discovers the "active SCM" via the SCM advertisement protocol, as described above. Each MN is registered with the SCM for its parent AP, even if the MN belongs to a different subnet.

Intra-subnet registration logic is implementation-specific. In the simple W1 implementation, WLCCP registration is used to establish and distribute context information between the SCM and child APs. It is NOT used to establish the Layer 2 forwarding path. The L2-Path-Update Flag is set OFF and the Hopwise-Routing Flag is set OFF in Registration messages in the W1 implementation. Detach and Deregistration messages are not used in the W1 implementation.

If Layer 2 path updating is enabled, then WLCCP registration reliably establishes the wireless forwarding path between the primary LAN and wireless stations, so that it is never necessary to flood unicast frames to 802.11 stations. Registration, Deregistration, and Detach messages must be forwarded with Hopwise Routing so that each AP on the path instance can process the message. A Registration Reply, for example, is forwarded outbound, with hopwise routing, by sending it to the MAC or IP destination address of the "next hop" on the path to the target node. A Deregistration Reply or Detach Request is forwarded inbound, with hopwise routing, by sending it to the MAC or IP destination address of the parent node identified in the "Parent Node Record".

Non-WLCCP bridges and switches transparently forward registration messages.

Figure 24:
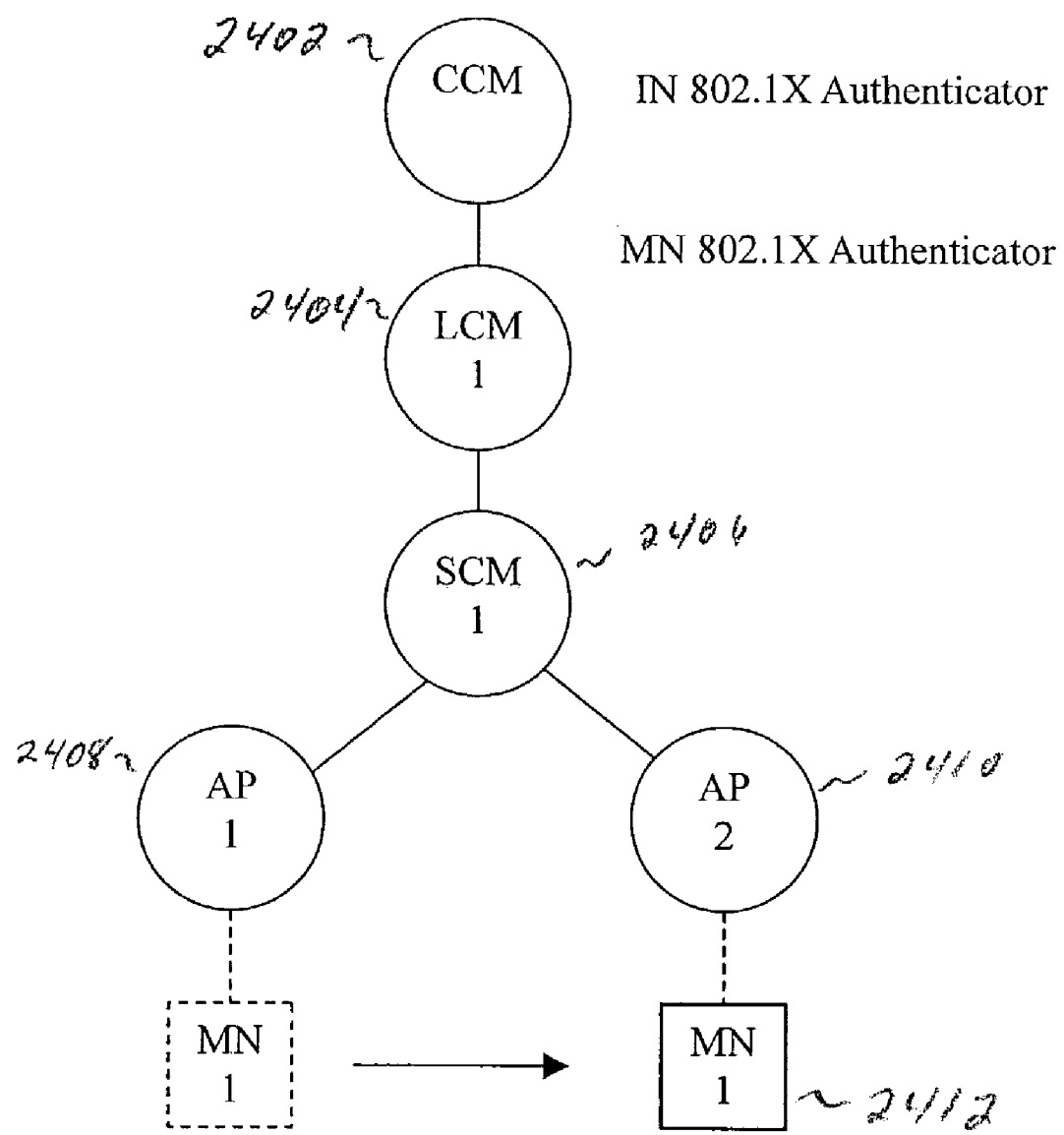
FIG. 24 is a block diagram illustrating a handoff from a first access point to a second access point for a mobile node on a campus topology.

Referring to FIG. 24 there is shown a block diagram illustrating a mobile node 2412 roaming from a first access point 2408 to a second access point 2410 on a campus network 2400. The network 2400 comprises a CCM 2402 which is an IN 802.1X Authenticator, an LCM 2404 which is a MN 802.1X authenticator, an SCM 2406, a first access point 2408, second access point 2410, and the mobile node 2412.

Figure 25:
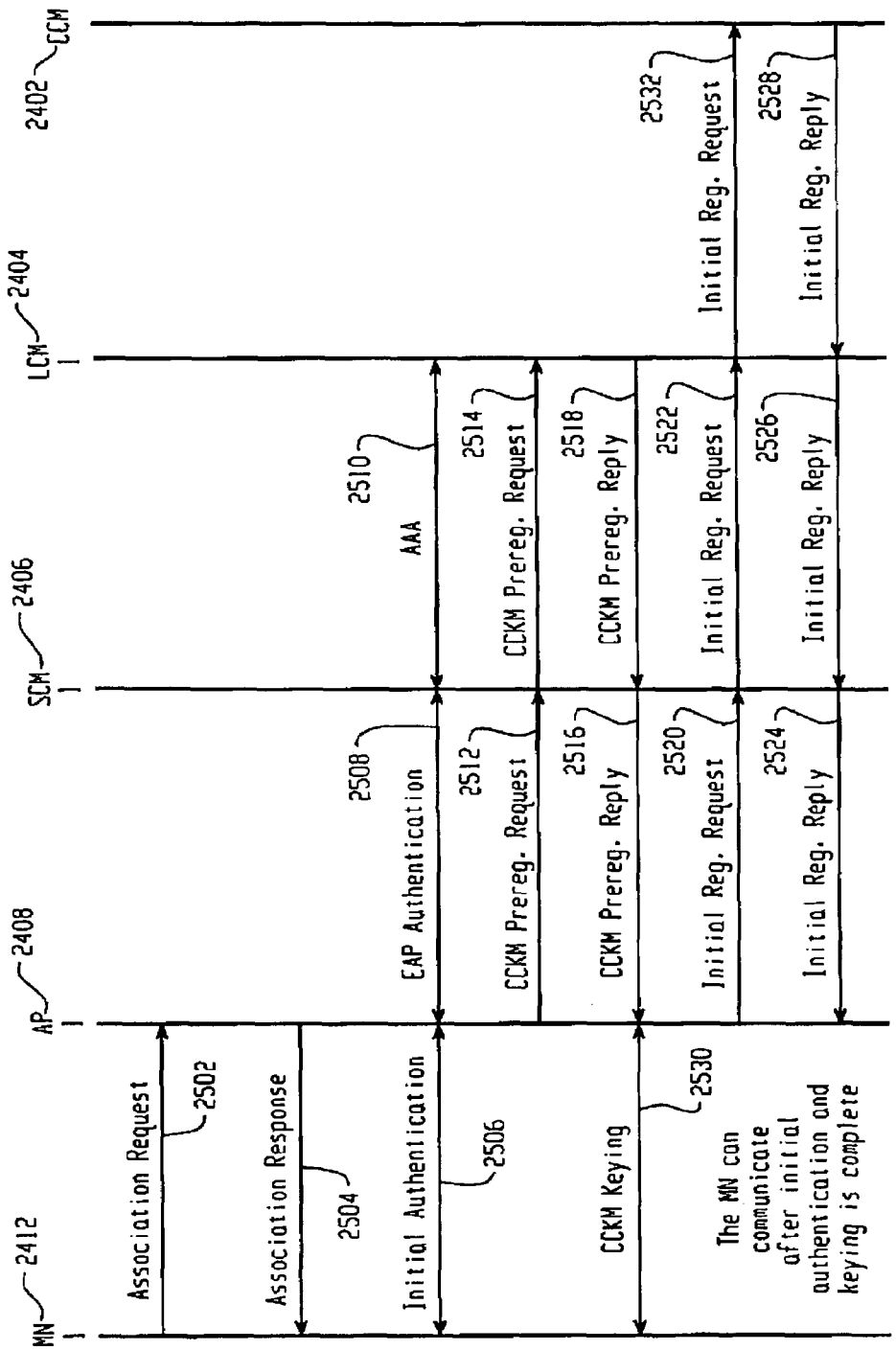
FIG. 25 is an example of the message sequences for initial mobile node association.
Figure 26:
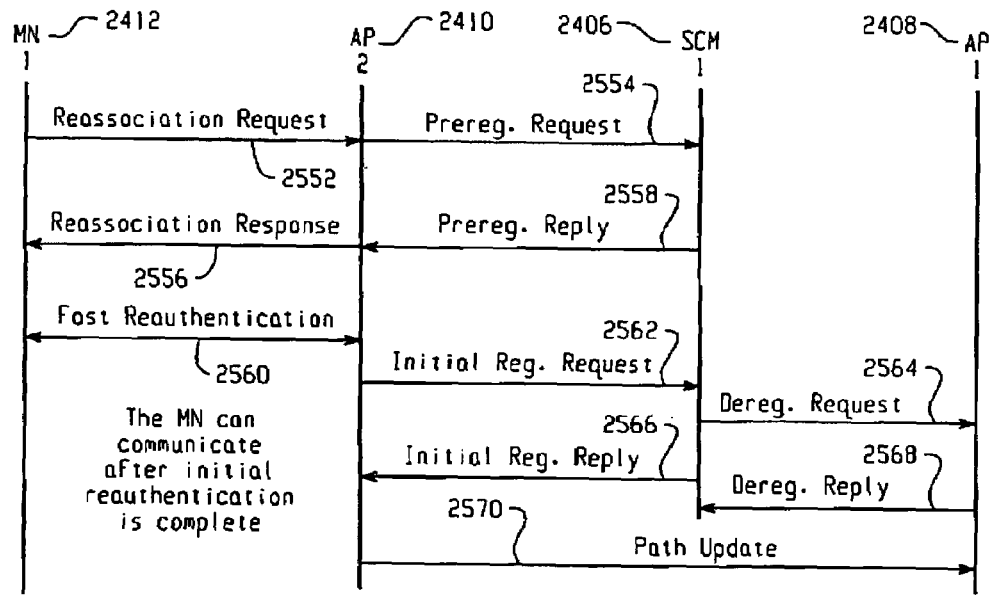
FIG. 26 is an example of the message sequences for a mobile node roaming from a first access point to a second access point.

The message sequences for registering and deregistering mobile node 2412 are shown in FIGS. 25 and 26. FIG. 25 shows the message sequences for the mobile node 2412 as it first associates and authenticates with access point 2408, and FIG. 26 shows the message sequences as the mobile node 2412 roams to the second access point 2410. The arrows indicate the direction of the message (source→destination or bi-directional⇋) and the vertical bars indicate the network component.

Referring first to FIG. 25, the mobile node 2412 associates with the first access point 2408. The steps comprise sending the association request 2502 from the mobile node 2412 to the first access point 2408 and the first access point 2408 sending an association response 2504. The mobile node 2412 then authenticates with LCM 2404 (the MN 802.1X authenticator) and the first access point 2408. The mobile node 2412 performs an initial authentication 2506 with the first access point 2408, an EAP authentication 2508 is then performed between the first access point 2408 and the SCM 2406, and a AAA request 2510 is performed between SCM 2406 and LCM 2404.

For CCKM mobile nodes, preregistration is required. The preregistration starts by the firs access point 2408 sending an initial proxy registration request 2512 to SCM 2406. SCM 2406 then forwards the initial registration request 2514 to LCM 2404 The CCKM preregistration reply 2418 is sent from LCM 2404 to SCM 2406, then as shown by 2516 from SCM 2406 to the first access point 2408, and the first access point 2408 sends the CCKM keying 2530 to the mobile node 2412. The mobile node 2412 can communicate after initial authentication and keying is complete.

The first access point then sends an initial proxy registration request 2520 to the SCM 2406, the SCM 2406 then forwards the initial proxy registration request request 2522 to the LCM 2404 with the LCM 2404 as the responder, then LCM 2404 forwards the initial registration request 2532 to the CCM 2402 with the CCM as the responder. The CCM 2402 then sends an initial registration reply 2528 to LCM 2404. LCM 2404 then forwards the initial registration reply as shown by 2526 to the SCM 2406. The SCM 2406 then forwards the initial registration reply to the first access point 2408 as shown by 2524.

Referring now to FIG. 26, there is illustrated the messaging sequence when the mobile node roams from the first access point 2408 to the second access point 2410. Mobile node 2412 reassociates with the second access point 2410 by sending a reassociation request 2552 to access point 2410. The second access point 2410 then sends a preregistration request 2554 to SCM 2406 to obtain the dynamic credentials for the mobile node 2410. SCM 2406 then sends a preregistration reply 2558 to the second access point 2410. The second access point 2412 then sends a reassociation response 2556 to the mobile node 2412. The mobile node 2412 then re-authenticates with the second access point 2410 using its dynamic credentials by fast reauthentication 2560. The mobile node can communicate after reauthentication is complete. The second access point 2410 then sends an initial proxy registration request 2562 to SCM 2406 for the mobile node 2412. SCM 2406 then sends a deregistration request 2564 to the first access point 2408. SCM 2406 then sends a initial registration reply 2566 to the second access point 2410. The first access point 2408 sends a deregistration reply 2568 to SCM 2406. The second access point 2410 sends a path update request 2570 to the first access point 2408.

Figure 27:
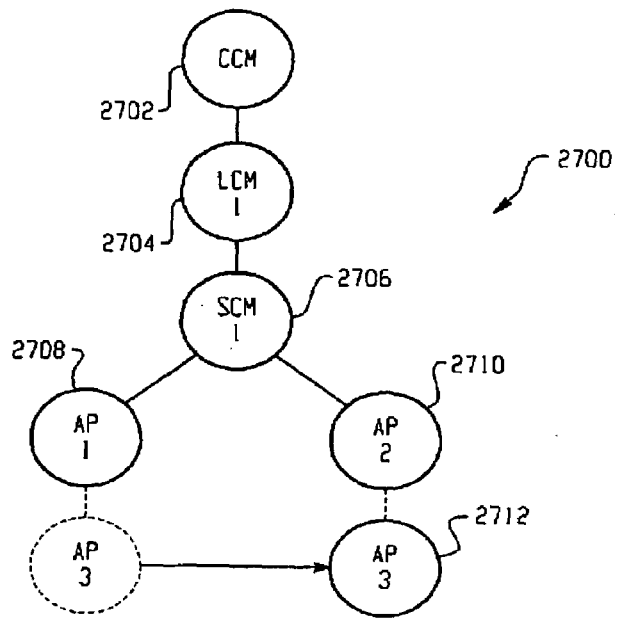
FIG. 27 is a block diagram illustrating a handoff of a repeater access point from a first access point to a second access point.

Referring to FIG. 27 there is shown a block diagram illustrating a repeater access point 2712 roaming from a first access point 2708 to a second access point 2710 on a campus network 2700. The network 2700 comprises a CCM 2702 which is an IN 802.1X Authenticator, an LCM 2704, an SCM 2706, a first access point 2708, second access point 2710, and the repeater access point 2712.

Figure 28A:
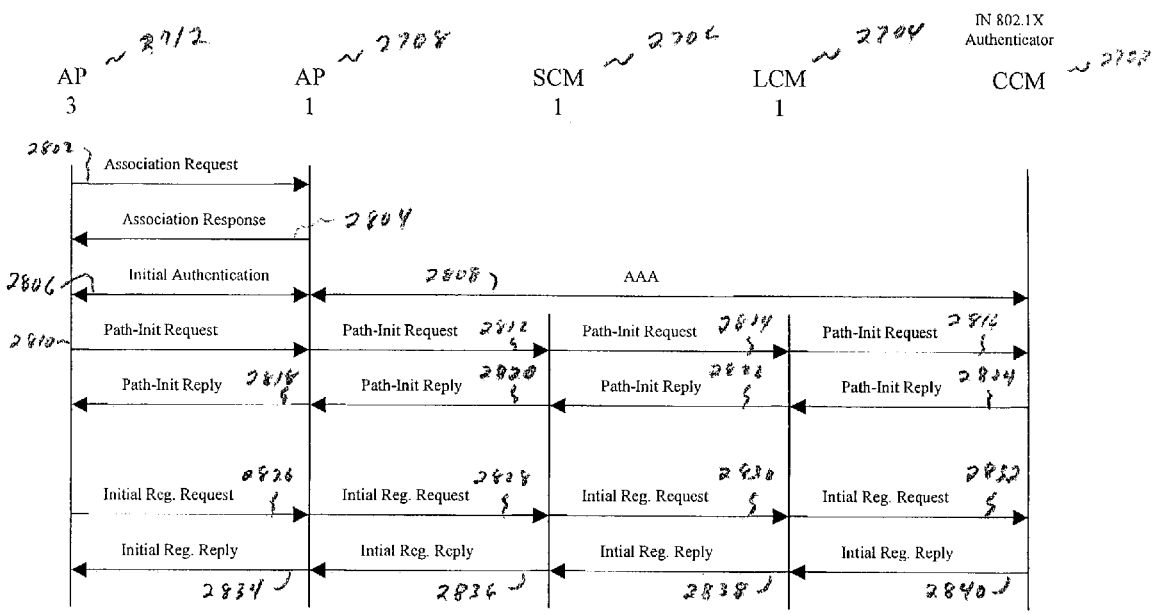
FIG. 28a is an example of the message sequences for initial repeater access point association.
Figure 28B:
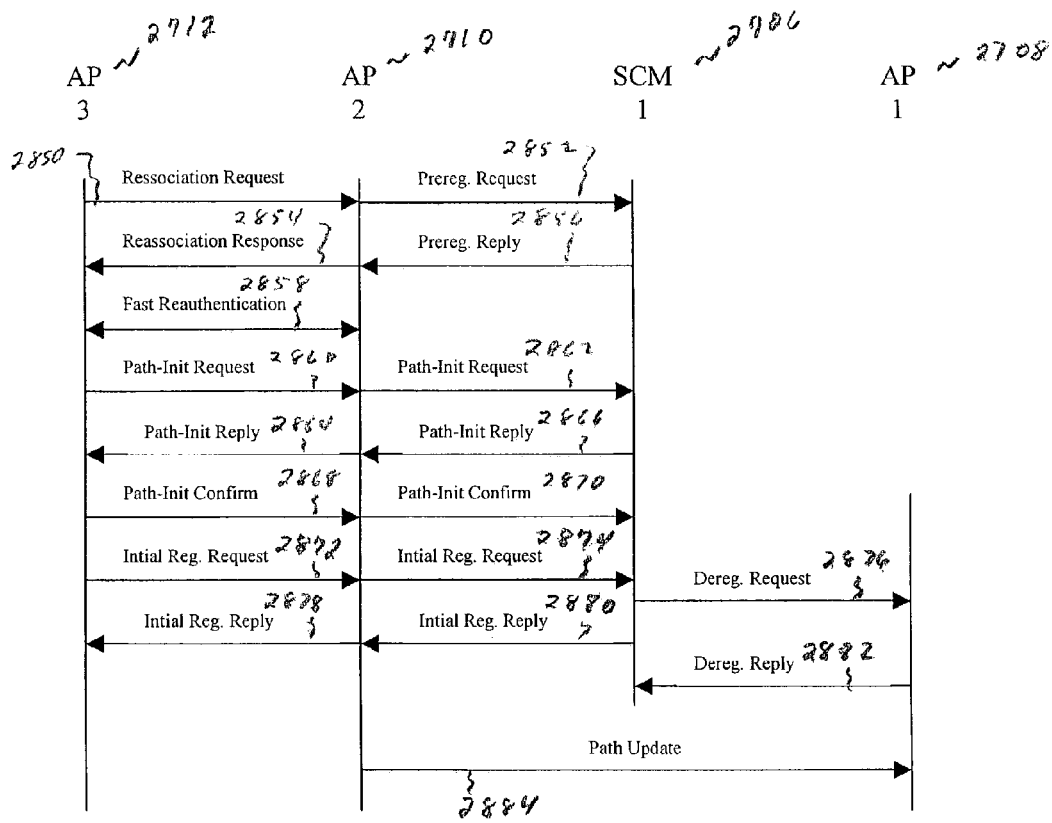
FIG. 28b is an example of the message sequences for a repeater access point roaming from a first access point to a second access point.

The message sequences for registering and deregistering repeater access point 2712 are shown in FIGS. 28a and 28b. FIG. 28a shows the message sequences for the repeater access point 2712 as it first associates and authenticates with access point 2708, and FIG. 28b shows the message sequences as the repeater access point 2712 roams to the second access point 2710. The arrows indicate the direction of the message (source→destination) and the vertical bars indicate the network component.

Referring to FIG. 28a, the repeater AP 2712 (AP 2712) associates with the first access point 2708 (AP 2708). This process comprises AP 2712 sending an association request 2802 to AP 2708 and AP 2708 responding with an association response 2804. AP 2712 then authenticates with CCM 2702, the IN 802.1X Authenticator, and AP 2708 via initial authentication 2806 and AAA 2808.

AP 2712 then sends a Path-Init request to AP 2708 with AP 2708 as the responder. AP 2708 then sends the Path-Init Request to SCM 2706 as shown by 2812 with SCM 2706 as the responder. SCM 2706 forwards the Path-Init Request to LCM 2704 as shown by 2814 with LCM 2704 as the ersponder. LCM then forwards the Path-Init request to CCM 2702 as shown by 2816 with CCM as the responder. As shown by 2834, CCM 2702 then sends a Path-Init Reply to the LCM 2704 with AP 2708 as the originator. The LCM 2704 sends th Path-Init reply to SCM 2706 with AP 2708 as the originator as shown by 2822. SCM 2706 sends the Path-Init reply to AP 2708 as shown by 2820. AP 2708 sends the Path-Init reply to AP 2712 as shown by 2818.

AP 2712 then sends an Initial Registration Request 2826 to AP 2708 with AP 2712 as the Responder. AP 2708 sends the Initial Registration Request to SCM 2706 for AP 2712 with SCM 2706 as the Responder at 2828. At 2830, SCM 2706 forwards the Initial Registration Request to LCM 2704 with LCM 2704 as the Responder. Then at 2832, LCM 2704 forwards the Initial Registration request to CCM 2702 with CCM 2702 as the lo Responder. At 2840 CCM 2702 sends an Initial Registration Request Reply to LCM 2704. At 2838 LCM 2704 then forwards the Initial Registration Request Reply to SCM 2706. Then at 2836 SCM 2706 forwards the Initial Registration Request Reply to AP 2708, which then at 2834 forwards the Initial Registration Request Reply to AP 2712.

Referring now to FIG. 28b there is shown the sequence of messages that occurs when the repeater AP (AP 2712) roams from the first access point 2708 (AP 2708) to a second access point 2710 (AP 2710). The process begins at 2850 when AP 2712 sends a reassocation request to AP 2760 and indicates a "fast reauthentication" capability. At 2852 AP 2710 then sends a Preregistration Request to SCM 2706 to obtain the dynamic credentials for AP 2712. SCM 2706 sends a Preregistration reply to AP 2710 at 2856. AP 2720 then sends a reassociation response to AP 2712 at 2854. At 2858 AP 2712 reauthenticates with AP 2710 using its dynamic credentials.

AP 2712 then sends a Path-Init Request to AP 2710 at 2860 with AP 2710 as the Responder. At 2862 AP 2710 sends a Path-Init request to SCM 2706 for AP 2712 with SCM 2706 as the Responder. SCM 2706 sends a Path-Init Reply to AP 2710 at 2866 with AP 2710 as the Originator. At 2864 AP 2710 sends a Path-Init Reply to AP 2712.

At 2872 AP 2712 sends an Initial Registration Request to AP 2710 with AP 2710 as the Responder. At 2874 AP 2710 sends an Initial Registration Request to SCM 2706 for AP 2712 with SCM 2706 as the Responder. At 2876 SCM 2706 sends a Deregistration Request to AP 2708. At 2880 SCM 2706 sends an Initial Registration Reply to AP 2710. At 2878 AP 2710 sends an Initial Registration Reply to AP 2712. At 2882 AP 2708 sends a Deregistration reply to SCM 2706. AP 2710 sends a Path-Update Request to AP 2708.

A single active SCM is elected for each subnet, as described infra. By default, APs on a subnet operate in "distributed mode" if no SCM candidates are configured for the subnet The active SCM either operates in 1) Stand-alone Mode or 2) SWAN Infrastructure Mode. An SCM operates in Stand-alone mode whenever it cannot communicate with a parent LCM. In Infrastructure Mode, an SCM is registered with a parent LCM and forwards WLCCP messages to its parent CM. SCM operation in infrastructure mode is specified in the section entitled "W2—SCM Operation".

The LCM co-located with the CCM is the default backup LCM for all SCMs.

If an active SCM transitions from Stand-alone mode to Infrastructure mode then any existing sub tree rooted at the SCM must be deleted, to force all nodes in the sub tree to reregister. [An SCM resets its Instance Age to '0' to delete its sub tree. Sub Tree Deletion is described in a separate section.]

The sub tree rooted at an SCM does NOT need to be rebuilt when an SCM transitions from Infrastructure Mode to Stand-alone mode. The SCM must function as the IEEE 802.1X authenticator for its subnet, in stand-alone mode.

The general SCM Data Structures and State Variables will now be described.

SCM_Advertisement_Timer—An SCM-Advertisement Reply messages is generated by an SCM Candidate or active SCM when the timer expires. The period of the timer is DEF_SCM_ADVERTISE_PERIOD seconds (e.g. 5 seconds).

SCM_Instance_Age—The SCM_Instance_Age is initialized to '0' and is reset to '0' whenever an SCM relinquishes the active SCM status. The active SCM increments the SCM_Instance_Age value each time the SCM_Advertisement_Timer expires.

Authenticated Node Table—The SCM is the 802.1X IN and MN Authenticator IN if the SCM is operating in standalone mode. In standalone mode, the SCM must maintain an Authenticated Node Table, which is a list of Authenticated Node Entries. Each Authenticated Node Entry contains authentication state information for APs and MNs in the sub tree rooted at the SCM. The authentication state in a node entry is initialized to 'unauthenticated'. The state information contained in the table is defined in the section entitled "WLCCP Security Support".

Registration Tables—The active SCM must maintain a Registration Table, which contains state information for each AP and MN in its sub tree. An AP Registration Table contains an AP Registration Record for each AP in its subnet. A MN Registration Table contains a MN Registration Record for each MN that is associated with an AP in the subnet. A Registration Record is created or updated when a Registration Request is received for an AP or MN. A Registration Record contains a cross reference to an Authenticated Node Entry. A MN Registration Record contains a cross reference to the AP Registration Record for the MN's parent AP. A Registration Record is aged and discarded if a successful Registration Request is not received for the respective node with the registration Lifetime.

SCM Candidate Path Authentication. Each SCM candidate in a campus control domain is automatically assigned to a parent LCM by the CCM using Context Request/Reply messages. An SCM candidate must send a Path-Init Request to its assigned parent LCM, after it has successfully authenticated with the root CM, to initiate Path Authentication. The LCM always forwards the Path-Init Request to the CCM, in campus infrastructure mode. The CCM functions as a KDC to mutually authenticate the SCM Candidate and the LCM and establish a shared CTK. An (optional) WLCCP "multicast CTK" is forwarded to the SCM during the Path Authentication process. The SCM candidate (optionally) uses the WLCCP multicast CTK to sign SCM Advertisement Reply messages. The CTK shared by an SCM Candidate and the LCM is not used, if the SCM Candidate is not elected as the active SCM.

Active SCM Election.

An SCM election protocol is used to elect a single active SCM for each subnet, from a set of one or more SCM Candidates. By definition, the Primary LAN is the wired Ethernet LAN attached to the SCM; therefore, SCM election automatically establishes the Primary LAN for each Subnet. The election protocol is facilitated by SCM Advertisement messages.

Each SCM candidate is configured with a non-zero SCM priority value from 1 to 255. A WLCCP node is not an SCM candidate if it is configured with an SCM priority value of '0'. The high-order bit of the SCM priority value is used as a "Preferred SCM" flag and is set ON in a "preferred" SCM. The Preferred SCM flag is set OFF in a "backup" SCM. Therefore, priority values from 128 to 255 are used for "preferred" SCM candidates. Normally, there should only be one preferred SCM candidate. Priority values from 1 to 127 are used for "backup" SCM candidates. The SCM "priority value" is concatenated with the SCM Node ID for form an SCM "Priority ID". The effective relative SCM priority is discussed in detail below.

The state transition table below defines the operation of the SCM election protocol.

| State | Event | Action | Next State |
|---|---|---|---|
| Initial | SCM priority is non- zero | Start SCM listen timer with an average expiration time of DEF_SCM_LISTEN_TIME seconds; start periodic SCM advertisement timer; send SCM Advertisement Request | SCM_CAND |
| SCM_CAND | Receive higher-priority SCM Advertisement | Restart SCM listen timer with an expiration time of MAX_SCM_AGE seconds | SCM_BACKUP |
| SCM_CAND | Receive SCM Advertisement request or lower-priority SCM Advertisement reply | Send an SCM Advertisement with the active flag set OFF | SCM_CAND |
| SCM_CAND | SCM advertisement timer expires | Send an SCM Advertisement with the active flag set OFF | SCM_CAND |
| SCM_CAND | SCM listen timer expires | Reset SCM Instance Age to 0; send SCM Advertisement with the active flag set ON; restart SCM advertisement timer | SCM_ACTIVE |
| SCM_BACKUP | Receive higher-priority SCM Advertisement | Restart the SCM listen timer with an expiration time of MAX_SCM_AGE seconds | SCM_BACKUP |
| SCM_BACKUP | SCM listen timer expires | Restart the SCM listen time with an expiration of DEF_SCM_LISTEN_TIME seconds; restart periodic SCM advertisement timer; send SCM Advertisement with the active flag set OFF | SCM_CAND |
| SCM_ACTIVE | Receive higher-priority SCM Advertisement. (The effective priority of the received Adver. is "higher" if a) the "priority value" is higher, or b) the active flag is ON and the Priority ID is higher.) | Start SCM listen timer with an expiration time of MAX_SCM_AGE seconds | SCM_BACKUP |

-continued

| State | Event | Action | Next State |
|---|---|---|---|
| SCM_ACTIVE | Receive an SCM Advertisement request or a lower-priority SCM Advertisement Reply | Send unicast unscheduled SCM Advertisement with the active flag set ON | SCM_ACTIVE |
| SCM_ACTIVE | SCM advertisement timer expires | Send scheduled SCM Advertisement with the active flag set ON; restart the SCM advertisement timer | SCM_ACTIVE |

The SCM election/advertisement protocol operates on a single "native" VLAN that is shared by SCM candidates and APs. SCM Advertisement messages that are received on any other VLAN are ignored.

An "SCM Candidate" is configured with a non-zero SCM "priority value". Each SCM candidate has an "SCM Priority ID" which consists of the concatenated SCM priority value and the SCM Node Address. The rules for the effective relative SCM priority are as follows:

1) An SCM candidate or active SCM has a relatively "higher priority" if it is configured with a higher priority value.
2) A first SCM candidate has a relatively higher priority than a second SCM Candidate if it has an SCM "Priority ID" that is lexicographically higher.
3) A first active SCM has a relatively higher priority than a second active SCM if it has an SCM "Priority ID" that is lexicographically higher.
4) An SCM candidate has a relatively higher priority than an active SCM if it is configured with a higher priority value. If an SCM Candidate is configured with the same or a lower priority value than an active SCM, then it has a relatively lower priority than the active SCM.

The effective priority is structured so that an SCM Candidate will not replace an active SCM with the same priority value, even if it has a "higher" Node ID. However, the user can explicitly select the active SCM by configuring a higher priority value.

An SCM candidate initially enters an SCM_CANDIDATE state to listen for SCM advertisements on its Ethernet port. The SCM candidate remains in the SCM_CANDIDATE state for a "listen period" which exceeds 3 SCM advertisement intervals or until it discovers a higher-priority SCM. An SCM candidate enters the SCM_ACTIVE state if it does NOT receive a higher-priority SCM advertisement message within the listen period. In infrastructure mode, the "elected" active SCM must immediately register with its parent LCM and the CCM. The active SCM sets the "SCM Active" flag ON in its SCM Advertisement Reply messages after it has successfully registered or enters "stand-alone mode".

An SCM candidate or active SCM enters an SCM_BACKUP state if it discovers a higher priority SCM.

An AP or SCM candidate must send an SCM Advertisement Request message, to the WLCCP "all INs" group address, on each port when the port is first enabled. A node in the SCM_ACTIVE or SCM_CANDIDATE state responds by sending an SCM Advertisement Reply. A node in the SCM_CANDIDATE state sets the "SCM Active" flag OFF in the reply and sets the Path Cost and Hop Count fields to "infinite" values.

As an option, multiple active SCMs can be elected for a single subnet. An SCM Advertisement Request message contains an SCM Group Election field for that purpose. The field contains the number of SCM election groups and the group ID assigned to the respective SCM candidate (i.e. identified by the SCM Node ID). The group ID must be less than the number of election groups. An SCM candidate only considers SCM Advertisements from other candidates in the same group, so that an active SCM is elected for each group. Registrations are distributed across multiple active SCMs. The algorithm for determining the active SCM for a node is described in the section entitled "WLCCP Registration Protocol".

The elected active SCM transmits SCM Advertisement Reply messages, with the Active Flag set ON, once per Advertisement Period. The fields in SCM_Advertisement Reply messages sent by the active SCM are set as follows:
  WLCCP header fields:
  Type—'0x41' (SCM-Advertisement Reply)
  Originator—'0'.
  Responder—SCM Node ID.
  Outbound Flag—'1'.
  TLV FLag—'1' (the Request must include an IPV4_SUBNET TLV and an ROOT_$_{CM}$_INFO TLV).
  SCM_Advertisement Reply fields:
  Hop_Address—The SCM Ethernet port address.
  SCM Flags:
  Active Flag—'1'
  SCM Priority—User-configured SCM Priority.
  SCM Node ID—SCM Node Type and Ethernet port address
  Instance Age—SCM_Instance_Age value.
  Path Cost—'0'
  Hop Count—'0'
  Advertisement Period—DEF_SCM_ADVERTISE_PERIOD seconds.
  WTLV_IPV4_SUBNET_ID TLV—IPv4 address and prefix length of the SCM
  WTLV_ROOT_CM_INFO TLV—Contains the IPv4 address of the root CM (which is also the 802.1X IN Authenticator).
  SCM Registration.

An SCM must register with the root CM immediately after it is elected as the "active SCM" for its subnet. [Note that it has already completed Path Authentication.] The elected active SCM sends an "initial" Registration Request its assigned parent LCM. The LCM always forwards the initial Registration Request inbound to the CCM, in campus infrastructure mode. The CCM returns an initial Registration Reply message to the parent LCM, which forwards the Registration Reply message to the SCM. The Reply message contains the Node ID and IP address of the "root CM" in a Root CM TLV.

The SCM must generate periodic "update" Registration Request messages to refresh its registration bindings in the parent LCM and CCM. The update Registration Request messages are always forwarded to the root CM. The root CM returns an update Registration Reply message, to acknowledge the Registration Request. The parent LCM resets the age of the DPR, for the SCM, to '0' when it receives a "matching" Registration Request with a "good" status. A parent LCM must delete the sub tree rooted at the SCM if it does not receive an update Registration Reply message for the SCM with the registration Lifetime.

An SCM must repeat the path authentication and initial registration processes whenever it is assigned to a different parent LCM instance.

Genearal AP operations will now be discussed.

A WLCCP AP either operates in 1) "Distributed Mode" or 2) SWAN "Infrastructure Mode".

The AP operational mode depends on the presence of an SCM and on an AP "Operational Mode" parameter, which can be set to one of the following values:

a) Infrastructure-only
b) Automatic-fallback (default)

A WLCCP AP always operates in "infrastructure mode" if it discovers a SWAN SCM. An AP operates in "distributed mode" if it cannot register with the active SWAN SCM and "Operational Mode" is set to "Automatic-fallback". The CISCO Datagram Delivery Protocol (DDP) is used as the inter-AP protocol, in distributed mode. It should be noted that a WLCCP Context or Path-Update messages can be used, in distributed mode, to directly transfer context from an "old AP" to a "new AP", when a station roams. The "old AP" MAC address can be obtained from an 802.11 Reassociation message.] Each AP must function as the 802.1X authenticator, in distributed mode. APs should operate in distributed mode if the network contains non-WLCCP APs.

An AP can NOT operate in "distributed mode" if "Operational Mode" is set to "Infrastructure-only".

AP operation in infrastructure mode is generally the same in a standalone subnet infrastructure, a standalone local infrastructure, or a campus infrastructure.

An AP that is operating in infrastructure mode is considered "Attached" if it is registered with the active SCM; otherwise, it is considered "Unattached". An AP that is operating in "distributed" mode is considered "Attached" if it has a good Ethernet link, which is configured in parent or parent/child mode (see below), or if it is associated with a parent AP; otherwise, it is considered "Unattached". An Unattached AP must prohibit 802.11 station associations, to prevent stations from associating with an AP that cannot provide access to the Primary LAN. A management station can use a special "Management SSID" to associate with an Unattached AP, when other station associations are prohibited.

A child 802.11 bridge or repeater AP cannot operate in infrastructure mode unless it is associated with a parent AP that is operating in infrastructure mode. [A parent AP that is operating in infrastructure mode transmits periodic SCM Advertisement Reply messages to child APs and bridges.]

Below is a list of general AP state variables.

Infrastructure_Mode—TRUE if there is an active SCM; otherwise, FALSE.

AP_Top_Level_State—Contains the current top-level AP state. Top-level AP states and top-level state transitions are described in the section entitled "AP Operational Modes".

Parent_SCM_Record—contains the following information about the active parent SCM:

SCM_Node_ID—The Node ID of the active SCM copied from the SARpM.

SCM_Age—Incremented once per SCM Advertisement Period. Reset to 0 when an "active" SARpM is received. Infrastructure_Mode is reset to False when the SCM_Age equals MAX_SCM_AGE.

SCM Instance_Age—The Instance Age of the SCM copied from the SARpM.

SCM_Subnet_Address—IPv4 Address and (optional) Subnet Mask of the SCM copied from a WTLV_IPV4_SUBNET_ID TLV in the SARpM.

SCM_Priority—The priority of the active SCM copied from the SCM Priority field in the SARpM.

SCM_Advertisement_Period—The number of seconds between scheduled SCM advertisements copied from the Advertisement Period field in the SARpM.

SCM_Path_Cost—The Path Cost value from the SARpM, plus the cost assigned to the AP's primary port.

SCM_Hop_Count—The Hop Count value from the SARpM, plus '1' for the primary port.

SCM_Advertisment_Timer (optional)—A timer that expires once per "SCM Advertisement Period" when WLCCP is enabled. The duration of the timer is SCM Advertisement_Period seconds (see above).

IN_1X_Authenticator—Node ID and IPv4 Address of the WLCCP Infrastrucutre 802.1X Authenticator, which is always the SCM in the simple WLCCP implementation.

An AP must monitor SCM Advertisement Reply messages received on its primary port on the native VLAN to determine if there is an active SCM for the native VLAN. An AP operates in infrastructure mode and executes the WLCCP protocol if there is an active SCM for the AP's native VLAN.

An AP must update its "Parent SCM Record" each time it receives an SCM Advertisement Reply message. Infrastructure mode is enabled when an AP first receives an SCM Advertisement with the "Active_Flag" set ON. An AP must generate SCM Advertisement Reply messages on each of its secondary ports, using one of the following methods: 1) An AP can simply generate SCM Advertisements on each of its secondary ports when it receives an SCM Advertisement on its primary port, or 2) an AP can start a periodic SCM_Advertisement_Timer and generate SCM Advertisements on its secondary ports each time the timer expires. The period of the timer is the non-zero Advertisement Period value in advertisements received on the primary port. The first method must be used if the Advertisement Period value is zero in advertisements received on the primary port.

A repeater AP must send a multicast SCM Advertisement Request on its primary port when it first associates with a parent AP, to solicit a unicast unscheduled SCM Advertisement Reply message.

The AP top-level state transition table below specifies SCM_Advertisement Reply message (SARpM) processing logic. An "active" SARpM has the "Active Flag" set ON.

The IN 802.1X Authenticator is in the root CM when the AP is in the I,R state; otherwise, the IN 802.1X Authenticator is in the AP. Preregistration and Registration of MNs is only enabled in the I,R state.

AP top-level states are described below:

D,*—Any state in Distributed mode. "Infrastructure_Mode" is False, because the AP has not discovered an active SCM.

D,L—The AP is in a power-up SCM discovery period.

D,A—The AP is actively operating in Distributed mode and is accepting station associations.

D,SC—The AP discovered an SCM Candidate during the power-up SCM discovery period.

I, U—Infrastructure_Mode is True and the AP has not authenticated with the root CM.

I, A—Infrastructure_Mode is True and the AP has successfully authenticated with the root CM.

I, P—The AP has successfully completed Path Authentication.

I, R—The AP has successfully Registered with the root CM; MN (pre)registration is enabled.

I,*—Any state where Infrastructure_Mode is True.

Top-level AP State Transition Table

| State | Event | Action | Next State |
|---|---|---|---|
| Initial | System reset; good Ethernet link; Auto-fallback is enabled | Start an "SCM Listen timer" with a 10-second expiration time; send SCM Advertisement Request | D, L |
| D,* | Receive active SARpM | Set Infrastructure_Mode to TRUE; Update the Parent SCM Record and the IN_1X_Authenticator; Initiate authentication with the SCM | I, U |
| D, L | Receive inactive SARpM | restart SCM Listen timer with a MAX_SCM_ELECT_TIME expiration time; Save SCM Candidate Priority ID | D, SC |
| D, SC | Receive higher-priority inactive SCM Advertisement | restart SCM Listen timer with a MAX_SCM_ELECT_TIME expiration time; Save SCM Candidate Priority ID | D, SC |
| D, L | SCM Listen timer expires | Start active operation in distributed mode. | D, A |
| D, SC | SCM Listen timer expires (i.e. because the active SCM election did not complete) | Start active operation in distributed mode. | D, A |
| D, A | Receive inactive SARpM | (none) | D, U |
| I, U | Authentication with the root CM completes successfully. | Initiate Path Authentication. | I, A |
| I, A | Path Authentication completes successfully | Initiate AP Registration | P |
| I, P | Registration completes successfully | Enable MN Preregistration and Registration; Register authenticated MNs; transfer the MN 802.1X Authenticator function to the SCM; start the SCM_Advertisement_Timer | I, R |
| I, * | Receive an active SARpM from the active SCM instance. | Reset the SCM_Age to 0; Update the Parent_SCM_Record | I, * |
| I, * | Receive inactive SARpM or an "active" SARpM, with a lower Instance Age, from the active SCM | Set Infrastructure_Mode to False | D, U |
| I, * | Receive a higher priority active SARpM from a different priority SCM | Update the SCM state information; Initiate authentication with the new active SCM | I, U |
| I, * | Receive an inactive SARpM or a lower priority active SARpM from a different SCM (Candidate) | (none) | I, * |
| I, R | SCM_Advertisement_Timer expires; the SCM_Age is less than MAX_SCM_AGE | Restart the timer with the current Advertisement Period; Increment SCM Age; Generate SARpMs on each secondary port | I, R |
| I, R | SCM_Advertisement_Timer expires; the SCM_Age is equal to MAX_SCM_AGE | Set Infrastructure_Mode to False | D, U |

SCM Advertisement Reply messages are NOT transparently forwarded by WLCCP APs. Instead, a registered AP generates "secondary" SCM Advertisement Reply messages, on each of its active secondary ports, with the same period as the SCM. [The advertisement period is contained in SCM Advertisement Reply messages.] SCM Advertisement Reply messages are NOT transmitted on the AP primary port or on AP ports that are "blocked" by the underlying STP.

SCM advertisements, which are transmitted on AP secondary ports, contain updated "path cost" and "hop count" values. Each AP port is assigned a user-configurable "path cost". Default path cost values are defined for each AP port type (e.g. Ethernet, 802.11a, 802.11b). The updated path cost is calculated by adding the path cost assigned to the AP's primary port to the parent AP's path cost (i.e. the path cost in SCM advertisements received on the primary port); the "hop count" is incremented by '1', if the AP's primary port is a wireless port. A subnet address and updated path cost and hop count information is also advertised in 802.11 Beacon and Probe Response messages, sent on AP 802.11 secondary ports, so that unassociated wireless APs and MNs can quickly discover the least-cost path to the primary LAN (i.e. without iteratively associating and authenticating with each potential parent AP).

An AP may register with a logical SCM that is contained in the same hardware box. In that case, the cost assigned to the "internal primary port" should be consistent with Ethernet port cost (i.e. to prevent stations from migrating to an AP that is co-located in the same box as an SCM).

A non-SWAN AP may transparently forward SCM Advertisement Reply messages generated by a different SWAN node. A child AP must discard any SCM Advertisement Reply messages that are not generated by its parent. A child AP can use the SCM Advertisement Hop Source field to determine if its parent AP generated an SCM Advertisement message. The Hop Source address must be the same as the parent AP's Hop Address.

Root APs are always bound to the active SCM on the native VLAN. A Root AP only receives SCM Advertisement Reply messages on its native VLAN on the primary port. A non-root AP must belong to the same subnet as its parent AP; therefore, a non-root AP is always bound to the same SCM as the parent (or ancestor) root AP.

SWAN APs are configured with a single "WLCCP SSID". A campus-wide WLCCP SSID is sufficient if a campus network only contains root APs or if non-root APs can dynamically bind to any subnet. Subnet-specific WLCCP SSIDs can be used to bind non-root APs to a specific subnet (i.e. the subnet with root APs with a matching WLCCP SSID). [A child AP can use DHCP to dynamically bind to a subnet; however, the native VLAN and the set of enabled VLANs in a parent and child AP must match.]

A child 802.11 port (i.e. in a repeater AP or child 802.11 bridge) uses the WLCCP SSID to associate with a parent AP. A child AP sends Probe Requests that contains the WLCCP SSID and potential parent APs reply with a Probe Response that also contains the WLCCP SSID. A child AP can only attach to a parent AP with a matching WLCCP SSID.

An AP or child CM must authenticate its path to the root CM, after it has successfully authenticated with the 802.1X IN Authenticator, to mutually authenticate and establish a secret Context Transfer Key (CTK) with each ancestor node on its branch of the SWAN Topology Tree. An AP must also initiate path authentication whenever it detects a new SCM instance. A non-root AP must also initiate path authentication whenever it roams to a new parent AP. [As an option, a non-root AP does not need to fully authenticate when it roams, if fast reauthentication is supported for child APs.]. Path authentication includes a Path-Init Request/Reply exchange and initial Registration Request/Reply exchange. Path Authentication and CTK updates are described in more detail in the section entitled "*Infrastructure Path Authentication*".

An Unattached AP must send a Path-Init Request to its selected parent node, on its selected primary port, to initiate path authentication. The Originator is the Unattached AP; the Requester is also the Unattached AP; and the Responder is the selected parent node (i.e. parent AP or SCM), in the Path-Init Request and the corresponding Reply.

Non-security fields in a Path-Init Request, sent by an Unattached AP, are set as described below. (Unspecified fields are set to '0'.) The Hopwise-Routing Flag is set to '1' so that each ancestor AP on the path to the SCM processes the Request and the corresponding Reply. Security TLVs included in Path-Init messages (and initial Registration messages).

WLCCP header fields:
Type—'12'
Originator—Node ID of the Unattached AP.
Responder—Node ID of the SCM.
Response-Req Flag—'1' to solicit a Reply.
Inbound Flag—'1'.
Hopwise-Routing Flag—'1' if Layer 2 Path Updates are enabled; otherwise '0'.
Root CM Flag—'1'
TLV FLag—'1' (The Request must include an EAP_IDENTITY_TLV.)
Path-Init fields:
Requester—Node ID of the AP.
Relay Node ID—'0'.
Proxy Flag—'0'.

The parent node must forward a Path-Init Request from an Unattached AP or CM inbound until it reaches the root CM. The parent node enters its Node ID in the Originator field and the Node ID of its parent CM in the Responder field, before forwarding the request inbound. An intermediate LCM must update the Responder field with the CCM Node ID before it forwards the request inbound to the CCM. The CCM returns a Path-Init Reply to the parent node (i.e. the Originator). The parent node updates the Responder field with the Requester Node ID before forwarding the Reply to the Unattached AP or CM.

An AP must authenticate with the root CM before it can register with the SWAN infrastructure. An AP discovers the root CM via a WTLV_ROOT_CM TLV contained in SCM advertisement messages. The root CM may be the local SCM, an LCM, or the CCM.

An Unattached AP scans for a potential parent SCM or AP on each of its ports that are configured in child or parent/child mode. [Note that an Attached AP becomes Unattached if it discovers a new instance of its parent AP or SCM.] An Unattached AP or CM must send an initial Registration Request to its selected parent node, on its selected primary port, to request attachment to the network. The Originator is the Unattached AP; the Requester is also the Unattached AP; and the Responder is the selected parent node (i.e. parent AP or SCM), in the initial Registration Request and the corresponding Reply.

The fields in an initial Registration Request sent by an Unattached AP are set as described below. (Unspecified fields are set to '0'.)

WLCCP header fields:

Type—'3'

Originator—Node ID of the Unattached AP.

Responder—Node ID of the selected parent node (parent AP or parent SCM).

Response-Req Flag—'1' to solicit a Reply.

Inbound Flag—'1'.

Hopwise-Routing Flag—'1'.

TLV FLag—'1' (the Request must include a WTLV_AP_PORT_ADDRESS TLV for each AP port).

Registration fields:

Requester—Node ID of the Unattached AP.

Hop Address—802 address of the Unattached AP's selected Primary Port.

Relay Node ID—'0' in a registration message generated by the Originator or Responder. Otherwise, the Node ID of an intermediate "relay" node that forwarded the message.

Initial Flag—'1'.

VLAN ID—The native VLAN ID of both the Unattached AP and the parent node. The VLAN ID value may be '0'. It is an error if the VLAN ID value is different than the parent node's native VLAN ID.

The parent node must forward an initial Registration Request from an Unattached AP inbound until it reaches the root CM. The parent node enters its Node ID in the Originator field and the Node ID of its parent CM in the Responder field, before forwarding the request inbound. An intermediate LCM must update the Responder field with the CCM Node ID before it forwards the request inbound to the CCM. The CCM returns a Registration Reply to the parent node (i.e. the Originator). The parent node updates the Responder field with the Requester Node ID before forwarding the Reply to the Unattached AP or CM.

An AP periodically sends an "update" Registration Request message to the SCM to "refresh" its mobility bindings in each node on the path to the SCM. An update Registration Request has the Initial Flag set OFF and it contains a valid Path ID. An Attached AP or CM can send an "update" Registration Request directly to its parent CM, with itself as both the Originator and the Requester Node and the parent CM as the Responder. The parent CM must update the Responder field, with the Node ID of its parent CM, before forwarding the request inbound.

An AP (re)transmits a Registration Request either until it receives a Registration Reply with a matching message ID, or until the maximum retries are exceeded. An AP is "registered" when it receives a matching Registration Reply with a "good" RegStatus. The Registration Reply contains a Path ID, set by the SCM, which identifies the "path instance" from the AP to the SCM.

A Registration Request from an AP must include a WTLV_AP_PORT_LIST TLV, which contains a list of WTLV_AP_PORT_INFO TLVs. Each PORT_INFO TLV includes the port type, port mode (parent, child, or parent/child), and 802 port address of a physical communications interface.

A Registration Request from an AP must include an IP Address TLV to bind its IP address to its Node ID. An AP must generate an update Registration Request immediately whenever its IP address changes.

A Registration Request from an AP, which is configured with a Proxy MIP SSID, must include a WTLV_PMIP_SSID_LIST TLV, which contains a list of Proxy MIP SSIDs and MIP HA bindings.

Preregistration messages are used to obtain context information that is required prior to registration. A new parent AP, optionally, sends a Preregistration Request message, to its parent SCM, to obtain dynamic credentials and "old AP bindings" for an 802.11 station (MN or child AP) when it "reassociates". [A Preregistration Request is NOT generated when an 802.11 station initially "associates".] The parent AP generates a Preregistration Request when it receives 1) an 802.11 Reassociation Request or 2) an 802.1X EAP Identity Response message from the 802.11 station. The Preregistration Request contains the child station's Node ID and its security "Identifier".

A Preregistration Request is forwarded inbound to the nearest common ancestor CM of the old AP and new AP (with some restrictions noted below). If the "common CM" has the mobility bindings and security context for the child station, then the old AP bindings and dynamic credentials are returned in a Preregistration Reply message. Otherwise, a Preregistration Reply is returned with a "not found" status and the station must fully authenticate.

A Preregistration Request for a MN is never forwarded beyond the nearest common LCM, since the LCM is the MN Authenticator. An AP cannot roam across subnet boundaries; therefore, the nearest common ancestor CM for a child AP should always be the local SCM.

A Preregistration Reply does NOT establish a "bound" Path Instance. An 802.11 Reassociation Response message is, optionally, generated when the parent AP receives the Reply.

A new parent AP does not need to send a Preregistration Request to obtain an 802.11 station's's dynamic credentials if fast reauthentication with a Network Session Key is not supported or if the station's dynamic credentials are "predictively" forwarded to the new parent AP. In that case, the station's "old AP bindings" are returned in a Registration Reply message. Specific Preregistration handshaking is dependent on the 802.11 (re)authentication method.

The fields in a Proxy Preregistration Request message, generated by a parent AP for a child 802.11 MN, are set as follows:

WLCCP header fields:

Type—'9'

Originator—Node ID of the Parent AP.

Responder—Node ID of the SCM.

Response-Req Flag—'1' to solicit a Reply.

Inbound Flag—'1'.

Root CM Flag—'1' for an AP; '0' for a MN.

Hopwise-Routing Flag—'0'.

TLV FLag—'1' (The Request must include an EAP_IDENTITY_TLV and an SSID_TLV).

Preregistration fields:

Requester—Node ID of the MN.

Relay Node ID—'0'.

Proxy Flag—'1'.

EAP_IDENTITY TLV—The Preregistration Request for a MN or child AP must contain a WTLV_EAP_IDENTITY TLV that contains the node's identifier from an optional 802.11 Reassociation element or from the EAP Identity Response message.

SSID_TLV—The SSID of the MN taken from the MN's (Re)Association Request message.

A child AP can, optionally, include a Node_ID element in its (Re)Asssociation Request messages, to communicate its WLCCP Node ID to its parent AP. If a parent AP does not know the Node ID of a child AP, when it generates a Preregistration Message for the child AP, it must set the Requester Node Address to '0'. A Preregistration Request should include a WTLV_PORT_ADDRESS_TLV, which contains the MAC port address of the child AP.

A parent AP generates "proxy" Registration Request messages for associated MNs. The Originator, Responder, and Requester fields are always set as follows:
Originator—Node ID of the Parent AP.
Responder—Node ID of the SCM.
Requester—802 address of the MN.

A parent AP must generate a Proxy Registration Request for a MN after it successfully authenticates or reauthenticates (as described below).

Proxy MN Registration logic is specific to the implementation and is described in more detail below in the sections entitled "W1 Proxy MN Registration" and "W2 Proxy MN Registration".

SWAN Authentication and Privacy is achieved by enforcing SWAN infrastructure nodes to mutually authenticate with both the root CM (CCM) as well as the IN nodes it will communicate with. Protection of WLCCP messages is achieved by the CCM generating and distributing CTKs upon successful pre-registration of INs.

"Initial authentication" is based on the IEEE 802.1X protocol. Each "secure MN", AP, and CM must initially "mutually authenticate" with an 802.1X authenticator, via an external authentication server (e.g. a RADIUS server). Infrastructure nodes (APs, SCMs, and LCMs) mutually authenticate with an "IN Authenticator". "Secure MNs" mutually authenticate with a "MN Authenticator". While MNs can select from any supported 802.1X EAP authentication types, for initial releases, IN nodes shall authenticate using LEAP.

In a campus network, the SWAN CCM contains the IN Authenticator and LCMs contain a MN Authenticator. In a stand-alone local domain, both the IN Authenticator and the MN Authenticator are contained in the LCM. In a stand-alone subnet domain, both the IN Authenticator and the MN Authenticator are contained in the SCM.

All nodes must authenticate into the SWAN topology prior to registration. The node authenticator will cache the credentials upon successful 802.1X EAP authentication. The IN Authenticator will cache:

| Field | Length (bytes) | Description |
| --- | --- | --- |
| Reserved | 1 | Used for byte alignment |
| State | 1 | Indicates whether this node is Active or not. |
| Node-ID | 8 | WLCCP Node Identifier: AP's MAC Address (e.g. BSSID) |
| NSK | 16 | The key resulting from a successful LEAP authentication. |
| Session Timeout | 4 | Session expiration time provided by the Radius Access Accept |
| CTK | 32 | The current context transfer key used to protect communications between the SCM Authenticator and the Node-ID |
| Key Sequence Counter | 4 | A sequence counter used to track how many CTK key refreshes have occurred |
| MIC Sequence Counter | 8 | A sequence counter used to track how many messages were authenticated |

Similarly, the MN Authenticator will cache:

| Field | Length(bytes) | Description |
| --- | --- | --- |
| Reserved | 1 | Used for byte alignment |
| State | 1 | Indicates whether this node is Active or not |
| STA Addr | 8 | WLCCP Node identifier: MN's MAC address |
| Authentication Type | 1 | EAP Type used to authenticate |
| Key Management Type | 1 | Type of (or no) key management negotiated. Valid values are:<br>0 - none (NSK is not forwarded)<br>1 - CCKM<br>2 - 802.1X Legacy systems (doing an effective re-authentication) forwards the NSK.<br>3 - SSN |
| Session Timeout | 4 | Session expiration time provided by the Radius Access Accept |
| KRK | 16 | Key Request Key used to authenticate MNs request for context transfers |
| BTK | 32 | Base Transient Key used to derive PTKs |
| RN | 8 | Rekey number used to track how many PTKs have been derived from BTK |
| SSID | L | MN's associated SSID TLV |
| EAP-ID | P | EAP Identity TLV |
| VLAN ID | 2 | MN's associated VLAN assignment |
| BSSID | 6 | Defines the current associated AP |
| Cipher | 2 | Negotiated cipher, values are:<br>0x0000 - none<br>0x0001 - WEP<br>0x0002 - TKIP<br>0x0003 - AES-OCB<br>0x0004 - AES-CCMP<br>0x0005 - CKIP<br>0xff<value> - Vendor specific |
| NSK Length | 2 | NSK length in bytes |
| NSK | N | The key resulting from a successful 802.1X EAP authentication. This is the MS-MPPE Rx Key sent by the AS |

-continued

| Field | Length(bytes) | Description |
|---|---|---|
| Tx Key Length | 2 | Tx Key Length |
| Tx Key | M | The key resulting from a successful 802.1X EAP authentication. This is the MS-MPPE Tx Key sent by the AS |

The fields in each registration entry are populated at either 802.1X EAP Authentication success or during a pre-registration. A successful authentication will result in the creation of a registration entry with the proper IDs, NSK and session timeout values defined. For MN, the valid BSSID, SSID and VLAN ID will also be defined at authentication based on the EAP identity.

802.1X EAP authentication messages are WLCCP encapsulated by the node's parent. An infrastructure node communicates directly via a wired link to the IN Authenticator during authentication. Once the IN parent has received the EAPOL authentication message, it will encapsulate it using a WLCCP_AAA message.

Since a MN always communicates through the AP to the MN Authenticator the AP must WLCCP encapsulate the EAP messages. Since the AP has authenticated and registered with the MN authenticator, WLCCP_AAA messages can be optionally authenticated. As described in the section entitled "EAP-Authentication Request/Reply Message", WLCCP_AAA messages can have a_MIC TLV appended. The MIC applies to the entire WLCCP message including the header:

$MIC=HMAC-MD5(CTK, WLCCP-\_AAA \text{ message})$

Where CTK=the key shared between the immediate sender and immediate reciever

WLCCP replies, or outbound messages, allow the opportunity to specify a status. For error conditions the following status values will apply during a WLCCP_AAA:

| Status | Value | Description |
|---|---|---|
| NO CONTEXT | 1 | Insufficient credentials were provided: either the NSK or session timeout were missing from the Radius Access Accept message |
| BAD SSID | 2 | Invalid SSID is specified |
| EAP FAILURE | 3 | EAP Authentication failed |

Each "secure" MN must mutually authenticate with a MN 802.1X Authenticator via an external security server. In infrastructure mode, the MN authenticator is in an LCM. In SCM stand-alone mode, the MN authenticator is in the SCM.

A MN does not require knowledge of the infrastructure behind the AP. Thus, from the MN's view, MN authentication is done as specified by the 802.11 (SSN and TGi) protocols as well as the use of CCKM. For an MN to be properly managed by the SWAN topology, it must negotiate 802.1X EAP Authentication.

The MN must employ 802.1X EAP Authentication to reap the benefits of LEAP, SSN or TGi's security advantages as well as SWAN manageability. In the SWAN architecture, the MN Authenticator is detached from the parent AP. When the MN engages in an 802.1X EAP authentication, its EAPOL messages are WLCCP encapsulated by the parent AP, in EAP-Authentication Request messages, and forwarded to the MN Authenticator.

Depending on the key management negotiated, the MN Authenticator must also properly forward the required keys to the AP in a Pre-registration Request/Reply exchange. The following table describes what the MN Authenticator must forward based on negotiated key management type:

| Key Management Type | Description |
|---|---|
| None | While the Radius may generate an NSK, the MN Authenticator will forward the NSK only on initial association; the operation is effectively a non-cached NSK. |
| Cisco-LEAP | The Radius MS-MPPE key is forwarded to the SCM and subsequently to the AP for protection of 802.11 packets |
| SSN/TGI | The Radius MS-MPPE key is forwarded to the SCM and subsequently to the AP for the 802.1X 4-way handshake to establish PTKs per AP |
| CCKM | The MN Authenticator engages in a 4-way handshake to establish the rekey authentication key, KRK and base transient key, BTK. Only the BTKs need to be forwarded to the AP to establish PTKs. CCKM requires a Pre-registration Request/Reply following initial Authentication. |

The pairwise transient keys (PTKs) used to protect communications between the MN and AP are generated by the MN and AP in all key management schemes.

The AS must also accommodate the session timeout setting based on key management approaches. For LEAP, the session timeout remains a function of the 802.11 negotiated cipher suite. However, for either SSN/TGi and CCKM, the session timeout is a function of the mutually derived key of each EAP authentication type.

After a CCKM MN has successfully authenticated, the MN Authenticator must trigger a key initialization to establish the Key Request Key (KRK) and Base Transient Key (BTK) before the MN and associated AP can establish PTKs.

To trigger KRK and BTK derivation, the MN Authenticator must generate a 16-byte nonce. An EAPOL Key message of the format described in the current TGi Draft [6] is generated to send the nonce to the MN and thus initiate the 4-way handshake used to establish KRK and BTK. The EAPOL Key message is encapsulated in a WLCCP_AAA message and delivered to the MN. The delivery is through the AP, thus the AP will unencapsulate the WLCCP message and forward the EAPOL Key message to the MN. The handshake proceeds as described in the Fast Handoff using Cisco's Central Key Management Protocol Specification.

After a CCKM MN has successfully authenticated, the MN Authenticator must trigger a key initialization to establish the Key Request Key (KRK) and Base Transient Key (BTK) before the MN and associated AP can establish PTKs.

To trigger KRK and BTK derivation; the MN Authenticator must generate a 16-byte nonce. An EAPOL Key message of the format described in the current TGi Draft [6] is generated to send the nonce to the MN and thus initiate the 4-way handshake used to establish KRK and BTK. The EAPOL Key message is encapsulated in a WLCCP_AAA message and delivered to the MN. The delivery is through the AP, thus the AP will unencapsulate the WLCCP message and forward the EAPOL Key message to the MN. The handshake proceeds as described in the Fast Handoff using Cisco's Central Key Management Protocol Specification.

An infrastructure node must first authenticate with the IN Authenticator using 802.1X EAP Authentication to establish a secret network session key (NSK). For initial releases, LEAP will be the authentication type. Since LEAP is known to be susceptible to dictionary attacks, as well as good security practice, a CTK must also be mutually derived to protect data exchanged between the IN and IN Authenticator.

An authenticating "supplicant" IN exchanges EAPOL authentication messages with its parent AP or CM. The supplicant's parent AP or CM relays the EAPOL authentication messages between the supplicant and the IN Authenticator in the root CM The EAPOL authentication messages are encapsulated in WLCCP AAA Message Request and Reply messages, with one exception. A child AP must exchange raw EAPOL messages with its parent AP on an 802.11 link.

The IN Authenticator contains a RADIUS client, which converts EAP_Authentication Request messages to RADIUS request messages, and converts RADIUS response messages to AAA Message Replies. The IN Authenticator determines if the authentication process has failed based on the RADIUS messages received. The IN Authenticator indicates authentication failure by returning a non-zero Status value in a WLCCP_AAA Reply.

A secret "session key", NSK, is established during initial authentication. The NSK is then used by the IN and IA along with exchanged key material to mutually derive the CTK. The CTK protecting TLVs and messages between the IN and IA are the only CTKs that require mutual derivation, all other links' CTKs are derived through a strong pseudorandom function by the IA and delivered to the INs.

An SCM or LCM determines that it must initially authenticate with the IN Authenticator in the CCM if it is configured with the IP address of the CCM.

All infrastructure nodes must also initiate "path authentication", after a successful LEAP authentication, to mutually authenticate and establish a CTK with each of its ancestors. Path authentication is described below in the section entitled "Infrastructure Path Authentication".

SCM Advertisement Reply messages contain an ROOT_CM_INFO TLV, which enables APs to automatically discover the Root CM and the IN Authenticator. An AP must initially authenticate with the IN Authenticator identified by the IP address contained in the TLV.

A Registration Reply message sent to an AP can include a MN__1X_AUTHEN TLV, which identifies the current MN authenticator. The SCM can advertise a new MN Authenticator in a MN__1X_AUTHEN TLV contained in SCM Advertisement Reply messages.

An IN must periodically repeat the initial authentication process to maintain a "fresh" session key (e.g. NSK); the refreshing of NSKs is determined by the session timeout defined by the authentication server (AS).

When in standalone mode, the SCM acts as both the MN and IN Authenticator. A path initialization message with only a single Secure Context TLV is required as it only requires the direct CTK with the IN Authenticator (e.g. the SCM). Since this is the only present link the Path Initialization message only requires a 3-way handshake: request, reply and confirm. However, to keep consistent with a full topology infrastructure, in the SCM standalone configuration, the AP shall use a request/reply handshake for Path Initialization and confirm the key establishment through the use of the Authenticator TLV in the Registration request/reply exchange.

Figure 29:
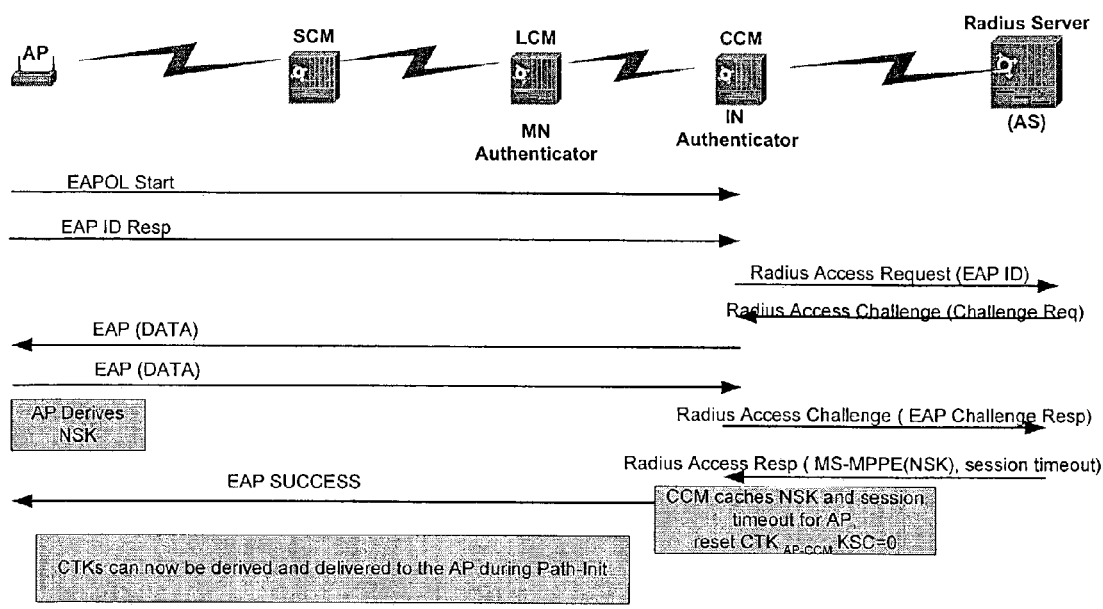
FIG. 29 is an example of a root access point authentication.

However, in a full SWAN topology, a full 4-message handshake is required to establish both the key delivery and liveness confirmation between the supplicant IN and its ancestors. The request/reply messages are required for key delivery and the confirm/ack are required to prove each link is live. FIG. 29 gives an example of a root AP authentication. While the example demonstrates the root AP authentication and CTK establishment, the same steps are required for all other infrastructure nodes, e.g. LCM and SCM.

After an infrastructure node has initially authenticated, it must mutually authenticate and establish a separate secret a "Context Transfer Key" (CTK) with each of its ancestor nodes including the IA. A Path-Init message is used to establish CTKs between the supplicant IN and its ancestors. Each ancestor node must provide a 16-byte nonce to allow for the distribution of fresh CTKs. The IA serves as a trusted key distribution center, KDC, for that purpose. The CTKs are used to generate MICs and encrypt sensitive context information in messages that are forwarded on branches of the Topology Tree. CTKs are 256-bit values whose lower 128 bits are used to authenticate messages and TLV and whose upper 128 bits are used to encrypt messages and TLVs.

For the CTK used between the IN and the IA, the supplicant IN must provide a 16-byte nonce in the Path-Init request message so that the IA can derive the CTK. The IA provides its 16-byte nonce in the Path-Init reply message so that the IN can derive the CTK. A final Path-Init confirm message is needed to allow the IN to confirm proper receipt of key material and liveness of the CTK. If a full path authentication is requested by the use of a WTLV_INIT_SESSION TLV, a fourth message is required to establish liveness of the CTK distributed in the Path-Init request/reply exchange.

An unregistered and unauthenticated IN "supplicant" initiates Path Authentication by sending a Path-Init Request message and embeds a WTLV_INIT_SESSION to its selected parent node. Included in the Init Session TLV is a Secure Context TLV that includes the IN's 16-byte nonce directed to the IA (e.g. the DST-ID is the IA in the Secure Context TLV). The parent node forwards the Path-Init Request inbound to the root CM, which contains the IA. Each node on the path to the root CM, including the parent node, inserts a Secure Context TLV into the request message's Init Session TLV. The IN Authenticator in the root CM determines the supplicant's list of ancestors from the list of WTLV_IN_SECURE_CONTEXT_REQ TLVs when it receives the Path-Init Request.

The IA will mutually derive the CTK to protect the link between the requesting IN and the IA. Additionally, the IA will generate CTKs for each of the supplicant's ancestors. The IA must first derive the CTK protecting the IN-IA link so that it can generate the Transient Key TLVs to properly deliver the CTKs to the requesting IN. For all of the ancestors, the CTKs are embedded in the corresponding (and now encrypted) Secure Context TLVs. For the Secure Context TLV corresponding to the IN-IA link, the nonce generated by the IA is included in the TLV and a new MIC is computed using the newly established $CTK_{IN-IA}$. This WTLV_MIC within the Secure Context TLV serves as the liveness authenticator to the requesting IN.

Figure 30:
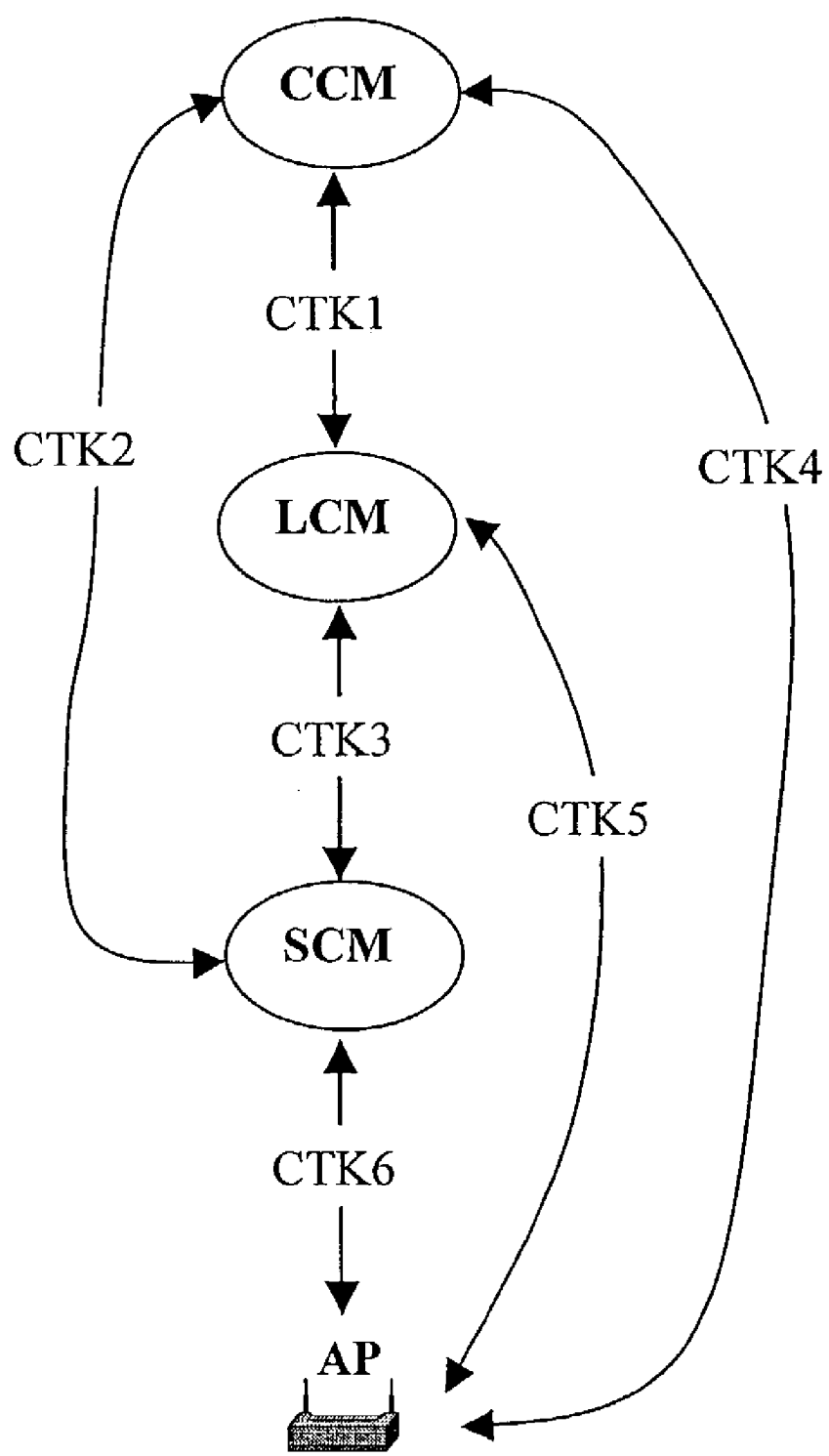
FIG. 30 is a block diagram illustrating defined CTK's.

To better describe the actions required to authenticate a IN to the SWAN topology, a simplified terminology is defined. First, the set of CTK's are explicitly defined in FIG. 30.

The AP path authentication are as follows:

An NSK is shared between the AP and the CCM

It is presumed it's ancestors have successfully registered. In the example shown in FIG. 30, CTK1, CTK2 and CTK3 are fresh and valid. This is a requirement as CTK1 is used to deliver and authenticate delivery of CTK5 to the LCM. While CTK2 is used to deliver CTK6 to the SCM but is sent via the LCM. The LCM in turn protects the WTLV_IN_SECURE_CONTEXT_REPLY using CTK3.

Figure 32:
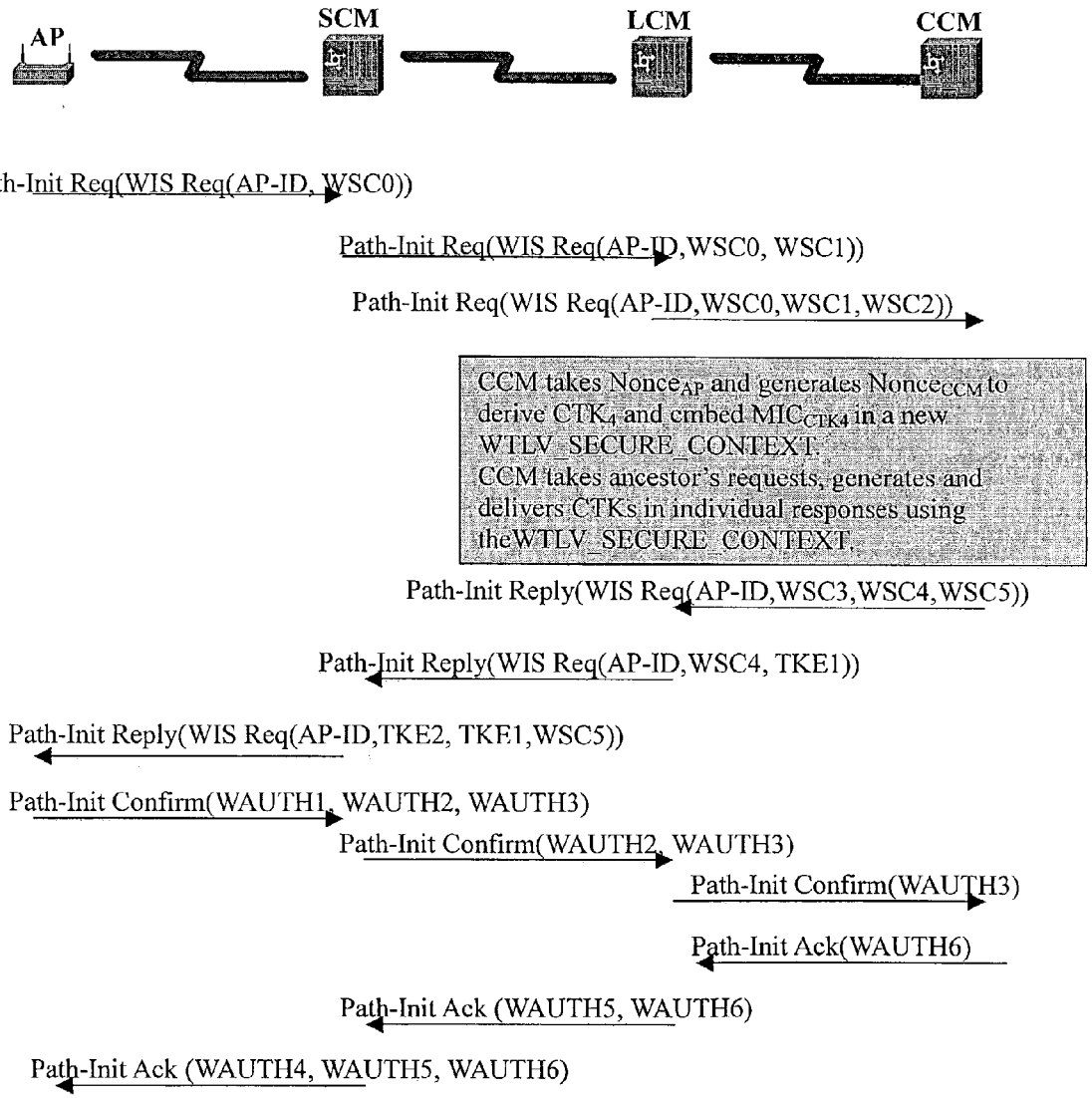
FIG. 32 is an example block diagram of an alternate sequence used for a path update requiring no registration.

The WTLV_TRANSIENT_KEY's used are described in shorthand as:

FIG. 32, once the supplicant receives the Path-Init Reply message, it must send an "initial" Registration Request message to the root CM, via its parent node, as described above. The supplicant must enter a WTLV_AUTHENTICATOR TLV into the request message for each of its ancestor nodes. Each ancestor node "authenticates" the supplicant when it receives its WTLV_AUTHENTICATOR TLV; therefore, the supplicant is fully authenticated before a Registration Reply is generated. Each ancestor node must update and re-encrypt the WTLV_AUTHENTICATOR TLV before forwarding the Registration Request. The supplicant mutually authenticates each of its ancestor nodes when it receives the updated list of WTLV_AUTHENTICATOR TLVs in the Registration Reply.

Figure 33:
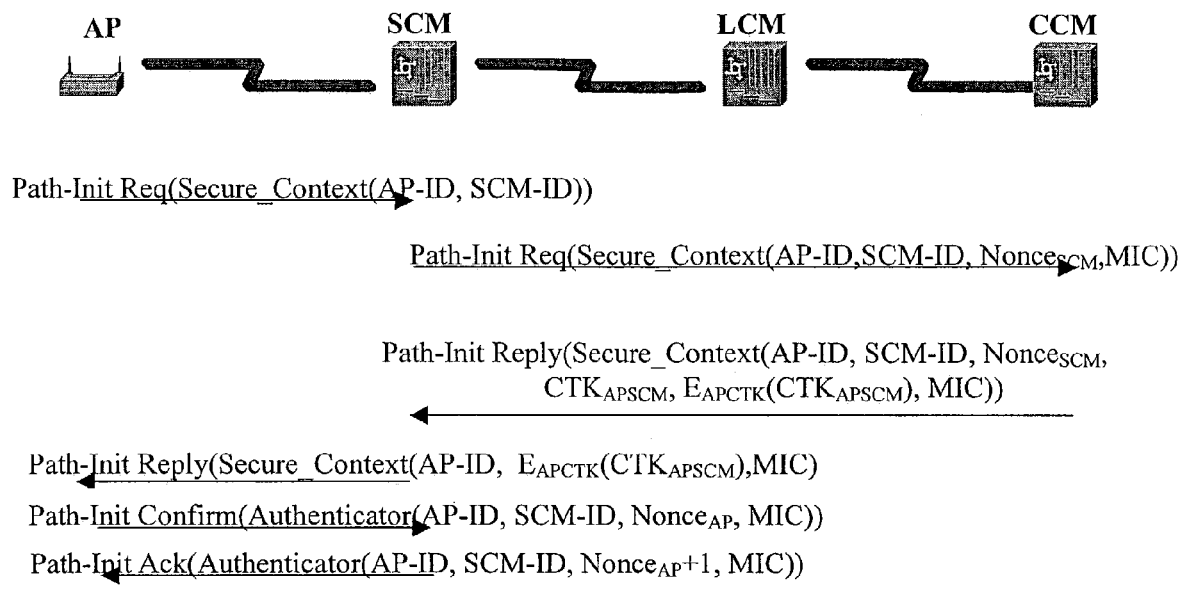
FIG. 33 is an example of an Establish (refresh) CTK's between an access point and a subnet context manager.

CTKs can be similarly refreshed as shown in FIG. 33, with the only difference being that no registration is needed and thus, rather than using a Registration message type, it extends the Path-Init message to use subtypes Confirm and ACK.

---

TKE1 = WTLV_TRANSIENT_KEY(CTK4, $KSC_{AP-LCM}$ || LCM-ID || AP-ID || CTK5 || $MIC_{CTK4}$)
TKE2 = WTLV_TRANSIENT_KEY(CTK4, $KSC_{AP-SCM}$ || SCM-ID || AP-ID || CTK6 || $MIC_{CTK4}$)

These TKE's are embedded in the encrypted Secure Context TLV's whose shorthand is:

WSC0 = WTLV_IN_SECURE_CONTEXT_REQ(<no encryption/MIC>, IA-ID || AP-ID || $Nonce_{AP}$)
WSC1 = WTLV_IN_SECURE_CONTEXT_REQ(CTK2, SCM-ID || AP-ID || $Nonce_{SCM}$ || $MIC_{CTK2}$)
WSC2 = WTLV_IN_SECURE_CONTEXT_REQ(CTK1, LCM-ID || AP-ID || $Nonce_{LCM}$ || $MIC_{CTK1}$)
WSC3 = WTLV_IN_SECURE_CONTEXT_REPLY(CTK1, LCM-TD || AP-ID || $Nonce_{LCM}$ || CTK5 || TKE1 || $MIC_{CTK1}$)
WSC4 = WTLV_IN_SECURE_CONTEXT_REPLY(CTK2, SCM-ID || AP-ID || $Nonce_{SCM}$ || CTK6 || TKE2 || $MIC_{CTK2}$)
WSC5 = WTLV_IN_SECURE_CONTEXT_REPLY(<no encryption>, AP-ID || A-ID || $Nonce_{IA}$ || $MIC_{CTK4}$)
WAUTH1 = WTLV_AUTHENTICATOR(CTK6, $KSC_{AP-SCM}$ || SCM-ID || AP-ID || $Nonce_{AP-SCM}$ || $MIC_{CTK6}$)
WAUTH2 = WTLV_AUTHENTICATOR(CTK5, $KSC_{AP-LCM}$ || LCM-ID || AP-ID || $Nonce_{AP-LCM}$ || $MIC_{CTK5}$)
WAUTH3 = WTLV_AUTHENTICATOR(CTK4, $KSC_{AP-CCM}$ || CCM-ID || AP-ID || $Nonce_{AP-CCM}$ || $MIC_{CTK4}$)
WAUTH4 = WTLV_AUTHENTICATOR(CTK6, $KSC_{AP-SCM}$ || SCM-ID || AP-ID || $Nonce_{AP-SCM}$ + 1 || $MIC_{CTK6}$)
WAUTH5 = WTLV_AUTHENTICATOR(CTK5, $KSC_{AP-LCM}$ || LCM-ID || AP-ID || $Nonce_{AP-LCM}$ + 1 || $MIC_{CTK5}$)
WAUTH6 = WTLV_AUTHENTICATOR(CTK4, $KSC_{AP-CCM}$ || CCM-ID || AP-ID || $Nonce_{AP-CCM}$ + 1 || $MIC_{CTK4}$)

---

Figure 31:
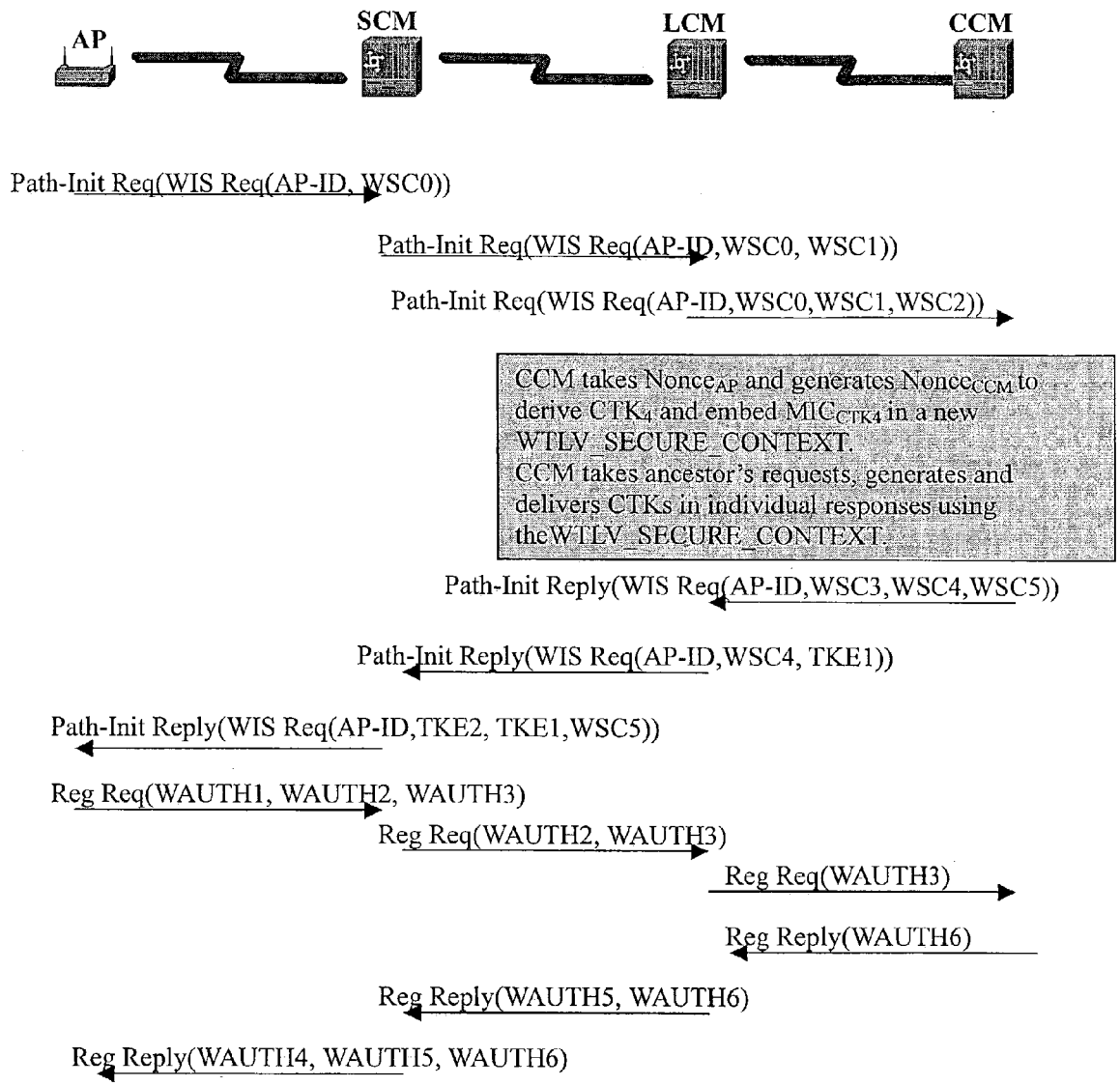
FIG. 31 is an example block diagram of an AP authenticating and registering to the infrastructure.

Using the above terminology, the WTLV_INIT_SESSION (WIS) TLV exchanges during path authentication serves as the means to authenticate and establish the path CTKs between a requesting infrastructure node and it's ancestors. An example of an AP authenticating and registering to the infrastructure is depicted in FIG. 31.

An alternate sequence for when paths need to be updated but no registration is required is shown in FIG. 32.

Each CTK delivered to the supplicant is encoded in a WTLV_TRANSIENT_KEY TLV. The CTK is directly delivered to the supplicant's ancestor in the WTLV_SECURE_CONTEXT_REPLY TLV. The list of TLVs is then entered into the Path-Init Reply message, which is sent to the supplicant's parent node. The parent node relays the Reply to the supplicant. Each node on the outbound path of the Path-Init Reply decrypts the CTK that it shares with the supplicant when it receives its respective WTLV_SECURE_CONTEXT_REPLY TLV. As shown in The CTKs must be refreshed based on the entropy defined by the cipher suites used to provide privacy and authenticity. [Initial releases will employ RC4 and HMAC-MD5 for respectively encrypting and authenticating all messages or TLVs. However, future releases may support AES.] CTKs must be refreshed when the message sequence counter has been exhausted or at a frequency of no more than a couple times a day (a 6 hr. interval will be reasonable). However, if a node is experiencing frequent MIC and or decryption failures it should silently discard these messages. Optionally (e.g. in future releases), with proper heuristics, the IN can decide whether to trigger a CTK refresh or a full (re) authentication.

CTK refreshes can optionally be refreshed for an entire branch, using WTLV_INIT_SESSION, or a single CTK can be refreshed using a Secure Context request/reply exchange. While the CTK used between the infrastructure node and the IA is also established and refreshed in WTLV_INIT_SES- SION or WTLV_SECURE_CONTEXT_REQ and WTLV_SECURE_CONTEXT_REPLY, its key can not be directly delivered by the IA, but rather key material (e.g. nonces) are exchanged to mutually derive a CTK. Thus the semantics of the WTLV_SECURE_CONTEXT_{REQ/REPLY} changes on whether the CTK is being delivered versus derived.

To rekey or establish a single CTK, the supplicant IN must request the IA for a fresh key. A 2-phase exchange is required. In the first phase, a WTLV_SECURE_CONTEXT TLV is used to establish the CTK. In the second phase a WTLV_AUTHENTICATOR TLV is used to confirm liveness of the CTK. The first phase is done during a Path-Init Request/Reply exchange while the second phase is completed during initial registration through the use of WTLV_AUTHENTICATORs. The second phase is required to ensure CTK liveness between the link nodes.

As shown in FIG. 33, an example of how a CTK used to protect the link between the AP and SCM employs the CCM for key delivery and direct path authentication from AP to SCM to confirm liveness of the CTK.

Mobile Node Security Context Transfer.

Dynamic security credentials for a MN are established in the initial MN authentication process, described above. These credentials include: NSK, session timeout, VLAN ID, SSID, KRK, BTK and RN. A MN's cached configuration information and dynamic credentials are automatically transferred to the new parent AP when a MN roams. The cached configuration information and dynamic credentials are also forwarded to any new SCM on the new path so that future roaming is localized (i.e. so that the LCM is not accessed as the MN roams within the subnet). The dynamic credentials are forwarded to the SCM during SCM registration updates.

MN SSID Authorization

A MN must be authorized to use its SSID. The 802.1X authentication server returns a list of allowed SSIDs for a MN, when the MN authenticates. The list of SSIDs (and any other static configuration information) is cached in each CM on the path to the MN. A MN's SSID is included in its Pre-registration and Registration Requests. The nearest common ancestor CM verifies that a MN is authorized to use its SSID each time that it receives a Pre-registration or Registration Request for the MN.

Fast Roaming and Rekeying

On a reassociate request, the roaming node affects an authenticated key refresh request to the new AP. The new AP subsequently requests security credentials to the MN Authenticator via a pre-registration request. The MN Authenticator must validate the security credentials provided by the MN (forwarded by the new AP to the MN Authenticator). On a successful pre-registration reply, the MN Authenticator will forward the security credentials to the new AP. On a failed pre-registration reply, the MN Authenticator will only provide a status code to indicate the failure point and allow the AP to decide whether to allow the MN to reestablish credentials by imposing a full authentication or to fully disassociate the MN.

MN Security Context Forwarding

In a full topology, the LCM acts as the MN Authenticator. The location of the MN Authenticator in a full topology can present longer latencies and thus it is desirable to forward the MN's security credentials down to the SCM. The forwarding of the credentials is achieved during Registration request/reply. This allows the MN's infrastructure ancestors, mainly the SCM, to cache the MN's security credentials and facilitate roaming.

Figure 34:
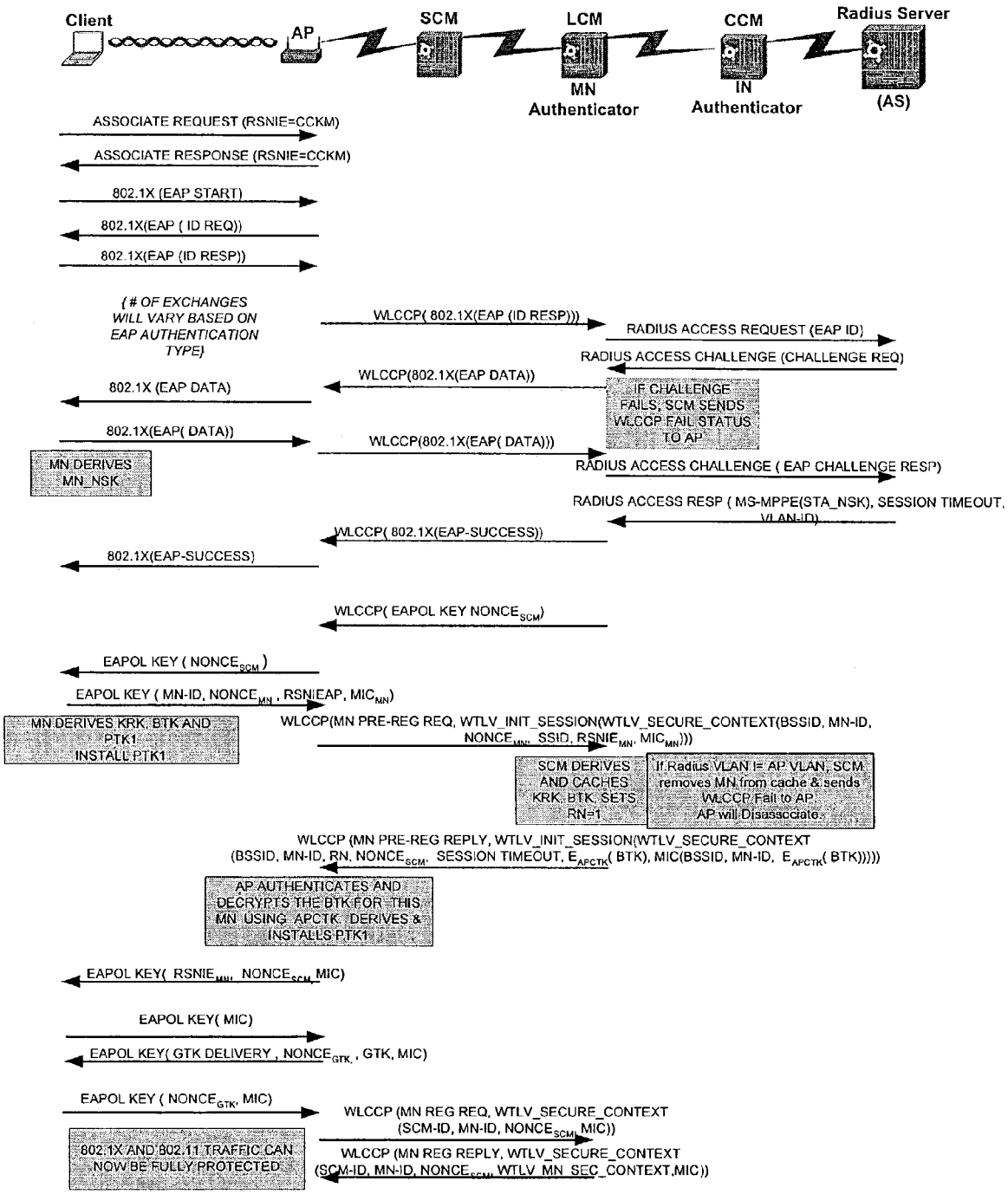
FIG. 34 is a block diagram illustrating an example message sequence for a successful mobile node authentication and registration to full topology.

The credentials are forwarded by request. That is, during a MN Registration Request, each ancestor (excluding the AP) can insert a WTLV_SECURE_CONTEXT_REQ requesting that the MN credentials be forwarded, a MIC must be included in the Secure Context TLV for the MN Authenticator to validate. On a successful request, the MN Authenticator will then embed a WTLV_MN_SEC_CONTEXT_REPLY TLV that includes all of the cached credentials encrypted in the TLV. Like the request, the Secure Context TLV must be MIC'ed on a reply as well. A full depiction of an MN authentication and registration undea SWAM topology is shown in FIG. 34.

The WLCCP_AAA message is the only explicit message type defined for node authentication. EAPOL messages are protected from man in the middle attacks as they are routed to the node's authenticator by means of a MIC in the WLCCP message encapsulation.

TLVs can be protected by using a modified RC4 algorithm to provide privacy and HMAC-MD5 to provide message authenticity. For privacy, TLVs are encrypted using the standard RC4 algorithm but discarding the first 256 bytes of the RC4 stream to thwart the FMS attack. For authenticity, a MIC TLV is included in WLCCP. The CTK is thus a 256 bit value comprised of two keys, the high order 128 bits is used as the HMAC-MD5 key while the low order 128 bits is used as the RC4 key.

A Message Integrity Check (MIC) TLV is used to authenticate WLCCP messages. A source node can, optionally, set the MIC Flag ON and enter a WTLV_MIC TLV in a WLCCP message to "authenticate" the message to the destination. The TLV contains a MIC that is calculated with the high order 128 bits of the Context Transfer Key (CTK) shared by the source and destination. If a Request message is authenticated, then the corresponding Reply message must also be authenticated. Each, source and destination node maintains a message sequence counter, MSC, initialized to 0 when a CTK is initialized or refreshed. The MSC serves as a replay counter as well as the RC4 initialization vector. If the current MSC is less than or equal to the previous MSC value, then the message is a replay and must be discarded. The MSC value is concatenated with the low order 128 bits of the CTK to generate the RC4 key. In little endian order:

RC4-key=MSC∥CTK[0:127] where ∥ is the concatenation function

To avoid MSC collisions and definition of directional CTKs, the MSC values shall be even on inbound paths and odd on outbound paths. The MSC should also be incremented every time a TLV or message is encrypted or authenticated.

Messages that are forwarded on branches of the SWAN Topology Tree are authenticated with CTKs that are established during the preregistration/registration process. Messages that are forwarded "laterally" are authenticated with dynamically-established lateral CTKs. Lateral message authentication is discussed in the next section.

If the Relay Flag is set OFF in a message, then the MIC is calculated using the CTK shared by the Originator and the Responder. An intermediate AP may "relay" a message that is forwarded with "Hopwise Routing". If the Relay Flag is set ON in a message, then the MIC is calculated using the CTK shared by the immediate sender and receiver. The rules for determining the shared CTK for a hopwise-routed message are as follows:

The immediate sender AP of an inbound message uses the CTK it shares with its parent node.

The immediate sender (AP or SCM) of an outbound message uses the CTK it shares with the next hop child node.

The immediate receiver uses the CTK it shares with the immediate sender. If the Relay Flag is set OFF, then the immediate sender is the Originator in a Request message and the Responder in a Reply message. If a the Relay Flag is set ON, then the immediate sender is the "relay node" identified by the required Relay Node ID field.

A CTK is also used to encrypt any TLVs that contain sensitive data (e.g. a session key for a descendant node). The rules for determining the CTK used to encrypt sensitive TLVs are the same as the rule for determining the CTK used for message authentication. Note that each relay AP must decrypt and re-encrypt TLVs in messages that are forwarded with Hopwise-Routing.

TLVs are defined to allow for node authentication, context management, and CTK and PTK management (i.e. path authentication and pre-registration).

There are five basic operations to establish, cache and manage security credentials; these are defined as TLV Group IDs in the following table:

| TLV Type ID | Value | Description |
| --- | --- | --- |
| WTLV_INIT_SESSION | 0x0101 | An IN node must initialize its CTK with the SWAN infrastructure. An MN node must initialize its BTK with the SWAN infrastructure. |
| WTLV_IN_SECURE_CONTEXT_REQ | 0x0102 | IN node CTK refresh |
| WTLV_UPDATE_RN | 0x0103 | Update of MNs PTK sequencing |
| WTLV_TRANSIENT_KEY | 0x0104 | Deliver a CTK |
| WTLV_AUTHENTICATOR | 0x0106 | Link authentication must be achieved on registration |
| WTLV_NSK | 0x0107 | MN Authenticator must retrieve NSK from associated AP, since key is statically configured |
| WTLV_MIC | 0x0108 | Generic MIC that can be embedded in messages or TLVs |
| WTLV_MN_SEC_CONTEXT | 0x0109 | TLV used to forward required MN security credentials |
| WTLV_IN_SECURE_CONTEXT_REPLY | 0x010a | TLV used to deliver IN CTKs |
| WTLV_MN_SECURE_CONTEXT_REQ | 0x010b | IN's request for MN's credentials |
| WTLV_MN_SECURE_CONTEXT_REPLY | 0x010c | IA's response for request of MN cache |
| WTLV_EAP_ID | 0x010d | EAP Identity |
| WTLV_CCKM_ASSOCIATE | 0x010e | Contents of 802.11 Association required for CCKM validation |
| WTLV_CCKM_REASSOCIATE | 0x010f | Contents of 802.11 Reassociation CCKM element |

The fourth type, WTLV_TRANSIENT_KEY is an embedded TLV used to deliver link keys within a WTLV_INIT_SESSION or WTLV_SECURE_CONTEXT_REPLY.

The Identity string provided within an EAP Identity request/response for MNs are cached at the SCM and used in the Secure Context TLVs to enable proper accounting at the AP. Since EAP Identity can be of arbitrary length a TLV is define as follows:

| TLV Type ID | Length | Identity (byte) Length | EAP Identity |
| --- | --- | --- | --- |
| WTLV_EAP_ID | TLV-length | 8 bytes | Nbytes |

WTLV_MIC

Another TLV used to secure WLCCP messages or TLVs is the WTLV_MIC. It is defined as:

| TLV Type ID | Length | Message Sequence Counter | MIC length (in bytes) value = 8 | MIC |
| --- | --- | --- | --- | --- |
| WTLV_MIC | TLV-length | 8 bytes | 2 bytes | 8 bytes |

The WTLV_MIC allows expansion of the MIC for some future use. Initially, the MIC length is preset to 8 bytes to define the MIC to be of length 8 bytes. The message sequence counter is used to define the number of WTLV_MICs generated using the corresponding CTK. This TLV will be appended to any WLCCP message whose Flags value includes the MIC Flag (0x0100). Messages that require a WTLV_MIC must define the fields covered by the HMAC-MD5 function.

Some WLCCP messages and TLVs that require a WTLV_MIC TLV:

WTLV_MIC is used to authenticate WLCCP_AAA messages for MN authentications only.

WTLV_TRANSIENT_KEYs must include a MIC to authenticate delivery of a CTK or when forwarding MN's keys.

WTLV_MN_SECURE_CONTEXT_REQ, WTLV_IN_SECURE_CONTEXT_REQ, WTLV_IN_SECURE_CONTEXT_REPLY and WTLV_MN_SECURE_CONTEXT_REPLY must be authenticated as they are augmented and propagated hop to hop.

WTLV_INIT_SESSION must be authenticated as they are augmented and propagated from the supplicant node to its authenticator.

WTLV_AUTHENTICATOR must include a MIC to ensure session liveness between a supplicant node and ancestor WTLV_INIT_SESSION: Path authentication and Pre-Registration Path authentication and Pre-registration are required to establish CTKs and BTKs, respectively. For IN nodes, CTKs must be established between the node and it's ancestors up to the root CM. The WTLV_INIT_SESSION TLV triggers the state for establishing fresh CTKs. On a successful WLTV_INIT_SESSION, sequence counters are initialized to zero and CTKs are established for all links between the requesting IN nodes and the IN Authenticator.

For MN nodes, only PTKs are required for an MN and its currently associated AP to consume. The key established between the MN and IA must be forwarded to the AP before PTKs can be mutually derived and consumed between MN and AP. However, a BTK must first be established for a CCKM MN. The WTLV_INIT_SESSION triggers the state for establishing fresh CTKs and BTKs. On a successful 802.1X authentication followed by a WTLV_INIT_SES-SION, sequence counters are initialized to zero and CTKs are established for all links between the requesting IN nodes and the IN Authenticator. Key sequence counters are only set to zero after a successful authentication, they are incremented every time a key is refreshed.

For a CCKM MN, a BTK and first PTK are established for securing data packets between the AP and MN; this of course, implies that for SCM standalone mode, the AP must have secured a CTK between itself and the SCM. That is, APs must first authenticate and register into the SWAN topology before it can pre-register or register MNs.

The WTLV_INIT_SESSION TLV is defined as follows:

| Field Name | Length | Description |
| --- | --- | --- |
| WTLV_INIT_SESSION | 2 | TLV Type |
| TLV Length | 2 | TLV length |
| Reserved | 1 | Reserved for byte alignment |
| Path Length | 1 | Number of Ancestors between Supplicant and IN Authenticator |
| Optional TLV(s) | N | Different TLVs must be included depending on the State and direction specified |

Since TLVs can vary in length, each TLV is preceded by an offset to indicate the next TLV length or the offset to the next TLV. An offset of 0 (zero) indicates the end, e.g. no more TLVs.

WTLV_INIT_SESSION for MNs

When MNs successfully authenticate into the network, the MN Authenticator will cache it's NSK and other relevant security credentials. If CCKM is the negotiated Authenticated Key Management selector, the MN Authenticator must respond with an EAPOL Key to the MN and trigger establishment of the KRK and BTK.

The response from the MN provides a $Nonce_{MN}$ and the negotiated security elements for which the AP can validate. However, the MN Authenticator must also validate some of these credentials to ensure that no VLAN hopping occurs.

For an inbound MN pre-registration request, the WTLV_INIT_SESSION includes a Secure Context TLV that includes the AP's identity as the Destination-ID and the negotiated 802.11 security information element (RSNIE) The SSID is also included in the Secure Context request by the MN and checked by the MN Authenticator to ensure that the MN is not hopping VLANs and thus breaching security. The Secure Context's Nonce must be provided by the MN as it serves as the keying material used to derive the KRK and BTK.

The WTLV_INIT_SESSION generated by the AP (on behalf of the MN) is defined as:

| Field Name | Length | Description |
| --- | --- | --- |
| WTLV_INIT_SESSION | 2 | TLV Type |
| TLV Length | 2 | TLV length |
| Reserved | 1 | 0 |
| Path Length | 1 | Number of Ancestors between Supplicant and IN Authenticator |

-continued

| Field Name | Length | Description |
| --- | --- | --- |
| SECURE_CONTEXT TLV | N | MN_SECURE_CONTEXT is embedded with SID = MN-ID and DID = AP-ID, include RSNIE |

If the MN has negotiated CCKM then it must have also provided a nonce, which is embedded in the WTLV_MN_SECURE_CONTEXT_REQ. The AP should trigger an error if the MN does not provide a nonce.

If the MN has negotiated SSN or legacy systems, the AP must obtain only the NSK. However, if the MN has negotiated CCKM then the MN Authenticator must derive and deliver the BTK to the AP and cache the KRK. Thus, on a response, the MN Authenticator must deliver the key (NSK or BTK) to the AP, embedded in the MN_SECURE_CONTEXT_TLV. Since it is an MN requesting such a key, the MN Authenticator will omit the WTLV_TRANSIENT_KEY normally used to deliver the NSK or BTK to the MN. This step is redundant and unnecessary as the MN has already mutually derived this key as well as it need not be aware what is behind the AP.

1.1.1.1.1.1 WTLV_INIT_SESSION for INs

Path authentication and initialization of CTKs for IN nodes presumes that the IN's ancestors have successfully registered into the SWAN infrastructure. Path authentication is initiated with a Path-Init request that includes a WTLV_INIT_SESSION TLV of the form:

| Field Name | Length | Description |
| --- | --- | --- |
| WTLV_INIT_SESSION | 2 | TLV Type |
| TLV Length | 2 | TLV length |
| Reserved | 1 | 0 |
| Path Length | 1 | 0 |
| Secure Context Request for IN-IA TLV | N | WTLV_IN_SECURE_CONTEXT_REQ SID = IN, DID = IA |

As the WLCCP Path-Init request is forwarded to the IA, the Supplicant's ancestors will in turn request a key to protect the link between it and the requesting IN by embedding their WTLV_SECURE_CONTEXT_REQ:

| Field Name | Length | Description |
| --- | --- | --- |
| WTLV_INIT_SESSION | 2 | TLV Type |
| TLV Length | 2 | TLV length |
| Reserved | 1 | 0 |
| Path Length | 1 | 0 |
| Secure Context Request for IN-IA TLV | N | WTLV_IN_SECURE_CONTEXT_REQ SID = IN, DID = IA |
| Secure Context Request for Ancestor[i] TLV | M | WTLV_IN_SECURE_CONTEXT_REQ SID = IN, DID = Ancestor[i] |
| . . . continued list of Secure Context TLVs | | |

As the inbound WTLV_INIT_SESSION request augments WTLV_IN_SECURE_CONTEXT_REQs, the outbound reply will consume these TLVs and respond with WTLV_IN_SECURE_CONTEXT_REPLYs and update them with the CTK and a WTLV_TRANSIENT_KEY to be consumed by the Supplicant node. FIG. 33 is an example of how a node initializes the CTKs between itself and it's ancestry path up to the IA.

The Path Length field must incremented by one by each ancestor as the request is forwarded to the IA. The IA must return this value and confirm that there are Path Length WTLV_SECURE_CONTEXT_REQ_TLVs in the WTLV_INIT_SESSION. If too many or too few are provided then it must discard this request.

Each ancestor must identify itself and provide it's corresponding WTLV_SECURE_CONTEXT_REQ. The IA in turn will convert each requesting Secure Context TLV into a WTLV_SECURE_CONTEXT_REPLY to deliver the appropriate CTKs. Since keys are delivered within WTLV_SECURE_CONTEXT_REPLYs, the responding Secure Context TLVs must be both encrypted and MIC'ed.

WTLV_TRANSIENT_KEY: delivering keys

A key must be distributed securely. To assure this, the key is encrypted using a shared secret between the source and intended receiver. The TLV is encapsulated as follows:

| Type | Length | KSC | IN-ID | IN-ID | Key | MIC TLV |
|---|---|---|---|---|---|---|
| WTLV_TRANSIENT_KEY | TLV len | Key sequence counter | Source IN ID | Destination IN ID | $E_{SUP\_DST}$ | KEY-$MIC_{SUP\_DST}$ |

The TLV implies the source IN identifier from the overall WLCCP message to avoid too much redundancy. The encryption uses RC4 to encrypt the key only:

$E_{SUP\_DST}$=Encrypted Key $RC4$
($MSC \| CTK_{Authenticator\_IN-ID}$,
$CTK_{IN-ID\_SupplicantID}$)

The key, $CTK_{IN-ID\_SupplicantID}$, is encrypted using the key established between the IN Authenticator and the destination IN. The delivered key, $CTK_{IN-ID\_SupplicantID}$, is used to protect data between the destination IN and the Supplicant. For the supplicant node, since it is the leaf node that is yet to register, the NSK is used to deliver its CTK.

The key delivery for protecting messages between the AP and MN is the same as that defined above, with the difference being that the BTK is the delivered key along with the Rekey sequence number to the AP only:

$E_{AP}$=Encrypted Key $RC4(MSC \| CTK_{Authenticator\_AP}$,
$BTK_{MN}$)

The authentication of the TLV includes fields excluded in the WTLV_TRANSIENT_KEY but embedded in the overall WLCCP message. The MIC for an IN node response is computed as follows:

KEY-$MIC_{SUP\_DST}$=HMAC-MD
$5(CTK_{Authenticator\_IN-ID}$, KSC, SNonce,
$ANonce_i$,
Supplicant-ID, Destination-IN_ID, $E_{SUP}$_DST)

The responding MIC for an AP request for a BTK is computed as follows:

KEY-$MIC_{AP}$=HMAC-MD5($CTK_{Authenticator\_AP}$, KSC,
SNonce, $ANonce_i$, Supplicant-ID, Destination-
IN_ID, $E_{AP}$)

A counter, KSC, for all keys delivered to the Destination IN must be kept and used between the destination IN and the IN Authenticator to prevent replays. Similarly, if the keys are delivered to the AP for protecting AP to MN communications, it must also retain a count for such keys in its KSC.

Secure Context TLVs

Secure Context TLVs are used to establish link keys between the Supplicant node and its ancestor. Since requesting Secure Context TLVs do not include keys but other pertinent information to carry the requests, the Secure Context TLVs are split into a requesting and a responding Secure Context TLV. Further, since MNs define a key management type and are proxied by the AP, the Secure Context TLV for requesting MN security credentials are distinguished from IN secure contexts.

The requesting MN Secure Context TLV is defined as:

| Field Name | Length | Description |
|---|---|---|
| WTLV_MN_SECURE_CONTEXT_REQ | 2 | TLV Type |
| TLV Length | 2 | TLV length |
| Key Sequence | 4 | Number of times |

-continued

| Field Name | Length | Description |
|---|---|---|
| Counter (KSC) | | this key has been updated |
| Destination-ID (DID) | 8 | Ancestor requesting to share key with SID |
| Supplicant-ID (SID) | 8 | Requesting (Supplicant) node |
| Reserved | 1 | Used for byte alignment |
| Key Management Type | 1 | 0 - none (NSK is not forwarded) 1 - CCKM 2 - 802.1X Legacy systems (doing an effective re-authentication) forwards the NSK. 3 - SSN (this field is ignored when establishing IN path CTKs) |
| Nonce | 16 | Random value |
| EAP ID | Q | EAP ID TLV |
| SSID | L | SSID TLV |
| RSNIE | P | Propagate the $RSNIE_{MN}$ TLV for authentication |
| Optional (CCKM) TLVs | N | If CCKM is the negotiated Key Management, then Associate or Reassociate TLVs must be provided |
| MIC | M | WTLV_MIC for this TLV |

Optional TLVs are also provided for when CCKM is the negotiated key management and thus further work is required by the MN authenticator to validate the EAPOL Key message on association or the Reassociation CCKM element.

The requesting IN Secure Context TLV is defined as:

| Field Name | Length | Description |
| --- | --- | --- |
| WTLV_IN_SECURE_CONTEXT_REQ | 2 | TLV Type |
| TLV Length | 2 | TLV length |
| Key Sequence Counter (KSC) | 4 | Number of times this key has been updated |
| Destination-ID (DID) | 8 | Ancestor requesting to share key with SID |
| Supplicant-ID (SID) | 8 | Requesting (Supplicant) node |
| Nonce | 16 | Random value |
| MIC | M | WTLV_MIC for this TLV |

A responding MN Secure Context TLV is defined as follows:

| Field Name | Length | Description |
| --- | --- | --- |
| WTLV_MN_SECURE_CONTEXT_REPLY | 2 | TLV Type |
| TLV Length | 2 | TLV length |
| Key Sequence Counter (KSC) | 4 | Number of times this key has been updated |
| Destination-ID (DID) | 8 | Ancestor requesting to share key with SID |
| Supplicant-ID (SID) | 8 | Requesting (Supplicant) node |
| Nonce | 16 | Random value |
| Session Timeout | 4 | Remaining session timeout for MN |
| EAP ID | Q | EAP ID TLV |
| Rx Key Length | 2 | Rx key length |
| Rx Key | 32 | Corresponds to one of CTK, BTK or NSK |
| Optional Tx Key Length | 2 | Tx key length |
| Optional Tx Key | M | Provided only after successful authentication when AS returns a Tx Key as a result of a successful authentication |
| Optional MN Cached Credentials | P | Provided only during MN registration to forward cached credentials from IA to outbound nodes (SCM). |
| MIC | Q | WTLV-MIC for this TLV |

The responding MN Secure Context TLV will ultimately deliver Key(s) to the Supplicant node. Depending on the Supplicant node (SID) type, optional fields are included. The succeeding subsections further describe the required fields based on the requests.

When a MN roams, WLCCP pre-registration is used to request security credentials. The parent AP sends a Pre-registration Request message to the SCM to request security credentials. [The request may be forwarded inbound, as required, if the security credentials are not cached in the SCM.] The Pre-registration request includes a WTLV_SECURE_CONTEXT REQ TLV. The parent AP must be authenticated and have an established CTK between itself and the SCM (i.e. via Path Authentication).

The WTLV_SECURE_CONTEXT_REPLY, contained in a Pre-registration Reply, is used to deliver keys and thus the TLV must be encrypted as follows:

$$RC4'(MSC\|CTK_{IN-IA}, \text{Key Management Type}\|\text{Nonce}\|\text{<included fields in } TLV\text{>})$$

Similarly, during a response the TLV must be authenticated as follows:

$$MIC=HMAC\text{-}MD5(CTK_{IN-IA}, DST\text{-}ID\|SRC\text{-}ID\|KSC\|\text{Nonce}\|\text{<included fields in } TLV\text{>})$$

A responding IN Secure Context TLV is defined as follows:

| Field Name | Length | Description |
| --- | --- | --- |
| WTLV_IN_SECURE_CONTEXT_REPLY | 2 | TLV Type |
| TLV Length | 2 | TLV length |
| Key Sequence Counter (KSC) | 4 | Number of times this key has been updated |
| Destination-ID (DID) | 8 | Ancestor requesting to share key with SID |
| Supplicant-ID (SID) | 8 | Requesting (Supplicant) node |
| Nonce | 16 | Random value |
| Session Timeout | 4 | Remaining session timeout for MN |
| CTK Key Length | 2 | Rx key length |
| CTK Key | 32 | Corresponds to one of CTK, BTK or NSK |
| Optional Key TLV | N | WTLV_TRANSIENT_KEY delivering the new CTK to the SID. This field must be provided when establishing CTKs between Ins. It is absent when the SID IN is mutually deriving keys with its IA. |
| MIC | Q | WTLV-MIC for this TLV |

Propogating MN Association information for CCKM

The WTLV_CCKM_ASSOCIATE element is used to forward the second EAPOL Key message from the MN to the MN Authenticator as it is MIC'ed with the KRK, which only the MN Authenticator holds. The EAPOL Key message must be validated by the MN Authenticator. Thus a TLV is defined to propage the EAPOL Key message for MIC validation as follows:

| Field Name | Length | Description |
| --- | --- | --- |
| WTLV_CCKM_ASSOCIATE | 2 | TLV Type |
| TLV Length | 2 | TLV length |
| EAPOL message length | 4 | Byte length of EAPOL message |
| EAPOL message | N | EAPOL message as received by the AP and forwarded to the MN Authenticator |
| MIC-KRK | P | MIC TLV containing the EAPOL MIC using the KRK |

Propogating MN's Reassociation CCKM element.

The WTLV_CCKM_REASSOCIATE element is used to forward the timestamp and MIC portions of the CCKM information element provided by the MN in the reassociation message. When CCKM is in effect, the MN includes a CCKM element in the Reassociation message of the format:

| Element ID | Length | OUI | OUI Type | Timestamp | RN | MIC$_{MN}$ |
| --- | --- | --- | --- | --- | --- | --- |
| 1 byte | 1 byte | 3 bytes | 1 byte | 8 bytes | 4 bytes | 8 bytes |

The AP places the RN value as the KSC field in the MN Secure Context Request TLV.

In addition, it propagates this element in the CCKM Reassociate TLV as follows:

| Field Name | Length | Description |
|---|---|---|
| WTLV_CCKM_REASSOCIATE | 2 | TLV Type |
| TLV Length | 2 | TLV length |
| Element ID | 1 | Must be 0x9c |
| Element ID Length | 1 | Should be 24 (bytes) |
| OUI | 3 | Must be 00:40:96 |
| OUI Type | 1 | Must be 0 |
| Timestamp | 8 | TSF timer that must be validated by the AP, forwarded for authentication |
| RN | 4 | Must be the same as KSC and validated by MN authenticator |
| MIC | P | MIC TLV containing the HMAC-MD5(KRK, MN-ID‖BSSID‖RSNIE$_{MN}$‖Timestamp‖RN) |

IN to IN CTK requests using WTLV_SECURE_CONTEXT

IN nodes can request subsequent CTKs via a WTLV_SECURE_CONTEXT request. WTLV_SECURE_CONTEXT requests a new CTK for the link specified between the Supplicant and IN. The request format is defined as follows:

| Field Name | Length | Description |
|---|---|---|
| WTLV_IN_SECURE_CONTEXT_REQ | 2 | TLV Type |
| TLV Length | 2 | TLV length |
| Key Sequence Counter (KSC) | 4 | A replay counter used to keep state of the rekeys for the link between SID and DID |
| Destination-ID (DID) | 8 | Ancestor with whom IN wants to rekey |
| Supplicant-ID (SID) | 8 | Requesting IN |
| Reserved | 1 | Used for byte alignment |
| Key Management Type | 1 | For IN the value is always set to 0. |
| Nonce | 16 | Random value provided by the DID |
| MIC | M | WTLV_MIC for this TLV |

The IN Authenticator will deliver a CTK for protection of WLCCP messages between the Supplicant and IN-ID. The delivery mechanism to the Supplicant is through the use of WLTV_TRANSIENT_KEY while the key can be delivered in the encrypted WTLV_SECURE_CONTEXT to the Destination (ancestor to the Supplicant) directly.

The WTLV_SECURE_CONTEXT response must encrypt the Nonce, Key and Key TLV as well as append a WTLV_MIC.

| Field Name | Length | Description |
|---|---|---|
| WTLV_IN_SECURE_CONTEXT_REPLY | 2 | TLV Type |
| TLV Length | 2 | TLV length |
| Key Sequence Counter (KSC) | 4 | Number of times this key has been updated |
| Destination-ID (DID) | 8 | Ancestor requesting to share key with SID |
| Supplicant-ID (SID) | 8 | Requesting IN |
| Nonce | 16 | Random value provided by DID |
| Session Timeout | 4 | Remaining session timeout for SID |
| CTK Length | 2 | CTK length should be 32 |
| CTK | 32 | CTK shared between SID and DID |
| Key TLV | N | WTLV_TRANSIENT_KEY delivering the new CTK to the SID. |
| MIC | Q | WTLV-MIC for this TLV |

IN to IA CTK requests using WTLV_SECURE_CONTEXT.

Both the IN and IA must mutually derive their link CTK since:

- keys can not readily be delivered in a clear channel
- the NSK provided at authentication may be not meet the freshness requirement
- the key length requirements to protect messages and TLVs may not be satisfied The supplicant IN must include a Nonce in the requesting WTLV_SECURE_CONTEXT_REQ so that the IA can then derive a CTK and use it to authenticate the reply. The Reply message will include the IA's Nonce and it's WTLV_SECURE_CONTEXT_REPLY MIC and an extra WTLV_MIC that serves as the authenticator to the supplicant IN. The final authentication and liveness proof of this key refresh must be completed with at WTLV_AUTHENTICATOR.

Both the IN and IA can mutually derive the CTK as follows:

$$CTK_{IN\text{-}IA}=PRF\text{-}256(NSK, \text{``SWAN IN-}IA \text{ link Context Transfer Key Derivation''}\|IN\text{-}ID\|IA\text{-}ID\|KSC\|Nonce_{AP}\|Nonce_{SCM})$$

The defined PRF-256 function is based on HMAC-SHA1 and allows the NSK to be stretched to 256 and ensure freshness by having each node contribute fresh key material.

The extra MIC computed for the IN to validate is defined as:

$$MIC_{STATE2}=HMAC\text{-}MD5(CTK_{IN\text{-}IA}, DST\text{-}ID\|SRC\text{-}ID\|KSC\|Nonce_{IN}\|Nonce_{AP})$$

Note however that while the reply is not sending the Nonce$_{IN}$ in the clear, it must authenticate the value of the Nonce$_{IN}$. Also, since the key is mutually derived, there is no WTLV_TRANSIENT_KEY delivered, this TLV is replaced by the authenticating MIC as defined above.

WTLV_SECURE_CONTEXT for Initial Associations.

When a CCKM-capable MN first associates and 802.1X authenticates into the network, the SCM initiates a 4-way handshake with the MN to establish the KRK and BTK. The messages are forwarded to the MN via the AP, with the AP decapsulating the WLCCP header and forwarding the EAPOL Key messages to the MN. On receipt of the 2$^{nd}$ message from the MN to the SCM, the AP triggers a pre-registration request to request forwarding of the BTK. Details of this exchange depicted in the Fast Handoff Specification[8].

The pre-registration uses a WTLV_INIT_SESSION that embeds a Secure Context TLV forwarding the following MN information:

| Field Name | Length | Description |
|---|---|---|
| WTLV_MN_SECURE_CONTEXT_REQ | 2 | TLV Type |
| TLV Length | 2 | TLV length |
| Key Sequence | 4 | should be set to 1 |

| Field Name | Length | Description |
|---|---|---|
| Counter (KSC) | | |
| Destination-ID (DID) | 8 | AP ID |
| Supplicant-ID (SID) | 8 | MN ID |
| Reserved | 1 | Used for byte alignment |
| Key Management Type | 1 | 0 - none (NSK is not forwarded)<br>1 - CCKM<br>2 - 802.1X Legacy systems (doing an effective re-authentication) forwards the NSK.<br>3 - SSN |
| Nonce | 16 | Nonce$_{MN}$ required to derive KRK & BTK |
| SSID | L | SSID TLV |
| RSNIE | P | Propagate the RSNIE$_{MN}$ TLV for authentication |
| Optional TLV | M | For CCKM, include WTLV_CCKM_ASSOCIATE |
| MIC | N | WTLV_MIC for this TLV |

If Key Management Type 1 (CCKM), the Pre-Registration request includes the above TLV to propagate the Nonce$_{MN}$ contributed by the MN as well as the MIC TLV used to prove liveness to the SCM that the MN has correctly derived the KRK. The pre-registration concludes with a reply with the Secure Context TLV as:

| Field Name | Length | Description |
|---|---|---|
| WTLV_MN_SECURE_CONTEXT_REPLY | 2 | TLV Type |
| TLV Length | 2 | TLV length |
| Key Sequence Counter (KSC) | 4 | Should be 1 (RN value) |
| Destination-ID (DID) | 8 | AP-ID |
| Supplicant-ID (SID) | 8 | MN-ID |
| Nonce | 16 | reaffirm (resend) the 1$^{st}$ msg Nonce$_{SCM}$ |
| Session Timeout | 4 | Remaining session timeout for MN |
| Optional Rx Key Length | 2 | Must be = 32 |
| Optional Rx Key | 32 | BTK |
| Optional Tx Key Length | 2 | Should be = 0 |
| Optional Tx Key | 0 | No Tx Key is applicable |
| MIC | N | WTLV-MIC for this TLV |

If Key Management Type=2 or 3, then the MN Authenticator will remove the MN's credential after it sends a Pre-Registration Reply. That is, the MN Authenticator will not cache nor will it propagate the PMK to any node other than to the immediate AP. The Pre-registration reply terminates by forwarding the PMK to the AP using the following Secure Context TLV:

| Field Name | Length | Description |
|---|---|---|
| WTLV_MN_SECURE_CONTEXT_REPLY | 2 | TLV Type |
| TLV Length | 2 | TLV length |
| Key Sequence Counter (KSC) | 4 | Value is ignored |
| Destination-ID (DID) | 8 | AP-ID |
| Supplicant-ID (SID) | 8 | MN-ID |
| Nonce | 16 | Value is unused (ignored) |
| Session Timeout | 4 | Remaining session timeout for MN |
| Optional Rx Key Length | 2 | Reflects value based on 802.1X Auth Type |
| Optional Rx Key | 32 | Key sent in MS-MPPE Rx Key |
| Optional Tx Key Length | 2 | Reflects value based on 802.1x Auth Type |
| Optional Tx Key | 0 | Key sent in MS-MPPE Tx Key |
| MIC | N | WTLV-MIC for this TLV |

Note that there is a second Optional Tx Key Length, for authentication types that provide both a Rx and Tx key in the MS-MPPE Radius attribute. All authentication types will provide an Rx key, the Tx key is optional and it's length will be zero when it is not provided by the Authentication Server. Note that in any of the negotiated Key Management types, the VLAN is forwarded to the AP as the VLAN field provided in the Pre-Registration message.

The WTLV_SECURE_CONTEXT replies are encrypted from the WTLV_SECURE_CONTEXT Nonce field through the end (up to but excluding) the WTLV-MIC using the CTK established between the AP and MN Authenticator. Similarly, the same fields are authenticated using HMAC-MD5.

WTLV_SECURE_CONTEXT for MN reassocations

When a MN roams, the new parent AP must initiate pre-registration to request the MN's WTLV_SECURE_CONTEXT. To facilitate the context transfer and minimize transactions between AP and MN, CCKM provides a base key, BTK to generate the link key, PTK. The request format is defined as follows:

| Field Name | Length | Description |
|---|---|---|
| WTLV_MN_SECURE_CONTEXT_REQ | 2 | TLV Type |
| TLV Length | 2 | TLV length |
| Key Sequence Counter (KSC) | 4 | A replay counter used to keep state of the rekeys for the link between SID and DID |
| Destination-ID (DID) | 8 | AP ID |
| Supplicant-ID (SID) | 8 | MN ID |
| Reserved | 1 | Used for byte alignment |
| Key Management Type | 1 | 0 - none (NSK is not forwarded)<br>1 - CCKM<br>2 - 802.1X Legacy systems<br>3 - SSN |
| Nonce | 16 | Random value provided by the DID |
| SSID | L | SSID TLV |
| RSNIE | P | Propagate the RSNIE$_{MN}$ for authentication if State = 0 |
| Optional (CCKM) TLV | M | For CCKM, include WTLV_CCKM_REASSOCIATE |
| MIC | N | SECURE CONTEXT MIC TLV |

The new AP identifies the MN by using its MAC address. The BSSID, RN and MIC$_{MN}$ must be provided by the MN. The RN is encapsulated as the KSC. The MIC is an HMAC-MD5 operation over the entire WTLV_MN_SECURE_CONTEXT_REQ message, beginning with the WLTV_MN_SECURE_CONTEXT_REQ type through and including the MIC$_{MN}$. The MIC$_{MN}$ must be provided if State=0; this signifies that the MN has negotiated CCKM and it is authenticating itself with the MN Authenticator via the specified MIC$_{MN}$.

The SSID serves as a means for the MN Authenticator to validate security credentials for the MN and ensure that the MN is not switching to a prohibited VLAN. While the MN Authenticator can effectively match the security credentials, it is up to the AP to decide on policy; e.g. the AP must define what state it will transition to upon a failure. The MN Authenticator must also validate the MN's authorization by computing and matching the provided $MIC_{MN}$. Finally, it must also ensure that the session timeout for the MN has not expired. On a successful response, the MN Authenticator will safely deliver the BTK to the new AP and affect a switch from old AP to new AP. That is, the MN's registration entry will reflect the new AP's BSSID and the RN will be incremented by one. The response TLV is defined as follows:

| Field Name | Length | Description |
| --- | --- | --- |
| WTLV_MN_SECURE_CONTEXT_REPLY | 2 | TLV Type |
| TLV Length | 2 | TLV length |
| Key Sequence Counter (KSC) | 4 | RN value |
| Destination-ID (DID) | 8 | Ancestor with whom IN wants to rekey |
| Supplicant-ID (SID) | 8 | Requesting IN |
| Nonce | 16 | Random value provided by the DID |
| Session Timeout | 4 | Remaining session timeout for MN |
| Optional Rx Key Length | 2 | Length of key delivered (in bytes) |
| Optional Rx Key | Q/32 | BTK if Key Management type = 1 (Q = 32) NSK or MS-MPPE Rx Key otherwise |
| Optional Tx Key Length | 2 | 0 if Key management type = 1 Tx Key length otherwise |
| Optional Tx Key | Key len | MS-MPPE Tx Key otherwise |
| Optional MN Credential TLV | P | MN's cached credentials |
| MIC | N | WTLV-MIC for SECURE_CONTEXT |

The WTLV_MN_SECURE_CONTEXT_REPLY response is encrypted from the WTLV_MN_SECURE_CONTEXT_REPLYNonce field through the end (up to but excluding) the WTLV-MIC using the CTK established between the AP and MN Authenticator. Similarly, the same fields are authenticated using HMAC-MD5.

Since the MN Authenticator provides the MNs session timeout to the active AP, it is up to the AP to enforce a re-authentication prior to the expiration of the session timeout.

If the MN Authenticator fails in any of the checks required for a secure context transfer, then the response will populate the BTK field with all zeroes and include one of the following status values:

| Status | Value | Description |
| --- | --- | --- |
| NO CONTEXT | 1 | MN does not have cached credentials (no registration entry) |
| REPLAY | 2 | RN is out of sequence |
| SSID | 3 | Invalid SSID |
| SESSION EXPIRED | 5 | MN's session has expired |
| BAD MIC | 6 | MN's MIC did not match Authenticator's computed MIC |

MN's credentials are forwarded during a MN registration. If the credentials are being forwarded, then no optional key is forwarded, rather a new TLV holding most of the MN's cached credentials are propagated to the MN's ancestry infrastructure nodes, terminating at the SCM. In the standalone mode, the SCM does not forward credentials unless predictive roaming is (statically) configured at the time SCM or LCM is initialized. The MNs credentials are forwarded using the WTLV_MN_SEC_CONTEXT.

WTLV_MN_SEC_CONTEXT.

This TLV is only used during a MN Registration Reply to forward it's credentials from the MN Authenticator to the MN's ancestors excluding the AP (unless predictive roaming has been configured). For example, if the LCM is the MN Authenticator, the LCM will forward the MN credentials to the SCM.

The TLV is defined as follows:

| Field | Length (bytes) | Description |
| --- | --- | --- |
| WTLV_MN_SEC_CONTEXT | 2 | TLV Type |
| TLV Length | 2 | TLV Length |
| State | 1 | Indicates whether this node is Active or not |
| STA Addr | 8 | WLCCP Node identifier: MN's MAC address |
| Authentication Type | 1 | EAP Type used to authenticate |
| Key Management Type | 1 | Type of (or no) key management negotiated. Valid values are: 0 - none (NSK is not forwarded) 1 - CCKM 2 - 802.1X Legacy systems 3 - SSN |
| Session Timeout | 4 | Session expiration time provided by the Radius Access Accept |
| KRK | 16 | Key Request Key used to authenticate MNs request for context transfers |
| BTK | 32 | Base Transient Key used to derive PTKs |
| RN | 8 | Rekey number used to track how many PTKs have been derived from BTK |
| SSID | L | MN's associated SSID TLV |
| VLAN ID | 2 | MN's associated VLAN assignment |
| BSSID | 6 | Defines the current associated AP |
| Cipher | 2 | Negotiated cipher, values are: 0x0000 - none |

-continued

| Field | Length (bytes) | Description |
|---|---|---|
| | | 0x0001 - WEP |
| | | 0x0002 - TKIP |
| | | 0x0003 - AES-OCB |
| | | 0x0004 - AES-CCMP |
| | | 0x0005 - CKIP |
| | | 0xff<value> - Vendor specific |
| NSK Length | 2 | NSK length in bytes (e.g. Rx MS-MPPE key) |
| NSK | N | The Rx key resulting from a successful 802.1X EAP authentication |
| Tx Key Length | 2 | Tx key length (if sent by Radius) |
| Tx Key | P | The Tx key resulting from a successful 802.1X EAP authentication |

This TLV carries highly sensitive information and thus must be encrypted using the CTK shared between the MN Authenticator and the destined IN. In addition, the Secure Context TLV that embeds the MN Secure Credentials TLV must be authenticated, e.g. a TLV MIC must also be used. The MN Secure Credentials TLV is encrypted from the State field through the Cipher field.

WTLV_UPDATE_RN: updating sequencing for PTKs.

This TLV is only valid between APs and MN Authenticators as it is used to update the key sequencing between the AP and MN. Since APs are capable of affecting PTK rekeys, the SCM must be appraised of any key refreshes as they occur. A request for update but be sent from the AP to MN Authenticator as follows:

| Type | Len | 8 bytes | 6 bytes | 6 bytes | 4 bytes | 8 bytes |
|---|---|---|---|---|---|---|
| WTLV_KEY_UPDATE | TLV len | MSC | BSSID | MN MAC Addr | RN | MIC$_{AP}$ |

The WTLV_KEY_UPDATE message is encrypted and authenticated using the CTK established between the AP and MN Authenticator.

The MN Authenticator must correctly decrypt and authenticate this request for a successful update and response. That is, if the message can not be decrypted, authenticated nor is the RN greater than the current RN, the MN authenticator discards this message and no update is done. However, the response must provide a status to indicate how it failed. The response is defined as follows:

| Type | Len | 8 bytes | 6 bytes | 6 bytes | 4 bytes | 8 bytes |
|---|---|---|---|---|---|---|
| WTLV_KEY_UPDATE | TLV len | MSC | BSSID | MN MAC Addr | RN | MIC$_{AP}$ |

If the update request fails, it will also include a status value from the following table:

| Status | Value | Description |
|---|---|---|
| BAD MIC | 1 | Computed MIC did not match TLV's MIC |
| REPLAY | 2 | RN provided is out of sequence and considered a replay |
| INVALID BSSID | 3 | The specified MN is not associated to given BSSID |
| NO MN | 4 | The specified MN is not registered |

WTLV_NSK

The MN Authenticator may need to request the NSK of the associated AP upon a successful EAP authentication. For legacy MN nodes that only support static WEP keys and/or 802.1X authentication types (such as EAP-MD5) that do not provide dynamic keys, the MN Authenticator must use the AP statically configured NSK for the negotiated SSID/VLAN. To achieve this, a new WTLV is defined to allow the MN Authenticator request the NSK of the associated AP.

The Requesting TLV is defined as:

| Type | Length | 8 bytes | MIC |
|---|---|---|---|
| WTLV_NSK | TLV length | MN-ID | WTLV-MIC |

The Reply TLV is defined as:

| Type | Length | 8 bytes | NSK | MIC |
|---|---|---|---|---|
| WTLV_NSK | TLV length | MN-ID | WTLV_TRANSIENT_KEY | WTLV_MIC |

This TLV is only required when pre-shared keys and authentication types such as EAP-MD5 are used and result in using statically configured keys. While this use is highly discouraged due to insecurities, this feature is presented to better support legacy systems and allow for a migration path. The key retrieval would be achieved by using a WLCCP_CONTEXT request/reply exchange between the MN and AP.

WTLV_AUTHENTICATOR.

A WTLV_AUTHENTICATOR is required to ensure liveness of a CTK between a link. This is effectively the means by which the Originating IN authenticates with it's ancestor. While any of the link endpoints can request this in a pre-registration request response. It is expected to follow post a Secure Context (or WTLV_INIT_SESSION) request and reply, typically during registration. The TLV is defined as follows:

| Field | Length | Description |
|---|---|---|
| WTLV_ AUTHENTICATOR | 2 | |
| TLV Length | 2 | |
| DST-ID | 8 | Destination IN-ID that must prove it is using the same $CTK_{SRC-DST}$ as the SRC-ID to protect the (SRC-ID, DST-ID) link. |
| SRC-ID | 8 | Originating IN-ID requesting liveness proof |
| KSC | 4 | Key sequence counter to serve as a replay protector. This value must match the value used during a Secure Context request/reply exchange |
| Reserved | 1 | |
| Status | 1 | Ignored on the request message but can be set on a reply. A non-zero value indicates that the link does not share the same CTK or a replay was detected. |
| Nonce | 16 | A random challenge used to prove liveness. The originator must provide a 16 byte random value |
| MIC | ML | WTLV_MIC authenticating this TLV |

The Originating MIC is computed as follows:

$$MIC_{request} = HMAC\text{-}MD5(CTK_{SRC-DST}, SRC\text{-}ID\|DST\text{-}ID\|KSC\|Nonce_{SRC})$$

The Destination must increment the provided $Nonce_{SRC}$ and compute it's MIC as follows:

$$Nonce_{DST} = Nonce_{SRC} + 1$$

$$MIC_{reply} = HMAC\text{-}MD5(CTK_{SRC-DST}, SRC\text{-}ID\|DST\text{-}ID\|KSC\|Nonce_{DST})$$

Both Request and Reply WTLV_AUTHENTICATOR must encrypt the TLV as follows:

$$RC4'(MSC\|CTK_{SRC-DST}, Status\|Nonce)$$

Replacing the plaintext fields with their encrypted values. (Note, the first 256 bytes of the RC4 random stream must first be deleted before XOR'ing with plaintext).

WTLV_RSNIE.

The security policy negotiated by the MN must be propagated to the SCM when:

MN successfully negotiated CCKM and is currently associated to an AP

MN roams from current AP to new AP and establishes reassociation to new AP

During the reassociation, the RSNIE is included in the signature element included in the reassociation message. Thus the RSNIE must be propagated to the SCM for validation. As the RSNIE varies in length, it's TLV is defined as follows:

| Field Name | Length | Description |
|---|---|---|
| WTLV_RSNIE | 2 | TLV Type |
| TLV | 2 | TLV length |
| RSNIE Element | N | Contents of RSNIE as provided by the MN |

Lateral Message Authentication and Privacy

A "lateral" Context Request or Context Reply message is forwarded independently of the SWAN Topology Tree. The Originator and Responder may not be on the same Topology Tree branch; therefore, the Originator and Responder may not share a secret CTK. The Inbound and Outbound flags are set OFF in a lateral Context message.

A "lateralL-CTK" (L-CTK) shared by the Originator and Responder of a lateral Context message is used to authenticate the message and to encrypt any sensitive TLVs contained in the message. A common ancestor of the Originator and Responder functions as a trusted third party to generate a L-CTKL-CTK. The common ancestor uses the path CTK it shares with the Originator and the path CTK it shares with the Responder to securely deliver the L-CTKL-CTK to each node.

The common ancestor generates a "ticket" and a L-CTK. The L-CTK is encrypted with the path CTK shared by the common ancestor and the Originator. The ticket also contains the L-CTK and is encrypted with the path CTK shared by the common ancestor and the Responder. The L-CTK and ticket are delivered to the context transfer Originator in a WTLV_CTK_TICKET TLV.

The Originator includes the Node ID of the common ancestor, the ticket and an "authenticator" in a WTLV_AUTHEN_TICKET TLV in the lateral Context Request sent to the Responder. The Originator uses the L-CTK to generate the WTLV_MIC TLV used to authenticate the Context Request. The Responder decrypts the ticket with the path CTK it shares with the common ancestor and extracts the L-CTK. The Responder can then use the L-CTK to authenticate the message and to decrypt any encrypted TLVs. The Responder also uses the CTK to authenticate the Reply message and to encrypt any sensitive TLVs contained in the Reply.

The root CM is the common ancestor of all SWAN nodes; therefore, the root CM can establish a L-CTK for any two nodes. An Originator node can send a WTLV_TICKET_REQUEST TLV, in a Context Request message, to the root CM to request a L-CTK and ticket for a second Responder node. The root CM returns the ticket and the L-CTK in a WTLV_CTK_TICKET TLV in the Context Reply message.

If a MN roams from an old AP to a new AP it may be necessary to forward context information laterally from the old AP to the new AP, in a Context Request message. The nearest common ancestor CM can automatically deliver a L-CTK and a "ticket" for the new AP in the Deregistration Request message sent to the old AP. The old AP can use the L-CTK to generate a WTLV_MIC TLV and to encrypt any sensitive context information in the Context Request sent to the new AP, as described above.

A similar mechanism can be used to transfer context laterally from the "old LCM" to the "new LCM" when a MN roams to a new local control domain.

A Simple WLCCP Implementation (W1)

This section describes a simple single-subnet WLCCP implementation where the SCM for each subnet operates in SCM standalone mode and WLCCP is NOT used to update Layer 2 forwarding paths. The simple implementation includes the following components:

The SCM is the "root CM" in a standalone single subnet infrastructure.

AP and MN Initial Authentication

SCM Election and Advertisement

AP Path Authentication

Intra-subnet Security Context Transfer for MNs (i.e. MN Preregistration).

MN Fast Reauthentication

Simple AP and MN Registration. (WLCCP Registration does NOT establish Layer 2 forwarding paths.)

WLCCP Message Authentication and Privacy.

The SCM is the 802.1X Authenticator for both MNs and APs. EAPOL messages are relayed between the SCM and parent APs in WLCCP AAA messages.

The simple implementation does not support Layer 2 path updates, inter-subnet handoffs, or inter-subnet context transfer. The network topology does not include a CCM or LCMs. The existing Cisco DDP protocol is used to establish and delete layer-2 forwarding paths. DDP is also used for intra-subnet handoffs (i.e. when stations roam within a single subnet).

The simple implementation uses the following WLCCP message types:

SCM-Advertisement
Registration
Preregistration
AAA
Path-Init

The W1 Network Topology includes an SCM and APs in a single subnet. It also includes any MNs associated with those APs. Layer 2 path updates are not supported; fast-reauthentication of repeater APs is not supported; therefore, multihop AP-to-AP links are generally transparent to the W1 implementation.

The active SCM operates in subnet standalone mode in the simple WLCCP implementation.

The data structures and state variables required for the W1 implementation are the same as the General SCM Data Structures and State Variables. The SCM is the IN and MN 802.1X authenticator; therefore, it must maintain an Authenticated Node Table.

Each SCM Candidate, which is configured with a non-zero SCM Priority value, must participate in the SCM election protocol, as described in the section entitled "Active SCM Election.

The fields in SCM_Advertisement Reply messages are set as defined in the section entitled "Active SCM Election" with the following constraints:

The WTLV_ROOT_CM_INFO TLV contains the IPv4 address of the SCM.

W1—IN Authentication.

Each AP must mutually authenticate with the 802.1X Infrastructure Authenticator, which is the active SCM in the simple WLCCP implementation. The SCM advertises its IP address in the ROOT_CM_INFO TLV in SCM_Advertisement Reply messages. WLCCP IP-encapsulated Context Request and Reply messages are used to transport EAPOL authentication messages between the "Supplicant" AP and the 802.1X Authenticator. The AP/SCM mutual authentication process establishes a Network Session Key (NSK) that is shared by the Supplicant AP and the SCM. An AP must initiate Path Authentication with the SCM after it has successfully authenticated (and whenever it roams). The NSK is used in the Path Authentication process (described below) to establish an AP-SCM Context Transfer Key (CTK).

W1—SCM Registration Processing

The active SCM must maintain an Registration Table, which has an entry for each AP in its subnet and each MN associated with those APs. The Registration Table is initialized to 'empty'. The active SCM resets the table to empty whenever it relinquishes the active SCM status. In the simple WLCCP implementation, the Registration Table is only used to manage MN context information. It does NOT contain Layer 2 forwarding information and Path State information.

The SCM creates or updates a Registration Record for an AP or MN when it receives a valid Registration Request and generates a corresponding Registration Reply for the AP or MN.

W1—(Pre)Registration Message Authentication

In the simple WLCCP implementation, Preregistration and Registration Messages are authenticated with an SCM/AP CTK established via AP Path Authentication. The CTK is used to generate and check a Message Integrity Check contained in a WTLV_MIC TLV in all (Pre)Registration messages. The SCM always uses the CTK it shares with the Originator to authenticate (Pre)Registration Request messages. The AP always uses the CTK it shares with the SCM (i.e. the Responder) to authenticate (Pre)Registration Reply messages. (Pre)Registration messages generated by a non-root AP are not processed or authenticated by intermediate APs, in the simple WLCCP implementation. General WLCCP message authentication is discussed in detail in the section entitled "WLCCP Message Authentication".

When the SCM receives an "invalid" (Pre)Registration Request, which fails message integrity authentication, the SCM returns a Reply message, with a "Bad MIC" status, without further processing the message.

W1—Received AP Path-Init Request

An AP must authenticate its path to the SCM, as described below, to establish and update a Context Transfer Key (CTK) that is shared with the SCM. The SCM generates a Path-Init Reply when it receives a Path-Init Request with the Response-Req Flag set ON. The SCM returns a Path-Init Reply with a 'good' status if it has an Authenticated Node Entry, for the Requestor AP, that is in the 'authenticated', 'preregistered', or 'registered' state; otherwise, the SCM returns a Path-Init Reply with an 'unauthenticated' status.

Path authentication, including AP/SCM CTK generation and distribution, is described in detail in the section entitled "Infrastructure Path Authentication".

W1—Received AP Registration Request

An AP, which has successfully completed path authentication, must register with the SCM, as described below. The SCM generates a Registration Reply for an AP when it receives a Registration Request from the AP with the Response-Req Flag set ON. The SCM returns a Registration Reply with a 'good' status if it has an Authenticated Node Entry, for the Requestor AP, that is in the 'preregistered' or 'registered' state; otherwise, the SCM returns a Registration Reply with an 'unauthenticated' status.

The SCM creates or updates an AP Registration Record for the Originator, when it generates a Registration Reply with a 'good' status. The age of the Registration Record is reset to '0' when a good Reply is generated.

W1—Received MN Preregistration Request.

A new parent AP sends a Preregistration Request to the SCM, with the Response-Req Flag set ON, to obtain the dynamic security credentials of a child MN when it reassociates. The SCM generates a Preregistration Reply for a MN when it receives the Preregistration Request. The SCM returns a Reply with a 'good' status if has an Authenticated Node Entry for the MN. The protocol for transferring a MN's security credentials to a new parent AP is discussed in detail in the section entitled "MN Security Context Transfer".

W1—Received MN Registration Request.

The SCM generates a Registration Reply for a MN when it receives a Registration Request from the MN's parent AP with the Response-Req Flag set ON. The SCM returns a Registration Reply with a 'good' status if 1) it has an Authenticated Node Entry, with a 'successful' status, for the Requestor MN and 2) it has a 'bound' Registration Record for the Originator AP. The SCM returns a Registration Reply with an 'unauthenticated' status if the MN is not authenticated. The SCM returns a Registration Reply with an 'unregistered parent' status if the parent AP does not have a bound Registration Record.

The SCM accepts Registration Requests in order of arrival. As an option, the SCM should timestamp a MN Registration Record each time a 'good' Registration Reply is generated for the respective MN. The timestamp is calculated using the current time minus any Delay value in the corresponding Registration Request. The SCM should discard a received Registration Request for a MN if there is an existing Registration Record for the MN and the timestamp value in the entry is greater than the current time minus any Delay value in the Registration Request.

In the simple WLCCP implementation, the SCM does NOT generate a Deregistration Request when a MN roams to a different parent AP.

W1—AP Operation.

This section defines the AP state variables, timers, and procedures that are necessary for the simple WLCCP implementation. AP procedures are, generally, described in the order of AP "top-level" WLCCP state transitions. Top-level AP WLCCP states and state transitions are described in the section entitled "AP Operational Modes".

The simple AP implementation requires the following AP procedures:

An AP must process SCM-Advertisement Reply messages to discover the active SCM.

An AP must mutually authenticate with the 802.1 X IN Authenticator, and establish an NSK.

Each AP must authenticate its path to the SCM to establish a CTK.

APs must register with SCM.

Registered APs must generate SCM Advertisement Reply messages on secondary ports.

Registered APs must preregister MNs to obtain MN dynamic credentials.

Registered APs must register MNs.

Preregistration and Registration messages are sent with the Hopwise-Routing Flag set OFF; therefore, intermediate APs do not process the messages.

W1—SCM Advertisement Message Processing

An AP must monitor SCM Advertisement Reply messages received on its primary port on the native VLAN to determine if there is an active SCM for the native VLAN. An AP executes the simple WLCCP protocol if there is an active SCM for the AP's native VLAN.

The MN 802.1X Authenticator is in the SCM when the AP is registered with the active SCM; otherwise, the MN 802.1X Authenticator is in the AP. Path cost and hop count information is not used in the W1 implementation. The SCM Advertisement protocol is not used to determine the AP primary port.

W1—AP Initial Authentication

An AP must mutually authenticate with the 802.1X IN Authenticator when it first discovers a new instance of an active SCM, as described above in the section entitled "W1—IN Authentication". The IN Authenticator is always the active SCM, in the simple WLCCP implementation.

W1—AP Path Authentication

An AP must initiate Path Authentication with the SCM, after it has successfully authenticated, to establish a secret Context Transfer Key (CTK) that is shared by the AP and the SCM. [An AP must periodically update its AP-SCM CTK via update Registration Request/Reply messages.]

AP Path Authentication, in the simple W1 implementation, is as described above in the section entitled "General AP Path Authentication" except that 1) the root CM is always the SCM, and 2) the Hopwise-Routing Flag is set OFF. The Hopwise-Routing Flag is set OFF because Layer 2 Path Updating is not enabled; therefore, it is not necessary to establish a shared CTK between a child AP and any ancestor APs.

W1—AP Registration

An AP must register with the active SCM for its subnet, initially when it discovers a new instance of the SCM and periodically to refresh its registration record in the SCM.

The fields in an initial Registration Request sent by an Unattached AP are set as described below. (Unspecified fields are set to '0'.)

WLCCP header fields:
Type—'3'
Originator—Node ID of the Unattached AP.
Responder—Node ID of the SCM.
Response-Req Flag—'1' to solicit a Reply.
Inbound Flag—'1'.
Hopwise-Routing Flag—'0'.
Registration fields:
Requester—Node ID of the Unattached AP.
Hop Address—802 address of the Unattached AP's selected Primary Port.
Relay Node ID—'0'.
Initial Flag—'1'.

An AP (re)transmits a Registration Request either until it receives a Registration Reply with a matching message ID, or until the maximum retries are exceeded. An AP is "registered" when it receives a matching Registration Reply with a "good" RegStatus.

An AP periodically sends an "update" Registration Request message to the SCM to "refresh" its registration record. An update Registration Request has the Initial Flag set OFF.

An AP cannot generate Proxy Preregistration and Registration messages for MNs until it has successfully registered with the SCM.

An AP that is successfully registered with the active SCM (i.e. the "I,R" state above) must periodically generate SCM Advertisement Reply messages on each of its secondary ports.

An SCM Advertisement_Timer is started initially when the AP has successfully registered with the active SCM. It is restarted each time that it expires, until the AP transitions to an unregistered state (i.e. when the active SCM changes or is lost). The period of the SCM_Advertisement_Timer is always set to the SCM_Advertisement_Period value (in seconds) in the AP's Parent_SCM_Record. The SCM_Advertisement_Period is updated each time the AP receives an SCM Advertisement from the active SCM.

A registered AP does the following when the SCM_Advertisement_Timer expires:

If the SCM Age equals MAX_SCM_AGE, then WLCCP is disabled.

Otherwise, if the SCM Age is less than Increment the SCM_Age then restart the SCM_Advertisement_Timer with the current Advertisement_Period value;

increment the SCM_Age value;

generate an "active" SCM_Advertisement Reply message on each secondary port

A registered AP generates a scheduled SCM_Advertisement Reply message with the field values shown below. Fields that are not specified are set to '0'.

WLCCP header fields:
Type—'0x41' (SCM_Advertisement Reply)
Originator—'0'.
Responder—AP Node ID.
Outbound Flag—'1'.
TLV FLag—'1' (the Request must include an IPV4_SUBNET TLV and an IN_1X_ATHEN TLV).
SCM_Advertisement Reply fields:
Hop_Address—The 802 hop address used to access the AP via the respective output port (which is the AP Node Address if the output port is operating in promiscuous mode).
SCM Flags:
Active Flag—'1'
SCM Priority—copied from the Parent_SCM_Record
SCM Node ID—copied from the Parent_SCM_Record
Instance Age—copied from the Parent_SCM_Record
Path Cost—copied from the Parent_SCM_Record
Hop Count—copied from the Parent_SCM_Record
Advertisement Period—copied from the Parent_SCM_Record
WTLV_IPV4_SUBNET_ID TLV—IPv4 address and prefix length of the AP
WTLV_ROOT_CM_INFO TLV—copied from the IN_1X_Authenticator state variable W1—Proxy MN Preregistration.

MN preregistration, in the simple WLCCP implementation, is exactly the same as General Proxy MN Preregistration.

W1—Proxy MN Registration.

WLCCP MN registration is enabled in an AP after it has successfully registered with the active SCM (i.e. when it transitions to the I,R state above). A parent AP generates an initial, proxy Registration Request for a MN, after the MN has successfully authenticated or re-authenticated. [A Registration Request may be used to complete authentication handshaking; however, the MN must be fully authenticated before an "authenticated" Registration Reply message is generated by the SCM.]

In the simple WLCCP implementation, the WLCCP registration process is not used to establish or delete Layer 2 forwarding paths; therefore, the L2_Path_Update Flag and the Hopwise-Routing Flag are set OFF in Registration messages. The Originator is always the parent AP and the Responder is always the parent SCM. A Registration Request for a MN must contain the MN's SSID and the default VLAN ID for the MN.

The SCM acknowledges a Registration Request by returning a Registration Reply to the Originator. The Status value in the Reply indicates if the Registration Request was accepted.

If a parent AP does not receive an expected Registration Reply, then it must retransmit the Registration Request, with the Retry Flag set ON and the same Message ID, until the number of retries equals REGISTRATION_RETRY_LIMIT. The Delay field should be set to the elapsed time since the MN last transmitted an uplink frame, in a retransmitted Registration Request.

The Registration Reply Lifetime field contains a registration lifetime value, in minutes. An AP must generate an update Registration Request, for a MN, before the registration lifetime expires.

The fields in an initial, proxy Registration Request for a MN are set as described below. Unspecified fields are set to '0'.

WLCCP header fields:
Type—'3'
Originator—Node ID of the Parent AP.
Responder—Node ID of the SCM.
Response-Req Flag—'1' to solicit a Reply.
Inbound Flag—'1'.
Hopwise-Routing Flag—'1'.
TLV Flag—'1' (the Request must include an SSID_TLV).
Registration fields:
Requester—802 address of the MN.
Hop Address—802 address of the Parent AP's Primary Port.
Relay Node ID—'0'
Proxy Flag—'1'.
Initial Flag—'1'.
Authenticated Flag—The Authenticated Flag is set to '1' in a Request to indicate that the MN was authenticated by the parent AP.
Proxy MIP Flag—set to '1' if the MN is using an SSID where Proxy MIP is enabled.
Delay—The delay in hundreds of seconds since the MN last sent an uplink frame. The delay is usually '0' if the Retry flag is '0'.
VLAN ID—The VLAN ID assigned to the MN. The MN's VLAN ID is usually the default VLAN ID assigned to the MN's SSID. The assigned VLAN ID may be '0' if the MN is assigned to the "native VLAN". The VLAN ID field, in the Registration Reply for a MN, can contain a different VLAN ID, to explicitly assign the MN to a VLAN.
SSID_TLV—The Registration Request for a MN must contain a WTLV_SSID TLV that contains the active SSID for the MN, contained in the MN's (Re)Association Request.

The Broadcast SSID Flag must be set ON if the MN associated with a broadcast SSID. A Registration Reply for a MN can include an SSID TLV, with a different SSID, to explicitly assign the MN to a service set.

AUTHENTICATION_TYPE TLV—Contains the 802.11 authentication type (Open, Shared Key, or EAP type) used to authenticate the MN.

A Registration Request, which is generated for an 802.11 station that "reassociated", must contain the BSSID of the old AP in a WTLV_OLD_AP_BSSID TLV. The BSSID is obtained from the "old AP" field in the 802.11 Reassociation Request transmitted by the station.

A Registration Reply message for a MN always contains the MN's IP address, if it is known. A parent AP must generate a "Registration Request for a MN when it first detects a new or different IP address for the MN (i.e. by snooping IP/ARP packets transmitted by the MN). The Root CM Flag is set ON in the request to cause an update on the full path to the root CM.

A Full WLCCP Implementation (W2)

This section describes a complete WLCCP implementation that supports:
Inter-subnet Context Transfer via LCMs and the CCM.
Reliable Layer 2 path updates.
A subnet topology that includes repeater APs, simple wireless bridges (e.g. WGBs), and an arbitrary mix of Ethernet and 802.11 links.
Path Instances.

As noted above, a path lies on a branch of the SWAN Topology Tree. The full path to a node in a campus network includes the node, the CCM, and any intermediate nodes and links. A Path Instance is a full or partial path, at a point in time. Each CM establishes path instances for each node within its domain. For example, an SCM establishes an "SCM path instance" for each AP and MN in its subnet domain; the CCM establishes a "CCM path instance" for each CM, AP, and MN in the campus network. A path instance is established when an unattached node selects a parent node and registers with the SWAN infrastructure.

A CM path instance is identified by a Path ID, which is allocated by the respective CM. A Path ID of '0' is used to indicate "no Path ID". Valid Path IDs start at '1'. A CM increments its Path ID for a node when it receives an "initial" Registration Request message for the node. Registration Reply, "update" Registration Request, Detach, Deregistration, Path Update, and Path Check messages always contain a valid Path ID.

An SCM path instance exists within the context of an LCM path instance. An LCM path instance exists within the context of a CCM path instance. The combined CCM, LCM, and SCM Path IDs identify the full path instance for a MN in a campus network. In FIG. 1, for example, the full path instance for MN-2 is identified by Path IDs 15, 10, and 6, which were established by the CCM, LCM, and SCM, respectively.

An "inbound path" is defined by the structure of the Topology Tree. An "outbound path" to a node is defined by state information maintained in each CM and AP on the path to the node. In this document, the path state information for a single descendant node is contained in a "Descendant Path Record" (DPR) in each CM and AP on the outbound path to the node.

No disconnected path fragments can exist in the Topology Tree. A "bound" path instance is established by an "outbound" Registration Reply message. The inbound portion of a path instance must exist before the outbound portion can be established. For example, in infrastructure mode, an SCM cannot establish a path instance for a node unless an LCM path instance for the node already exists. If a MN roams, then the most outbound portion of the "old path" is deleted first (i.e. by an inbound Deregistration Reply or Detach Request message). If the link to a child AP or CM link is lost, then all path instances in the sub tree rooted at the AP or CM are deleted.

W2 Registration Records.

Each CM or AP must maintain a Registration Table that contains a Descendant Registration Record (DRR) for each descendant node (MN, AP, or CM) in its sub tree. A Registration Table can, optionally, include Inbound Registration Records (IRR) for nodes that are not in the sub tree of the respective AP or CM. A temporary Unbound Registration Record (URR) is used to store state information for an unregistered node. Registration Records are updated by Registration, Deregistration, and Detach messages. A Registration Record is aged and discarded if it is not refreshed within the registration Lifetime. The primary key for a Registration Record is the WLCCP Node ID of the respective node.

In the W2 implementation, an AP or CM must maintain additional forwarding and path state information for each descendant WLCCP node. In this document, a "Descendant Path Record" (DPR) contains any information that is necessary to send a message to a descendant node, and other path state information. Each DRR points to a DPR. "DRR/DPR" is used to denote a DRR and the corresponding DPR.

A DPR can be in a "bound" or "unbound" state. A parent AP creates an unbound DPR and generates an "initial" Registration Request, for a child 802.11 MN, when the MN first enters the 802.11 "associated and authenticated" state. The initial Registration Request also creates an unbound DPR in each AP and CM on the path to the CCM. An "unbound" DPR contains the Message ID of the corresponding initial Registration Request.

A DPR becomes "bound" when an "authenticated" Registration Reply, with a matching Message ID and good status, is received. A "bound" DPR contains a non-zero Path ID, which is set by the parent CM in the Registration Reply. A DPR in an SCM contains an SCM Path ID and an LCM Path ID. The SCM Path ID identifies the outbound path originating at the SCM; the LCM Path ID (i.e. the Path ID established by the LCM) identifies the inbound path to the LCM. A DPR in an LCM contains an LCM Path ID and a CCM Path ID for similar reasons.

A path is "bound" if each DPR on the path is in a "bound" state. The path to a node may be both bound and unbound. For example, the most outbound fragment of the path to a MN will be unbound (i.e. until recovery is initiated) if an initial Registration Reply message is lost. Unbound DPRs are quickly aged and discarded; therefore it is not necessary to explicitly delete an "unbound path".

The maximum age of a bound DPR is established during WLCCP registration via a registration Lifetime field. Parent APs and CMs age DPRs for child nodes. A DPR is discarded if it is not "refreshed" within the registration lifetime. The DPR for a child MN is refreshed by uplink data or management frames. The DPR for a child AP or CM is refreshed by periodic update Registration Requests. If the DPR for a child AP or CM is deleted, then the AP or CM is deregistered and the entire sub tree rooted at the child AP or CM is also deleted.

The CCM has a DRR/DPR for each active CM, AP, or MN in the SWAN campus network. A CCM DPR contains the Node ID and IP address of the node's parent LCM. An LCM has a DRR/DPR for each MN, AP, and SCM in its local control domain (i.e. in its assigned subnets). An LCM DPR for an AP or MN contains the Node ID and IP address of the parent SCM. An SCM has a DPR for each AP and MN in its subnet. An SCM DPR the Node ID of the parent AP, if it exists, and the Node ID of the root AP.

In an AP, a MN DPR contains a pointer to a Port Record. As noted above, an Ethernet port, an 802.11 BSS, and each AP-to-AP link are considered as a logical port. At any give time, each active logical AP port is either operating as a primary port in "child" mode or as a secondary port in "parent" mode. A Port Record contains the "port state" and the information that is necessary to forward a frame on the respective logical port. A Port Record contains the 802 "hop address" for 802.11 ports. A non-root AP forwards a message "inbound" by sending the message on its primary port.

W2 Subnet Topology

A SWAN subnet is an Ethernet LAN. In this document, it is assumed that an underlying IEEE 802.1D Spanning Tree Protocol (STP), or other STP, is used to organize wired Ethernet LAN segments, in each AP subnet, into a loop-free spanning tree topology. WLCCP is generally independent of the underlying STP; therefore, WLCCP is compatible with other STPs, such as the Cisco-proprietary PVST+STP.

The WLCCP SCM advertisement and registration protocol is used to build a WLCCP spanning tree in each subnet, which may exist on top of any underlying (i.e. 802.1D) spanning tree. The WLCCP spanning tree may extend the underlying 802.1D spanning tree with non-STP links to non-STP wireless "repeater" APs or non-STP 802.11 bridges. An AP (e.g. a root AP, repeater AP, or 802.11 bridge) is an interior node and a MN is a leaf in the WLCCP spanning tree.

A single Primary LAN is at the root of the WLCCP spanning tree in each subnet. Each subnet has a single active SCM. By definition, the Primary LAN is the set of, possibly bridged, wired Ethernet segments directly connected to the SCM. Other secondary wireless Ethernet LANs or "Secondary LANs" are connected to the Primary LAN via wireless 802.11 bridge links. [A Primary or Secondary LAN may contain 802.11 bridges that do not participate in WLCCP. Such non-WLCCP 802.11 bridges are transparent to WLCCP.]

A Subnet Control Domain includes all APs that are in the same subnet as the respective SCM and any client stations that are directly, or indirectly, associated with those APs. For example, it includes any MNs that are associated with those APs, even if a MN is assigned to a different subnet at the network layer via VLAN trunking or MIP tunneling. It also includes any ENs attached to secondary LANs that are bridged to the Primary LAN.

Figure 35:
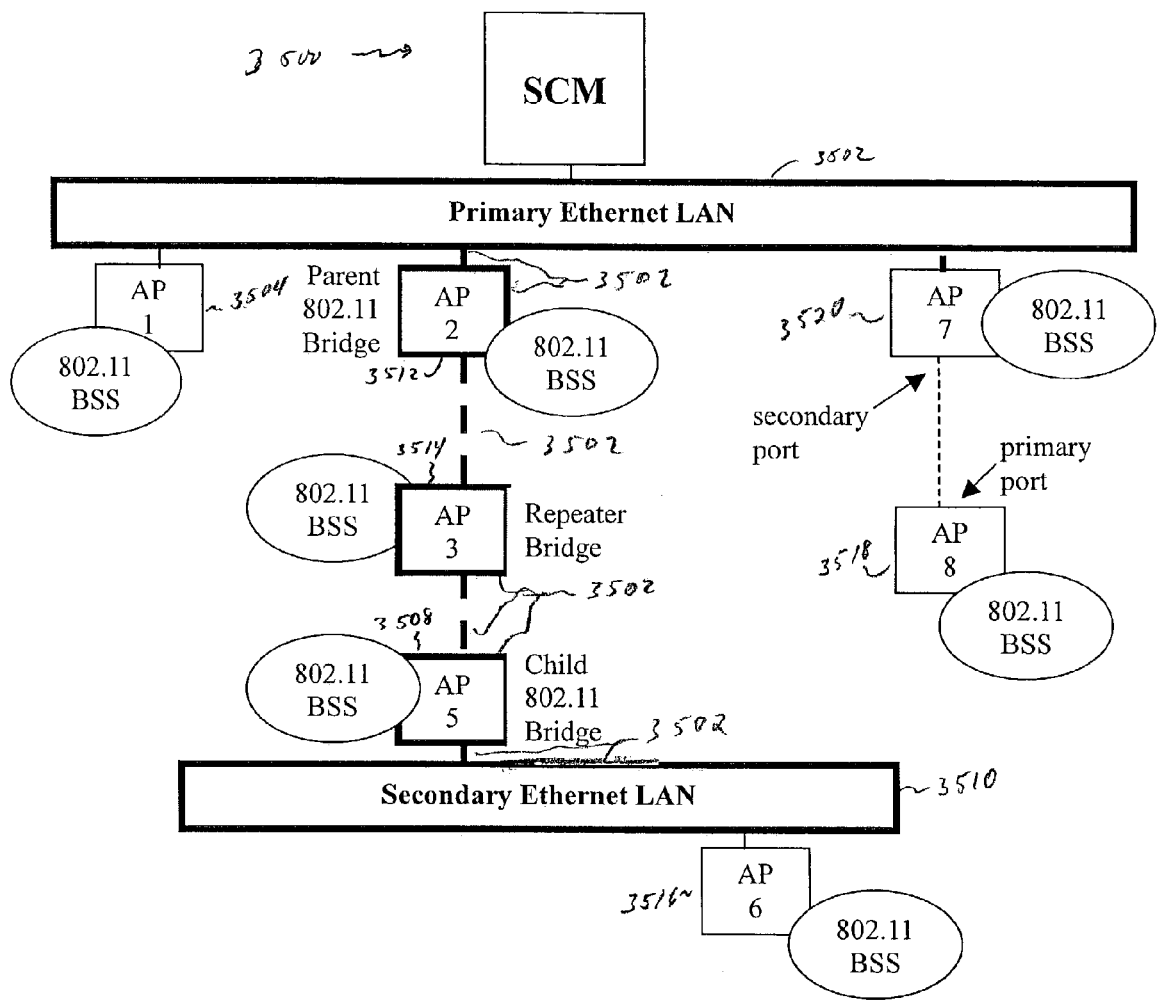
FIG. 35 is a block diagram of a WLAN spanning tree for a single subnet.

An example WLAN spanning tree 3500, for a single subnet, is shown in FIG. 35. The 802.1D STP links and STP APs are denoted as 3502. Wireless links are shown as dashed lines.

The Primary and Secondary LANs may include multiple Ethernet segments and 802.1D bridges and/or switches. The 802.1D "root bridge" may be contained in either the Primary LAN or a Secondary LAN. A Primary or Secondary Ethernet LAN functions as a logical, transparent link with respect to WLCCP.

The "primary port" in a WLCCP AP is the port that is used to access the Primary LAN. A "root AP" is connected directly to the primary LAN on its Ethernet primary port. A "secondary port" is any logical or physical AP port other than the primary port. A primary or secondary port may be an Ethernet or 802.11 port. A logical 802.11 port exists for each wireless AP-to-AP link. A logical secondary BSS port provides access to 802.11 stations in the local BSS. AP 3508 has an 802.11 primary port and an Ethernet secondary port.

Note that the 802.1D root port, in an STP AP, will be the same as the primary port if, and only if, the 802.1D root bridge is contained in the primary LAN.

A single "WLCCP designated AP" is responsible for bridging frames to a secondary LAN. The WLCCP designated AP for a secondary Ethernet segment may be different than the 802.1D designated bridge for the same Ethernet segment. For example, in FIG. 35, AP 3508 is the "WLCCP designated AP" for the "secondary LAN". If the 802.1D root bridge is contained in the primary LAN, then AP 3508 is also the 802.1D designated bridge for its Ethernet segment in the secondary LAN. A WLCCP designated AP must register its attached lo secondary LAN with the SCM to establish forwarding and flooding parameters, for the secondary LAN, on wireless links.

In an Ethernet LAN, "backward learning" establishes the forwarding path, to wired stations and MNs, in 802.1D bridges or switches. VLAN tagging and backward learning establish the forwarding path in an Ethernet VLAN. Backward learning is unreliable; therefore, unicast frames must be "flooded" by a transparent bridge, switch, or AP if the location of the destination address is unknown.

Unicast frames are never flooded into an 802.11 BSS because 802.11 stations reliably associate with a parent AP. Unicast flooding is selectively enabled to secondary Ethernet LANs. A WLCCP "registration protocol" is used to reliably establish the forwarding path from the Primary LAN to 802.11 stations and select secondary LANs. Therefore it is never necessary to flood unicast frames "outbound" (i.e. from the Primary LAN) to 802.11 stations and select secondary LANs. Unicast flooding is always enabled on an AP Primary Port. By default, unicast frames are forwarded "inbound" toward the Primary LAN, if the destination is unknown.

The WLCCP registration protocol is also used to forward multicast group membership information to the Primary LAN. Optionally, multicast frames are only forwarded on those secondary ports that are used to access members of the multicast group identified by the respective multicast destination address. [Multicast communications between 802.11 stations can, optionally, be prohibited to further restrict multicast flooding.]

A "secondary LAN" is relative to each AP. For example, in FIG. 35, the wired LAN labeled "secondary LAN" 3510 is only a secondary LAN from the perspective of AP 3512 and AP 3514. In a single AP, the "Primary LAN" can be considered as that portion of the WLAN spanning tree that is accessed via the AP's primary port, for frame forwarding purposes. For example, AP 3516 forwards a frame to the primary LAN by simply relaying the frame to on its primary port (e.g. to the Ethernet LAN labeled "secondary LAN"). The wireless links to the primary LAN are generally transparent to AP 3516.

The 802.1D STP should be operated on wireless links that are used to bridge wired STP LANs. In FIG. 35, for example, the 802. ID STP should be operated on the wireless links between APs 3512, 3514 and 3508 if the Secondary LAN contains 802.1D bridges/switches. AP 3518 is connected to an STP AP, AP 3520, on a non-STP link.

The WLAN spanning tree can include non-STP wireless links to non-STP wireless repeater APs and "work-group bridges" (WGB). Non-STP repeater APs and WGBs attach to the WLAN spanning tree much like 802.11 MNs.

By default, an AP is attached to the network on a "normal access" primary port. An AP can, optionally, be attached to the network on a VLAN trunk primary port, so that a single 802.11 BSS can include MNs from multiple VLANs.

A user-configurable "WLCCP port mode" variable is set to one of the following values for each AP port:

a) Child mode. Child mode is the default on the AP Ethernet port.

b) Parent mode.

c) Parent/child mode. Parent/child mode is the default on 802.11 ports.

An AP port that is configured in "child mode" can only function as the WLCCP primary port. An AP port that is configured in "parent mode" can only function as a WLCCP secondary port. An 802.11 "parent" port generates beacons and accepts station associations. An 802.11 "child" port associates with an 802.11 "parent" port.

An 802.11 port that is configured in "parent/child" mode can function both as a "parent" port and a "child" port (i.e. as a repeater port). An Ethernet port that is configured in "parent/child" mode can function as a secondary "parent" port in a child 802.11 bridge, or as a primary "child" port in a wired AP or bridge. The parent/child mode is intended to facilitate a self-configuring subnet topology.

A port (or ports) in an "unattached" AP, which is configured in child mode or parent/child mode, constantly scans for a potential parent AP or SCM. An AP automatically selects a "primary port" and a parent node that provide the "best" (i.e. least-cost) path to the primary LAN. An AP "secondary port" is any port other than the primary port.

The user can configure a "parent AP list" for a child 802.11 port, to restrict potential parent APs. Note that a user can explicitly configure an AP-to-AP link by configuring a "parent AP list" with a single entry.

A parent/child port in an attached AP operates as follows: a) It operates in "child" mode if it is the primary port. b) It operates in "parent" mode if it is a secondary port. c) A physical radio port in an attached repeater AP operates in both parent and child mode, where the single port provides both a logical uplink primary port and one or more logical downlink ports.

A "root AP" always operates its primary Ethernet port in child mode and its secondary radio ports in "parent mode". By default, an AP that does not have an Ethernet link operates as a "repeater" because the default 802.11 port mode is "parent/child".

A "child 802.11 bridge" always operates its primary radio port in "child" or "parent/child" mode and its secondary Ethernet port in "parent mode". Note that an AP can only function as a child 802.11 bridge if its Ethernet port is explicitly configured in "parent" or "parent/child" mode.

On power-up, an unattached AP initially "scans" for SCM advertisement information to discover the SCM and to determine the best path to the Primary LAN. The AP then selects a parent node and Primary Port, which provide the best path, and registers with the SCM.

Path cost information is contained in SCM Advertisement messages and in 802.11 Beacon and Probe Response messages received on AP ports that are configured in child or parent/child mode. An AP only accepts SCM Advertisements with a "matching" subnet ID and only accepts Beacon and Probe Response messages with a matching subnet ID and matching WLCCP SSID.

An AP immediately determines that it is a "root AP" if it receives SCM Advertisement messages on its Ethernet port with the Preferred SCM flag set ON and with a Hop Count of zero. The parent SWAN node for a root AP is the local SCM. A root AP immediately selects the Ethernet port as its "primary port" and registers with the SCM. After it successfully registers, it generates SCM advertisements on each of its secondary ports.

By default, a non-root AP (i.e. an AP that is not directly attached to the primary LAN) selects a primary port and parent AP that provide the "best" path to the primary LAN, where the best path is the least-cost path with acceptable signal quality. A non-root AP registers with the SWAN infrastructure via its selected "parent AP" on its selected primary port.

An AP may receive SCM Advertisement messages on its Ethernet port with the Preferred SCM flag set OFF. In that case, the AP should scan for a higher priority SCM, for a random interval, on each port where "child mode" is enabled. The AP operates as a root AP, if it does not discover a higher priority SCM. An AP may receive an SCM advertisement from a backup SCM because 1) the preferred SCM failed, or 2) the wired network topology is fragmented. For the later case, scanning for a higher-priority SCM is required for topology convergence.

A SWAN AP can, optionally, execute the 802.1D Spanning Tree Protocol (STP). SWAN operation with STP APs is discussed infra.

A child 802.11 bridge is the WLCCP designated bridge for a secondary Ethernet LAN. A child 802.11 bridge is responsible for attaching the secondary LAN, and attached secondary Ethernet nodes, to the primary LAN. Unicast Flooding and Multicast Flooding to the secondary LAN is enabled or disabled locally on the designated bridge. Unicast and multicast flooding requirements are propagated inbound to the primary LAN.

A non-STP child 802.11 bridge is configured with a Bridge Priority. The Bridge Priority is used to elect the WLCCP designated bridge, as described below in the section entitled "WLCCP Designated Bridge Election", if more that one child bridge is attached to a secondary LAN.

A user-configured Ethernet Address List can be configured on an AP Ethernet port. The Ethernet Address List contains a list of static 802 addresses, where each address identifies a station that is accessed via the Ethernet port. [The list can be configured via standard 802.1D configuration options that support the creation of "static" database entries.] A child 802.11 bridge attaches addresses in the list and other dynamically-learned addresses to the primary LAN.

A Work Group Bridge (WGB) is a special case of a child 802.11 bridge with the following configuration settings:
1) The Ethernet port is configured in "parent" mode.
2) The 802.11 ports are configured in "child" mode.
3) Unicast flooding is disabled on the Ethernet port.
4) A WGB does not execute the STP. [A WGB can provide access to a secondary LAN that is part of a mobile network (e.g. a LAN in a vehicle that is part of a larger mobile network). It is not practical to execute the standard 802.1D STP in a mobile bridge due to the frequent topology changes.]

A WGB must include a WLCCP_SEC_LAN_ADDR_LIST TLV in its WLCCP Registration Request records. The TLV contains a list of 802 addresses, where each address identifies an Ethernet station on the Ethernet LAN attached to the WGB's secondary Ethernet port.

The WLCCP Designated Bridge Election Protocol enables two or more redundant WGBs to be attached to a work-group secondary LAN.

Note that the Ethernet port on a WGB is configured in "parent" mode; therefore, a WGB cannot attach to the SWAN network on its Ethernet port—even if it could provide a lower cost path.

An "old path" to a node must be deleted if 1) the node roams to a new parent AP or CM, 2) the node is "disabled" by a network administrator, or 3) the node becomes physically disconnected from the network. For the first two cases, a CM generates a "Deregistration Request" to delete the old path. For the third case, the parent node generates a "Detach Request" to delete the old path.

The WLCCP Registration/Deregistration/Detach protocol is structured to prevent "disconnected path fragments". A Registration Reply with a "good" status code establishes a path instance for a "Requester Node" as it is forwarded outbound from the common CM toward the Requester Node. Path instances are deleted in the reverse direction. A path instance is deleted as a Deregistration Reply or Detach Request message is forwarded inbound.

Deregistration Requests.

A CM "deregisters" any old path instance, 1) when a new path instance is established for a node that has roamed, or 2) a network administrator "disables" a node. A CM sends a Deregistration Request message, with the Response-Req Flag set ON, outbound on the old path to solicit a Deregistration Reply message. The Deregistration Reply is forwarded inbound (with hopwise routing if L2 Path Updates are enabled) until it reaches the Originator. The old path instance is deleted in each node as the inbound Deregistration Reply is received; therefore, the most outbound portion of the old path instance is deleted first.

The CM that is the "nearest common ancestor" is responsible for reliably deregistering a node's old path instance, when the node roams. The nearest common ancestor CM is referred to as the "common CM".

A common CM only deregisters bound path instances for descendant nodes (i.e. path instances where it has a bound DPR). A Deregistration Request and the corresponding Reply contain the Path ID of the old bound path instance. The common CM is always the "Originator" in Deregistration Request/Reply messages.

A CCM deregisters an old path instance, for a node, by sending a Deregistration Request to the "old" LCM, with the old LCM as the "Responder". An LCM deregisters an old path instance by sending a Deregistration Request to the old SCM, with the SCM as the Responder. An SCM deregisters the path to a MN or child AP by sending a Deregistration Request to the "old" parent AP, with the old parent AP as the Responder.

The common CM retransmits a Deregistration Request until it receives a Deregistration Reply with a matching Message ID. A common CM must maintain deregistration state information for an "old" path instance, until it receives a matching reply or the maximum deregistration retries are exceeded. Other descendant APs or CMs on the old path do NOT need to maintain deregistration state information.

A Deregistration Request is always forwarded to the immediate parent of the Target Node, if possible. The immediate parent must generate the Deregistration Reply when it receives a Deregistration Request.

If an intermediate CM receives a Deregistration Request, it must first determine if it has a DPR for the path instance identified by the Target Node ID and Path ID. If it does NOT have such a DPR, then it must return a Deregistration Reply. Otherwise, it must forward the request outbound toward the immediate parent. Before the request is forwarded, an LCM must first change the Responder to the old SCM; an SCM must first change the Responder to the old parent AP. An intermediate CM must update the Path ID field, to identify the lo outbound or inbound path instance, before forwarding a Deregistration Request or Reply message to a child or parent CM.

An intermediate AP must a forward Deregistration Request to the next hop AP on the outbound path to the immediate parent AP (i.e. the Responder), if such a next hop AP exists. Otherwise, an intermediate AP must generate a Deregistration Reply, with an error status, if such a next hop AP does not exist. Note that an AP will be on both the old and new path, when a MN roams between child APs in its sub tree.

It is possible that an "old parent node" may become Unattached before an old path instance is deregistered. In that case, the old parent node (AP or CM) will be deregistered, when the CM cannot successfully delete an old path instance, and the entire sub tree rooted at the old parent node will be deleted.

An AP or CM must delete a "bound DPR" for a node, if it receives a Deregistration Reply, for the node, with a matching Node ID and a matching or "newer" Path ID. An AP also must delete a DPR for a node if it receives a Registration Reply with a "newer" Path ID. The corresponding DRR can be deleted or, optionally, converted to an IRR.

A DPR contains the Message ID of the last received Registration Request for the respective path instance. If a common CM receives an out-of-order initial Registration Request, it will generate a Deregistration Request that contains the Registration Message ID. An AP or CM must delete an "unbound" DPR if it receives a Deregistration Request with a matching Registration Message ID. It must NOT delete a "bound" DPR.

Unbound DPRs (i.e. which do not transition to the bound state) are quickly aged and discarded; therefore, it is not necessary to explicitly delete an unbound path fragment.

An incorrect, transient path instance, for a rapidly roaming MN, will exist if Registration Request messages for the MN arrive out-of-order at a CM. In that case, the CM will delete the correct path to the MN with a Deregistration Request. The MN's parent AP must disassociate the MN, when it receives the Deregistration Request. Therefore, a correct path instance will quickly be established when the MN reassociates.

Detach Requests.

A "parent" node generates a Detach Request to delete the path instance for a "child", when the link to the child becomes "disconnected". A Detach Request is generated for the following reasons: 1) A parent AP generates a Detach Request for a child 802.11 station, when the station is "disassociated"; 2) a parent node (AP or CM) generates a Detach Request for a child node (MN, AP, or CM) if it can no longer communicate with the child node, or 3) a parent node generates a Detach Request for a child node if it discards the DPR for the child node (i.e. because the Registration Lifetime expired before the DPR was refreshed). [In theory, an AP or CM can also generate a Detach Request to disconnect itself from the network.]

The Originator of a Detach Request is the parent node of the disconnected child node.

The Responder is always the parent CM of the parent node. The Requester is the disconnected child node.

A Detach Request is (re)transmitted until the Originator receives a matching Detach Reply. The Detach Request is used to change the registration state to "unbound" in each AP and CM on the path to the CCM. A Detach Request contains the Path ID for the path instance. If an AP or SCM receives a Detach Request for a MN, it sets the DPR state to "unbound", if the Path ID in the DPR is not "newer" than the Path ID in the Detach Request. The DPR state is immediately set to "unbound" in a parent AP when a station is disassociated.

The Path ID and Responder field must be updated, as a Detach Request is forwarded inbound, exactly as for an inbound Deregistration Reply.

Sub Tree Deletion

If an "Attached" AP becomes disconnected from the SWAN Topology Tree, then the AP and each node in the sub tree rooted at the AP must reliably transition to the "Unattached" state.

There are two general cases:
1) A parent AP or SCM may "disconnect" a child node.
2) An "Attached" child node may independently transition to the "Unattached" state.

Case 1: A parent AP or CM asynchronously disconnects a child node if a) the DPR for the child node is aged and discarded, b) the parent can no longer communicate with the child, or c) an administrative Deregistration Request is received for the child. If a parent node deletes a child AP, then the child AP and the entire sub tree rooted at the AP must reliably transition to the Unattached state.

If a DPR is aged and discarded, then it is guaranteed that the child AP has already transitioned to the Unattached state and no further action is required.

A parent AP can disconnect an 802.11 child, in its BSS, simply by the changing the child's 802.11 state to Disassociated and, optionally, transmitting a Disassociation (or Deauthentication) message to the station. At worst, the child node will discover that it is unassociated when it attempts to send an uplink frame.

If a parent SCM or AP disconnects a child AP, which is attached on an Ethernet secondary port, then it must advertise the child AP's Node ID and Path ID, in a WTLV_DELETED_NODE_LIST TLV, in SCM Advertisement Reply messages that are transmitted on the Ethernet secondary port. The disconnected AP's Node ID must be advertised for some threshold period or until the AP reregisters. It is guaranteed that the child AP will transition to Unattached state either a) when it misses all SCM Advertisement Reply messages from its parent in some small threshold period, or b) when it discovers its Node ID in a Deleted Node List.

Case 2: An "Attached" child node becomes "Unattached" if a) it loses the link to its parent; b) it detects that its parent node has become Unattached; c) it detects a new parent "instance"; or d) its Node ID and current Path ID are in a Detached Node List in an advertisement message.

Each SWAN CM must maintain an internal "Instance Age", as described in the section entitled "Topology State Information". The Instance Age is entered into the Instance Age field in Advertisement Reply messages. A node's Instance Age is initialized to '0' and is reset to '0' each time the node transitions to the Unattached state.

An AP must maintain an internal "Attach Count" variable that is initialized to '0' and incremented each time that the AP initially registers with the SCM. The Attach Count is copied into the Attach Count field in SCM Advertisement Reply messages that are transmitted on the AP's secondary ports.

A child node must save the Instance Age of its parent CM. A non-root AP must also save the Attach Count of its parent AP. An Attached node transitions to the Unattached state if it receives an Advertisement Reply message, from its parent node, with a lower Instance Age (e.g. because the parent node has restarted). A non-root AP also transitions to the Unattached state if it receives an Advertisement Reply with a different Attach Count. Note that an SCM can directly or indirectly delete its entire sub tree by transmitting an SCM Advertisement message with a lower Instance Age value.

A child AP must also maintain a variable that contains the current Attach Count of its parent AP. A child AP must transition to the Unattached state if it receives an Advertisement Reply from its parent AP with a different Attach Count (e.g. because the parent AP roamed).

When an SCM transitions to the Unattached state it must a) transmit a multicast unscheduled SCM Advertisement Reply message with the Unattached Flag set ON and an infinite Path Cost and Hop Count, and 2) delete all DPRs.

When an Attached AP transitions to the Unattached state it must: a) transmit a multicast unscheduled SCM Advertisement Reply message with the Unattached Flag set ON and an "infinite" Path Cost and Hop Count, on each Ethernet secondary port, b) disassociate all child 802.11 stations, c) delete all DPRs, d) stop Beaconing on 802.11 ports, and e) initiate scanning for a new parent SCM or AP. The AP "disassociates" 802.11 stations by changing the 802.11 state to "Unauthenticated and Unassociated"; it does not need to send an 802.11 Disassociation Request to each child station.

An AP must remain in the Unattached state for a holddown period, (i.e. 5 seconds) before it registers with a new parent AP, to ensure that all child 802.11 stations have disassociated and to prevent out-of-order Registration Requests.

W2—SCM Sub Tree Deletion.

If an "Attached" SCM becomes unattached from its parent LCM, then it transitions to subnet standalone mode. The sub tree rooted at the SCM is NOT deleted when the SCM transitions from local infrastructure mode to subnet standalone mode; therefore, the SCM must NOT reset its Instance Age.

The sub tree rooted at an SCM, which is operating in standalone mode, must be deleted when the SCM it transitions to local infrastructure mode. Therefore, a standalone SCM must reset its Instance Age after it initially registers with a new parent LCM.

If an "Attached" LCM becomes unattached from the CCM, then it transitions to Local Standalone mode. The sub tree rooted at the LCM is NOT deleted when the LCM transitions from campus infrastructure mode to local standalone mode; therefore, the LCM must NOT reset its Instance Age.

The sub tree rooted at an LCM, which is operating in standalone mode, must be deleted when the LCM it transitions to campus infrastructure mode. Therefore, a standalone LCM must reset its Instance Age after it initially registers with the CCM.

W2—LCM Path Authentication.

In campus infrastructure mode, an unattached LCM must send a Path-Init Request to the CCM, after it initially authenticates, to initiate path authentication. Path authentication is described in detail in the section entitled "Infrastructure Path Authentication".

W2—LCM Registration.

An LCM sends an "initial" Registration Request to the CCM after it has successfully completed Path Authentication. The CCM returns an initial Registration Reply message. The LCM must generate periodic "update" Registration Request messages to refresh its registration bindings in the CCM. The CCM returns an update Registration Reply message, to acknowledge the Registration Request.

W2—SCM Operation.

Parent LCM Assignment.

An SCM must send a Context Request message, with a "request" WTLV_PARENT_CM TLV, to the CCM at startup and whenever its link to an assigned LCM is lost. The CCM determines the SCM's parent LCM, from the set of registered LCMs, when it receives the Context Request. [The user must configure LCM/subnet bindings in the CCM. For redundancy, a user can configure primary and fallback LCMs, for each subnet. By default, the LCM co-located with the CCM can function as the fallback for failed LCMs. The CCM assigns an SCM to an active LCM if the SCM's subnet is assigned to the LCM.] The CCM returns a Context Reply with a non-null WTLV_PARENT_CM TLV to explicitly assign the SCM to a parent LCM. Otherwise, the CCM returns a null WTLV_PARENT_CM TLV to direct the SCM to operate in subnet stand-alone mode. A non-null TLV contains the Node ID and IP address of the assigned parent LCM. The SCM must then path-authenticate and register with its assigned parent LCM.

If an SCM cannot communicate with a parent LCM and it cannot communicate with its assigned CCM then it must operate in stand-alone mode. However, the SCM must periodically attempt to re-establish communications with the CCM.

The CCM will return a null WTLV_PARENT_CM TLV (i.e. with a Node ID of '0') to direct an SCM to operate in stand-alone mode.

An SCM must repeat the process to determine its (i.e. new) parent LCM, if it becomes unattached. An attached SCM becomes unattached if a) it loses the link to its parent LCM, b) it cannot successfully register with its parent LCM, c) it detects a new instance of the CCM or its parent LCM, or d) if it receives a valid administrative Deregistration Request. If an attached SCM becomes unattached from its parent LCM, it must send a Context Request to the CCM, which contains a non-null "request" and WTLV_PARENT_CM TLVs. The "request" TLV contains the Node ID and IP address of the "old parent LCM". If the SCM lost its link to the parent LCM, then it must also include a WTLV_LOST_LINK TLV in the Context Request. As before, the CCM includes a null or non-null WTLV_PARENT_CM TLV in the Context Reply to either direct the SCM to operate in stand-alone mode or to assign the SCM to a parent LCM, respectively.

W2—AP Operation.

W2—AP State Variables.

The AP State Variables for the W2 implementation are described in the section entitled "General AP State Variables", with one exception. The AP must maintain a Registration Table with records that include forwarding and path state information, as described in the section entitled "W2 Registration Records".

W2—AP Path Authentication.

An AP must initiate Path Authentication, after it has successfully authenticated, to establish a secret Context Transfer Key (CTK) with each of its ancestors. AP Path Authentication, in the W2 implementation, is as described above in the section entitled "General AP Path Authentication".

W2—AP Registration.

An Unattached AP scans for a potential parent SCM or AP on each of its ports that are configured in child or parent/child mode. [Note that an Attached AP becomes Unattached if it discovers a new instance of its parent AP or SCM.] An Unattached AP or CM must send an initial Registration Request to its selected parent node, on its selected primary port, to request attachment to the network. The Originator is the Unattached AP; the Requester is also the Unattached AP; and the Responder is the selected parent node (i.e. parent AP or SCM), in the initial Registration Request and the corresponding Reply.

The fields in an initial Registration Request sent by an Unattached AP are set as described below. (Unspecified fields are set to '0'.)

WLCCP header fields:

Type—'3'

Originator—Node ID of the Unattached AP.

Responder—Node ID of the selected parent node (parent AP or parent SCM).

Response-Req Flag—'1' to solicit a Reply.

Inbound Flag—'1'.

Hopwise-Routing Flag—'1'.

TLV Flag—'1' (the Request must include a WTLV_AP_PORT_LIST TLV).

Registration fields:

Requester—Node ID of the Unattached AP.

Hop Address—802 address of the Unattached AP's selected Primary Port.

Relay Node ID—'0' in a registration message generated by the Originator or Responder. Otherwise, the Node ID of an intermediate "relay" node that forwarded the message.

Initial Flag—'1'.

VLAN ID—The native VLAN ID of both the Unattached AP and the parent node. The VLAN ID value may be '0'. It is an error if the VLAN ID value is different than the parent node's native VLAN ID.

The parent node must forward an initial Registration Request from an Unattached AP inbound until it reaches the root CM. The parent node enters its Node ID in the Originator field and the Node ID of its parent CM in the Responder field, before forwarding the request inbound. An intermediate LCM must update the Responder field with the CCM Node ID before it forwards the request inbound to the CCM. The CCM returns a Registration Reply to the parent node (i.e. the Originator). The parent node updates the Responder field with the Requester Node ID before forwarding the Reply to the Unattached AP or CM.

An Attached AP or CM can send an "update" Registration Request directly to its parent CM, to refresh its path instance, with itself as both the Originator and the Requester Node and the parent CM as the Responder. The parent CM must update the Responder field, with the Node ID of its parent CM, before forwarding the request inbound.

An AP (re)transmits a Registration Request either until it receives a Registration Reply with a matching message ID, or until the maximum retries are exceeded. An AP is "registered" when it receives a matching Registration Reply with a "good" RegStatus. The Registration Reply contains a Path ID, set by the SCM, which identifies the "path instance" from the AP to the SCM.

An AP periodically sends an "update" Registration Request message to the SCM to "refresh" its mobility bindings in each node on the path to the SCM. An update Registration Request has the Initial Flag set OFF and it contains a valid Path ID.

A Registration Request from an AP must include a WTLV_AP_PORT_LIST TLV, which contains a list of AP port descriptors. Each port descriptor includes the port type, port mode (parent, child, or parent/child), and 802 port address of a physical communications interface.

A Registration Request from an AP must include an IP Address TLV.

A Registration Request from an AP, which is configured with a Proxy MIP SSID, must include a WTLV_PMIP_SSID_LIST TLV, which contains a list of Proxy MIP SSIDs and MIP HA bindings.

W2—Proxy MN Registration

This section describes MN registration by a parent AP when WLCCP registration is used to establish the Layer 2 forwarding path between the MN and the primary LAN.

A "proxy WLCCP MN", in a parent AP, provides proxy WLCCP registration services for WLCCP-unaware MNs. Each MN is registered with the SCM for the native VLAN of its parent AP, even if the MN belongs to a different VLAN.

A parent AP generates an "initial, authenticated" Registration Request message for a MN, after the MN has successfully authenticated or re-authenticated. A Registration Request for a MN must contain the MN's SSID and the default subnet for the MN.

If a parent AP does not receive an expected Registration Reply, then it must retransmit the Registration Request with the Delay field set to the elapsed time since the MN last transmitted an uplink frame. A parent AP must disassociate a MN if it does not receive an expected Registration Reply after REGISTRATION_RETRY_LIMIT retransmissions.

The fields in an initial, proxy Registration Request for a MN are set as described below. Unspecified fields are set to '0'.

WLCCP header fields:

Type—'3'

Originator—Node ID of the Parent AP.

Responder—Node ID of the SCM.

Response-Req Flag—'1' to solicit a Reply.
Inbound Flag—'1'.
Hopwise-Routing Flag—'1'.
TLV Flag—'1' (the Request must include an SSID_TLV).
Registration fields:
Requester—802 address of the MN.
Hop Address—802 address of the Parent AP's Primary Port.
Relay Node ID—'0' in a registration message generated by the Originator or Responder. Otherwise, the Node ID of an intermediate "relay" node that forwarded the message.
Proxy Flag—'1'.
Initial Flag—'1'.
Authenticated Flag—The Authenticated Flag is set to '1' in a Request to indicate that the MN was authenticated by the parent AP.
Proxy MIP Flag—set to '1' if the MN is using an SSID where Proxy MIP is enabled.
Delay—The delay in hundreds of seconds since the MN last sent an uplink frame. The delay is usually '0' if the Retry flag is '0'.
VLAN ID—The VLAN ID assigned to the MN. The MN's VLAN ID is usually the default VLAN ID assigned to the MN's SSID. The assigned VLAN ID may be '0' if the MN is assigned to the "native VLAN". The VLAN ID field, in the Registration Reply for a MN, can contain a different VLAN ID, to explicitly assign the MN to a VLAN.
SSID_TLV—The Registration Request for a MN must contain a WTLV_SSID TLV that contains the active SSID for the MN, contained in the MN's (Re)Association Request.
The Broadcast SSID Flag must be set ON if the MN associated with a broadcast SSID. A Registration Reply for a MN can include an SSID TLV, with a different SSID, to explicitly assign the MN to a service set.
AUTHENTICATION_TYPE TLV—Contains the 802.11 authentication type (Open, Shared Key, or EAP type) used to authenticate the MN.
A Registration Request, which is generated for an 802.11 station that "reassociated", must contain the BSSID of the old AP in a WTLV_OLD_AP_BSSID TLV. The BSSID is obtained from the "old AP" field in the 802.11 Reassociation Request transmitted by the station.
A Registration Request for a MN is always forwarded to the "nearest common ancestor" CM. An SCM must forward an initial Registration Request, for a MN, to its parent LCM if it receives a Registration Request from the MN's parent AP and one of the following conditions is true:
The SCM does not have a bound DPR for the MN.
Any BSSID in the received Registration Request is NOT the address of a port on the "parent AP" in the SCM's DPR for the MN.
The SCM creates or updates a "bound" DPR for the MN when it receives a matching Registration Reply from its parent LCM with a "good" status. The SCM generates a Registration Reply, when it receives the Registration Reply from its parent CM, to establish the new path instance within its subnet.
An LCM must forward a received initial Registration Request, for a MN, inbound to the CCM if it does not have a bound DPR for the MN.
A Registration Reply message for a MN always contains the MN's IP address, if it is known. A parent AP must generate a "Registration Request for a MN when it first detects a new or different IP address for the MN (i.e. by snooping IP/ARP packets transmitted by the MN). The Root CM Flag is set ON in the request to cause an update on the full path to the root CM.

A parent AP generates a Path Update message for a MN after the MN has successfully authenticated. A Path-Update message is always transmitted on the MN's VLAN to update the forwarding tables in bridges and switches. The Path-Update message is sent to the 802 address of the "old Parent AP", if the address is known and the old parent AP is on the same VLAN as the MN; otherwise, the Path-Update is sent to the 802 broadcast address on the MN's VLAN.

A parent AP must disassociate a child MN if it does not receive an uplink frame from the MN within a MAX_MN_I-NACTIVITY period. The parent AP must send a WLCCP Detach Request to the SCM when a child station (MN or AP) is disassociated. Detach Request logic is discussed in more detail below.

Data frames can be forwarded to or from a MN as soon as the MN is authenticated.

However, unicast data frames are not forwarded outbound on an AP-to-AP link until a "bound" path instance exists for the destination address. Data frames are not forwarded from a "home subnet" to a Proxy-MIP MN on "foreign subnet" until a MIP tunnel is established.

802.11 Bridge Registration.

A "parent 802.11 bridge" registers like any other AP, as described in the section entitled "AP Registration".

A "child 802.11 bridge" is the WLCCP designated bridge for a secondary Ethernet LAN. The designated bridge must register itself, as any other AP, and it must also register its attached secondary LAN and Ethernet nodes on the secondary LAN. A WLCCP designated bridge must set the Secondary LAN Flag ON in its Registration Request messages.

Unicast Flooding to a secondary LAN is enabled or disabled locally on the designated bridge's secondary Ethernet port. If unicast flooding is enabled, then the WLCCP designated bridge must set a Unicast Flooding Flag ON in its WLCCP Registration Request messages, to propagate unicast flooding requirements to the primary LAN. Unicast Flooding is dynamically enabled on a logical AP secondary port, if a Registration Request is received on the port, with the Unicast Flooding Flag set ON. In general, an AP must set the Unicast Flooding Flag ON in its Registration Request messages, if unicast flooding is statically or dynamically enabled on any of its secondary ports. Therefore, unicast flooding is enabled on any AP secondary port if the sub tree rooted at the port contains a secondary Ethernet LAN with unicast flooding enabled. Dynamically enabled unicast flooding is disabled on a secondary AP port if a Registration Request, with the Unicast Flooding Flag set ON, is not received within the maximum AP registration lifetime.

If unicast flooding is disabled on a secondary LAN, then the WLCCP designated bridge must include a WTLV_SEC_LAN_ADDR_LIST TLV, in its Registration Request records, to attach Ethernet nodes on the secondary LAN to the primary LAN. The TLV contains a list of VLAN-ID/802-address pairs for stations on the secondary LAN. The addresses can be statically configured or dynamically "learned" via backward-learning.

A user-configured Ethernet Address List can be configured on an AP Ethernet port. The Ethernet Address List contains a list of static 802 addresses, where each address identifies a station that is accessed via the Ethernet port. [The list can be configured via standard 802.1D configuration options that support the creation of "static" database entries.] A child 802.11 bridge attaches addresses in the list to the primary LAN, as described above.

WLCCP Designated Bridge Election.

This section describes an optional WLCCP Designated Bridge Election protocol that is used to elect a WLCCP designated bridge for a non-STP secondary LAN. The protocol can be used, for example, to facilitate automatic redundancy for non-STP Work-Group Bridges.

A non-STP child 802.11 bridge is configured with a Bridge Priority value from 0 (default) to 7. A Bridge ID is the concatenated Bridge Priority and WLCCP Node ID of the respective child 802.11 bridge. A Bridge ID has relatively higher bridge priority if it is lexicographically higher. The child bridge with the highest-priority Bridge ID functions as the WLCCP designated bridge for its attached secondary LAN.

A non-STP child bridge transmits periodic SCM Advertisement Reply messages, which contain its Bridge ID, on its secondary Ethernet port. A child 802.11 bridge must block its secondary Ethernet port if it receives an SCM Advertisement Reply message, with a higher-priority Bridge ID, on the port. A child 802.11 bridge becomes the active WLCCP designated bridge for its attached secondary LAN if it does not receive an SCM Advertisement Reply message on its Ethernet port, with a higher-priority Bridge ID, within WLCCP_BRG_ELECT_HOLDDOWN seconds after it begins transmitting SCM advertisements.

802 Multicast Address Registration.

An AP must set the Multicast Flooding Flag ON, in its Registration Request messages, if multicast flooding is enabled on any of its secondary ports. Multicast Flooding is dynamically enabled on a logical AP secondary port, if a Registration Request is received on the port, with the Multicast Flooding flag set ON. Therefore, multicast flooding is enabled on a secondary port if it is enabled on any other AP or secondary LAN in the sub tree rooted at the port.

An AP must include a, possibly empty, WTLV_MCAST_ADDR_LIST TLV in a Registration Request where the Multicast Flooding Flag is set OFF. The TLV contains the aggregate list of 802 multicast addresses that are enabled on the AP's secondary ports. The lo aggregate list of enabled 802 multicast addresses includes any user-configured list of enabled multicast addresses and multicast addresses registered by MNs.

A multicast address is dynamically enabled on an AP secondary port if it is contained in a WTLV_MCAST_ADDR_LIST TLV in a Registration Request or in a MULTICAST_802_ADDRESS_LIST element in an 802.11 (Re) Association message or 802.11 Action frame. A dynamically enabled multicast address is aged and discarded if it is not re-registered after the maximum AP registration lifetime.

802 multicast flooding is enabled on all AP secondary ports, by default. 802 Multicast Flooding to a secondary LAN is enabled or disabled locally on the designated bridge's secondary Ethernet port.

IP Multicast Address Registration.

"IGMP Snooping" is commonly used to automatically derive which IP multicast addresses are "active" on a port (i.e. which IP multicast addresses should be forwarded on the port). IGMP Snooping can be enabled globally or it can be enabled on each AP (i.e. secondary) port. If IGMP Snooping is enabled, then only IP multicast packets with "active" multicast IP addresses are forwarded on the secondary port.

If IGMP Snooping is disabled on an AP secondary port, then the IP Multicast Flooding Flag must be set ON in the AP's Registration Request message, so that all Multicast IP packets are flooded to the secondary port. IP Multicast Flooding is dynamically enabled on a logical AP secondary port, if a Registration Request is received on the port, with the IP Multicast Flooding Flag set ON. Therefore, IP multicast flooding is enabled on a secondary port if it is enabled on any other AP or secondary LAN in the sub tree rooted at the port.

By default, IGMP Reports are simply forwarded inbound to the primary LAN to propagate IP multicast membership information to each AP on the inbound path. If reliable IP multicast registration is required, an AP can include a WTLV_IP_MCAST_ADDR_LIST TLV in a Registration Request where the IP Multicast Flooding Flag is set OFF. The TLV contains the aggregate list of IP multicast addresses that are active on the AP's secondary ports.

[WLCCP support is not required for IP multicast filtering, if IGMP Reports are simply forwarded inbound to the primary LAN.]

Reliable Path Update Mechanism.

This section describes an optional WLCCP "Reliable Path Update" mechanism that is used to recover from lost Path-Update messages.

A new AP sends a single Path-Update Request message to update the backward-learned forwarding path, for a MN, in intermediate bridges and switches, when the MN associates. The forwarding path for the MN will NOT be updated correctly in intermediate bridges/switches if the Path-Update message is lost.

The Reliable Path Update mechanism requires that any AP Ethernet Primary Port must exist on a dedicated Ethernet link. For example, two root APs cannot be plugged into the same Ethernet hub. With that restriction, an "old AP" should not receive frames, on its primary port, for a MN that is not in its sub tree.

The mechanism is implemented as follows:

APs must maintain MN-IRRs for MNs that are not in its sub tree.

A MN-IRR is put into a "Path Update Pending" state for some threshold period (e.g. 1 minute) after a child MN is deregistered, if a Path-Update message is not received for the MN. The pending state ends if the threshold period expires, a Path-Update is received, or a Path-Check Reply indicates the MN has left the subnet. (Note that a Path-Update message may be received before a Deregistration message.)

An old parent AP generates a Path-Check Request message for a MN if a) it has an MN-IRR for the MN that is in the Path Update Pending state and b) it receives a data frame destined to the MN on its Primary Port. The Path-Check Request is sent to the old AP's parent SCM The parent SCM generates a Path-Check Reply message when it receives a Path-Check Request. If the SCM has a newer outbound path to the MN, then it sends the Path-Check Reply to the new parent AP; otherwise, it sends a Path-Check Reply to the old parent AP, to indicate that the MN is no longer registered in the subnet.

The new parent AP sends a Path-Update Request message to the old parent AP, after it determines that the MN is still associated.

MN Extended Service Sets.

An 802.11 Service Set ID (SSID) identifies an Extended Service Set (ESS), which can be considered as a "wireless access domain" for an 802.11 station. A campus network may contain multiple overlapping ESSes. An ESS may span multiple subnets. An AP can be configured with multiple SSIDs to provide access to multiple ESSes.

The following access parameters are configured for each AP SSID:

Authentication criteria (e.g. a required authentication algorithm)

Proxy MIP Flag (enabled or disabled).

VLAN ID (optional).*

If Proxy MIP is enabled, then an optional "Home Agent Address and Subnet Mask" can be configured for the SSID.*

* At most one VLAN ID or Home Agent Address can be configured for each AP SSID; however, multiple AP SSIDs can be configured with the same VLAN ID or Home Subnet Address.

The VLAN and Proxy MIP access parameters for a single ESS can be configured differently in each AP. For example, the SSID "FOO" may be configured with a VLAN ID, in a first AP, and the SSID "FOO" may be configured with a Home Agent Address in a second AP.

An SSID can be configured with a "virtual Home Agent Address" so that Proxy MIP MNs can be assigned to a MIP "virtual home subnet". [In a simple "seamless roaming" installation, all Proxy MIP MNs can be assigned to a single virtual home subnet via a centrally configured Proxy MIP SSID.]

Authentication parameters should be configured consistently for an SSID throughout an ESS.

At any given time, each MN is associated with a single ESS. The physical roaming domain for a MN is limited to those APs that are configured with the SSID for the MN. The "Proxy MIP and VLAN Integration" section includes an example ESS roaming scenario.

WLCCP Support for VLAN Trunking.

If 802.1Q VLAN Trunking is enabled in an AP, then an AP must assign each node in its sub tree to a VLAN ID. All APs and SCMs in the WLCCP spanning tree for a subnet are on the same "native" VLAN as the SCM. MNs and Ethernet stations (i.e. on a secondary LAN) can be on a different VLAN.

All APs in a subnet belong to the same "native VLAN", with one exception. A WGB that is operating in "client mode" can belong to a non-native VLAN. All Ethernet stations attached to the WGB belong to the same VLAN as the WGB. [A WGB associates as a client station in "client mode". A WGB cannot attach to its parent AP on an 802.11 VLAN trunk link, in client mode.]

A parent AP assigns a child MN to a VLAN ID. By default, a MN is assigned to the VLAN implicitly or explicitly configured for the MN's SSID. The parent AP must include the VLAN ID of the MN in Registration Request messages for the MN. A parent AP may re-assign a MN to a different VLAN ID when it receives a Registration Reply message if the Registration Reply message contains a different VLAN ID, or the Registration Reply message contains a WTLV_HOME_SUBNET TLV.

A Registration Reply message will contain a different VLAN ID, if an AAA server assigns the VLAN ID. The second case is described in the following section.

An AP must "count" the number of MNs in its sub tree for each enabled VLAN. A VLAN is "active" on an AP secondary VLAN trunk port, if there are 1 or more registered stations, in the sub tree rooted at the port, that belong to the VLAN. An egress multicast VLAN filter, on each secondary VLAN trunk port, is used to discard multicast transmissions for inactive VLANs.

Proxy MIP is used to provide "proxy" Mobile IP services for IP MNs that do not directly support Mobile IP.

[Currently, Proxy MIP does not provide seamless inter-subnet mobility for non-IP applications. Proxy MIP can be extended to provide seamless mobility for any ethernet-based application by adding backward-compatible extensions to standard MIP. Such MIP extensions require minimal WLCCP changes, and do not affect the WLCCP topology.]

Proxy MIP Registration and Deregistration.

The SCM for each subnet maintains the Mobile IP Registration State for Proxy MIP MNs. A "foreign SCM" triggers proxy MIP Registration Requests for a MN when it first visits the foreign subnet, and periodically thereafter, to maintain FA/HA mobility bindings for the MN. [The SCM cannot trigger ME? registration until complete home subnet bindings (i.e. HA address and MN IP address) are established for the MN in the SCM.] A "home SCM" triggers a proxy MIP Deregistration Request for a MN when it first roams back to its home subnet from a foreign subnet.

MIP Registration Request frames must be transmitted to a MIP FA with the source Ethernet address of the respective MN, so that the FA can discover the Ethernet address of the MN. Therefore, a parent AP must transmit Proxy MIP Registration Requests, to avoid incorrect "backward learning" in any intermediate transparent bridges or switches. A parent AP generates a MIP registration request when it receives an indication from the SCM.

A "Proxy MIP MN" is a MN that requires proxy MIP services. A Proxy MIP MN must be configured with an SSID that has proxy MIP enabled. The SSID of a MN is contained in 802.11 (Re)Association Request messages; therefore the parent AP for a MN can immediately determine if the MN may require proxy MIP services. The parent AP must set the Proxy MIP Flag ON, in a Registration Request for a MN, if Proxy MIP is enabled for the MN's SSID. The SCM includes a WTLV_MIP4_REG_REQ TLV in the Registration Reply, to trigger the parent AP to transmit a MIP Registration (or Deregistration) Request.

An SCM is NOT in the MIP forwarding path for a proxy-MIP MN on a foreign subnet. IP packets for the MN are forwarded between the home subnet and foreign subnet over a MIP tunnel between the MIP HA and FA. The FA forwards IP frames outbound to the unicast 802 address of the MN. The proxy MIP entity, in the parent AP of the MN, forwards IP frames from the MN, inbound, to the unicast 802 address of the FA (i.e. reverse tunneling) or to the unicast 802 address of the default router (i.e. triangular routing).

SSID/Home-Agent Database.

The SSID/HA database contains a list of MIP HAs that are accessible for each SSID, which is configured with Proxy MIP enabled, on an AP in the SWAN network. Entries in the SSID/HA database are automatically populated by APs, as described below. A MN is not dynamically bound to a home subnet, based on its source IP address, unless it a) is authorised to use its SSID (i.e. via RADIUS) and b) a MIP HA for the home subnet is in the list of accessible HAs for the MN's SSID.

Each SSID configured on an AP is either implicitly or explicitly bound to a default VLAN or to a MIPv4-HA/Subnet-mask pair. If a Proxy MIP SSID is bound to a default VLAN, then the AP must attempt to automatically discover the HA for that VLAN by monitoring HA advertisements transmitted on the VLAN. An AP must also attempt to discover the subnet mask for the VLAN. An AP can discover the subnet mask for each VLAN by broadcasting an ICMP Subnet Mask Request message on the VLAN or by monitoring subnet information in Cisco CDP messages.

An AP that is configured with a Proxy MIP SSID must include a WLTV_PMIP_SSID_LIST container TLV in its Registration Request messages. The container TLV contains a list of WTLV_SSID TLVs, where each SSID TLV is followed by 0 or more WTLV_MIPV4_AGENT TLVs. Each MIPV4_AGENT TLV contains the IP address, subnet mask, and capabilities of a HA that is accessible for the respective SSID. The subnet mask field for a HA is set to '0' if it is unknown. The SCM consolidates the list of Proxy MIP SSIDs and HAs from all APs in its domain and forwards the resulting lists of Proxy MIP SSIDs and associated HAs to the CCM. The CCM uses the information to automatically populate the SSID/HA database and the "Home Agent Database" described below.

Home Agent Database.

The CCM maintains a Home Agent Database that contains a list of MIPv4-HA/Subnet-mask pairs. Entries in the list are statically configured and/or automatically populated by APs. The CCM uses the database to determine the MIP HA for a Proxy MIP MN when it receives a Registration Request with the Proxy-MIP Flag set ON and a WTLV_HOME_SUBNET TLV. The HOME_SUBNET TLV contains an IP address, of a Proxy MIP MN, which was discovered by "snooping" the source IP address in packets sent by the MN. The CCM determines the HA for the MN by matching the MN's subnet address to the subnet address of an HA. A "longest matching prefix" search algorithm can be used if some subnet masks are not known. The MN must be authorized to access the HA's home subnet, as described above.

Proxy-MIP/VLAN Integration.

An AP that is attached to the network on a primary VLAN trunk port has a Layer 2 "VLAN link" to multiple Proxy MIP "home subnets". If a parent AP has a VLAN link to a Proxy MIP MN's home subnet, then the Proxy MIP MN is assigned to the corresponding VLAN ID; otherwise, the Proxy MIP MN is assigned to the native VLAN, even if the native VLAN is not the home subnet.

Each AP must maintain a "VLAN Table" with an entry for each VLAN ID that is enabled on the AP. A VLAN is marked as "Proxy-MIP enabled" if 1 or more Proxy MIP SSIDs are bound to the VLAN. Each VLAN Table entry for a Proxy-MIP enabled VLAN must contain the address and subnet mask of one or more MIPv4 HAs.

The SWAN infrastructure will return any existing home subnet bindings for a Proxy MIP MN in a WTLV_HOME_SUBNET TLV in a Registration Reply message for the MN. The MN is "at home" if the HA address in the Registration Reply matches any HA address in the VLAN Table. In that case, the MN is assigned to the VLAN ID contained in the matching entry. A MIP "Deregistration" message is generated when a proxy-MIP MN first roams into the domain of an SCM, and the MN is bound to its home subnet via VLAN trunking.

Home Subnet Bindings.

The "home subnet bindings" for a Proxy MIP MN include the MIP HA address, subnet mask, and IP address for the MN. The HA bindings for a MN can be statically configured or automatically derived, as described above. The CCM maintains the "master copy" of the home subnet bindings for each active Proxy MIP MN. The proxy MIP client entity, in an SCM, must determine the home subnet bindings for a Proxy MIP MN, before it can generate a MIP Registration Request for the MN.

A Proxy-MIP MN is assigned to a home subnet with the following (lowest to highest) prioritized rules:

1) A MN is assigned to the default VLAN or Home Subnet Address configured for its SSID in the parent AP.

2) If an AP discovers an IP address of a Proxy-MIP MN, then the MN is assigned to the home subnet that corresponds to its IP address.

3) The MN is assigned to a statically configured home subnet and MIP HA(s).

A proxy MIP MN with existing MIP home subnet bindings is always bound to its current home subnet—even if the MN is associated with an AP that has a matching SSID that is configured with a VLAN ID or Home Agent Address for a different subnet (see the section entitled "Proxy MIP and VLAN Integration"). Proxy MIP is used to access the home subnet, if the MN is attached to an AP on a foreign subnet (i.e. an AP that is not attached to the home subnet on a LAN link or a VLAN trunk link).

A WTLV_HOME_SUBNET TLV is used to establish home subnet bindings for a Proxy MIP MN. The TLV contains the following fields: a) MIPv4 HA, b) Subnet Mask, and c) MN IP Address. The Subnet Mask and MN IP Address fields can be zero if the values are not known. A MN cannot be bound to a home subnet until its IP address is discovered.

MN home subnet assignment proceeds as follows. (Note that a Registration Request for a MN always contains the MN's SSID in a WTLV_SSID TLV.)

When a Proxy MIP MN roams to a parent AP, the AP must include a WTLV_HOME_SUBNET TLV in the initial Registration Request message for the MN. The HOME_SUBNET TLV must contain the "default MIP HA" address and the MN's IP address, if it is known. The default MIP HA is the either a) the HA that is configured for the Proxy MIP MN's SSID or b) it is the HA that is bound to the VLAN that is configured for the Proxy MIP MN's SSID. The default MIP HA address is used to dynamically establish the home subnet for a MN that does not have existing home subnet bindings. The initial Registration Request is forwarded to the nearest common ancestor CM—the "common CM".

The common CM forwards any existing home subnet bindings for the Proxy MIP MN to the MN's parent AP, in a WTLV_HOME_SUBNET TLV in the corresponding Registration Reply message. The outbound Reply message establishes the bindings in each CM and AP on the path to the MN. The existing bindings override the bindings established by the parent AP. Note that the "existing bindings" may have been statically configured or dynamically established (i.e. by an old parent AP).

The CCM is the "common CM" if the Proxy MIP MN does not have existing home subnet bindings. In that case, the HA IP address in the WTLV_HOME_SUBNET TLV in the Proxy MIP MN's Registration Request is used to determine the MIP HA for the MN. The home subnet bindings are returned in a WTLV_HOME_SUBNET TLV in the Registration Reply generated by the CCM.*

* An SCM cannot trigger MIP registration until both the MN's IP address and home agent are known. If the MN's IP address is unknown, then the MN's parent AP must immediately generate another Registration Request when it discovers the MN's IP address. A Proxy MN can be assigned to a local VLAN before its IP address is known.

A parent AP may discover that a MN is using an IP address that does not belong to its current home subnet. In that case, the parent AP must immediately generate an update Registration Request, which contains the IP address in a WTLV_HOME_SUBNET TLV, to dynamically assign the MN to the home subnet that corresponds to its IP address.

The CCM uses the SSID/HA database to verify that the MN is permitted to access the home subnet that corresponds to its IP address. If the home subnet assignment is authorised, then the home subnet bindings are contained in a WTLV_HOME_SUBNET TLV in the corresponding Registration Reply generated by the CCM.

Note that a parent AP consistently assigns a Proxy MIP MN to the home subnet contained in a WTLV_IPV4_HOME_SUBNET TLV in a Registration Reply message for the MN. A Proxy MIP MN is "at home" if the HA address in the Registration Reply message matches a HA address in the AP's VLAN Table. In that case, the MN is assigned to the corresponding VLAN ID in the matching table entry. The parent AP generates a MIP Deregistration Request message for a MN if it receives a Registration Reply, with a WTLV_MIP4_REG_REQ TLV, and the MN is "at home".

Dynamically-assigned home subnet bindings for a MN are aged and discarded if the MN becomes inactive. Therefore, the home subnet for a Proxy-MIP MN may change (i.e. to a more optimal subnet) after some period of inactivity.

A MN can be bound to a "virtual home subnet" by configuring APs with a Proxy MIP SSID that is bound to the virtual home subnet.

[The "IPv4 Subnet Selection Option for DHCP", RFC 3011 [6], is used to maintain the IP address for a DHCP MN on a foreign subnet.]

Proxy MIP Unicast Forwarding.

By default, "triangular routing" is used to forward packets for a Proxy MIP node on a foreign subnet: Packets transmitted on a home subnet, which are destined to a MN on a foreign subnet, are encapsulated by a HA and tunnelled to the MN. Packets transmitted by a MN on a foreign subnet are sent to the MAC address of an IP gateway on the foreign subnet. The gateway uses normal IP routing to deliver the packets to the target IP address.

As an option, "MIP Reverse Tunneling" can be enabled per Proxy MIP SSID. If Reverse Tunneling is enabled for a Proxy MIP MN's SSID, then packets transmitted by the MN on a foreign subnet are encapsulated and forwarded inbound to the MN's HA, as specified in RFC 3024.

[Reverse Tunneling is needed for unicast IP packets for a couple reasons. The DHCP server for a "private subnet" may allocate an unroutable "private IP address" to a proxy MIP MH associated with the subnet. The router for a private subnet typically contains a Network Address Translator (NAT). A NAT enables a station, with a private address, to access other public networks by translating the station's private address to a routable "public address", in IP packets sent and received by the station. Port Address Translation (PNAT) is used to multiplex many private addresses onto a single NAT public address. If a proxy MIP MH, with a private home address, roams to a foreign subnet, then packets transmitted by the MH must be forwarded to its home subnet, on a reverse MIP tunnel, to enable any necessary NAT translation. A private IP address may NOT be an unambiguous "home IP address" if multiple private subnets, in the same campus network, share the same IP address space.

A campus network may contain "secure subnets" that are protected by "firewall" logic. Packets transmitted by a MN on a foreign subnet may not be allowed to pass through a firewall that exists between the foreign subnet and the home subnet.]

Proxy MIP Multicast Forwarding

Per RFC 2002, a standard Mobile IP MN, on a foreign subnet, must generate IGMP Membership Report messages to participate in an IP multicast group. The Membership Reports can either be relayed onto the foreign subnet or forwarded to the MN's MIP HA.

APs use "IGMP Snooping" to derive IP group membership information for a MN. An AP sends an IGMP General Query to a MN, when it associates, to solicit IGMP Reports.

A parent AP can be configured to process IGMP Membership Reports and IP Multicast packets for a proxy-MIP MN on a foreign subnet, in one of the following ways:

An AP can forward the Membership Reports to the MN's HA via the local FA. The MIP HA is responsible for encapsulating and forwarding multicast packets, transmitted on the MN's home subnet, to the MN on the foreign subnet, as defined in RFC 2002. If the HA tunnels IP multicast packets to the MN, then the proxy MIP entity in a parent AP is responsible for removing the "inner encapsulation header" from a multicast packet forwarded by the HA to a proxy-MIP MN on a foreign subnet. The parent AP can then send the resulting multicast IP packet to the unicast 802 address of the MN. [The parent AP cannot send the multicast IP packet to a multicast 802 address because it will be incorrectly received by MNs in a different broadcast domain.] Multicast packets transmitted by a proxy-MIP MN on a foreign subnet are forwarded to the MN's home subnet, via a MIP "reverse tunnel", as described in RFC 3024.

An AP can relay Membership Reports onto the local "foreign" LAN. Multicast routers are then responsible for forwarding multicast packets to the MN's foreign subnet. The AP must (i.e. selectively) forward the multicast packets to the MN. Multicast packets transmitted by a proxy-MIP MN on a foreign subnet are relayed onto the local, foreign subnet. A multicast router is responsible for forwarding the multicast packets to the home subnet.*

*The second option requires router support for IGMP and multicast routing. It is preferred because it is much more efficient.

Proxy MIP Broadcast Domains.

Currently, an 802.11 broadcast domain corresponds to a VLAN. Proxy MIP nodes should be segregated into a broadcast domain that corresponds to a home subnet. 802.11 broadcast domains should be generalized so that a common radio interface is used for both VLAN and Proxy MIP broadcast domains. If Proxy MIP MNs are not receiving broadcast messages, then a single Proxy MIP broadcast domain can be used to group all Proxy MNs on foreign subnets that share the same 802.11 broadcast encryption suite. IP multicast packets must be copied and transmitted into a Proxy MIP broadcast domain, as required. Note that it is not necessary to segregate standard MIP MNs into such broadcast domains.]

IP Address Registration.

The IP address of each MN, AP, and CM interface is optionally registered with the CCM as soon as it is discovered. IP/802 address pairs are distributed in Registration Reply messages to each AP and CM on the path to a node. The IP/802 address bindings are used to facilitate automatic ARP filtering (see below).

Context Records.

Each WLCCP CM caches context and configuration information for each node in its domain. In this document, a "Context Record" contains context and configuration information that is transferred when a station roams from an old AP to a new AP. A "context manager", in each AP or CM, manages Context Records. A Context Record is transferred as an opaque object in WLCCP Registration and Context messages. [Currently, a Context Record only contains RADIUS configuration information.]

Lateral Context Transfer.

A Context message can be used to forward a MN's dynamic context "laterally" from a node on the "old" branch to a node on the "new" branch (e.g. from an old SCM to a new SCM) when the MN roams. The nearest common ancestor CM automatically facilitates lateral context transfer by forwarding the MN's old and new bindings in Registration Reply and Deregistration Request messages, respectively. For example, an SCM can forward the address of the "old AP" to the "new AP" in a Registration Reply message. The nearest common ancestor CM functions as a trusted third party, for lateral message authentication, as described in the section entitled "WLCCP Message Authentication".

Context information can be transferred laterally in either a Context Request or Reply message. For example, an old AP can asynchronously forward context information to a new AP in a Request message. As a second example, a new SCM can send a Context Request to an old SCM to "request" context information. The old SCM returns the request context information in the corresponding Context Reply message.

Dynamic ARP Filtering.

The IP address of each node in the sub tree rooted at a "root AP" is registered with the SWAN infrastructure. The IP address of a MN is transferred to the new parent AP each time the MN roams. If "ARP Translation" is enabled, then an AP must filter broadcast ARP requests that are transmitted on 802.11 secondary ports. An ARP request is discarded if the target IP address does not belong to a node in its sub tree; otherwise, if the target IP address belongs to a node in the sub tree, the broadcast destination MAC address is translated to the node's unicast MAC address. The resulting unicast frame is then forwarded as any other unicast frame.

RADIUS Accounting.

A RADIUS accounting client in an LCM maintains a single RADIUS accounting session for each MN. A parent AP periodically forwards accounting statistics inbound in a WLTV_ACCOUNTING TLV contained in a WLCCP Context Request message. The WLCCP registration protocol is used to transfer the accounting session when a MN roams. Any "residual" accounting statistics are forwarded inbound in Deregistration Reply and Detach Request messages, when a MN roams or becomes disconnected. If a MN roams to a "new" Local Control Domain then either a) a new accounting session must be started at the new LCM, or b) the accounting session must be transferred from the old LCM to the new LCM via lateral context transfer.

MN Support for WLCCP

MNs do not directly participate in WLCCP. Instead, MNs can support WLCCP 802.11 elements that convey subnet and path cost information. The elements facilitate the following:

A MN can select a parent AP that provides the least-cost path to the primary LAN on the MN's home subnet.

A MN can quickly determine when it has roamed to a different subnet.

A standard Mobile IP MN can quickly discover a MIP Foreign Agent.

A MN can reliably register its IP address.

A MN can reliably register its enabled multicast addresses.

802.11 elements that are used to convey WLCCP information are defined in the section entitled "WLCCP 802.11 Elements".

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for establishing a secure association for a mobile node with a network, the steps comprising:
    associating with an access point;
    authenticating the mobile node using an extensible authentication protocol by the access point;
    establishing a network session key; and
    wherein the network session key is used to establish a key request key and a base transient key;
    wherein the base transient key is used as a counter mode key generator to provide fresh pairwise transient keys;
    wherein the key request key is used by the mobile node to prove it has proper authorization for a session;
    wherein roaming after establishing the network session key comprises:
    incrementing a rekey number, producing an incremented rekey number,
    generating a fresh pairwise transient key based on the incremented rekey number;
    sending a reassociation request to a new access point, the reassociation request containing the incremented rekey number, and
    verifying the new access point is using the fresh pairwise transient key based on the incremented rekey number.

2. The method of claim 1 further comprising sending the network session key to a Subnet Context Manager.

3. The method of claim 1 wherein the extensible authentication protocol is 802.1X compliant.

4. The method of claim 1 further comprising authenticating key refreshes using the key request key.

5. The method of claim 4 further comprising deriving a pairwise transient keys using the base transient key.

6. The method of claim 1 further comprising delivering the group transient key in the re-association request to compress and optimize messages.

7. The method of claim 1 further comprising computing a Key Request Key and a Base Transient Key from the network session key using a pseudo random function.

8. The method of claim 1 further comprising sending a re-association request, the re-association request comprising a rekey request number and an authenticated element.

9. The method of claim 8 further comprising verifying the rekey request number of the re-association request is greater than a previous rekey request number.

10. The method of claim 8 wherein the re-association request further comprises replay protection.

11. The method of claim 10 wherein the replay protection comprises a timestamp.

12. The method of claim 10 wherein the replay protection comprises a random challenge.

13. The method of claim 8 wherein the authenticated element authenticates a security policy defined by the mobile node.

14. A mobile node, comprising:
    means for associating with an access point;
    means for authenticating the mobile node using an extensible authentication protocol by the access point;
    means for establishing a network session key; and
    wherein the network session key is used to establish a key request key and a base transient key;
    wherein the base transient key is used as a counter mode key generator to provide fresh pairwise transient keys;

wherein the key request key is used by the mobile node to prove it has proper authorization for a session; and means for roaming, the means for roaming comprises means for incrementing a rekey number, producing an incremented rekey number, means for generating a fresh pairwise transient key based on the incremented rekey number, means for sending a reassociation request to a new access point, the new reassociation request containing the incremented rekey number, and means for verifying the new access point is using the fresh pairwise transient key based on the incremented rekey number.

15. The mobile node of claim 14 further comprising means for sending the network session key to a Subnet Context Manager.

16. The mobile node of claim 14 wherein the extensible authentication protocol is 802.1X compliant.

17. The mobile node of claim 14 further comprising means for authenticating key refreshes using the key request key.

18. The mobile node of claim 17 further comprising means for deriving a pairwise transient keys using the base transient key.

19. The mobile node of claim 14 further comprising means for delivering the group transient key in the re-association request to compress and optimize messages.

20. The mobile node of claim 14 further comprising means for computing a Key Request Key and a Base Transient Key from the network session key using a pseudo random function.

21. The mobile node of claim 14 further comprising means for sending a re-association request, the re-association request comprising a rekey request number and an authenticated element.

22. The mobile node of claim 21 further means for comprising verifying the rekey request number of the re-association request is greater than a previous rekey request number.

23. The mobile node of claim 21 wherein the means for re-association request further comprises means for replay protection.

24. The mobile node of claim 23 wherein the means for replay protection comprises means for using a timestamp.

25. The mobile node of claim 23 wherein the means for replay protection comprises means for a random challenge.

26. The mobile node of claim 21 wherein the authenticated element authenticates a security policy defined by the mobile node.

27. A computer program product having a computer readable medium having computer program logic recorded thereon for establishing a secure association for a mobile node with a network, comprising means for associating with an access point;

means for authenticating the computer readable instructions using an extensible authentication protocol by the access point;

means for establishing a network session key; and wherein the network session key is used to establish a key request key and a base transient key;

wherein the base transient key is used as a counter mode key generator to provide fresh Pairwise transient keys;

wherein the key request key is used by the computer readable instructions to prove it has proper authorization for a session; and means for roaming, the means for roaming comprises means for incrementing a rekey number, producing an incremented rekey number, means for generating a fresh pairwise transient key based on the incremented rekey number, means for sending a reassociation request to a new access point, the new reassociation request containing the incremented rekey number, and means for verifying the new access point is using the fresh pairwise transient key based on the incremented rekey number.

28. The computer program product of claim 27 further comprising means for sending the network session key to a Subnet Context Manager.

29. The computer program product of claim 27 wherein the extensible authentication protocol is 802.1X compliant.

30. The computer program product of claim 27 further comprising means for authenticating key refreshes using the key request key.

31. The computer program product of claim 30 further comprising means for deriving a pairwise transient keys using the base transient key.

32. The computer program product of claim 27 further comprising means for delivering the group transient key in the re-association request to compress and optimize messages.

33. The computer program product of claim 27 further comprising means for computing a Key Request Key and a Base Transient Key from the network session key using a pseudo random function.

34. The computer program product of claim 27 further comprising means for sending a re-association request, the re-association request comprising a rekey request number and an authenticated element.

35. The computer program product of claim 34 further means for comprising verifying the rekey request number of the re-association request is greater than a previous rekey request number.

36. The computer program product of claim 34 wherein the means for re-association request further comprises means for replay protection.

37. The computer program product of claim 36 wherein the means for replay protection comprises means for using a timestamp.

38. The computer program product of claim 36 wherein the means for replay protection comprises means for a random challenge.

39. The computer program product of claim 34 wherein the authenticated element authenticates a security policy defined by the computer program product.

40. A method according to claim 1, the verifying step further comprises retrieving group transient key from the new access point using the fresh pairwise key.

41. A method according to claim 1, further comprising
the reassociation request further comprising a mobile node identification and an authentication element;
validating the current security association to the network by use of the key request key; and
the verifying step further comprising receiving a response from the new access point, the response comprising an authentication element, the authentication element comprising delivery of a new group transient key, and proof of possession of the fresh pairwise transient key by using the new pairwise transient key to authenticate the element.

42. The method according to claim 1, wherein roaming comprises a rekey sequence, the rekey sequence comprising:
computing an authentication element, the authentication element comprising a rekey request number and the fresh pairwise transient key;

transmitting to the new access point a call for a new pairwise transient key and alerting the new access point that the mobile node is ready to receive and transmit using the fresh pairwise transient key;

receiving a response authentication element from the new access point; and the verifying step comprises verifying the response authentication element comprises the fresh pairwise transient key and receipt of the group transient key.

* * * * *